Sept. 13, 1966 B. J. WARMAN 3,272,924

AUTOMATIC TELECOMMUNICATION SWITCHING SYSTEMS

Filed July 6, 1961 88 Sheets-Sheet 14

Sept. 13, 1966 B. J. WARMAN 3,272,924

AUTOMATIC TELECOMMUNICATION SWITCHING SYSTEMS

Filed July 6, 1961 88 Sheets-Sheet 16

Sept. 13, 1966 B. J. WARMAN 3,272,924

AUTOMATIC TELECOMMUNICATION SWITCHING SYSTEMS

Filed July 6, 1961 88 Sheets-Sheet 21

Sept. 13, 1966 B. J. WARMAN 3,272,924

AUTOMATIC TELECOMMUNICATION SWITCHING SYSTEMS

Filed July 6, 1961 88 Sheets-Sheet 22

Sept. 13, 1966 B. J. WARMAN 3,272,924

AUTOMATIC TELECOMMUNICATION SWITCHING SYSTEMS

Filed July 6, 1961 88 Sheets-Sheet 23

Sept. 13, 1966 B. J. WARMAN 3,272,924

AUTOMATIC TELECOMMUNICATION SWITCHING SYSTEMS

Filed July 6, 1961 88 Sheets-Sheet 24

Sept. 13, 1966 B. J. WARMAN 3,272,924

AUTOMATIC TELECOMMUNICATION SWITCHING SYSTEMS

Filed July 6, 1961 88 Sheets-Sheet 26

Sept. 13, 1966 B. J. WARMAN 3,272,924

AUTOMATIC TELECOMMUNICATION SWITCHING SYSTEMS

Filed July 6, 1961 88 Sheets-Sheet 27

Sept. 13, 1966 B. J. WARMAN 3,272,924

AUTOMATIC TELECOMMUNICATION SWITCHING SYSTEMS

Filed July 6, 1961 88 Sheets-Sheet 28

Sept. 13, 1966 B. J. WARMAN 3,272,924

AUTOMATIC TELECOMMUNICATION SWITCHING SYSTEMS

Filed July 6, 1961 88 Sheets-Sheet 33

Sept. 13, 1966 B. J. WARMAN 3,272,924

AUTOMATIC TELECOMMUNICATION SWITCHING SYSTEMS

Filed July 6, 1961 88 Sheets-Sheet 34

Sept. 13, 1966 B. J. WARMAN 3,272,924

AUTOMATIC TELECOMMUNICATION SWITCHING SYSTEMS

Filed July 6, 1961 88 Sheets-Sheet 35

Sept. 13, 1966 B. J. WARMAN 3,272,924

AUTOMATIC TELECOMMUNICATION SWITCHING SYSTEMS

Filed July 6, 1961 88 Sheets-Sheet 36

Sept. 13, 1966 B. J. WARMAN 3,272,924

AUTOMATIC TELECOMMUNICATION SWITCHING SYSTEMS

Filed July 6, 1961 88 Sheets-Sheet 39

Sept. 13, 1966 B. J. WARMAN 3,272,924

AUTOMATIC TELECOMMUNICATION SWITCHING SYSTEMS

Filed July 6, 1961 88 Sheets-Sheet 40

Sept. 13, 1966 B. J. WARMAN 3,272,924

AUTOMATIC TELECOMMUNICATION SWITCHING SYSTEMS

Filed July 6, 1961 88 Sheets-Sheet 41

Sept. 13, 1966 B. J. WARMAN 3,272,924

AUTOMATIC TELECOMMUNICATION SWITCHING SYSTEMS

Filed July 6, 1961 88 Sheets-Sheet 42

Sept. 13, 1966 B. J. WARMAN 3,272,924

AUTOMATIC TELECOMMUNICATION SWITCHING SYSTEMS

Filed July 6, 1961 88 Sheets-Sheet 43

Sept. 13, 1966 B. J. WARMAN 3,272,924

AUTOMATIC TELECOMMUNICATION SWITCHING SYSTEMS

Filed July 6, 1961 88 Sheets-Sheet 44

Sept. 13, 1966 B. J. WARMAN 3,272,924

AUTOMATIC TELECOMMUNICATION SWITCHING SYSTEMS

Filed July 6, 1961 88 Sheets-Sheet 45

Sept. 13, 1966 B. J. WARMAN 3,272,924

AUTOMATIC TELECOMMUNICATION SWITCHING SYSTEMS

Filed July 6, 1961 88 Sheets-Sheet 47

Sept. 13, 1966 B. J. WARMAN 3,272,924

AUTOMATIC TELECOMMUNICATION SWITCHING SYSTEMS

Filed July 6, 1961 88 Sheets-Sheet 48

Sept. 13, 1966 B. J. WARMAN 3,272,924

AUTOMATIC TELECOMMUNICATION SWITCHING SYSTEMS

Filed July 6, 1961 88 Sheets-Sheet 49

Sept. 13, 1966 B. J. WARMAN 3,272,924

AUTOMATIC TELECOMMUNICATION SWITCHING SYSTEMS

Filed July 6, 1961 88 Sheets-Sheet 50

Sept. 13, 1966 B. J. WARMAN 3,272,924

AUTOMATIC TELECOMMUNICATION SWITCHING SYSTEMS

Filed July 6, 1961 88 Sheets-Sheet 53

Sept. 13, 1966 B. J. WARMAN 3,272,924

AUTOMATIC TELECOMMUNICATION SWITCHING SYSTEMS

Filed July 6, 1961 88 Sheets-Sheet 54

Sept. 13, 1966 B. J. WARMAN 3,272,924

AUTOMATIC TELECOMMUNICATION SWITCHING SYSTEMS

Filed July 6, 1961 88 Sheets-Sheet 59

Sept. 13, 1966 B. J. WARMAN 3,272,924

AUTOMATIC TELECOMMUNICATION SWITCHING SYSTEMS

Filed July 6, 1961 88 Sheets-Sheet 61

Sept. 13, 1966 B. J. WARMAN 3,272,924

AUTOMATIC TELECOMMUNICATION SWITCHING SYSTEMS

Filed July 6, 1961 88 Sheets-Sheet 63

Sept. 13, 1966 B. J. WARMAN 3,272,924

AUTOMATIC TELECOMMUNICATION SWITCHING SYSTEMS

Filed July 6, 1961 88 Sheets-Sheet 65

Sept. 13, 1966 B. J. WARMAN 3,272,924

AUTOMATIC TELECOMMUNICATION SWITCHING SYSTEMS

Filed July 6, 1961 88 Sheets-Sheet 66

Sept. 13, 1966 B. J. WARMAN 3,272,924

AUTOMATIC TELECOMMUNICATION SWITCHING SYSTEMS

Filed July 6, 1961 88 Sheets-Sheet 75

Sept. 13, 1966 B. J. WARMAN 3,272,924

AUTOMATIC TELECOMMUNICATION SWITCHING SYSTEMS

Filed July 6, 1961 88 Sheets-Sheet 76

Sept. 13, 1966 B. J. WARMAN 3,272,924

AUTOMATIC TELECOMMUNICATION SWITCHING SYSTEMS

Filed July 6, 1961 88 Sheets-Sheet 77

Sept. 13, 1966 B. J. WARMAN 3,272,924

AUTOMATIC TELECOMMUNICATION SWITCHING SYSTEMS

Filed July 6, 1961 88 Sheets-Sheet 80

Sept. 13, 1966 B. J. WARMAN 3,272,924

AUTOMATIC TELECOMMUNICATION SWITCHING SYSTEMS

Filed July 6, 1961 88 Sheets-Sheet 83

Sept. 13, 1966 B. J. WARMAN 3,272,924

AUTOMATIC TELECOMMUNICATION SWITCHING SYSTEMS

Filed July 6, 1961 88 Sheets-Sheet 87

United States Patent Office 3,272,924

Patented Sept. 13, 1966

3,272,924

AUTOMATIC TELECOMMUNICATION SWITCHING SYSTEMS

Bloomfield James Warman, Charlton, London, England, assignor to Associated Electrical Industries Limited, London, England, a British company Filed July 6, 1961, Ser. No. 122,137
Claims priority, application Great Britain, July 18, 1960, 25,065/60, Patent 989,336
34 Claims. (Cl. 179—18)

Figure 1:
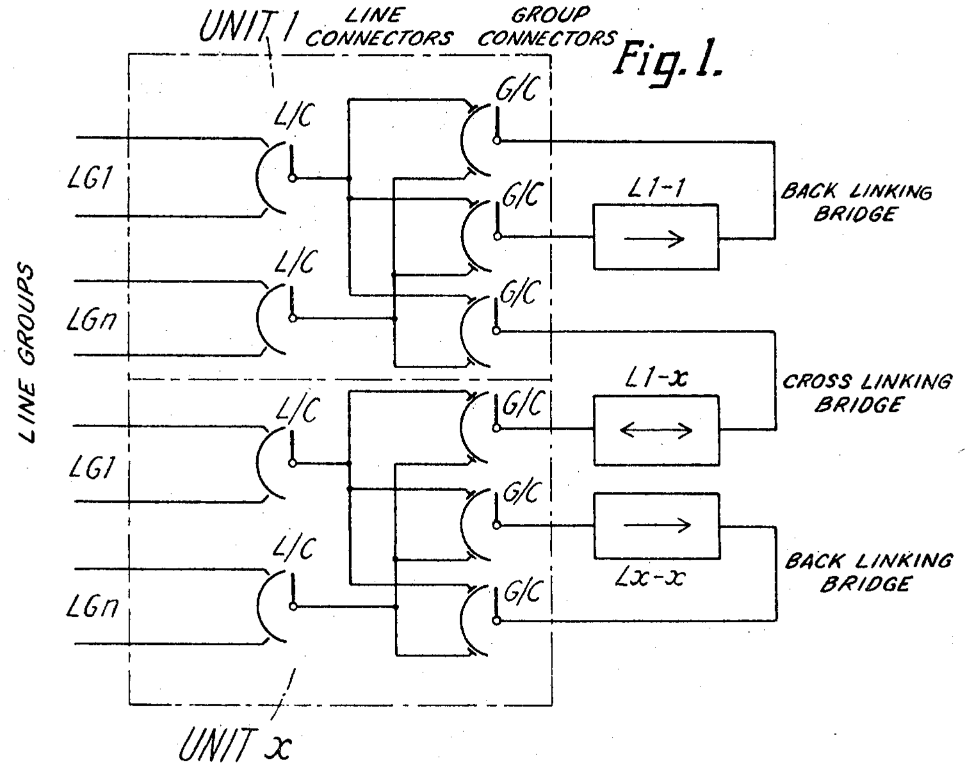

This invention relates to automatic telecommunication, for example telephone, switching systems.

The essential purpose of an automatic telephone exchange is to permit the establishment through the exchange of an interconnection channel between calling and called lines connected to the exchange, which lines may be subscribers' lines or incoming or outgoing junctions. The interconnection channel thus established may be a physical path completed through electromechanical switches such as two-motion switches, uniselector switches or crossbar switches, or through electronic switching devices serving an analogous function, or may be a time channel as in electronic exchange systems working on a time division multiplex (T.D.M.) basis. In these T.D.M. systems the lines connected to the exchange may also be each shared on a time multiplex basis by a number of subscribers or junction connections. Although the invention is applicable with advantage to all the various forms of exchange system just referred to, it was developed mainly in connection with motor uniselector systems and accordingly in explaining the invention and the advantages that can be derived from it, reference will be made especially to these uniselector systems for the purposes of illustration.

In exchanges with electromechanical or analogous electronic switching, it is common for the lines served by an exchange to be divided into groups and to be connected to what will for convenience be called line connector switches having access to or from what will be called group connector switches affording selective connection to the line connectors and through them to the lines in the several groups. These line connectors and group connectors, as so called herein, will be understood to be electro-mechanical or electronic switches if their nature is not otherwise indicated. The line connectors correspond for instance to line finders and final selectors in a line finder system or to primary switches in a crossbar system, while the group connectors correspond to second-finders or group selectors in a line finder system or to secondary switches in a crossbar system. In certain line finder systems the line connectors can be used for effecting connection to either calling or called lines, that is, they can serve both line finding and final selection functions, thereby achieving, as regards the number of such switches required, a certain economy which as will appear hereinafter can be still further enhanced by the application of the principles of the present invention. Likewise in a crossbar system, the primary switches can afford connection both to calling and to called lines.

As the subsidiary facilities which telephone exchanges are required to provide have multiplied, constant efforts have been made to effect economies in the switching equipment required, namely in respect of the size and/or the number of switches, without significantly decreasing the grade of service provided. If, in order to provide a high grade of service in a two-motion or uniselector system having line and group connectors as aforesaid, the line connectors are made accessible to all the group connectors (full availability), then the degree of concentration of the traffic is likely to be low, giving uneconomic utilisation of the group connectors. It is therefore usual in some systems to give the group connectors limited availability, for instances by so-called grading. This grading can allow a greater concentration of traffic to group connectors of given outlet capacity thus enhancing the efficiency by increasing the traffic occupancy without a corresponding deterioration of the overall efficiency due to limitation of the availability. As will be seen, the present invention can lead to still greater economy of switching apparatus at the expense of some additional equipment the cost of which can be largely offset by utilising it, at least in part, so as also to make available other facilities likely to be required.

In general, in the prior art systems with limited availability, it is a matter of pure chance whether any particular call, which will itself originate on a pure chance basis, will find that there is available for it a free interconnection channel that can afford connection between the calling and called lines. The switching quantities (number and/or size of switches) required to give any call a maximum chance of being successfully established, have therefore to be estimated on the basis of this pure chance traffic and are correspondingly relatively great. For like considerations, in known T.D.M. systems, the number of time channels made available to the system and consequently the pulse rate of the pulses defining these channels have to be relatively high.

The present invention, which by discrete choice of route through the exchange can improve the probability of successful connection of each call beyond that which could be expected on the normal basis of pure chance call routing, is thought to represent an entirely new concept in exchange design. Not only can the application of the basic principles of the invention lead in itself to simplification of or overall economies in the exchange equipment, particularly in larger exchanges, but even greater economy and advantage can be achieved by allying these basic principles with other techniques some of which are already known in the art but do not afford in themselves the advantages obtainable when they are used in an exchange embodying the invention. For instance, as will appear hereinafter it is necessary in carrying out the present invention to have calling line identification, which is not in itself new and is required for example on automatic telephone exchanges having automatic message accountancy. When used for such purpose alone, the provision of calling line identification tends to be disproportionately expensive, but by using it also for the purposes of the invention its cost can be greatly offset not only by the mere fact of its double use but also by the economies arising from the application of the basic principles of the invention.

According to the invention as basically conceived, the switching equipment which in an automatic telecommunications exchange permits the selective establishment of communication paths between lines connected to the exchange, whether they be paths shared on a T.D.M. basis or paths capable of spatial establishment by switching equipment of the exchange, is provided in a plurality of sections which together afford between any two of said lines, through the switching equipment, a plurality of possible communication paths of which the incoming portions are respectively afforded by various ones of said sections and the outgoing portions are likewise afforded by various ones of the sections, and a section selecting arrangement is provided which in respect of a call between two lines and on the basis of information conveyed to it as to pertinent conditions relating to the several sections is operable to cause the establishment of a connection between said two lines over such one of the possible paths as will give best advantage having regard to said conditions.

The selection effected by the section selecting arrangement may be based on various considerations dependent partly on the type of exchange (uniselector, crossbar, T.D.M. or other) and including considerations of traffic balance, incipient conditions of traffic congestion, on/off condition of power supplies in certain sections, removal of apparatus from service for modification or maintenance, and so on. For instance the selection may be such as to tend to balance the traffic over the several sections, or may be such as to take switches into use in accordance with a scheme of priority irrespective of the relative amounts of traffic in the sections, or may be such as to avoid taking into use a "last choice" switch in any section unless the other sections have also only such "last choice" switches. These last two bases of selection may be especially advantageous in crossbar or cross-point systems in that they can reduce the chances of a call being blocked because no suitable switch is available. In a uniselector system or any other system having full availability in the section, traffic balance may be more important in that it can result in a better utilisation of the exchange equipment, but this traffic balancing can also with advantage be combined with selection on the basis of avoiding a "last choice" switch until it is no longer possible to do so. In other words, if the requirements of traffic balance would call for the selection of a section in which a "last choice" switch would have to be used, then that section would not be chosen unless conditions in the other sections are similar in this respect, in which event the choice may be made in a discrete order. In a T.D.M. system embodying the invention, the selection of a particular section to provide an interconnection channel for a call may be made so as to utilise the most advantageous pulse position available. In general, the invention can lead to a better utilisation of the exchange equipment by causing each call to be set so as to give subsequent calls a greater chance of being successfully established, thereby enabling the grade of service to be increased for a given quantity of switching equipment or, conversely, the switching requirements to be reduced for a given grade of service.

In carrying out the invention for an exchange in which a path established by switching equipment of the exchange serves a call exclusively, that is, on an unshared (non-T.D.M.) basis, each of the sections referred to may be capable within itself of affording such a path between any two lines. There may then be provided in respect of each section an individual route selecting arrangement which, being supplied in respect of a call with information as to the identity of the calling and called lines, selects a route or path between these lines within the relevant section, provided that there is such a path which is free, and collates and passes to the section selecting arrangement information as to the conditions in its section; the section selecting arrangement acting on the basis of this information thereupon selects a particular section for establishing the call and causes an individual control arrangement in the selected section to bring about setting of the switching equipment therein so as to establish the path that was selected. It then becomes possible to consider each section, with the equipment individually associated with it, as constituting a separate, small traffic capacity sub-exchange capable of setting up calls to and from all the exchange lines. Each of these sections or sub-exchanges may be arranged to have full availability switching within it, thereby simplifying traffic calculations for the section and avoiding the provision of, for instance, the grading frames which would be required if the switching were given limited availability by grading. It would of course be possible to have limited availability within the sections, and this may be desirable in crossbar or cross-point switching systems: it is thought however that any advantage gained from such limitation of availability in a uniselector system may be found to be minimal. With the traffic approximately balanced over the sections by the section selecting arrangement, the total traffic carrying capacity of the exchange as a whole is substantially greater than the sum of the capacities of the individual sections, because each section can be regarded as acting as an organised overflow for the others and the selection from the randomly arriving calls of those best suited to it, allows a high degree of call packing into the sections, giving large simulated availability.

With each section virtually constituting a separate small exchange as aforesaid, any section can be taken out of service without interfering with the operation of the other sections, thereby permitting the removal of switching apparatus from service for maintenance, alteration or testing or for any other purpose such as power plant economy in off-peak periods. When a section has been isolated in this way an inhibiting condition can be applied which prevents the section selector from selecting that section. This sectionalised security is especially advantageous in fully electronic systems where security and power economy usually represent a more serious problem. On T.D.M. systems the increase of simulated availability by discrete route choice can allow a reduction in the number of pulse channels required without increase in the number of switching stages.

Instead of each section affording within itself a path between any two lines, the section may cooperate in pairs to provide the complete path, one section of each pair affording the incoming side of the path and being linked to the other section of the pair which affords the outgoing side. This will be explained more fully later with reference to FIG. 4*a*.

In an exchange embodying the invention further switching economy may be effected by introducing a limitation of availability in that each section is made up of a number of units each serving a proportion of the total number of lines, with linking circuits (links) provided between the units in order that lines served by different units may have access to each other only through these links and the switches in the units concerned. Route selection through the sections would then also include the selection of an appropriate link or group of links serving the units involved. Where the exchange size is too small to justify more than one unit per section, a limitation of the availability can still be introduced by providing links which afford linking between the single-unit sections where they would have linked to other units had these been provided. The section selection may then be organised to balance the traffic between the link groups linking different pairs of sections.

In carrying out the invention the connections of the exchange lines to line connectors in the several sections or the connections between such line connectors and group connectors in the several sections may with advantage be so organised that the plurality of paths afforded by the sections between any two lines do not follow the same routes through the line and group connectors in all sections. To this end the lines of a group served by a particular line connector or line connector multiple in one section may be distributed over two or more line connectors or line connector multiples in another section, so that whereas the paths afforded by the first section will include the same line connector or line connector multiple for all calls involving that line group, the paths afforded by the second section and including certain of the line connectors of that section for calls for some lines of the group will include different line connectors of the same section for calls for other lines of the group. In particular, when the sections are made up of a number of units as aforesaid, the lines served by any one unit in one section may be distributed over two or more units in another section. As will be explained more fully later, this can give further advantage in respect of traffic balance and the amount of traffic that can be handled, because the balancing of the traffic between sections then also gives a balance of the traffic in and between the units. This has the effect of offsetting the limitation of availability introduced by the unitisation of and cross-linking in the sections, in that it gives a larger simulated availability to each unit.

A somewhat similar effect can be achieved by arranging that of the line connectors serving a particular line group in each section, all of these line connectors are accessible to the same group connector or group connector multiple in one section, whereas in another section some of the line connectors are accessible to one group connector or group connector multiple and the others are accessible to another group connector or multiple. Both of the balancing arrangements just described provide for a spreading of the traffic over the group connectors and are to be distinguished from known arrangements of so-called slip multipling on line connectors which give spreading of traffic over these line connectors only. The arrangement described above in which the spreading of traffic is achieved by the organised connection of the lines to the line connectors, will also afford traffic spread over these line connectors in addition to spreading traffic over the group connectors.

Figure 4A:
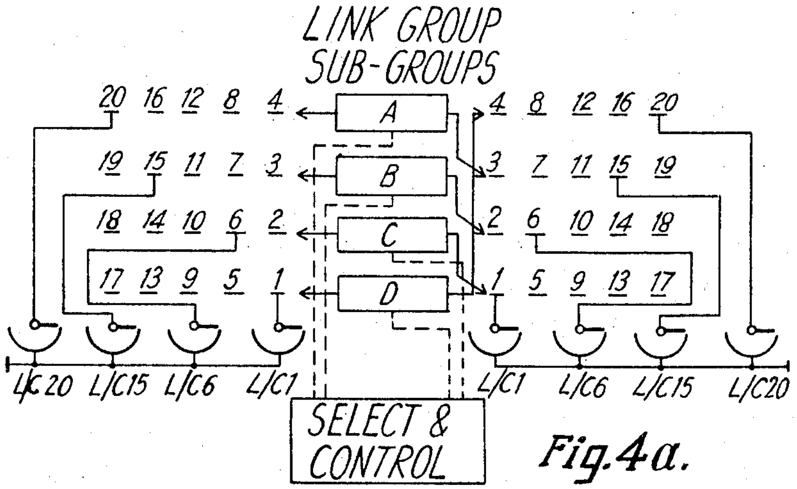
Figure 2:
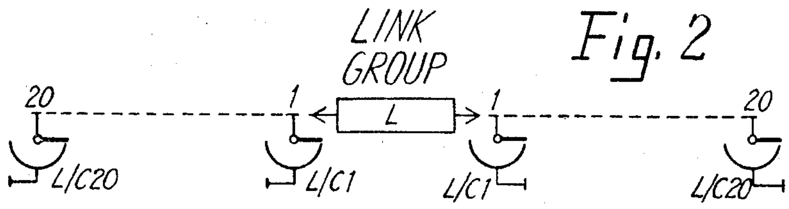
Figure 3:
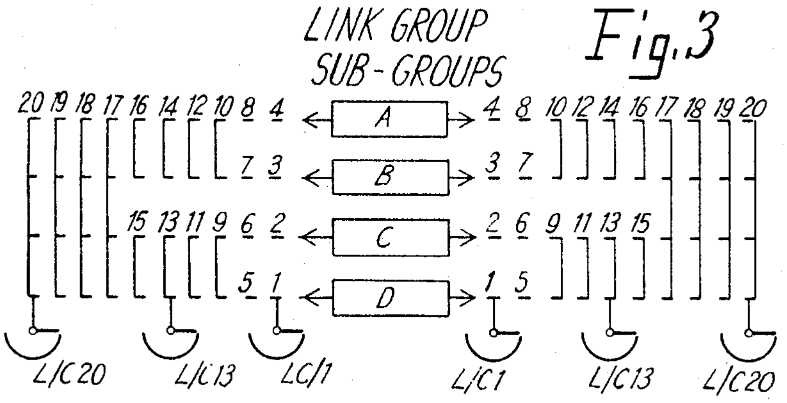
Figure 4:
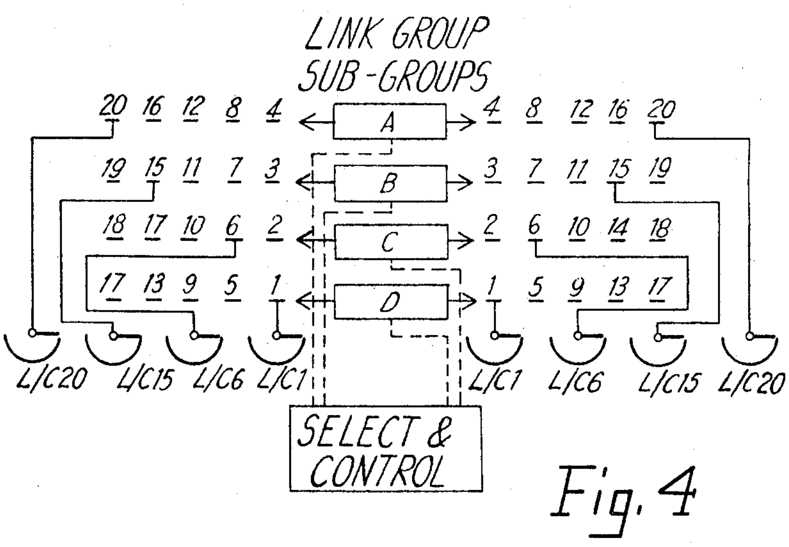
Figure 5:
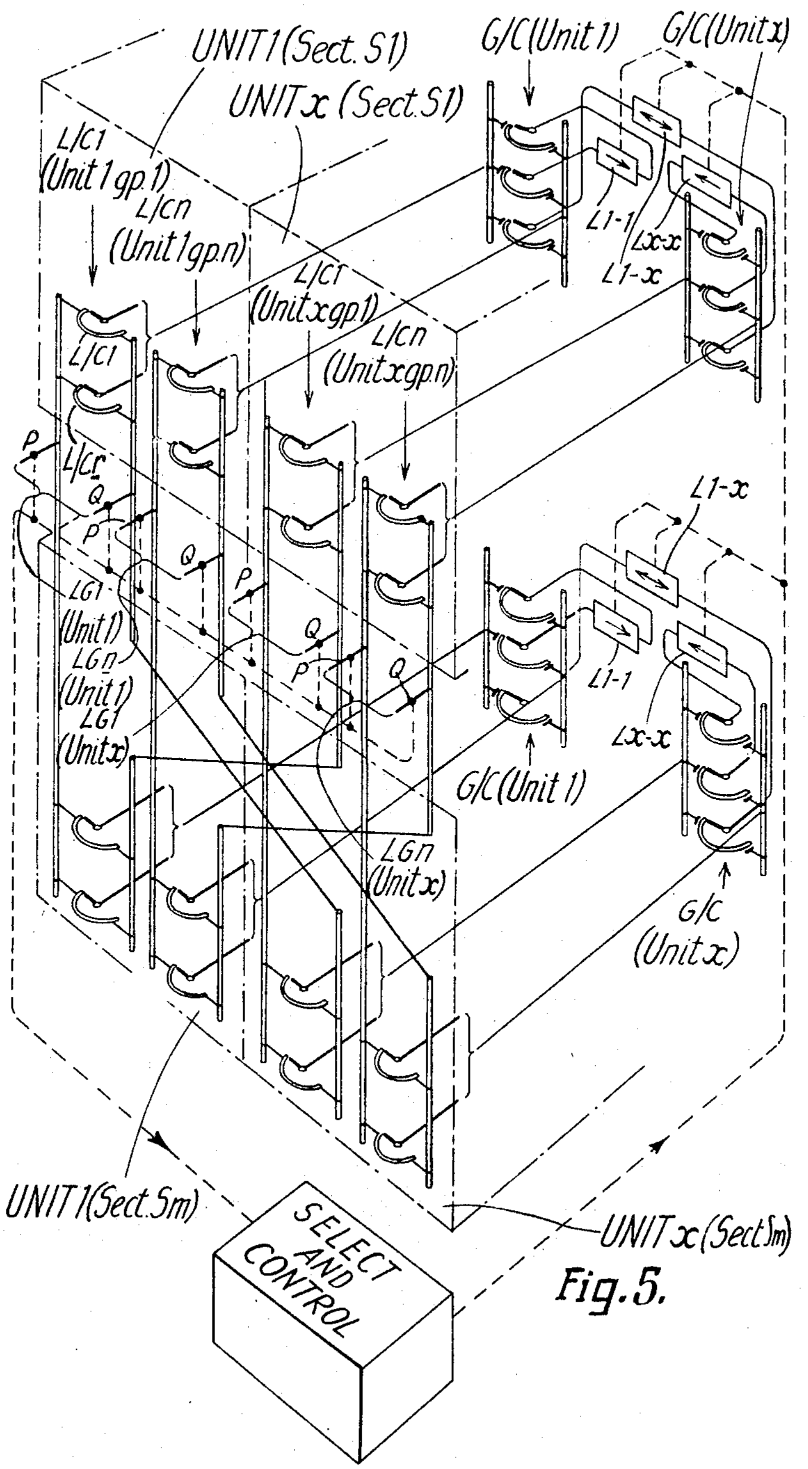
Figure 6:
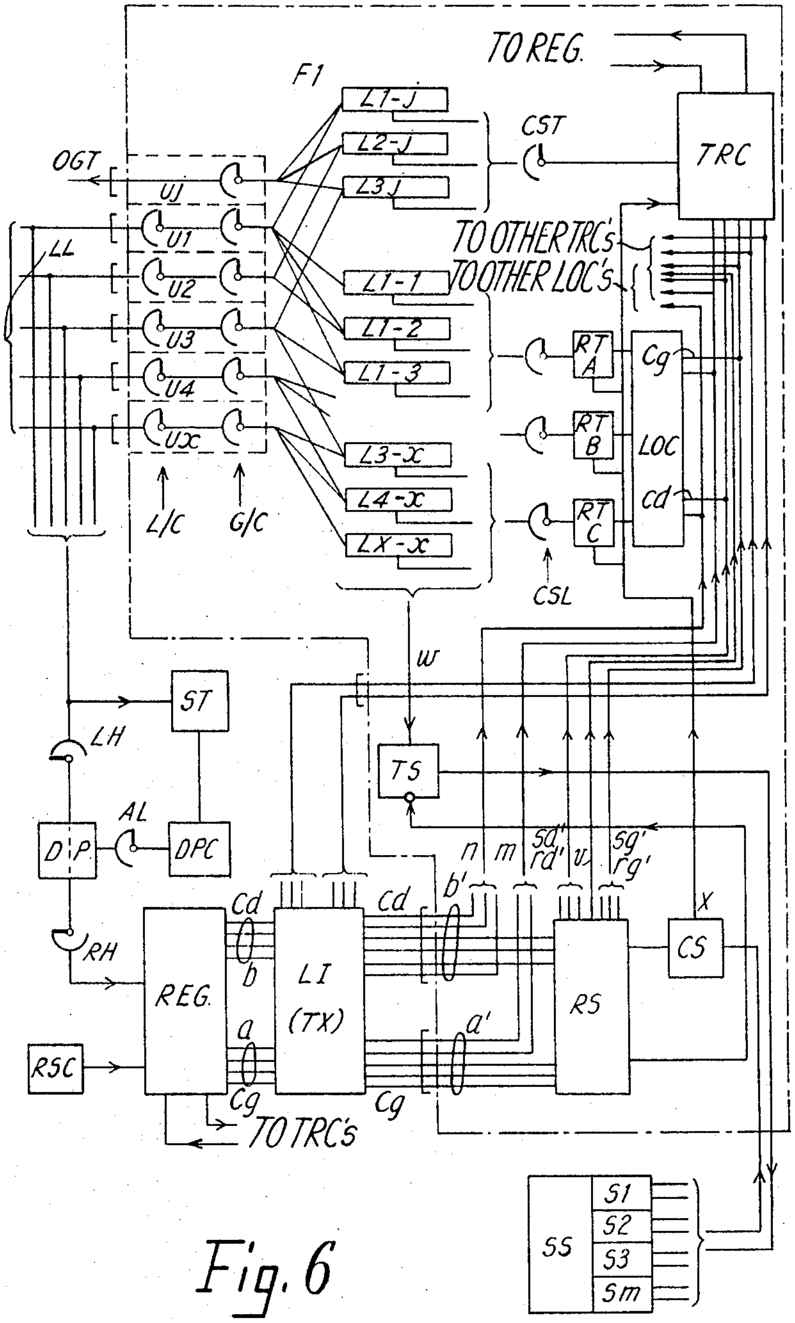
Figure 7:
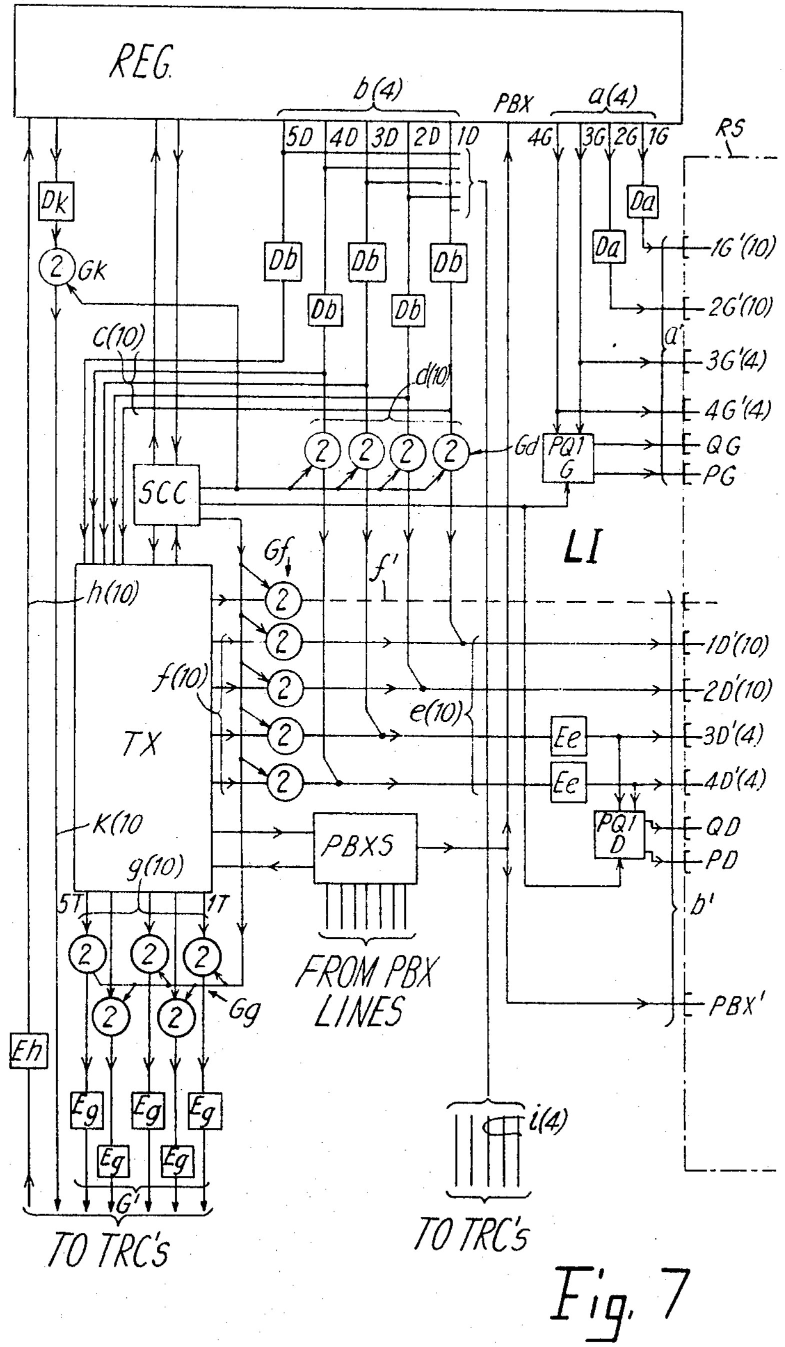
Figure 8:
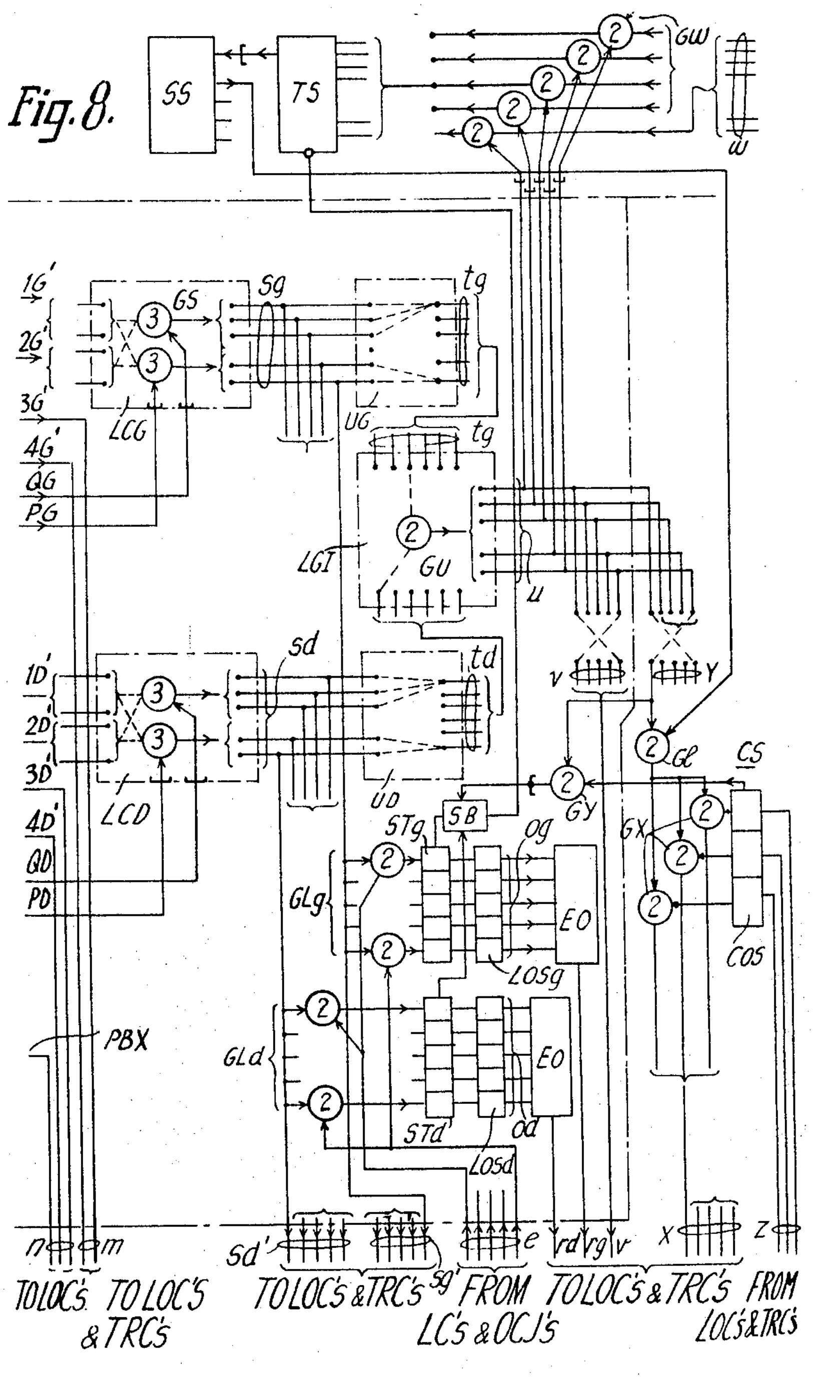

In further describing the invention, the manner in which it can be carried out and the advantages which arise from its use both on its own account and in conjunction with other techniques, reference will be made to the accompanying drawings which relate particularly to motor uniselector systems, by way of example, and of which:

FIG. 1 schematically illustrates an arrangement of line connectors and group connectors provided in two units with associated linking circuits;

FIGS. 2–4*a* will be referred to in explaining the basic principles of the invention, FIGS. 2 and 3 relating to known arrangements and FIGS. 4 and 4*a* to the new arrangement;

FIG. 5 schematically illustrates the build-up of the switching equipment in an exchange embodying the invention;

FIG. 6 is a general trunking diagram with certain parts of the exchange represented in block form;

FIGS. 7 and 8 are more detailed diagrams on the one hand of a line location identifier and on the other hand of a route selector and controller selector all represented in block form in FIG. 6, the integers of these parts being represented in so-called logical or functional manner; and The remaining figures concern exemplary circuit details for various parts of the exchange as represented in FIGS. 6, 7 and 8.

The embodiment of the invention about to be considered concerns a telephone exchange which, being sectionalised in accordance with the invention, includes in each section a number of switching units each serving a proportion of the total number of lines served by the exchange and each comprising a number of line connectors and group connectors constituted by motor uniselector switches. Each line connector in a unit has some smaller number of lines connected to its according to its outlet capacity, and each group connector in a unit affords selective access between the line connectors on the one hand and, on the other hand, one side of a linking transmission bridge the other side of which is connected either to another group connector in the same unit so as to have access through it to the line connectors of that unit, or to a group connector of another unit so as to have access through it to the line connectors of this latter unit and thence to the lines served by this latter unit. A transmission bridge connected in the former manner will be referred to as a back-linking bridge and will be one of a group of such bridges the number of which will be determined according to well-known principles on the basis of expected traffic: a transmission bridge connected in the other manner, that is between different units, will be referred to as a cross-linking bridge and will likewise be one of a group of such bridges linking the two units concerned. It is assumed that the cross-linking bridges are "both-way" bridges, that is, by appropriate switching, either side of the bridge can act as the incoming side while the other side acts as the outgoing side: this use of "both-way" bridges has the advantage that the availability of the bridges is effectively double that of normal one-way bridges, thereby giving increased efficiency so that the total number of cross-linking bridges required for the expected traffic can be significantly reduced. This in turn implies a reduced number of group connectors, it being appreciated that each linking bridge individually requires two group connectors which are respectively connected to its opposite sides and are included either in the same unit (back-linking bridges) or in different units (cross-linking bridges).

The general arrangement is illustrated diagrammatically in FIG. 1 for two units 1 and $x$. Each arc L/C represents a group of uniselector line connectors multipled over their bank contacts to a group of lines LG, while each arc G/C represents a group of group connectors multipled over their bank contacts to the line connectors of a number of line connector groups. The number of lines per line group depends on the outlet capacity of the line connectors, while the number of line connectors and hence the number of line connector groups per unit depends on the outlet capacity of the group connectors. The rectangle L1–1 represents a group of back-linking transmission bridges for unit 1, rectangle $Lx$–$x$ likewise represents a group of back-linking bridges for unit $x$, and rectangle L1–$x$ represents a group of both-way cross-linking bridges between these two units 1 and $x$. In general, one group of back-linking transmission bridges is required for each unit, plus one group of both-way cross-linking bridges for each pair of units: that is, for $x$ units the number of bridge groups required is $x+(x-1)+(x-2)\ \ldots\ (x-x)$, of which $x$ are back-linking bridge groups and the remainder are cross-linking groups. To give specific numbers by way of example, a suitable number of transmission bridges per group may be, say, between 30 and 40. The total number of transmission bridges to serve a total of, say, 10,000 lines with tolerable occupancy may be of the order of 800 to 1000. This gives a number of transmission bridge groups of the order of 20 to 30. The number of units for a 10,000 line exchange could therefore be 6 (requiring $6+5+4+3+2+1=21$ transmission bridge groups) or 7 (requiring 28 transmission bridge groups), giving the number of lines served by a unit in the order of 1500. These figures are of course very approximate.

In practice in an exchange embodying the invention the size of a unit may in general lie between 1000 and 2000 lines, being determined as a function of the outlet capacity of the line connectors and group connectors taken in conjunction with the number of separate sections into which the switching equipment is divided.

In line finder systems in which line finding and final selection are effected by different groups of uniselectors, it is well known that, depending on the grade of service and expected traffic, a multiple of some 20 line finder switches and 20 final selector switches all having 200 outlets may be required for each 200 lines, making a total of 40 such switches in all for each 200 lines. By combining the line finder and final selection functions it becomes possible to provide the same service using the same number of switches of half the size, namely 100 outlets. Twenty such switches would then be required for each 100 lines because the traffic for a group of 100-outlet line connectors serving both line finding and final selection functions is the same as for a group of 200-outlet switches serving only one of these functions. If 200-outlet switches were used for the multipled group connectors in each unit, then assuming that each line connector multiple comprises twenty 100-outlet line connectors the total number of lines per unit would be up to 1000, which is rather smaller than the size of unit previously estimated. This assumes full availability of the switches in each unit: that is, each group connector has access to all the line connectors of the unit and in particular to all the line connectors in each multiple serving a line group LG. This full availability is represented diagrammatically in FIG. 2 in which the groups of dashes 1–20 represent for different switches in the group connector multiple respective groups of 20 outlets connected directly to the 20 line connectors serving a line group. Every line connector on the left-hand side is available for connection to any line connector on the right-hand side via the group connectors and the linking bridge groups L to which the group connectors give access. This means that line connectors connected to early-choice group connector outlets on one side have full opportunity to couple to line connectors connected to late-choice outlets on the other side, which they would only rarely be required to do. Outlets of the switches are therefore being provided to permit couplings that will rarely be used.

The well-known principle of grading can be applied to improve the situation by giving limited availability to early-choices where the probability of successful choice is at a maximum and full availability to late-choices where it is most needed. This is represented in FIG. 3. The group of linking bridges L of FIG. 2 is divided into a number of sub-groups A, B, C, D and the group connector multiple is divided into a corresponding number of sub-multiples. Each horizontal group of dashes on each side of each sub-group A, B, C, D represents a group of group connector outlets on the corresponding group connector sub-multiple. The early outlets in each group are connected to individual line connectors, the intermediate outlets share the line connectors to which they are connected with corresponding outlets in one of the other group connector sub-multiples, and the last outlets share their line connectors with the corresponding outlets in all the group connector sub-multiples, that is these last outlets have full availability. It can be seen that by grading the availability in this way, only ten outlets are needed on each group connector sub-multiple to give access to the twenty line connectors serving a line group. This means that the group connectors can have access to twice as many line groups, thereby doubling the size of a unit, without increasing the sizes of the switches required for the line connector (100-outlet) and group connectors (200-outlet).

In comparison with the foregoing known arrangements of FIGS. 2 and 3, the application of the principles of the present invention, by virtue of traffic balance achieved thereby, can avoid the need for giving full availability even to the last-choice outlets, can consequently dispense with the grading frames which would be needed for effecting the necessary cross-connections if grading were employed, and allows the use of smaller (for example 100-outlet) group connectors and 100-outlet line connectors to serve the same size of unit. Referring to FIGS. 4 and 4*a*, which for comparison purposes illustrate the application of the invention in a manner similar to FIGS. 2 and 3, the group L of linking bridges of FIG. 2 is again divided into, say, four sub-groups A, B, C, D and the group connector multiple is correspondingly divided into sub-multiples. The horizontal lines of dashes have the same significance as in FIG. 3 and the outlets which they represent give access to the same number of line connectors, although the number per sub-multiple has been radically reduced. The outlets are all connected to individual line connectors, and circuits represented by the rectangle marked "SELECT AND CONTROL" are provided. These circuits by choosing a route through one of the linking bridge sub-groups and the associated group connectors and line connectors can ensure that a call will be successfully established if a clear route is available: at the same time the choice can be arranged to give minimum blocking to subsequent calls. This ability to make a discrete choice of route allows the divided linking bridge group to carry traffic approaching that which it would carry if fully available, in spite of all the group connector outlets having in fact only limited availability.

As can be seen from FIG. 4 only 5 outlets of a group connector sub-multiple are now required for each line connector sub-multiple serving the line group, thus enabling a unit of 2000 lines to be served by group connectors of half the size (that is 100-outlet) as compared with the graded system of FIG. 3.

In FIGS. 4 and 4*a* each of the group connector sub-multiples, together with the line connectors to which it has access, correspond to one section of the exchange as hereinbefore referred to in setting forth the invention. For instance the group connector sub-multiples having access to the line connectors 4, 8, 12, 16, 20 in the several line connector groups which it serves, that is, the group connector sub-multiple to which the uppermost horizontal row of dashes relate, is included in one section along with these line connectors, while the group connector sub-multiple having access to line connectors 3, 7, 11, 15, 19 in the several line connector groups, together with these line connectors, are included in another section, and so on. In FIG. 4 each of the linking bridge sub-groups A, B, C, D, serves a particular section so that each section affords within itself, independently of the other sections, the possibility of establishing an interconnection path between any two lines in the line groups served by the line connector multiples L/C1 . . . L/C20. Thus the four sections can provide the choice of four mutually separate routes or paths between any two lines, the choice being made by the "SELECT AND CONTROL" circuits. In FIG. 4*a* on the other hand the linking bridge sub-groups A, B, C, D, link the sections in pairs, so that an interconnection path between any two lines involves two sections one of which affords the incoming portion of the path, that is, between the calling line and a linking bridge circuit, and the other of which affords the outgoing portion of the path between the linking bridge circuit and the called line. Here again, however, the sections can between them provide, for interconnecting any two lines, a choice of the same number of mutually separate paths as there are sections, the choice being made by the "SELECT AND CONTROL" circuits. The cross-linking bridges may still be arranged to operate each way, and now that back-linking bridges serving calls originated and terminated in the same unit will reach the calling and called lines through different sections there may be some advantage in making the back-linking bridges reversible also.

The actual size of unit, which as indicated above may lie between 1000 and 2000 lines, may in a practical embodiment be varied by modifying the number of sections into which the exchange is divided. Thus with 4 sections as assumed above, a unit of 2000 lines is possible with 100-outlet line connectors and group connectors, whereas with 3 sections approximatel 1500 lines per unit can be accommodated, the precise number depending in all cases on the traffic per line. With 2 sections approximately 1000 lines can be accommodated, although this size of unit may tend to be too small for large exchanges. It will be appreciated that this variation of unit size with number of sections allows the exchange to be constructed to a more ideal format over a wide range of requirements.

The build-up of the switching equipment of an exchange embodying the invention is represented in more detail in FIG. 5, for which it is assumed that the exchange employs motor uniselector switches for its line connectors and group connectors, these switches being represented in conventional manner, and that the linking circuits are included in the individual sections as in FIG. 4 rather than between sections as in FIG. 4*a*. Typical numbers of lines and switches are indicated in the following description of FIG. 5 and these numbers will be adhered to for the subsequent detail description of various selectors and control circuits. In FIG. 5, in which recourse has been made to a three-dimensional representation in order to show the arrangement of the switches as clearly as possible, each arc L/C or G/C represents a single switch and is shown multipled with one or more other switches. (This is to be compared with FIG. 1 in which each arc itself represents a multiple of switches.) The switching equipment of the exchange is divided into a number of sections S1 . . . S*m* and each of these sections is divided into a number of units 1 . . . *x*, each comprising a number of line connectors L/C having access to and from a multiple of group connectors G/C individual to each unit. Back-linking transmission bridge groups represented by rectangles L1–1 and L*x*–*x* and cross-linking transmission bridge groups represented by rectangle L1–*x* are provided in each section for each unit and between each pair of units on the basis already explained in connection with FIG. 1. The line connectors of each unit in each section S1 . . . S*m* are divided into a number of groups 1 . . . *n* each comprising a number of line connectors L/C1 . . . L/C*r*. Corresponding outlets of the several line connectors 1 . . . *r* of a group in a section are multipled together and to corresponding multipled outlets in corresponding line connector groups in each other section, but not necessarily in the corresponding unit in such other section as will be explained later. Taking section S1 as reference, each group 1 . . . *n* of multipled line connectors L/C1 . . . L/C*r* in each unit serves an individual group of lines LG1 . . . LG*n*, these lines being multipled over the several sections according to the multipling of the line connector outlets. Assuming that each line group LG consists of a hundred lines and that the estimated traffic is such as to call for a total of 20 line connectors having common access to these lines, then if there are 4 sections S1 . . . S*m* ($m=4$) the number of line connectors in each group 1 . . . *n* in each unit will be $20/4=5$ (that is, $r=5$). Assuming that the group connectors are 100-outlet switches so that each of them can give access to 100 line connectors, then the number of groups of line connectors per unit can be $100/5=20$ (that is, $n=20$). If the line connectors are also 100-outlet switches then each line connector group can serve 100 lines giving a total of $100\times20=2000$ lines per unit. For a 10,000 line exchange there would therefore be 5 units 1 . . . *x* (that is, $x=5$) in each section. The number of transmission bridge groups such as L1–1, L*x*–*x*, L1–*x* would then be $5+4+3+2+1=15$ for each section.

As previously indicated the multipling of the lines of the line groups LG over the several sections S1 . . . S*m* is effected by multipling the outlets of each line connector group in each unit of any section to corresponding outlets of corresponding line connector groups in the other sections but not necessarily in the corresponding units in these other sections. One form of connection to this end will now be explained. The lines of each line group LG are divided into at least two sub-groups P and Q. The line connector outlet multiples to which the P-lines are connected extend over corresponding line connector groups in corresponding units in the several sections, but the line connector outlet multiples to which the Q-lines are connected are multipled over corresponding line connector groups in *different* units in the several sections. For example, the P-lines in group LG1 are multipled over the line connectors of group 1 in unit 1 of all sections S1 . . . S*m*, whereas the Q-lines in group LG1 are multipled over the line connectors of group 1 in unit 1 of section S1 and over the corresponding group, i.e. group 1, in unit *x* of section S*m*. This slipping of the Q-segment of the multiples between units at the point of connection between sections, as represented by the cross-connections in FIG. 5, means that for a call between the P-lines the same two units are involved in each section whichever section may be selected to establish the call, whereas for calls between two Q-lines or between a P- and a Q-line the two units involved may be different depending on the section selected. The effect of this is to give a balance of the traffic not only over the several sections but also over the several units of the sections, even although the section selection only chooses between the routes offered by the various sections. This therefore still further increases the effective availability of the units and therefore of the linking bridge groups serving them. Furthermore an increased level of irregular traffic to the line connectors can be tolerated, because the P-lines can take into use all the (20) line connectors serving them in the several sections and the Q-lines can take further line connectors into use from the other sections, provided of course that they are available. This therefore enables traffic peaks in a particular line group to be better catered for.

FIGS. 9 to 50 show exemplary circuit details of an exchange embodying the invention and having its switching equipment organised on the lines of FIG. 5, but before describing these detailed circuits there will first be described in general terms, with reference to the block schematic diagram of FIG. 6, the operations that take place in establishing a call. This will then be followed by a description in more detail, but still in general terms, of the manner which certain of the parts represented by rectangles in FIG. 6, in particular the line location identifier, the route selector and the controller selector can be organised to fulfill the functions required of them, this latter description being made with reference to FIGS. 7 and 8.

Referring to FIG. 6, there is represented near the top left-hand corner a number of switching units U1 . . . U*x* each assumed to be similar in size and arrangement to those described with respect to FIG. 5. There is also included an additional unit U*j* serving outgoing junctions and differing from the units U1 . . . U*x* in that whereas the latter have group connectors G/C and line connectors L/C, the unit U*j* only has a group of multipled group connectors G/C to which the outgoing junctions are directly connected. The units U1 . . . U*x* have back-linking bridge groups and cross-linking bridge groups L1–1, L1–2, . . . L*x*–*x*, as before, and in addition each of these units is linked with the outgoing junction unit U*j* by a group of linking circuits, such as L1–*j*, L2–*j*, . . . , which may or may not contain the transmission bridges for the outgoing junctions depending on whether or not it is possible, having regard to the signalling requirements of the various kinds of trunk circuit provided on the exchange, to provide universal transmission bridges at this point. Each linking circuit or bridge XBL (FIG. 13) in the groups L1–1, L1–2 . . . L*x*–*x*, L1–*j*, L2–*j* . . . , which will hereinafter simply be called link groups, has its opposite sides connected to respective group connectors provided individually for that linking circuit or bridge (link) in the unit or pair of units which it serves. The connectons are made via a cross-connection frame F1 in order to allow the number of links in each link group to be rearranged to cater for persistent unbalanced traffic conditions between units or to enable other units to be added while retaining the same total number of transmission bridges.

The units U1 . . . U*x* and U*j* and their associated link groups as represented in FIG. 6 belong to one section S of the exchange, corresponding to one of the sections S1 . . . S*m* of FIG. 5. Each of the other sections has a similar arrangement of switching units and associated link groups. Lines LL, including subscribers' lines and incoming junction lines are connected to and multipled over the line connectors L/C of units U1 . . . U*x* in the several sections as already described for the line groups L/C in FIG. 5. The incoming junctions may be exclusively served by one or more of the units U1 . . . U*x* or may be distributed among these units. The outgoing junctions may be multipled over the group connectors in the junction units in the several sections (which will be more suitable on small groups), or the group connectors in the several sections may serve different outgoing junction circuits in the same groups of outgoing junctions: that is, with the group connectors constituted by 100-outlet switches each section would have its own group of up to 100 outgoing junctions, giving a total of, say, 400 outgoing junctions for a four-section exchange. The section selection would choose junctions for each outgoing call to balance the traffic as if to a line connector group and would confer the benefit of simulated full availability to the junction groups as it does to the line connectors.

Each section such as S also includes one or more local controllers such as LOC and one or more trunk controllers such as TRC. Each trunk controller TRC has a coupling switch CST by which it can couple itself to any one of the transmission bridges in a proportion of the transmission bridge groups serving unit U*j*. Each local controller LOC includes a number of ring-and-tone circuits RTA, RTB, RTC each having a coupling switch CSL by which it can couple itself to any one of the transmission bridges in a proportion of the transmission bridge groups serving units U1 . . . U*x*. Each of the transmission bridges in each of the groups serving units U1 . . . U*x* can become coupled to any one of a group of ring-and-tone circuits, and through it to the associated controller, over the coupling switch of that ring-and-tone circuit. These ring-and-tone circuits, as their name implies, contain within them the apparatus for feeding ringing current to the called line, ringing or busy tone to the calling line, and possibly also metering current to the calling line. As will appear hereinafter a ring-and-tone circuit taken into use for a call supervises, and is held for the duration of, the ringing of the called line, the associated local controller being released however so as to be able to deal with another call if necessary. The use of ring-and-tone circuits in this way simplifies the design of the both-way transmission bridge linking circuits and also justifies the provision of extra coupling switches for the controller coupling, giving larger controller availability and reducing the traffic per coupling switch. This traffic might otherwise be so high as to result in reduced life of these switches. By holding the ring-and-tone circuit during ringing, its coupling switch is rested between successive operations.

Each section such as S also includes individually to itself a route selector RS, a traffic summator TS, and a controller selector CS. Common to all sections are a number of start circuits ST, a number of dial path circuits DP, a number of dial path control circuits DPC, a number of registers REG, a register scanner RSC, a line location identifier LI which, on the basis of information from a register, passes to the route selectors RS the requisite information to enable them to select a route through their own section of the exchange between the calling line and a called local line or outgoing junction, and a section selector SS which, in dependence on the traffic conditions in the several sections as indicated to it from the traffic summators TS in these sections, selects a particular one of the sections to deal with the call. It will be appreciated that the route selectors RS, traffic summators TS and section selector SS together constitute an overall section selection arrangement as will appear. Each dial path circuit DP serves a particular group or group of lines and each line group is served by a number of dial path circuits.

The action taking place following initiation of a call is as follows, taking a local call first. When a subscriber lifts his receiver the start circuit ST responds to the resulting line loop and generates a start signal into the dial path control circuit DPC. This circuit DPC thereupon drives an allotter switch AL to search for a free dial path circuit DP which can serve the calling line. Under the control of the allotted dial path circuit DP a register hunter RH then searches for a free register and subsequently, when such register has been coupled to the dial path circuit, a line hunter LH is set into operation to search for the calling line. The identity of the calling line is signalled to the register over the register coupler RH: the first two digits of the calling line's identity can be obtained from fixed strappings which by identifying the dial path circuit concerned therefore also identify the line group of the calling line, while the last two digits of the calling line's identity can be obtained either from the final setting of the line hunter LH or by counting impulses transmitted to the register as the line hunter searches. The subscriber then dials into the register over the allotted dial path.

The several registers are sequentially accorded the chance of being coupled to the line location identifier LI under control of the register scanner RSC and when a significant number of the digits identifying a called line have been received by a register (dependent upon the nature of the system) it allows itself to be coupled to the location identifier LI when next given the opportunity to do so. The register then passes into the location identifier the information it has regarding the identities of the calling and called lines. A translator (TX, FIG. 7) in the location identifier LI examines the dialled digits to ascertain the nature of the required call, namely whether it is a straightforward local call, a trunk call, a call to a PBX line or a call to a subscriber whose line has been re-connected at the exchange but whose number has not been correspondingly changed. If the call is a completely normal local call the location identifier passes the first two digits of the calling and called lines, identities into the route selectors RS of the several sections, together with markings identifying these lines as P- or Q-lines as the case may be, that is identifying in respect of each line whether it is multiplied directly over the several sections as are the P-lines in FIG. 5 or is slip-multipled over the sections as are the Q-lines in that figure. From this information each route selector RS determines the identity of the line connector groups to which these lines are connected in its section, the switching unit or units in which these line connector groups are included, and the link group which serves the unit or units concerned, this link group being one of the linking transmission bridge groups L1–1, L1–2 . . . L*x*–*x*. The route selector RS is also fed with information as to the busy or free condition of all the line connectors, and chooses a particular free line connector in each of the groups to which the calling and called lines are connected. The traffic summator TS, which is fed with information as to the busy or free condition of all the transmission bridges in the group concerned, then passes to the common section selector SS a signal indicating the traffic level in that group: this signal is inhibited, however, if the route selector has determined that in either or both of the required line connector groups in the section there are no free line connectors. The section selector SS compares the traffic levels in those sections from which this signal is obtained and selects the section which has the lowest number of busy transmission bridges in the required link group, commensurate with introducing minimum blocking on the line connectors. In the selected section the controller selector CS, acting in dependence on information fed to it from the route selector RS as to the identity of the link group required to serve the call, selects a free ring-and-tone circuit which can couple to this link group, and thereby also effectively selects the local controller LOC with which this ring-and-tone circuit is associated. This ring-and-tone circuit and controller are thereupon seized for use and the local controller then exclusively receives from the route selector RS the identity of the line connector groups to which the calling and called lines are connected, these groups being identified as the location on the relevant group connectors of the group of outlets to which the line connectors are connected, the identity of the chosen line connectors in these groups, and the identity of the required link group, this link group being identified by marking on the coupler switch CSL of the seized ring-and-tone circuits those outlets to which the transmission bridges of the link groups are connected. The seized local controller also receives the last two digits of the calling line's identity and of the called line's identity, these digits corresponding to the location of these lines on the line connectors to which they are connected.

The seized local controller causes the coupler CSL associated with the seized ring-and-tone circuit to select a free transmission bridge in the required link group and thereby effectively couples this bridge to the ring-and-tone circuit. Under the control of the local controller acting through the ring-and-tone circuit, the group connectors connected to the opposite sides of the selected transmission bridge are caused to set to the selected line connectors by revertive impulse control and these line connectors are then similarly set to the calling and called lines respectively. The called line is tested from the local controller and if it is free the ring-and-tone circuit is caused to send ringing current and ringing tone current in the appropriate directions over the transmission bridge towards the called and calling subscribers respectively, also sending metering current to the calling line when the call is answered. If the called line is busy then the ring-and-tone circuit is caused to give busy tone to the calling line. The ring-and-tone circuit is released either in response to the called line answering or along with the transmission bridge circuit if the calling line clears. If and when the called line answers, the transmission bridge is left to control the call and maintains each side of the speech path as long as that side is held. This is done in order to prevent the dialling paths and registers from getting false traffic during clear-down of the calls.

The call received over an incoming junction is dealt with similarly to a call on a local subscriber's line and is established in the same manner as for a local line. The incoming junctions may however have to include some storage means for at least the first received digit in order to allow time for a dial path circuit DP to become coupled. The need for such storage may be avoided however if a stop-dial facility is provided in the trunk system to which the incoming junction is connected or if the dial path circuit can be coupled sufficiently rapidly, for instance by employing electronic instead of electromechanical means.

In the case of a call which, coming from a subscriber's line or incoming junction line, has to be routed to another exchange over an outgoing junction OGJ, a register is seized and receives its information as before. The translator in the line location identifier LI examines the called line information and having identified that the called line is on some other exchange causes the location identifier to feed to the route selectors RS of the several sections a translation which, in conjunction with the identity of the calling line fed to the route selectors as before, allows the latter to select a route through the exchange in the manner already described. Since the outgoing junctions are connected directly to the group connectors G/C in unit U$j$, the location of these junctions on the group connectors can be determined in exactly the same manner as can the location on the group connectors of the connections to the line connectors in the other units. Thus on the basis of the information which it receives, each route selector RS determines the identities of the required outgoing junction and of the link group by which the unit U$j$ serving this junction can be linked with the unit U1 . . . U$x$ serving the calling line. The traffic summator TS in each section, fed with information as to the busy or free condition of all the linking circuits in the link group concerned, then passes to the common section selector SS a signal indicating the traffic level in that group. This signal is inhibited, however, if the route selector RS of the section, which is also fed with information as to the busy or free condition of all the outgoing junctions served by the section, has determined either that the required outgoing junction is not available or that there is no free line connector group to which the calling line is connected. The section selector SS compares the traffic levels as before and makes a discrete choice of the section which will best balance the traffic and cause minimum blocking. In the selected section, a free trunk controller capable of serving the required outgoing junction is selected by the controller selector CS in a similar manner to the selection of a ring-and-tone circuit and associated local controller for a local call. The selected trunk controller then exclusively receives, from the route selector of its own section, information as to the identities of the required outgoing junction, in particular its location on a group connector, of the line connector group to which the calling line is connected, and of the required link group as represented by the location of the outlets to which the links of this link group are connected on the coupler switch CST of the seized trunk controller. The seized trunk controller also receives the last two digits of the calling line's identity, together with any necessary translation digits required for the routing of the call over the outgoing junction. Thereafter the trunk controller in question causes the coupling switch CST to hunt for and seize a free link within the appropriate link group, and then proceeds to control the setting of the group connectors in unit U$j$ to the required outgoing junction and the group and line connectors in the appropriate one of units U1 . . . U$x$ to the calling line. Having done this the trunk controller does not immediately switch through to the calling line (which would result in release of the register) because the register may at this moment be counting a further train of digits from the calling line. The trunk controller therefore waits until the next inter-digit pause and then assumes command of the call, sending out over the outgoing junction the translated routing digits and any other digits which it may receive from the translator in the line location identifier or from the register. Should further digits be received by the register after it first passes its information into the trunk controller via the location identifier, the register subsequently re-couples itself to the latter (when permitted to do so by the register scanner) and passes the remaining digits then. In order to ensure that the register becomes coupled to the correct trunk controller this second time, the identity of the trunk controller is fed to the register and there stored for utilisation when the re-coupling is effected. This last provision is not represented in FIG. 6 but is represented in FIG. 7.

In telephone systems having separate line finding and final selection switches, the incoming traffic can be balanced over the line finding switches by appropriate connection of the line finder outlets to the lines, this being able to be done because the line finder outlets have no numerical significance. On the other hand, when the functions of line finding and final selection are combined in a line connector as in the present system, then the outlets of this line connector have a numerical significance and it is not possible, without changing subscribers' numbers, to balance the traffic merely by re-allocation of the line connector outlets. With the present systems however, in which the translator TX in the line location identifier LI provides a translation of the dialled digits to the route selectors to allow the call to be routed through the exchange to the required outgoing junction, it is possible to arrange the translator TX to provide a translation permitting a subscriber to retain his old number even if his line is reconnected at the exchange. To this end, line location translation facility can be extended to afford translation of the number of a "changed location" line into appropriate digits corresponding to the location of such line on the exchange. On a call to a changed-location line the line location identifier feeds this translation to the route selectors in substitution for the called line information which was stored in the register and would have been passed without translation to the route selectors in the case of an ordinary local call. Apart from the foregoing the actions taking place in establishing a call to a changed-location subscriber are generally the same as already described for an ordinary call.

The translator TX may also be arranged to recognise a PBX line and to cause the line location identifier, fed with the busy/free conditions of such PBX lines, to make a one-only choice of a free line in the required PBX group and pass into the route selectors markings identifying this line. Here again the action is similar to that for an ordinary call, except that the controller setting the call may be marked to release the set line and group connectors if the PBX line is busy on arrival (rather than switching busy tone to the calling line) and the register will in this case not be released but will be marked to try again in the face of call failure. The register will then try again, until after some predetermined number of attempts has been made or until all the lines in the wanted PBX group are signalled to the translator as busy.

Turning now to FIGS. 7 and 8 these show in more detail the manner in which the line location identifier (FIG. 7) and the route selector and controller selector FIG. 8) function. In these figures, various incoming and outgoing connections (each comprising one or more marking leads) have been labelled with lower case letters (*a, b, c* . . . ) which also appear on lines representing these connections in FIG. 6. In certain places in FIGS. 7 and 8, a single line has been used to indicate a set of marking leads used for passing digit values in binary or decimal code, and where this applies a numeral indicating the number of such leads in such set has been added alongside the letter which identifies the connection including these leads.

It may be mentioned here that it is contemplated that at least the line location identifier, its translator, and the route selectors will include as their active elements only electronic or static electromagnetic devices having a high speed of operation as compared with relays and other electromechnical devices.

When the register becomes coupled to the line location identifier LI after having received, in respect of a called line, a significant number of digits such as may require a translation, it passes into the location identifier, over groups of leads *a* and *b* respectively, digit values of the calling line's identity and markings which represent the values of the digits so far received of the called line's identity.

It should be noted here that each line connected to the line connectors of the exchange can be identified by four digits of which the first two denote the line group (one-out-of-a-hundred) in which the line is included and the last two denote the particular line (again one-out-of-a-hundred) of that group.

For a P-line (see above) the first two digits will also correspond to the particular line connector group to which the line is connected in each section of the exchange, but for a Q-line this will not apply for all sections because of the slip-multiplying. Therefore at least in these sections provision has to be made for determining the line connector group according as the line is a P- or Q-line.

It is assumed that the digital information is stored in the register REG in binary form so that each line shown for groups *a* and *b* represents a set of four binary marking leads. It is also assumed that up to five digits may have to be passed over the leads of group *b* at a time, whereas a calling line is identified by four digits which are passed over group *a*. Consequently group *b* has five sets of four leads each, represented by lines 1D . . . 5D, and group *a* has four sets of four leads each, represented by lines 1G . . . 4G. The markings on the leads of group *b* are converted into decimal form in decoders D*b* from which a group of marking leads *c* extends into the translator TX. Another group of marking leads *d* extends to gates G*d* from the decoders D*b* associated with the marking leads represented by lines 1D . . . 4D. Each of the lines shown for these groups *c* and *d* represents (as is indicated by the numeral 10 appended to the group lines *c* and *d*) a set of ten marking leads one or another of which is marked according to the decimal value of the relevant digit as received from the register.

The operations taking place in the line location identifier LI and elsewhere are controlled by a sequence control circuit SCC which is initiated into operation when the register scanner stops at a register and couples it to the line location identifier. This circuit SCC is a circuit which according to the kind of call (local, trunk, changed number, or PBX) produces one or another sequence of actuating signals which go to different parts of the line location identifier LI to initiate their operation in an appropriate sequence. The sequence control circuit SCC also provides, at appropriate times, signals which permit setting information to be fed into a selected local or trunk controller, and releasing signals by which the register is uncoupled from the line location identifier. The provision of such sequence control is useful in permitting the various parts of the line location identifier to function only after any input signals or markings to them have had time to become established, thereby reducing the possibility of maloperation due to the appearance of stray signals.

In order that the translator TX need not recognise all calls for local lines as well as outgoing junction calls, it is convenient to arrange that any digit combination having fewer digits than the number for a local call, is presumed to relate to a local call if not recognised by the translator when fed to it. Under control of the sequence control circuit the translator is given the opportunity to provide translation for the digit combination first fed into it over marking lead group *b*. If it contains no translation for this digit combination (which contains some number of digits less than the four which identify a local call) the sequence control circuit resets itself and causes the register to uncouple from the line location identifier until such time as it has gained the full number of digits for a local call.

When the register has received the fourth digit for a local call it again couples to the line location identifier (when permited to do so by the register scanner) and passes its digital information into its over lead groups *a* and *b*, together with a signal which causes the sequence control circuit to provide a sequence of signals appropriate for the subsequent operations for a local call. If the call is a completely normal local call, then the sequence control circuit SCC applies an opening stimulus to gates G*d* which thereupon pass the decoded digit values of the called line's identity on to a group of leads *e* and thence in common to the route selectors RS of the several sections for the exchange, the third and fourth digits being recoded to binary form in encoders E*e*. The route selectors RS also receive in common, from the *a* group of leads from the register, the digit values of the calling line's identity, the first and second digits being decoded to decimal forms in decoders D*a*. The route selectors therefore receive the first and second digits of the calling and called line's identities in decimal form, being the form in which they will be utilised, and the third and fourth digits in binary form ready for transmission in due course to a selected controller which will set up the call in the selected section. The lines 1G′ . . . 4G′ on FIG. 7 represent the sets of marking leads for the first to fourth digits representing the line group and particular line in the group of the calling line's identity, and the line 1D′ . . . 4D′ represent the sets of marking leads for the first to fourth digits correspondingly relating to the called line.

The line location identifier LI also passes to the route selectors RS at a time determined by the sequence control circuit SCC, markings indicating whether the calling and called lines are P- and Q-lines. These markings, which are passed over leads PG (calling P-line) or QG (calling Q-line) and PD (called P-line) or QD (called Q-line) are derived from discriminator circuits PQI which are fed with the third and fourth digit markings since it is the values of these digits that reveal the P or Q nature of the lines. The route selectors RS then have all the information necessary for each of them to select a route through their pertinent section of the exchange between the calling and called lines. The manner in which they do so will be described presently with respect to FIG. 8.

For a call to a changed-number line, the translator TX applies, to a group of leads *f* leading to gates G*f*, markings which represent in decimal code, as a translation of the called line's number, the value of the four digits identifying the line group and particular line in the group of the called line. The translator also passes a signal to the sequence control circuit SCC which in response thereto applies a stimulus to gates G*f* instead of to gates G*d*, so that the translated digits are passed over the group of leads *e* to the register selectors, instead of the digits sent into the translator.

If the translator TX recognises a call to a PBX line it passes markings identifying the required PBX line group into a PBX line selector PBXS which is also fed with the busy or free conditions of all PBX lines on the exchange. This selector PBXS selects a free line in the relevant PBX group and identifies its selection to the translator which thereupon marks the leads of group *f* to identify the selected PBX line. These markings are subsequently passed to the route selectors RS via the gates G*f* on stimulation of the latter from the sequence control circuit. In the time elapsing between the selection of a PBX line by the selector PBXS and the setting of a line connector to that line, it would be possible for an operator at the PBX switchboard to seize the same line or for the same line to be again selected by the selector PBXS for another call to the same PBX group, the translator in the meantime having become coupled to another register serving this second call. It is therefore possible that a PBX line selected by the selector PBXS, although free when selected, will be found to be busy when a line connector finally reaches it. It may therefore be arranged for PBX calls that the register and the local controller selected to set up a call receive from the selector PBXS a signal indicating that the call is for a PBX line. This signal is passed to the register over the lead labelled PBX in FIG. 7, and to the local controller, via the route selector of its section of the exchange, over the lead PBX'. The register is normally released for service on another call once line connectors have become set to the calling and called lines, or forcibly releases itself if one or other of these line connectors fails to become set within a certain time, for instance after the line connector attempting to set to the called line fails to do so because the line is busy. In this latter case the local controller would normally cause busy tone to be reverted to the calling line. For a PBX call however, the signal indicating the fact to the local controller may inhibit the application of busy tone if the selected PBX line is busy, while the signal to the register may prevent it from releasing and instead cause it to again couple to the line location identifier when next allowed to do so by the register scanner. Another attempt to set up the call would then be made as before, and further attempts may be subsequently made, if the others are unsuccessful, until the PBX line selector PBXS indicates that no line in the wanted PBX group is free, whereafter busy tone would be reverted.

When the translator recognises that the digits fed to it from a register relate to an outgoing junction call, it applies to the leads of a group *g*, leading to gates G*g*, markings representing in decimal code the values of a plurality of routing digits appropriate to the routing of the call over the outgoing junction. This is, of course, the usual function of a translator in a register translator system, but in this instance the functions of the translator are extended to provide the other facilities (PBX line selection and changed-number translation) already mentioned. The group *g* includes several sets of marking leads represented by lines 1T . . . 5T. Each set corresponds to a particular routing digit, so that the number of sets, of which only five are represented, will equal the number of routing digits, of which there may be eight or more. Gates G*g* are stimulated from the sequence control circuit at appropriate times and when so stimulated pass the markings from group *g* into encoders E*g* which feed the routing digits in binary form towards the trunk controllers. The translator TX also feeds over leads *f* and gates G*f* markings identifying the location of the required outgoing junction on the junction group connectors. Since this required only two digits, only the sets of leads represented by lines 1D' and 2D' on FIG. 7 have to be marked in this instance. There is no need for discriminating between P- and Q-lines, nor would third and fourth digits have any significance. However, in order to enable the outgoing junctions to be identified without using the same digit values as for the incoming junctions (which could be done if so desired but would be somewhat restrictive), one or other or both of the digits passed to the route selectors by the translator for an outgoing junction call may have more than the ten possible values of a decimal digit, having twelve possible values for instance. This requires extra marking leads from the translator to the route selectors, as has been indicated by the dotted line *f'*.

As has already been mentioned the translation for an outgoing junction call may have been determined and passed on in the foregoing manner before all of the digits identifying the called line have been received by the register. The register may therefore have to be permitted to recouple to the line location identifer LI at a later time in order to pass subsequently gained digits through it towards the trunk controller already seized for the call. The register must for this purpose know the identity of the trunk controller concerned and therefore markings identifying the seized trunk controller, coded into binary form in encoders E*h*, can be passed into the register on a set of leads represented by line *h*. On the subsequent coupling of the register to pass its remaining digits into the trunk controller, markings identifying the trunk controller, changed to decimal form in decoders D*k* and gated by gates G*k* under control of the sequence control circuit SCC, are passed over leads represented by line *k* to give exclusive access from the register to the trunk controller in quiestion. Digits required to be passed on over the outgoing junction without translation can be passed from the register to the trunk controller over a group of leads *i* leading directly from the register leads *b*.

Turning now to the route selectors RS of the several sections, one of them is illustrated in functional form in FIG. 8 and the others are similar. The markings representing the four digits identifying the calling line are received from the line location identifier LI on the sets of leads represented by lines 1G' . . . 4G', together with a marking on lead PG or QG identifying the P or Q nature of the calling line. The markings on the sets of leads 3G' and 4G' are passed directly towards the trunk controllers and local controllers over leads *m*. From the markings on the PG or QG leads and on the leads 1G' and 2G', the line connector group to which the calling line is connected in the section to which the route selector belongs can be determined. To this end the leads PG and QG and those represented by lines 1G' and 2G' are taken to a line connector group identifying element LCG. In this element these leads are selectively strapped to combining gates G*s* by which their markings are combined to mark in a group of leads *sg* a particular lead relating to the line connector group to which the calling line is connected in the section. The number of leads in group *sg* corresponds to the number of line connector groups and the same *sg* lead will be marked in all sections for P-lines but not for Q-lines. In a unit identifying element UG from which extends a group of leads *tg* including one *tg* lead for each switching unit, each *sg* lead is strapped to the particular *tg* lead relating to the unit containing the line connector group to which the *sg* lead pertains. Thus the marking on one of the *sg* leads will be extended to one of the *tg* leads to identify the unit to which the calling line is connected.

The markings representing the four digits identifying a called local line are received from the line location identifier LI on the sets of leads represented by lines 1D′ . . . 4D′, together with a marking on lead PD or QD identifying the called line as a P-line or Q-line. The markings on the sets of leads 3D′ and 4D′ together with any marking on lead PBX identifying the call as for a PBX line, are passed directly over a group of leads *n* towards the local controllers only. In a line connector group identifying element LCD functioning similarly to element LCG, the markings on the sets of leads 1D′ and 2D′ and on one or other of leads PD and QD are combined to mark, in a group of leads *sd*, a particular lead corresponding to the line connector group to which the called line is connected in the section concerned. The leads *sd* are cross-connected in a unit identifying element UD to a group of leads *td* so that a marking on an *sd* lead will be extended to a *td* lead to identify the unit to which the calling line is connected, there being one *td* lead for each unit.

For an outgoing junction call the outgoing junctions can be considered as divided into groups and each such group can be considered on the same basis as a line connector group because both are connected directly to outlets of group connectors. Therefore for an outgoing junction call the markings applied to the sets of leads 1D′ and 2D′ from the translator (TX, FIG. 7) are combined in element LCD to mark one of the *sd* leads according to the wanted outgoing junction group, and this marking is extended to one of the *td* leads, by a cross-connection in element UD, to identify the junction switching unit (U*j*, FIG. 6) as being the one involved.

The two switching units involved in the call are now known from the markings on the *tg* and *td* leads, and these markings can be combined, by a combining gate such as G*u* in a link group identifying element LGI, to mark one of a set of leads *u* according to the particular link group ($L_{1-1}$ etc., FIG. 6) which can link these units. The leads *u* are cross-connected to a group of leads *v* which extend towards the local and trunk controllers to identify according to the markings extended to them from the marked lead *u*, the location on the pertinent trunk or local coupler (CST or CSL, FIG. 6) of the link group to which that marked lead relates.

Reverting for the moment to the leads *sg* and *sd* which are respectively marked according to the line connector group of the calling line and the line connector group or outgoing junction group of the called line, these leads are extended towards the local and trunk controllers as groups *sg′* and *sd′* and each of these leads is also connected in common to a group of gates GL*g* or GL*d*. There is one of these gates for each line connector or outgoing junction in the group to which the particular *sg* or *sd* lead relates, and these gates are controlled over leads *l* according to the busy or free condition of the relevant line connector or outgoing junction. When an *sg* or *sd* lead is marked, the marking is passed over the "free" gates into a temporary storage element ST*g* or ST*d* which thereby registers the free or busy condition of the line connectors or outgoing junctions in the group concerned. If all of them are busy, a signal is passed from the storage element to a busying element SB which imposes an inhibiting condition on the traffic summator TS (FIG. 6) to prevent it from signalling the traffic level selector SS so that this section is thereby effectively inhibited against selection. Following selection of a section for one call, a temporary condition may be set up in its route selector which, in the event of the route selector having to deal with another call to the same line connector group or outgoing junction group while the switches are still being set for the first call, applies a simulated "group busy" signal to the busy element SB and thereby inhibits the section against selection. If some such measure were not taken, the fact that the busy markings received over leads *l* will not appear at the GL gates until the switches had been set would give rise to the possibility of the same line connector or outgoing junction being selected for the second call.

The temporarily stored busy or free conditions of the line connectors or outgoing junctions in the wanted groups are passed from the storage elements ST*g* and ST*d* to one-only selectors LOS which respectively select a free line connector in the calling group and a free line connector or outgoing junction in the called group· The selections are identified by markings applied to groups of leads *og* and *od*, these markings being encoded to binary form in encoders E*o* and passed over sets of leads *rg* and *rd* towards the local and trunk controllers.

Returning now to the *u* leads from the link group identifying element LGI, each of these leads is strapped to a lead *y* which goes to a gate such as G*l* leading to a plurality of gates such as G*x* in the controller selector CS. There is one such gate G*x* for each trunk controller or ring-and-tone circuit (as the case may be) whose coupling switch CST or CSL has access to the link group to which the particular *u* lead relates. A one-only selector COS is associated with each group of gates such as G*x* and is fed over leads *z* with information as to the busy or free condition of the trunk controllers or ring-and-tone circuits to which, as the case may be, the gates G*x* relate. This one-only selector COS primes one of these gates to allocate a free trunk controller or ring-and-tone circuit.

If all the trunk controllers or ring-and-tone circuits in the group that can serve the call are busy, a signal indicating the fact is gated in gate G*y* by the marking on the relevant *y* lead and is passed to the busying element SB to inhibit selection of this particular section as before.

Each *u* lead also goes as a priming lead to a plurality of gates such as G*w* which are fed over leads *w* with markings indicating the busy or free condition of all links in the group to which the particular *u* lead relates. These markings are passed into the trunk summator TS via the primed G*w* gates and the traffic level in the link group concerned is passed by the summator to the common section selector SS unless inhibited from the busy element SB. The section selector SS having chosen a particular section to establish the call, it passes a priming signal to the G*l* gates in that section, which therefore open. The marking on the marked *u* lead is now extended, via the pertinent G*l* gate and the primed G*x* gate to which it gives access, to one of a group of leads *x* thereby to identify the selected ring-and-tone circuit or trunk controller. In response to this extended marking the selected trunk controller or the selected ring-and-tone circuit with its associated local controller is seized and the controller concerned is caused to accept the information fed towards it from the route selector RS over leads *v*, *rg*, *rd*, *l*, *sg′*, *sd′*, *m* and in the case of a local controller, *n*. In the case of an outgoing junction call, the seized trunk controller also accepts the information fed towards it by the line location identifier LI over leads *g′* and *i* (FIG. 7).

Having set forth in general terms the operations of the exchange that take place in establishing a call, a more detailed description of the exchange operations in respect of a local call will now be given with reference to the exemplary circuit details shown in FIGS. 9 to 50. Of these figures, FIGS. 12 to 41 fit together in the manner shown in FIG. 42 to form a composite circuit, and in order more easily to identify the various exchange elements in this composite circuit, the circuit details comprising there elements have been enclosed in chain-dotted blocks which have been given the same references as their schematic counterparts in FIGS. 6 to 8: for instance, the circuit details within the chain-dotted block RS (FIGS. 35, 36, 40 and 41) comprise the route selector RS in FIG. 6 and the circuit details within the block LI (FIGS.

32 to 34 and 37 to 39) comprise the line location identifier LI in FIG. 7. An indication of the grouping of the circuit details in FIGS. 12 to 41 into the various elements has also been given in FIG. 42.

It will be observed that the circuit details shown in FIGS. 12 to 41 include numerous bistable transistor circuits. These bistable circuits are shown in outline only (as represented by individual dotted-line blocks such as blocks T*e*2 and T*e*3 in FIG. 28) so as not to overburden the drawings with detail. These bistable circuits although performing various functions as will be described, are nearly all identical with each other and have the same operation. It is therefore thought convenient to consider their detail operation separately prior to the description of the overall circuit operation: this will then allow the action of each of these bistable circuits to be dealt with subsequently in general terms only without detracting in any way from an understanding of the overall circuit operation.

Figure 9:
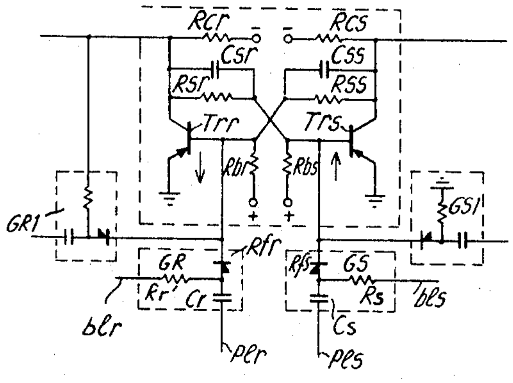

Each of the bistable transistor circuits is exemplified by the circuit given in FIG. 9. In this circuit two transistors T*rr* and T*rs* have their collectors and bases cross-coupled through capacitors C*sr* and C*ss* in parallel with resistors R*sr* and R*ss*. The collectors of the transistors T*rr* and T*rs* are also connected through respective collector resistors R*cr* and R*cs* to negative supply terminals (−) while their bases are also connected through respective base resistors R*br* and R*bs* to positive reference potential terminals (+). The emitters of the two transistors are connected directly to earth. With the left-hand transistor T*rr* for example substantially non-conducting (this being indicated by the downward pointing arrow adjacent this transistor) its resulting negative collector potential biases the base of the right-hand transistor T*rs* negative through the parallel combination of the capacitor C*sr* and resistor R*sr* so that this latter transistor is fully conducting (this being indicated by the upward pointing arrow adjacent this transistor). A positive signal applied to the base of the right-hand transistor T*rs* raises the base potential of this transistor thereby tending to reduce its conduction. The consequent negative-going change of potential at the collector of the right-hand transistor T*rs* is transferred via the parallel combination of capacitor C*ss* and resistor R*ss* to bias the base of the left-hand transistor T*rr* negative, thereby tending to render this transistor conducting with a consequent rise in its collector potential which is transferred via the parallel combination of capacitor C*sr* and resistor R*sr* to bias the base of the right-hand transistor T*rs* more positive and thereby tend to further reduce the conduction of this latter transistor. This regenerative action continues until the left-hand transistor T*rr* becomes fully conducting and the right-hand transistor T*rs* substantially non-conducting. Upon the application of a further positive signal to the base of the left-hand transistor T*rr* a similar operation to that just described will take place in reverse resulting in the right-hand transistor T*rs* becoming fully conducting again and the left-hand transistor T*rr* becoming substantially non-conducting. It is evident that a positive signal applied to the base of the non-conducting transistor in the bistable circuit is ineffective in changing the conducting states of the two transistors.

Hereinafter, the normal state of a bistable circuit as indicated by the arrows adjacent its transistors will be called the reset state, while its operated state, in which the state of conduction of the transistors is reversed, will be called the set state.

Associated with the bistable circuit in FIG. 9 is an individual so-called pulse-plus-bias setting input gate GS which comprises a pulse input capacitor C*s*, a bias input resistor R*s* and an output rectifier R*fs* all connected to a common point within the gate. Externally of the gate GS, capacitor C*s* is connected to a pulse lead *pls*, the resistor R*s* is connected to a bias lead *bls* and the output rectifier R*fs* is connected to and is poled to conduct towards the base of the right-hand transistor T*rs*. With these connections a positive-going (earth) signal applied to the input capacitor C*s* over lead *pls* will result in the application of positive pulse to the base of the transistor T*rs*, provided that the bias lead *bls* is held at a suitable potential to forward bias the rectifier R*fs* and so cause the gate GS to be opened: otherwise the rectifier R*fs* will be backed off and therefore the gate GS will be closed so that a positive pulse will not reach the transistor base. An individual pulse-plus-bias resetting gate GR is also associated with the bistable circuit. This gate similarly comprises a pulse input capacitor C*r*, a bias input resistor R*r* and an output rectifier R*fr* and operates in the same fashion as the gate GS in response to a positive signal applied to capacitor C*r* over a pulse lead *plr* and with a bias lead *blr* held at a suitable potential, but in respect of the resetting of the bistable circuit.

With regard to the numerous bistable transistor circuits included in the circuits of FIGS. 12 to 41 it is to be noted that the gates (setting and/or resetting) of some of them have their bias resistors connected directly to earth in the manner shown in a further setting gate GS1 in FIG. 9: this means of course that such gates are permanently open. Other gates (setting and/or resetting) may be biased from their associated bistable circuit by connecting their bias resistor to the collector of one of the transistors in the circuit in the manner shown in a further resetting gate GR1 in FIG. 9. Also it is pointed out that the resetting gates GR of many of the bistable transistor circuits have not been shown. This is the case with gates serving merely to reset their associated elements prior to the commencement of an exchange operating sequence. The resetting gates GR have been included for those bistable transistor circuits which are required to be reset during the exchange operating sequence.

The setting gates such as GS1 and additional resetting gates such as GR1 may be provided for certain of the bistable transistor circuits in addition to the gates GS and GR. These gates function in similar fashion to the basic setting and resetting gates GS and GR.

Figure 39A:
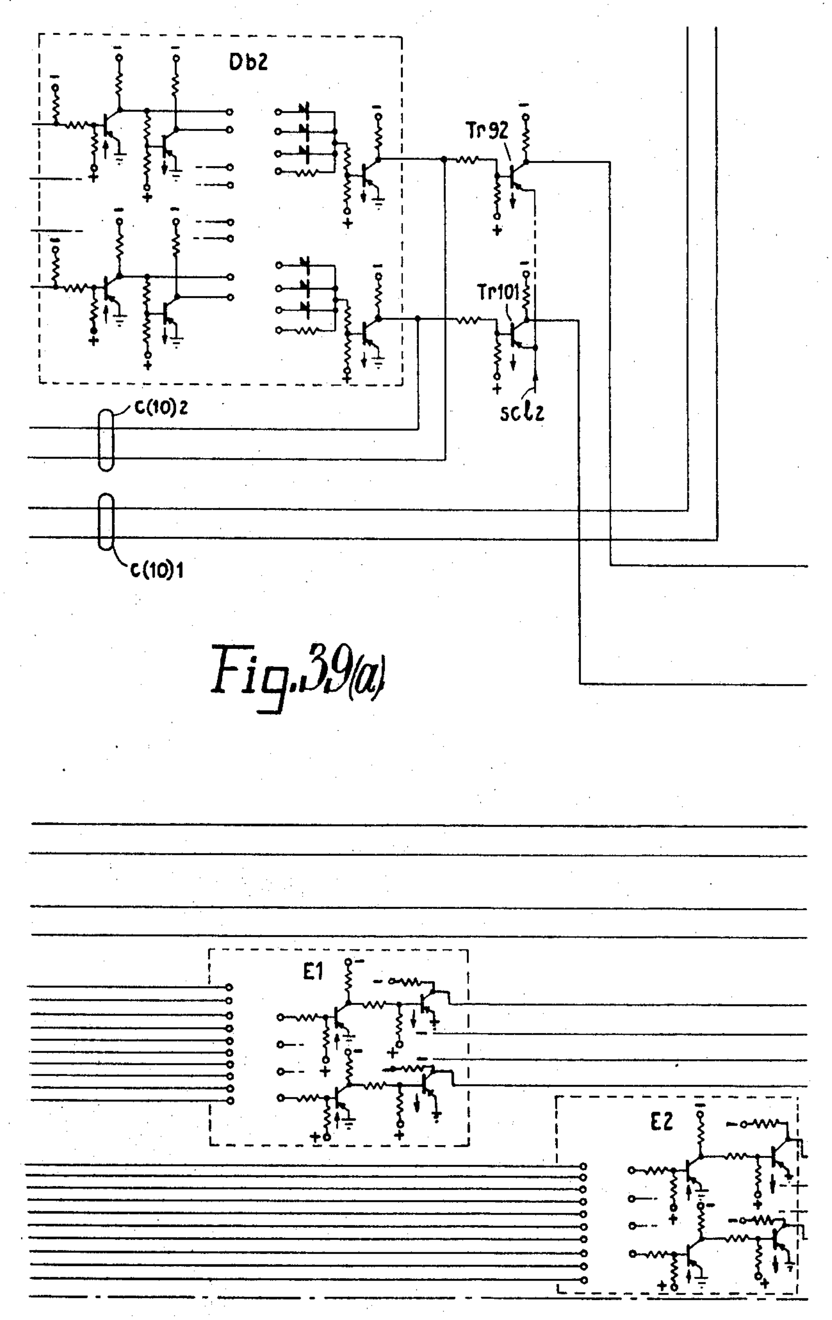
Figure 39B:
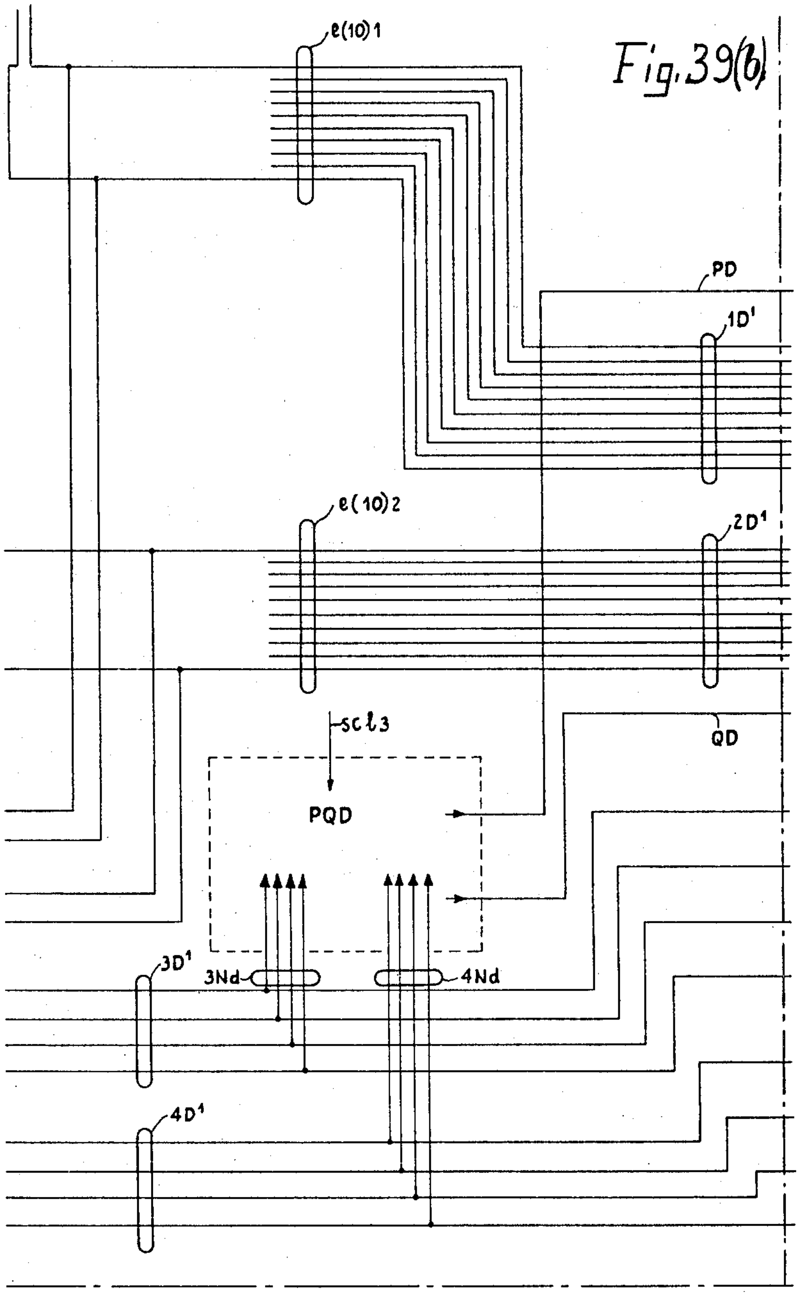

Other circuits which will be considered in detail at this time in order that their action can be subsequently dealt with in general terms only, are the binary-to-decimal decoders such as D*a*2 (FIG. 34), and the decimal-to-binary encoders such as E1 (FIG. 39).

Figure 10:
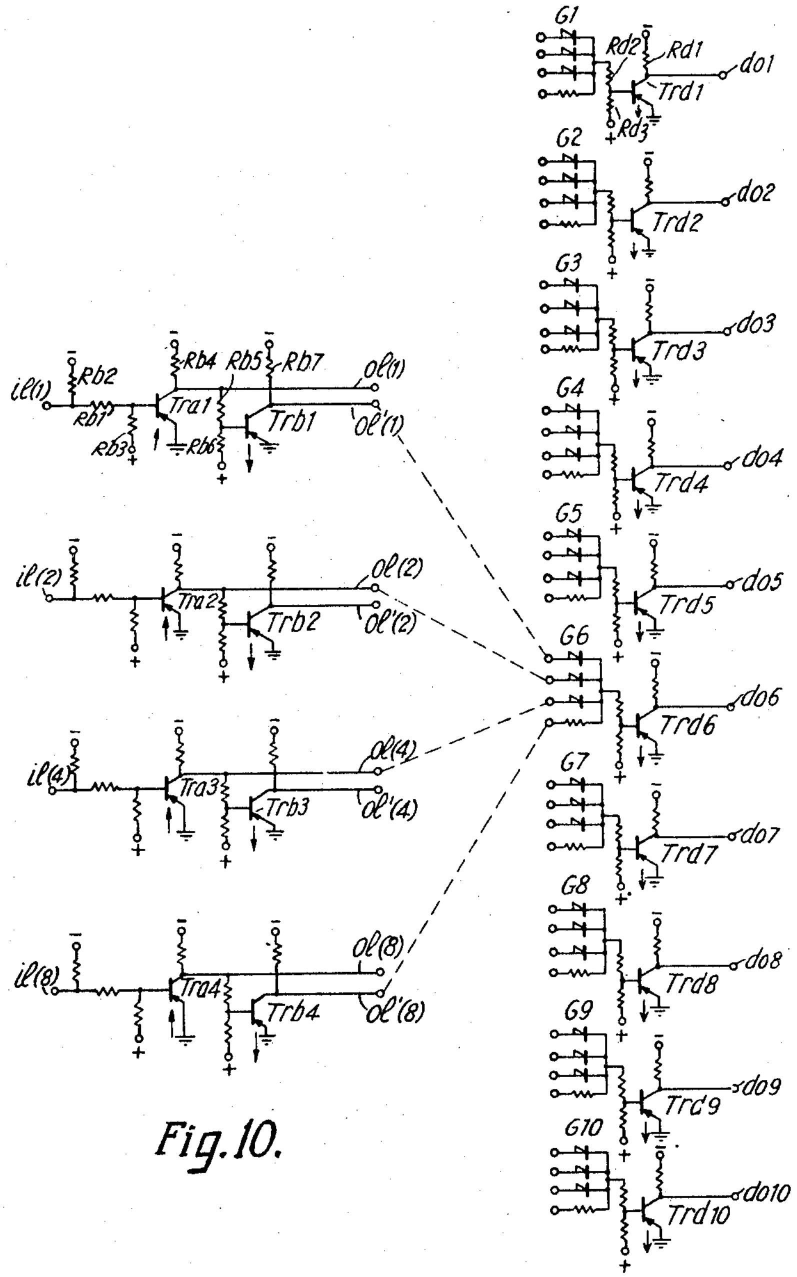

Considering firstly the decimal-to-binary decoders, a circuit exemplifying each of these is shown in FIG. 10. In this figure four pairs of transistors T*ra*1, T*rb*1; T*ra*2, T*rb*2; T*ra*3, T*rb*3; and T*ra*4, T*rb*4 are associated respectively with four binary marking leads *il*(1), *il*(2), *il*(4), *il*(8). As regards the transistor pair T*ra*1, T*rb*1 the lead *il*(1) is connected to the base of transistor T*ra*1 through a resistor R*b*1 from one side of which a resistor R*b*2 is connected to a negative supply terminal (−) and from the other side of which a resistor R*b*3 is connected to a positive reference potential terminal (+). The collector of the transistor T*ra*1 is connected through a resistor R*b*4 to a negative supply terminal (−) and through a resistor R*b*5 to the base of the transistor T*rb*1. The base of transistor T*rb*1 is also connected to a positive reference potential terminal (+) through a resistor R*b*6 and its collector is connected through a resistor R*b*7 to a negative supply terminal (−). The emitters of the two transistors T*ra*1 and T*rb*1 are connected directly to earth. It will be seen from the circuit that the other transistor pairs T*ra*2, T*rb*2; T*ra*3, T*rb*3; and T*ra*4, T*rb*4 are connected in similar fashion. With the binary marking leads *il*(1), *il*(2), *il*(4), *il*(8) unmarked the transistors T*ra*1–T*ra*4 in the several pairs are normally fully conducting (as indicated by the upward pointing arrows) due to the negative potential applied to their bases from the relavant resistor chain; that is the chain formed by resistors R*b*1–R*b*3 in the case of transistor T*ra*1. In consequence four output marking leads *ol*(1), *ol*(2), *ol*(4), *ol*(8) connected respectively to the collectors of these transistors are normally held at the positive (earth) potential. This positive collector potential also holds the other transistors (T*rb*1–T*rb*4) of each pair substantially non-conductive and in consequence four other output marking leads *ol'*(1), *ol'*(2), *ol'*(4), *ol'*(8) connected respectively to the collectors of these latter transistors are normally held at a negative potential.

For the ten decimal digit values to be provided by the circuit there are included respective transistors T*rd*1–T*rd*10 which have their emitters connected directly to earth and their collectors connected directly to respective output terminals *do*1–*do*10 and through respective resistors, such as resistor R*d*1 for transistor T*rd*1, to a negative supply terminal (−). The base of each of the transistors T*rd*1–T*rd*10 is connected to the junction of two resistors connected in series, that is resistors such as R*d*2 and R*d*3 for transistor T*rd*1. The other end of the resistors such as R*d*3 is connected to a positive reference potential terminal (+) and the other end of the resistors such as R*d*2 is connected to respective resistance-rectifier gating networks G1–G10 each comprising, as for gate G1, three rectifiers poled to conduct towards the appertaining transistor and a resistance. The leads *ol*(1), *ol*(2), *ol*(4), *ol*(8), and *ol'*(1), *ol'*(2), *ol'*(4), *ol'*(8) are cross-connected to the resistance rectifier gates G1–G10 in order to convert each combination of binary markings received on the four input leads *il*(1), *il*(2), *il*(4), and *il*(8) into one-out-of-ten decimal markings on the relevant one of the ten output leads *do*1–*do*10. The markings and the cross-connections achieving this, assuming straight forward binary coding, are given in Table I below in which positive signals on the (*il*) leads are represented by 1's and the absence of signals by 0's: the decimal output markings on the (*do*) leads are in the form of positive signals.

*Table I*

| Decimal Value | Binary Marking (+ve signal) | | | | Binary to Decimal Strappings to— | Gates G1-G10 | Decimal Marking (+ve) signal on leads do1-do10 |
|---|---|---|---|---|---|---|---|
| | il (1) | il (2) | il (4) | il (8) | | | |
| 1 | 1 | 0 | 0 | 0 | ol(1), ol'(2), ol'(4), ol'(8)--- | G1 | do1 |
| 2 | 0 | 1 | 0 | 0 | ol'(1), ol(2), ol'(4), ol'(8)--- | G2 | do2 |
| 3 | 1 | 1 | 0 | 0 | ol(1), ol(2), ol'(4), ol'(8)---- | G3 | do3 |
| 4 | 0 | 0 | 1 | 0 | ol'(1), ol'(2), ol(4), ol'(8)--- | G4 | do4 |
| 5 | 1 | 0 | 1 | 0 | ol(1), ol'(2), ol(4), ol'(8)---- | G5 | do5 |
| 6 | 0 | 1 | 1 | 0 | ol'(1), ol(2), ol(4), ol'(8)---- | G6 | do6 |
| 7 | 1 | 1 | 1 | 0 | ol(1), ol(2), ol(4), ol'(8)---- | G7 | do7 |
| 8 | 0 | 0 | 0 | 1 | ol'(1), ol'(2), ol'(4), ol(8)--- | G8 | do8 |
| 9 | 1 | 0 | 0 | 1 | ol(1), ol'(2), ol'(4), ol(8)---- | G9 | do9 |
| 10 | 0 | 1 | 0 | 1 | ol'(1), ol(2), ol'(4), ol(8)---- | G10 | do10 |

By way of example the circuit shows the strapping connections required in respect of the digit value 6 for which as can be seen from Table I positive signals are received on leads *il*(2) and *il*(4). These signals render transistors T*ra*2 and T*ra*3 non-conducting so causing negative signals to be applied over leads *ol*(2) and *ol*(4) to the resistance rectifier gate G6. This gate is already receiving negative signals over leads *ol'*(1) and *ol'*(8) and therefore the coincidence of these four negative signals renders the transistor T*rd*6 conducting to produce a positive signal, indicative of the digit value 6, on the digit lead *do*6. All the other resistance rectifier gates are maintained closed, thereby holding the associated transistor non-conducting, since they are receiving at least one positive signal from the (*ol*) output leads. If the input leads are marking according to a modified binary code, the cross-connections would be modified accordingly.

Figure 11:
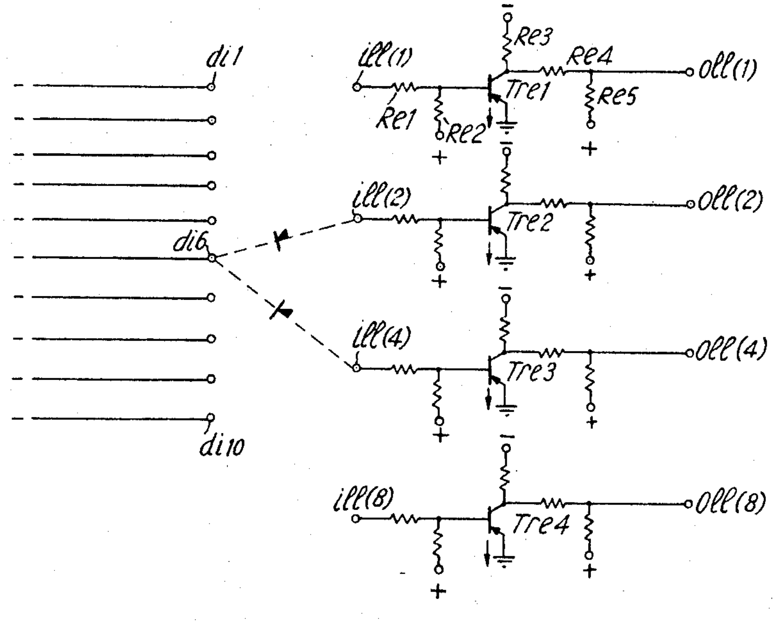

A circuit exemplifying each of the decimal-to-binary encoders is shown in FIG. 11. In this figure four transistors T*re*1–T*re*4 are associated respectively with four binary input marking leads *ill*(1), *ill*(2), *ill*(4) and *ill*(8) and four binary output marking leads *oll*(1), *oll*(2), *oll*(4) and *oll*(8). As regards the transistor T*re*1, the lead *ill*(1) is connected through a resistor R*e*1 to its base which is also connected to a positive reference potential terminal (+) through a resistor R*e*2. The collector of the transistor T*re*1 is connected through a resistor R*e*3 to a negative supply terminal (−) and through a resistor R*e*4 to the output lead *oll*(1). The lead *oll*(1) is also connected through a resistor R*e*5 to a positive reference potential terminal (+), while the emitter of the transistor T*re*1 is connected directly to earth. The other transistors T*re*2–T*re*4 are connected in similar fashion.

Ten decimal input marking leads *di*1–*di*10, one for each of the decimal values 1–10 are selectively strapped through individual rectifiers to the leads *ill*(1), *ill*(2), *ill*(4) and *ill*(8) according to the binary marking (normal or modified) required to be produced for any particular decimal marking. A decimal marking on a *di* lead is in the form of a negative signal and is effective to render conducting those of the transistors T*re*1–T*re*4 which have their associated input lead *ill* strapped to that *di* lead to produce binary markings in the form of positive signals on the output leads *oll*. As an example decimal marking lead *di*6 has been shown strapped to input leads *ill*(2) and *ill*(4) whereby to produce in response to a negative signal on lead *di*6 a binary marking pattern 0110 on leads *oll*(1), *oll*(2), *oll*(4) and *oll*(8), a "1" representing a positive marking signal and "0" representing a negative marking signal.

Figure 16A:
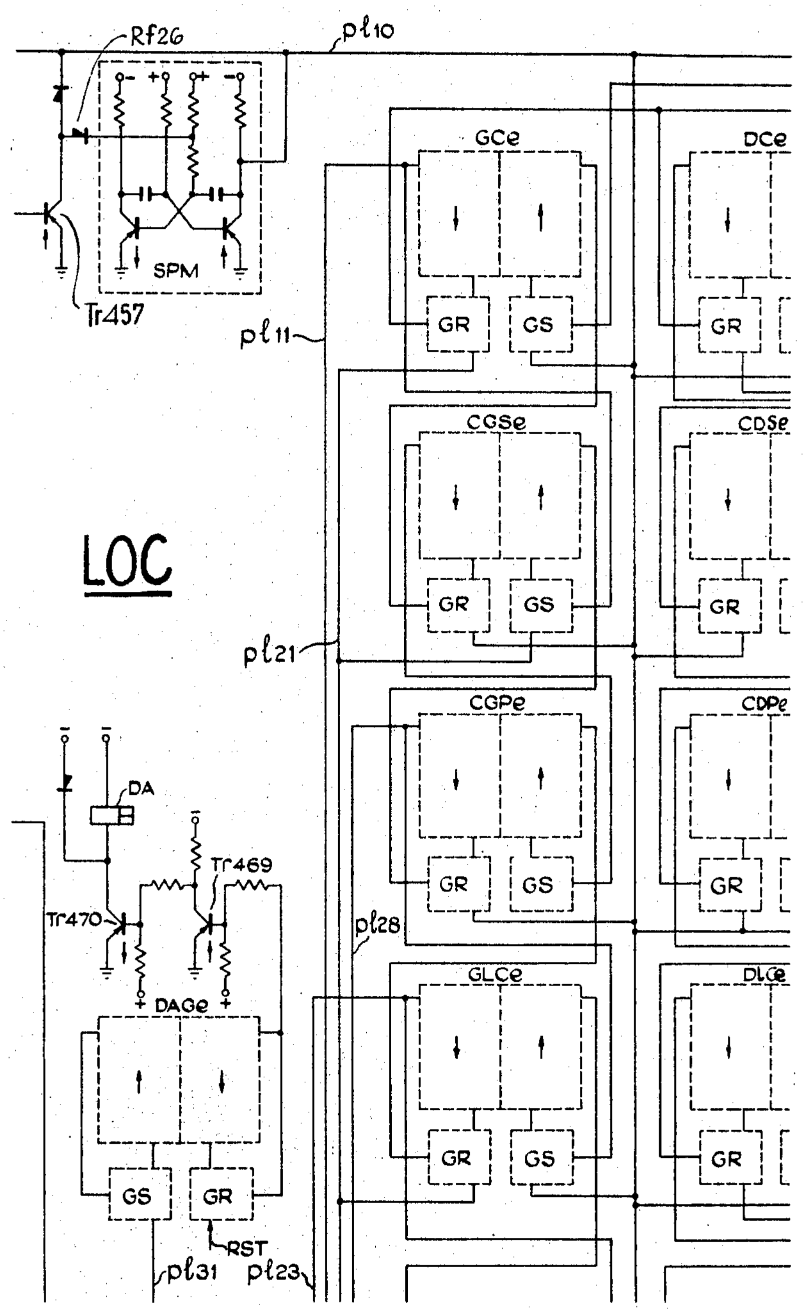
Figure 16:
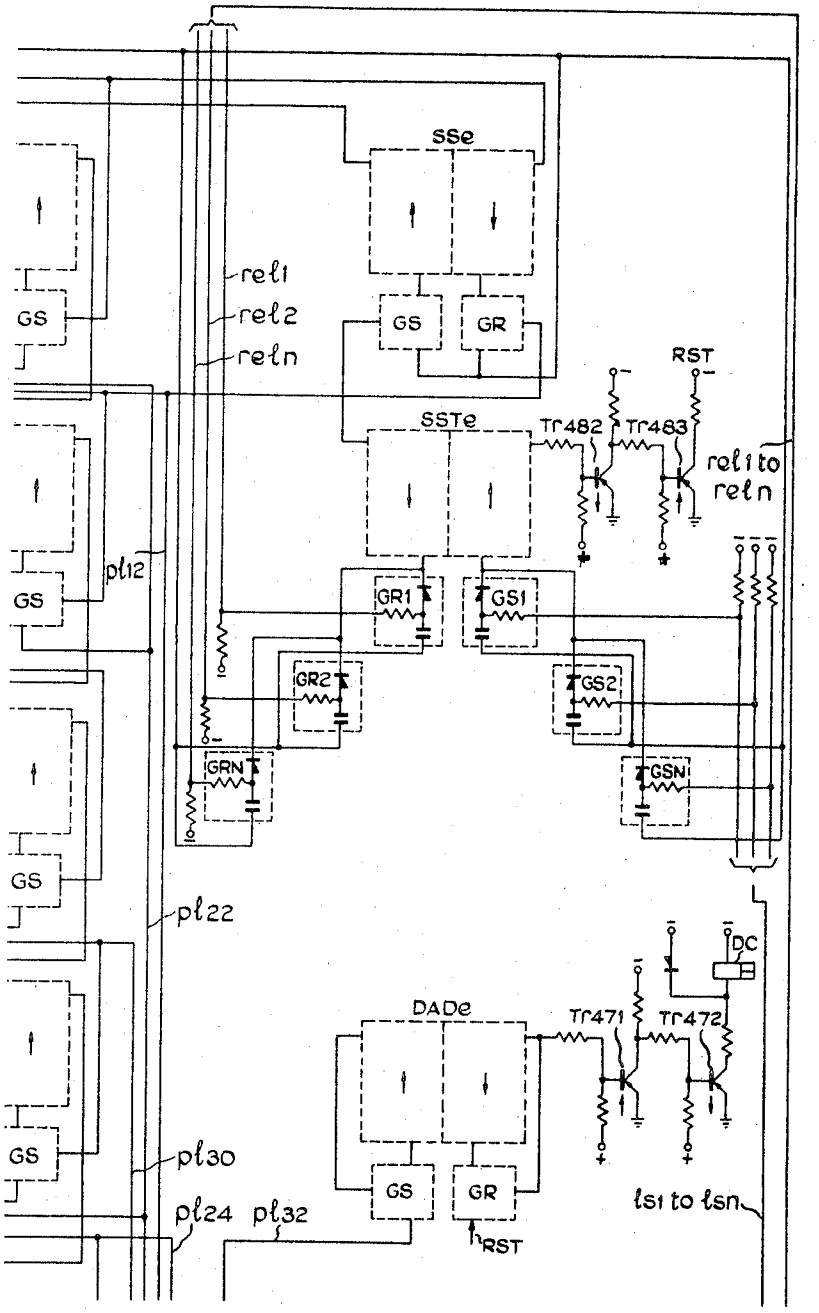
Figure 17A:
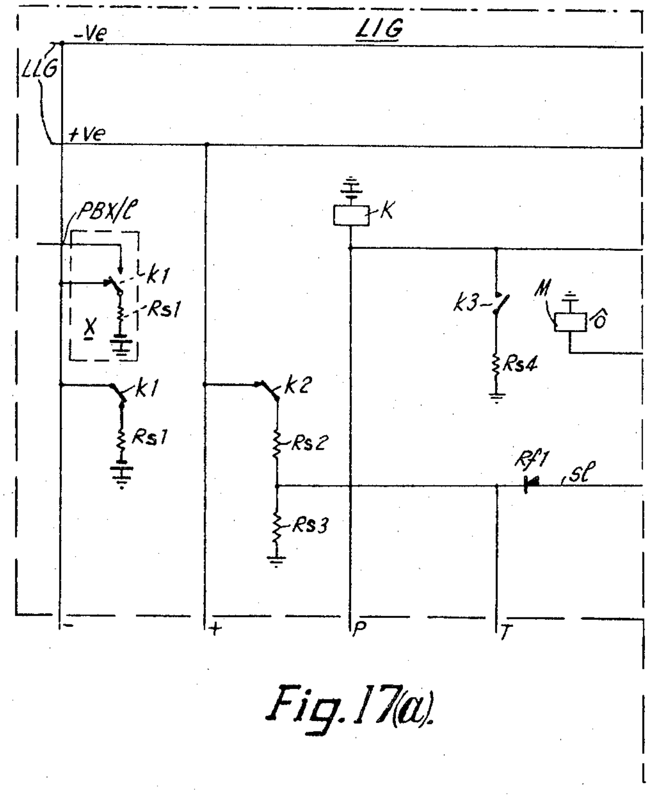
Figure 17B:
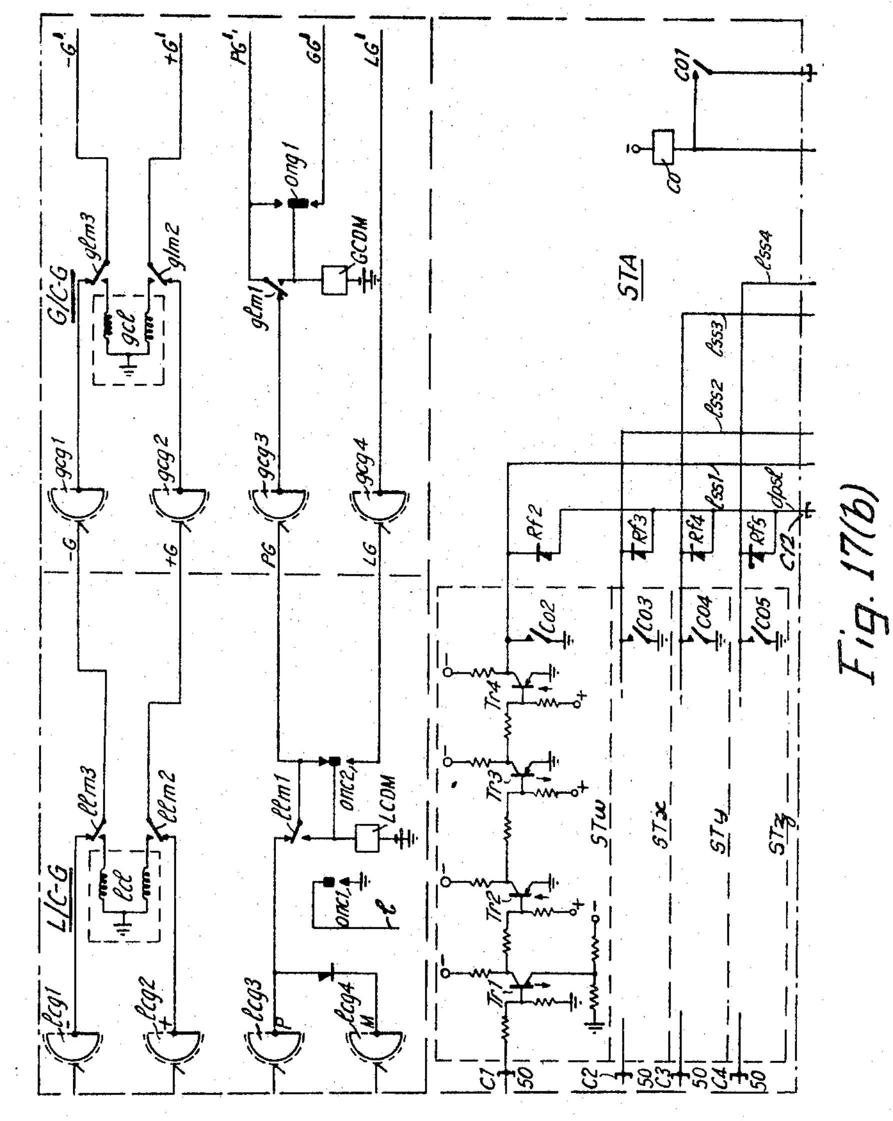

Turning now to the circuits shown in FIGS. 12 to 41, in FIG. 17 a typical subscriber's line circuit LIG (being one of a group of, say 100 such line circuits) comprises −*ve* and +*ve* line wires LLG, a line relay K and a metering relay M connected to corresponding contacts in the −*ve* and +*ve*, P-wire and M-wire, contact arcs *lcg*1 to *lcg*4 respectively of a 100-outlet motor uniselector line connector L/C–G, which is one of a line connector group of, say, 20 such line connectors multiplied together over their contact arcs and serving the group of 100 line circuits including the line circuit LIG. The −*ve* and +*ve* line wires LLG are also connected to corresponding contacts in the −*ve* and +*ve* contact arcs *lh*1 and *lh*2 of a 200-outlet motor uniselector line hunter LH of a dial path DP (FIG. 22) serving two hundred line circuits, one group of 100 line circuits over contact arcs *lh*1–*lh*4 and another group of 100 line circuits over contact arcs *lh*5–*lh*8. The contact arcs *lh*3 and *lh*7 are P-wire busying arcs and the contact arcs *lh*4 and *lh*8 are T-wire testing arcs, the contacts of which are connected to P-wires and T-wires, as the case may be, of the line circuits in the two groups. The line hunter LH is one of several multiplied together over their contact arcs so that their associated dial paths serve the two 100-line circuit groups. For example, six dial paths may be multiplied to serve the two 100-line circuit groups, in which case a 10,000 line exchange would be equipped with 6×50=300 dial paths. The connections from each line circuit of a group to the outlets of the line connectors in the relevant line connector group are inverted with respect to the connections between the line circuit and the outlets of the line hunters serving the line group: that is, line circuits connected to outlets 100, 99, 98, 97, etc., on the line connector arcs are connected to outlets 1, 2, 3, 4, etc., on the line hunter arcs. This inversion enables the identification of calling lines by the line location identifier LI to be determined by received complementary marking signals as will be described.

In addition to its contact arcs *lcg*1–*lcg*4, the line connector L/C–G includes a driving motor LCDM, latch contacts *llm*1–*llm*3 which are operated by a latch electromagnet (not shown) which in turn is operated when the driving motor LCDM is energized, off-normal contacts *onc*1 and *onc*2 which are operated when the line connector moves from its home or normal position, and a pair of windings *lcl* which are inductively coupled with windings of the driving motor LCDM.

The line connector L/C–G is connected over wires —G, +G, PG and LG to corresponding contacts in contact arcs *gcg*1–*gcg*4 of a 100-outlet group connector G/C–G which is one of a group of such connectors multiplied together on their contact arcs and serving 100 line connectors. The group connector G/C–G includes a driving motor GCDM, latch contacts *glm*1–*glm*3, off-normal contacts *ong*1 and a pair of windings *gcl* which correspond to the similar components in the line connector L/C–G.

The group connector G/C–G is connected over wires —G′, +G′, PG′, GG′ and LG′ to one side of a both-way transmission bridge link XBL (FIG. 13) which is one of a group of such transmission bridges constituting a link group. The other side of the transmission bridge link XBL is connected over wires —D′, +D′, PD′, GD′ and LD′ to another group connector G/C–D (FIG. 12) which is one of another group of group connectors multiplied together on their contact arcs and serving 100 line connectors of which a line connector L/C–D is one, and is connected to its outlet on the multiplied group connector contact arcs over wires —D, +D, PD and LD. In turn the line connector L/C–D is one of a group serving a further group of 100 line circuits including the line circuit LID.

Figure 12A:
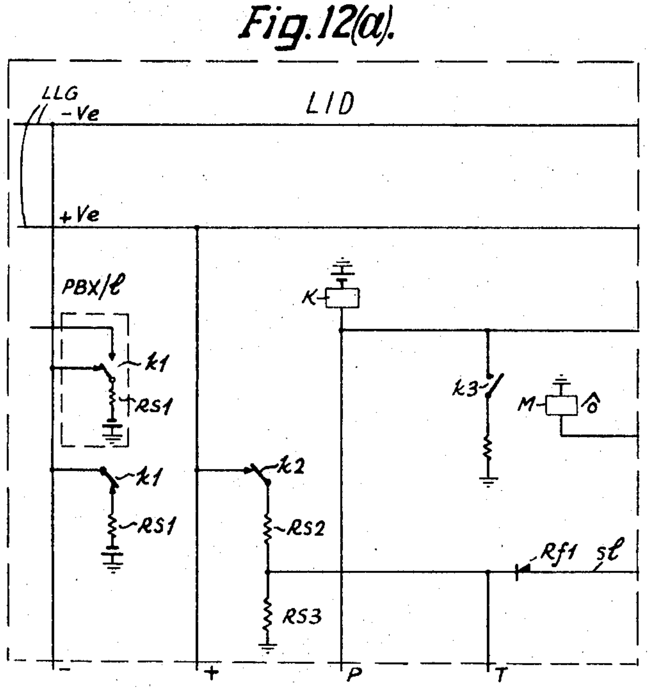
Figure 12B:
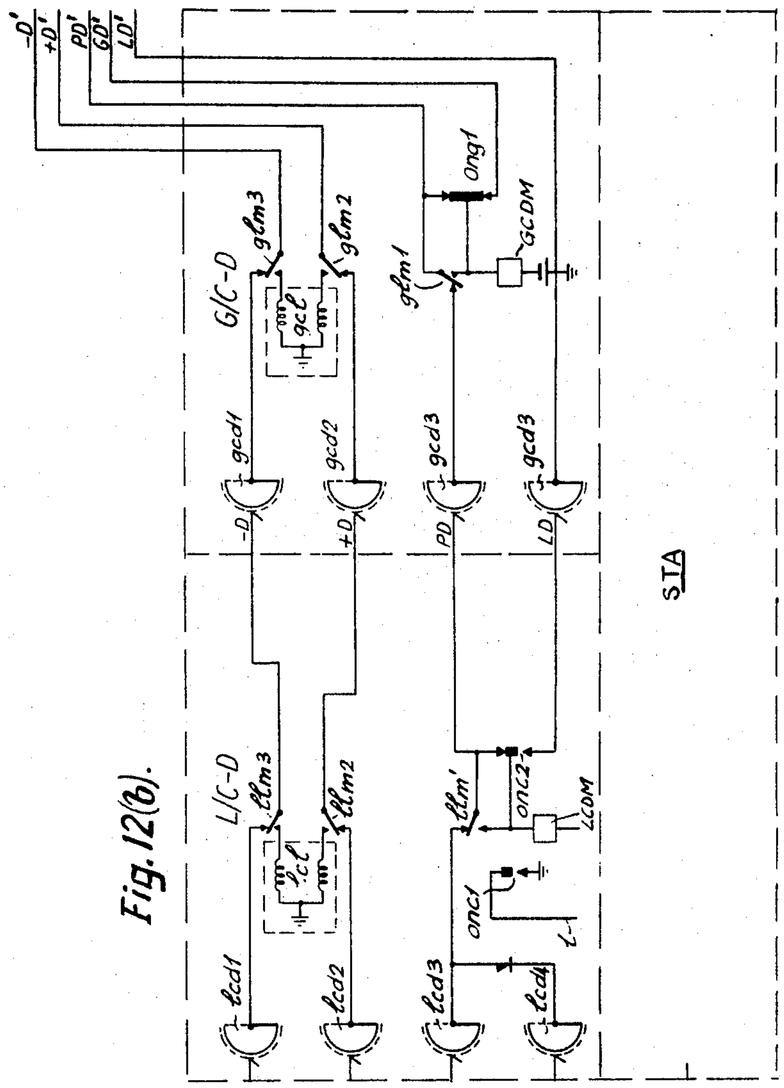
Figure 13A:
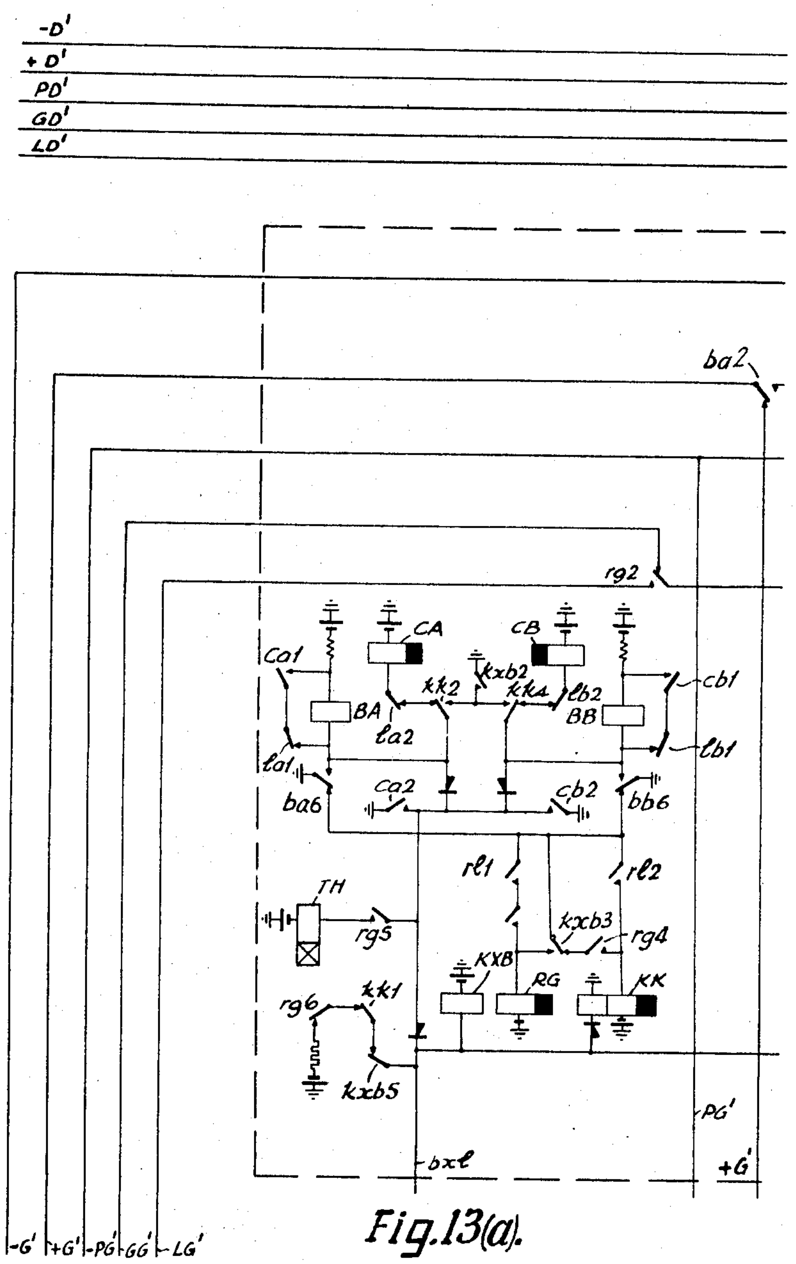
Figure 13B:
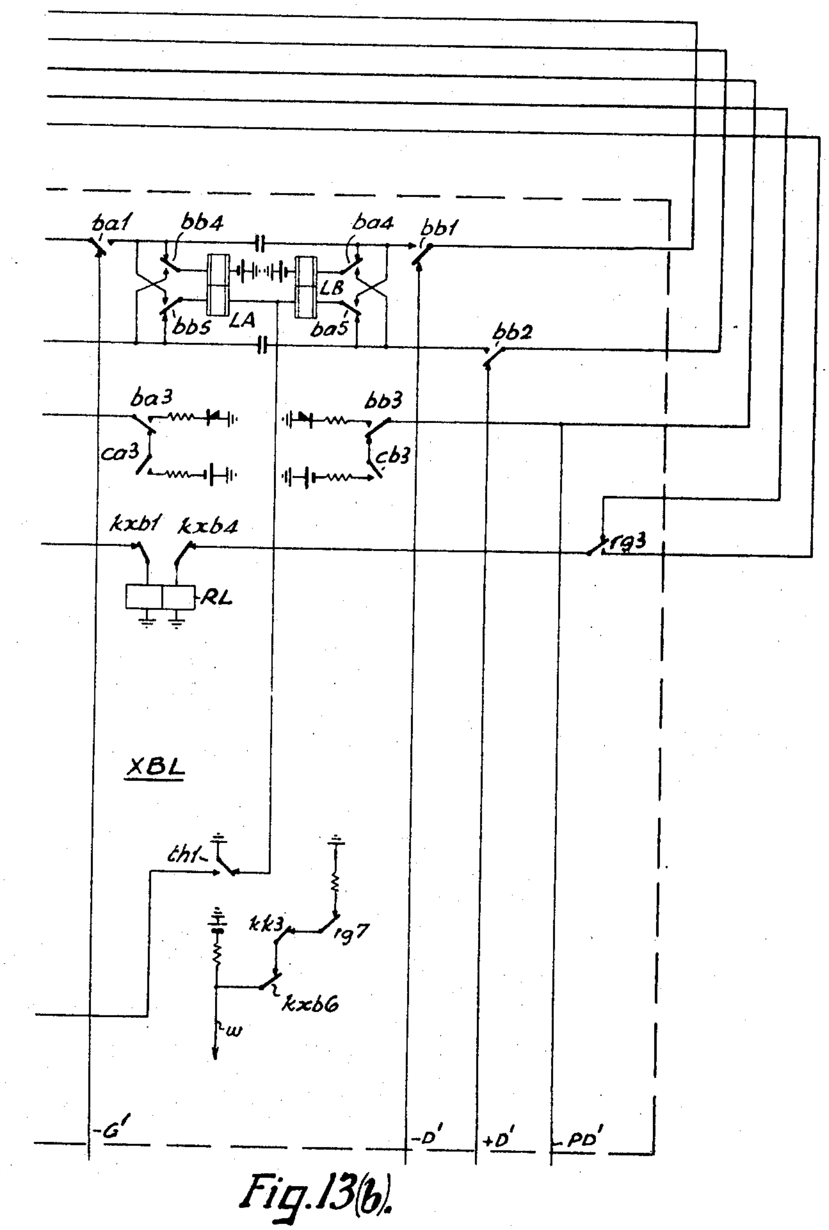

The line circuit LIG is coupled by a start lead *sl* to a start circuit STA which conveniently comprises four start sections ST*w*, ST*x*, ST*y* and ST*z*. Each of these start sections may serve 50 line circuits, as indicated by the common symbols *c*1–*c*4 and on this basis a 10,000 line exchange would be equipped with 50 start circuits arranged in convenient groups. In FIG. 12 the start circuit STA to which the line circuit LID is coupled is shown in outline only. The start sections ST*w*–ST*z* have respective output leads *lss*1–*lss*4 connected to outlets of testing arcs *tss*12 and *tss*34 of a uniselector switch serving as a start section hunter and contained in a dial path control circuit DPC (FIG. 22) which, as indicated by the common symbols *c*5–*c*11, is one of a group of several such dial path control circuits serving a group of start circuits. The allocation of the dial path control circuits may be such that a group of six start circuits are served by a group of five dial path control circuits, with the outlets of the testing arcs *tss*12 and *tss*34 being multiplied over the group.

The dial path control circuit DPC includes a 100-outlet motor uniselector dial path allotter AL having contact arcs *al*1–*al*7 to the contacts of which dial paths such as dial path DP are connected. The dial paths may be provided in the order of six dial paths for two 100-line groups so that a 10,000 line exchange would be equipped with 300 dial paths. The dial path DP includes a 100-outlet motor uniselector register hunter RH having contact arcs *rh*1–*rh*8 through which the dial path has access to 100 registers such as register REG (FIGS. 27 to 29), these contact arcs being multiplied to the contact arcs of the other dial paths which therefore have common access to the registers.

Considering now the operations which take place in establishing a connection between the line circuit LIG and the register REG, assuming that the start circuit STA, the dial path DP, and the dial path control circuit DPC are involved in the setting-up of this connection. Dealing firstly with these operations in general terms, in the quiescent condition of the line circuit LIG, a break contact *k*1 of relay K applies negative battery to the —*ve* line wire through a resistor R*s*1 while a break contact *k*2 applies earth to the +*ve* line wire through resistors R*s*2 and R*s*3. The junction between the resistors R*s*2 and R*s*3 is connected on the one hand to the start lead *sl* through an isolating rectifier R*f*1 and on the other hand to the arc *lh*4 of the line hunter LH over test wire T. A make contact *k*3 is arranged to apply a holding earth to relay K through a resistor R*s*4 when this relay is operated.

If the line connected to the line circuit LIG constitutes one of a P.B.X. group then, as shown in the dotted block X, contact *k*1 is alternatively provided with a change-over action so that a negative signal is applied to a lead PBX/*l* when relay K operates to signify that the line circuit LIG is busy. The effect of this negative signal on lead PBX/*l* will hereinafter be described in relation to a PBX call.

In the start circuit STA, each of the start sections ST*w*–ST*z* comprises four cascade-connected transistors, such as transistors T*r*1–T*r*4 in start section ST*w*, arranged for applying a negative start signal to a dial path control circuit start lead *dpsl* responsively to the looping of the line wires of a line circuit served by any of the start sections of the start circuit group. The start sections ST*w*–ST*z* are commoned to the lead *dpsl* through individual rectifiers R*f*2–R*f*5 and, as indicated by the common symbol *c*12, start sections of other start circuits in the group are likewise commoned to this lead *dpsl*. Assuming start sections ST*w* and ST*x* serve the 100-line group connected to the line hunter contact arcs *lh*1–*lh*4, while the start sections ST*y* and ST*z* serve the 100-line group connected to the line hunter contact arcs *lh*5–*lh*8, then in the dial path control circuit DPC, a calling line on the first-mentioned line group will bring about the operation of a test relay TWX while a calling line in the second-mentioned line group will bring about the operation of a test relay TYZ.

The application of a start signal to the lead *dpsl* upon the initiation of a call by the line circuit LIG causes the start section hunter in the dial path control circuit DPC (and also the start section hunter in the other dial path control circuits of the group as well) to search for the calling start section (ST*w*) responsively to the operation of a relay S in the dial path control circuit DPC and the consequent establishment of a drive circuit for the hunter. When the hunter tests in to the calling start section (ST*w*) relay TWX will operate and relay S releases. If the line circuit LIG was in the 100-line group connected to contact arcs *lh*5–*lh*8 of the line hunter LH, then it is evident that one of the two start sections ST*y* and ST*z* would have been involved—causing relay TYZ to operate instead of relay TWX. An allotter start relay ST in the circuit DPC then operates to cause the dial path allotter AL to search over testing arc *al*7 for a free dial path. If the dial path allotter AL fails to find a free dial path in one complete sweep of its arc *al*7 it is stopped on its last outlet and the start circuit (STA) containing the calling start section (ST*w*) is put into congestion by the operation of a start circuit congestion relay CO therein so as to prevent it from taking further dial path control circuits into use.

The dial path allotter AL subsequently researches for a free dial path at 2 second intervals.

When the allotter AL tests into a free dial path, assumed to be dial path DP, a test relay T operates in the circuit DPC. A wiper switching relay WS in the dial path DP will also be operated if relay TYZ is operated in the circuit DPC, but not relay TWX, to signify in which of the two 100-line groups the calling line is located. Completion of a drive circuit for the register hunter RH in the dial path DP is then effected from the circuit DPC, and the register hunter RH accordingly searches over its testing arc *rh*6 for a free register. Upon seizing a free register, a test relay P in the dial path control circuit DPC and a relay H in the dial path DP operate: the latter relay prepares a drive circuit for the line hunter LH which subsequently searches for the calling line. Upon reaching the calling line circuit the T-wire thereof is extended via the line hunter arc *lh*4 (or *lh*8) and the allotter arc *al*1 to the dial path control circuit DPC, and a test relay Q operates to the calling potential on the T-wire. In driving to the calling line circuit impulses corresponding in number to the position of the circuit on the line hunter arcs are transmited to the seized register through the register hunter contact arcs *rh*4 and *rh*5.

The operation of the test relay Q in the circuit DPC results in the operation of a relay HA in the circuit DP and make contacts *ha*1 and *ha*5 of relay HA extend the *—ve* and *+ve* line wires of the calling line circuit through contact arcs *rh*1 and *rh*2 to the register REG so completing a path for impulses subsequently to be dialed by the calling line. Make contacts *ha*3 and *ha*7 of relay HA apply negative signals to the register through contact arcs *rh*7 and *rh*8, the register being able to identify the particular dial path taken into use from these signals as will be described. The cut-off relay K in the calling line circuit is then operated by a signal extended from the register via contact arcs *rh*3 and *lh*3, operation of relay K being proved by the release of test relay Q in the dial path control circuit DPC. Relay ST is consequently released to release the dial path control circuit DPC from the dial path DP which remains held by the selected register.

In the case of a dial path control circuit failing to complete its sequence of operations within a predetermined time period this control circuit is locked out of service together with any dial path to which it may already be coupled but the calling line circuit is released. If all the dial path control circuits of the relevant group become locked out of service then they will all be released from their locked-out condition so as to maintain a limited service to the lines served by the group.

Dealing now in detail with the connection of the line circuit LIG to the register REG. In the quiescent condition of the start section ST*w*, that is in the absence of a calling line, the transistor T*r*1 therein is non-conducting. Due to the cascade-connection of transistors T*r*1–T*r*4, transistors T*r*2 and T*r*4 are therefore conducting, while transistor T*r*3 is also non-conducting. (It is convenient to mention here that the normal conducting state of transistors T*r*2 and T*r*4 has been indicated by upward pointing arrows adjacent these transistors, and the normal non-conducting state of transistors T*r*1 and T*r*3 has been indicated by downward pointing arrows adjacent them. This convention of using directional arrows to indicate the normal conducting and non-conducting states of transistors has been employed throughout the circuits of this specification.) In view of the conducting state of transistor T*r*4 its collector is held at a positive (earth) potential which backs off the rectifier R*f*2.

When a call is initiated by the line circuit LIG, the calling loop across the line wires LLG results in the potential at the junction of resistors R*s*2 and R*s*3 becoming sufficienty negative to pass a negative signal through rectifier R*f*1 and over start lead *sl* to the base of the transistor T*r*1 in the start section ST*w* whereby to render this transistor conducting. Transistor T*r*2 is accordingly cut-off while transistor T*r*3 conducts to cut-off transistor T*r*4. The resulting negative potential on the collector of transistor T*r*4, constituting a calling signal, is extended to the dial path control circuit DPC, on the one hand via rectifier R*f*2 and start lead *dpsl*, and on the other hand to the first outlet on testing arc *tssl*2 of the start section hunter via lead *lss*1. The calling signals from the start section ST*w* may pick up a number of free dial path control circuits simultaneously so that transistor T*r*4 will need to operate a plurality of dial path control start relays S. For this reason the intermediate transistors T*r*2 and T*r*3 are provided in the start section ST*w* (and likewise in the other start sections) to give a start signal of sufficient magnitude and correct polarity.

In the circuit DPC the negative calling start signal on the lead *dpsl* is effective to bring about the operation of relay S in response to the conduction of transistor T*r*5 followed by the conduction of transistor T*r*6 coupled to the transistor T*r*5 through a normally conducting transistor T*r*7 which becomes non-conducting. The transistor T*r*6 only becomes fully conducting after a time delay determined by the time constant of a capacitor discharge circuit comprising resistor R*s*5 and capacitor C*s*1; this circuit giving delayed operation of relay S.

When relay S operates, make contacts *s*1 thereof close and thereby complete an energizing circuit for the drive magnet SHDM of the start section hunter to the earth behind contacts *pz*5. The start section hunter self-drives through interrupter contacts *shdm* until it finds the lead (*lss*1) to which the start section calling signal is applied.

Make contacts *s*3 apply potentials to the emitters of two sets of transistors T*r*8–T*r*10 and T*r*11–T*r*13 arranged in the wiper circuits associated with arcs *tss*12 and *tss*34 respectively, such that transistors T*r*9 and T*r*12 conduct. Make-before-break contacts *s*2 and make contacts *s*4 complete and prepare operating and local holding circuits for a relay PS for providing in conjunction with a relay PZ fault lock-out facilities as will hereinafter be described.

When the start section hunter finds the calling start section ST*w* transistor T*r*8 conducts due to the negative potential on lead *lss*1. Transistor T*r*9 is therefore cut-off while transistor T*r*10 conducts to bring about the operation of test relay TWX by the energization of one winding *w*1 thereof contained in the collector circuit of this transistor. Changeover contacts *twx*1 remove the potentials from the emitters of transistors T*r*11–T*r*13 so as to render these transistors ineffectual and thereby prevent operation of test relay TYZ to a calling potential on lead *lss*3. The change in potential on the base of transistor T*r*8 raises the potential of lead *lss*1 positively, so preventing another dial path control circuit from testing in to this lead. Contacts *twx*1 also prepare a holding circuit for relay TWX which will be completed when relay ST operates. Changeover contacts *twx*2 interrupt the energizing circuit for the drive magnet SHDM of the start section hunter and simultaneously remove a short circuit from the right-hand winding of the allotter start relay ST thereby permitting this relay to operate to the earth behind contacts *pz*5 in series with magnet SHDM. Relay S releases as a result of transistor T*r*8 shunting transistor T*r*5, this shunting being effected at the bases of these transistors through the leads *dpsl* and *lss*1 so that transistor T*r*5 is cut-off to render transistor T*r*7 conducting which then cuts-off transistor T*r*6 which was holding relay S operated. The allotter start relay ST has operated before relay S releases and make contacts *st*1 complete a holding circuit for relay ST via contacts *pz*5, while changeover contacts *st*2 complete the holding circuit for relay TWX before contacts *s*3 open. Make contacts *st*3 prepare an alternative operating circuit for relay PS to an "S" pulse lead *spl*, while make contacts *st*7 prepare a holding circuit for fualt lock-out relay PZ.

Consequent upon the operation of relay ST the motor uniselector allotter AL has its latch magnet ALLM energized over a path from negative battery to earth via an allotter release alarm relay MA, latch magnet ALLM, break contacts *cn*6 (and *cgb*4), changeover contacts *ta*3, changeover contacts *t*1 short circuiting relay TA, and changeover contacts *st*6. When latch magnet contacts *allm*1 close an operating circuit is completed for a double winding high speed relay MX from negative battery to earth via relay MA, the left-hand motor winding ALDM1 of the allotter AL, the lower winding of relay MX, break contacts *sm*6, make contacts *st*4, motor interrupter contacts, *aldm*1, and latch magnet contacts *allm*1. Upon relay MX operating, make contacts *mx*1 complete a holding circuit for relay MX preparatory to the operation of a relay SM and make contacts *mx*2 connect the two windings of the test relay T in parallel.

Relay MA operates in series with the latch magnet ALLM and the motor windings ALDM1 and ALDM2. Make contacts *ma*1 prepare an alternative energizing path for latch magnet ALLM and make contacts *ma*2 prepare a release alarm circuit (not shown).

Relay SM operates shortly after high speed relay MX by the completion of the operating circuit for relay SM at contacts *st*6. Make contacts *sm*1 prepare a holding circuit for relay SM which will be completed if fault lockout relay PZ operates to a "Z" pulse over a lead *zpl*. Make contacts *sm*2 prepare a holding circuit for a high speed relay LC as well as an operating circuit for slow-to-operate relay CN, while break contacts *sm*3 disconnect the base of transistor Tr5 from the dial path start lead *dpsl*. Make contacts *sm*4 serve to connect together the wipers associated with contact arcs *al*7 and *al*8 of the allotter AL and so prepare a dial path testing circuit, and make contacts *sm*5 complete a holding circuit for relay TWX over contacts *twx*2 and *st*1. Break contacts *sm*6 disconnect the energizing circuit for the bottom winding of relay MX which then holds over its top winding through make contacts *mx*1.

Allotter motor winding ALDM2 is effectively energized through latch magnet contacts *allm*1 and motor interrupter contacts *aldm*1 so that the allotter commences to search for a free dial path signified by a negative battery marking on a contact of arc *al*7. On the first step of the allotter AL the actuation of the allotter interrupter contacts *aldm*1 results in the disconnection of the operating circuit for relay MX which accordingly releases. The restoration of contacts *mx*2 serves to connect the two windings of the testing relay T in series.

As the allotter AL drives over the first outlet on its arcs an operating circuit for relay LC is completed over the path from negative battery to earth via relay LC, arc *al*7, contacts *sm*4 and arc *al*8. In operating, relay LC completes its own holding circuit at make contacts *lc*1 and at make contacts *lc*2 extends the circuit of testing relay T through to arc *al*8.

If the allotter AL finds a free dial path (DP) before reaching its last outlet the negative battery applied to the testing circuit operates test relay T. Changeover contacts *t*1 remove the short circuit from the right-hand winding of relay TA and this relay operates. The relay TA operates in series with the latch magnet ALLM which releases so as to arrest the allotter AL on the outlet for dial path DP. Make contacts *ta*2 complete an operating circuit for a high speed relay DP through its top winding over contacts *pz*3 and *tyz*2. Changeover contacts *ta*3 prepare an operating circuit for a relay QA while make contacts *ta*1 prepare a drive circuit for the register hunter RH in the seized dial path, this drive circuit being completed by the closure of contacts *dp*1 and extending from negative battery to earth via the register hunter driving motor RHDM, changeover contacts *h*6, arc *al*4, and contacts *ta*1, *pb*2, *pa*6, *p*1 and make contact *dp*1. Make contacts *dp*2 connect the earthed testing relay P to the wiper for arc *al*6. The register hunter RH then searches for negative battery on a contact of its arc *rh*6 signifying a free register.

If, however, the allotter AL is unable to find a free dial path in one full search of its arc *al*7, relay T operates to negative battery applied to the wiper for arc *al*7 through break contacts *cn*3 when the allotter reaches its last outlet (i.e. normal position of allotter AL). The operation of relay T brings about the operation of relay TA as previously described. Since off-normal contacts *aln*2 of the allotter restore when the latter reaches its last outlet an operating circuit is established for a relay CGA to the earth behind make contacts *ta*4 and *aln*2. Make contacts *cga*4 complete an operating circuit for a relay CGB. Changeover contacts *cga*1 apply an earth to the wiper positioned on the first outlet of a further arc *con* of the start section hunter and changeover contacts *cga*2 extend this earth to the congestion relay CO in the start circuit STA containing the calling start section ST*w*. Relay CO operates and make contacts *co*1 prepare a holding circuit for relay CO. Contacts *co*2, *co*3, *co*4 and *co*5 apply earth potentials to the respective start sections ST*w*–ST*z* of the start circuit STA to put them out of service.

Relay CGB in operating establishes a circuit through make contacts *cgb*1 for maintaining relay T operated independently of contacts *cn*3. Break contacts *cgb*4 render the operating circuit for relay TA dependent on contacts *cn*6. Make contacts *cgb*6 complete an operating circuit for relay CN which operates. Break contacts *cn*6 disconnect the operating circuit of relay TA which releases, while make contacts *cn*4 complete a holding circuit for relay CN. Break contacts *cn*3 prepare a path for applying a two-second break pulse applied via contacts *sp* to the testing circuit for initiating a further searching operation by the allotter AL upon the release of relay CGB. When relay TA releases the operating circuit for relay CGA is interrupted at contacts *ta*4 and relay CGA and relay CGB dependent thereon release. The congestion relay CO is held operated over contacts *co*1, *st*4, *cn*1 and *ta*5. Break contacts *cgb*5 in restoring extend negative battery to the testing circuit over contacts *cn*3 to hold relay T operated and although an energizing circuit for the right-hand winding of relay TA is re-established via contacts *cgb*4, the relay fails to operate since the left-hand winding of relay TA is energized in the opposite sense through the testing circuit including the test relay T. After a short lapse of time, contacts *sp* are opened for two seconds to disconnect the operating circuit for relay T. In releasing relay T prevents relay TA from re-operating by short-circuiting its right-hand winding through contacts *t*1. The latch magnet ALLM is once more effectively energized so that the allotter AL can search over its arc *al*7 for a free dial path. If the allotter AL still fails to find a free dial path, relay T is re-operated on the last outlet and puts relay TA in series with the latch magnet ALLM to arrest the allotter AL. The re-searching operation for a free dial path is repeated in response to the re-operation of contacts *sp*.

When the free dial path DP is found by the allotter AL, relays T and TA operate and break contacts *ta*5 interrupt the holding circuit for congestion relay CO. The start circuit STA is thus restored to service.

The register hunter RH then searches for negative battery in its arc *rh*6. When a free register is found this negative battery operates test relay P in the dial path control circuit DPC. Changeover contacts *p*1 remove a short circuit from a relay PA which operates in series with the register hunter motor RHDM to arrest the register hunter RH. Make contacts *pa*4 (so-called "*x*" contacts) establish a holding circuit for relay PA prior to the interruption of the initial operating circuit for relay PA at break contacts *pa*5. Contacts *pa*6 changeover to prepare an operating circuit for a relay PB and make contacts *pa*2 complete an operating circuit for relay H in the dial path DP through arc *al*3. Relay H in operating disconnects at break contacts *h*2 the negative battery behind a resistor R*s*6 which is holding testing relay T in the circuit DPC operated. Relay T thus releases. Make contacts *h*4 would apply a negative signal from the battery behind make contacts *ws*4 and a resistor R*s*7 to the register REG over contact arc *rh*5 if the wiper switching relay WS had been operated. Changeover contacts *h*6 prepare a drive circuit for the line hunter LH. This circuit is completed through contacts *pb*2 consequent upon the operation of relay PB is response to the release of relay P. The release of relay P is effected by the presence of earth potential extended from the register REG through contact arcs *rh*6 and *al*6 to indicate that the register is ready to proceed. The drive circuit for the line hunter LH extends from negative battery to earth through the line hunter driving motor LHDM and contacts *h*6, arc *al*4 and contacts *ta*1, *pb*2, *qa*2, *q*1, *ta*3, *t*1 and *st*6. Make contacts *pb*1 connect a line testing circuit element comprising cascade-connected transistors T*r*14, T*r*15 and T*r*16 and high sped relay Q, connected in the collector circuit of transistor T*r*16, through arc *al*1 to the wiper for testing arc *lh*4 (or *lh*8 if relay SW is operated) of the line hunter LH. Make contacts *pb*3 apply potentials to the emitters of the transistors T*r*14–T*r*16 whereby transistor T*r*15 conducts while transistors T*r*14 and T*r*16 remain cut-off. The line hunter LH searches on its arc *lh*4 for the negative calling potential on the T-wire in the line circuit LIG. Throughout this searching operation by the line hunter LH the latch magnet contacts *lhlm*1 and *lhlm*2 are operated so that impulses induced into coils *lhi* from the line hunter motor windings (not shown) are transmitted to the register REG through arcs *rh*4 and *rh*5.

These impulses are indicative of the position of line circuits such as LIG as connected to the outlets of arcs *lh*1–*lh*8 of the line hunter LH and according to which outlet the line hunter LH is set the register REG will receive a particular number of these impulses. As already mentioned the connection of the line circuits to the arcs *lh*1–*lh*8 is inverted with respect to their connections to the line connector arcs *lcg*1–*lcg*4 so that the number of impulses received by the register REG for a particular line circuit will be complementary to the outlet number on the line connector to which that line circuit is connected. As will hereinafter be described these impulses will be recorded in the register REG as the complement of the tens and units digit values of calling lines.

When the calling line LIG is reached transistor T*r*14 is rendered conducting by the negative potential on the calling line T-wire and cuts-off transistor T*r*15. The transistor T*r*16 then conducts to operate high speed relay Q. The line hunter LH is stopped on the calling line circuit LIG by the insertion of relay QA in series with the motor LHDM when contacts *q*1 are opened to remove the short-circuit from relay QA. Relay QA operates and make contacts *qa*1 complete through arc *al*2 an operating circuit for relay HA in the dial path DP, which relay holds operated over make contacts *ha*4 to the earth extended through arc *rh*6 from the register REG. Contacts *ha*3 and *ha*7 apply negative signals from the batteries behind resistors R*s*8 and R*s*9 to the register REG over arcs *rh*7 and *rh*8 to identify the particular dial path being used and contacts *ha*2 and *ha*6 complete an operating circuit for cut-off relay K in the line circuit LIG through line hunter arc *lh*3. The calling loop is extended to the register by the operation of contacts *ha*1 and *ha*5 in readiness for dialling. When cut-off relay K operates the calling potential is removed from the T-wire so that testing relay Q releases. As relay Q releases, contacts *q*1 complete an energizing circuit for the left-hand winding of relay ST. This opposes the energization of the right-hand winding of relay ST which releases to release the dial path control circuit DPC. Thereafter the dial path is held by the register REG through arc *rh*6 by the continued operation of relay HA. The register REG detects completion of the dial path by the negative potential extended to it through arc *rh*3 consequent on contacts *ha*6 operating.

As soon as relays S and ST operate when the dial path control circuit DPC is seized, operating circuits are prepared for fault lock-out relays PS and PZ. If the dial path control circuit DPC has not released within a predetermined time relay PS operates to the first "S" pulse on lead *spl* following the seizure of the dial path control circuit and relay PZ operates to the next "Z" pulse over lead *zp*1. Relay PZ in operating disconnects the holding circuit for relay ST at contacts *pz*5 and control held alarm (CHA) and control held lamp (CHL) circuits are completed respectively by contacts *pz*3 and *pz*5. If the delay is simply due to congestion on the dial paths then relay CN will be operated in consequence of which relay PZ cannot hold over contacts *cn*5 and releases at the end of the "Z" pulse. Contacts *pz*2 interrupt the holding circuit for relay SM which releases to effect the release of the dial path control circuit. If, however, the delay results from a fault in the control circuit or dial path, then relay PZ will remain operated over contacts *cn*5. Relay SM holds to keep the seized dial path out of service by the reduced negative potential on its P-wire. The dial path control circuit can be locked out of service by the operation of key KDC1 and relay PZ can be released by the operation of key KDC2. Relay SM then releases.

When a dial path is established between the calling line circuit LIG and the register REG and dial tone is returned to the calling line circuit LIG, trains of impulses for identifying the called line can thereafter be transmitted to the register REG over the $-ve$ and $+ve$ line wires extended to the register REG through arcs *lh*1, *lh*2 and *rh*1, *rh*2. After receipt of the last impulse train by the register REG the latter removes the earth extended through arc *rh*6 to allow relays H and HA to release. The line hunter LH self-drives to free the dial path DP over a circuit extending from negative battery to earth via motor LHDM, contacts *h*5 and *pgb*3 and line hunter off-normal contacts *lhn*1. If the calling line circuit LIG is released by opening the line loop before dialling is completed earth potential is applied through arc *rh*4 from the register REG to operate relay PGB. Earth potential is then removed from arc *rh*6 so that the relay H and HA release. When contact *ha*6 restore a low resistance negative battery is placed in parallel with the line circuit relay K via a resistor R*s*10 and make contacts *pgb*1 so that this relay releases. Contacts *ha*8 disconnect the operating circuit for relay PGB, which releases, and in releasing, a homing drive circuit is established for the line hunter LH via off-normal contacts *lhn*1, contacts *pgb*3 and *h*5. The release battery applied to relay K is removed by the opening of contacts *pgb*1. The dial path DP is then free to be taken into use for another call.

Figure 27A:
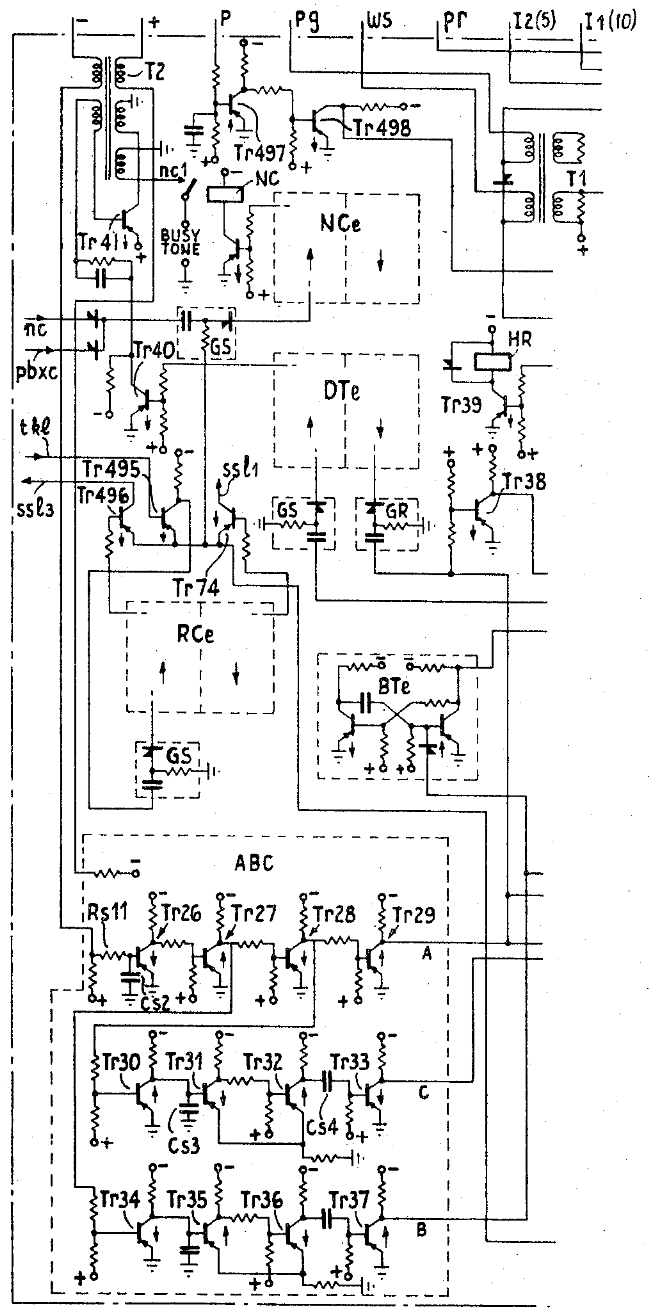
Figure 27B:
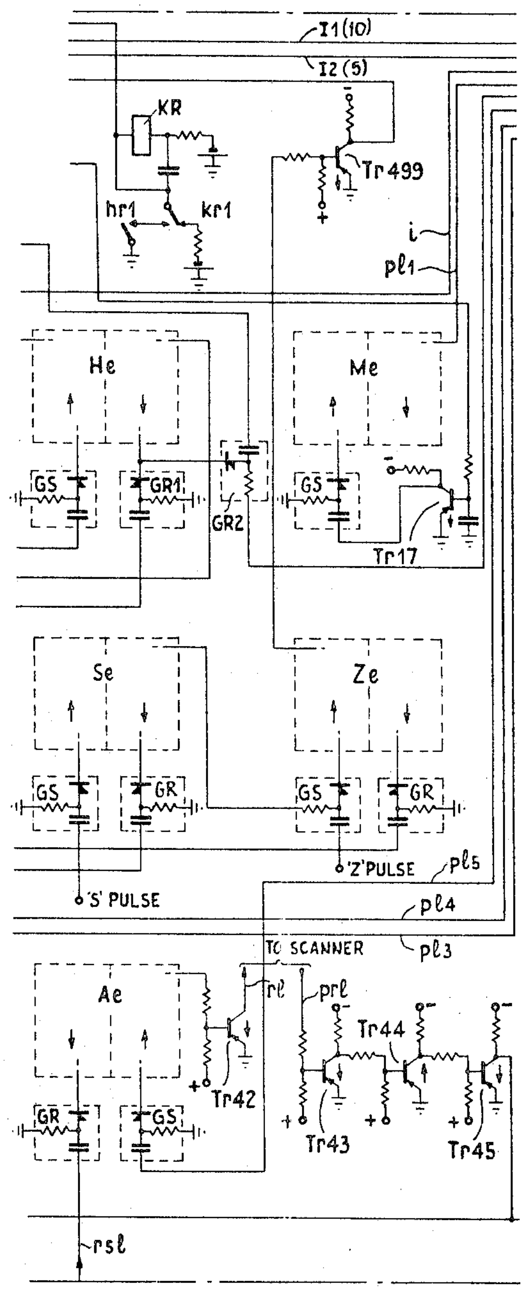
Figure 27C:
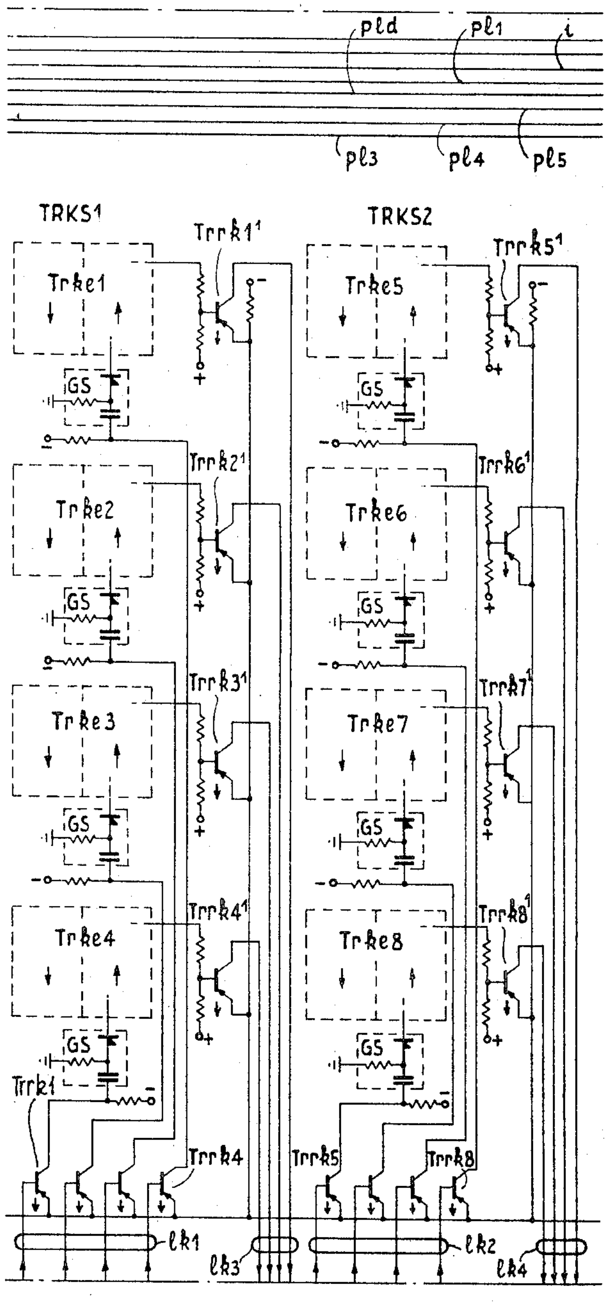
Figure 28A:
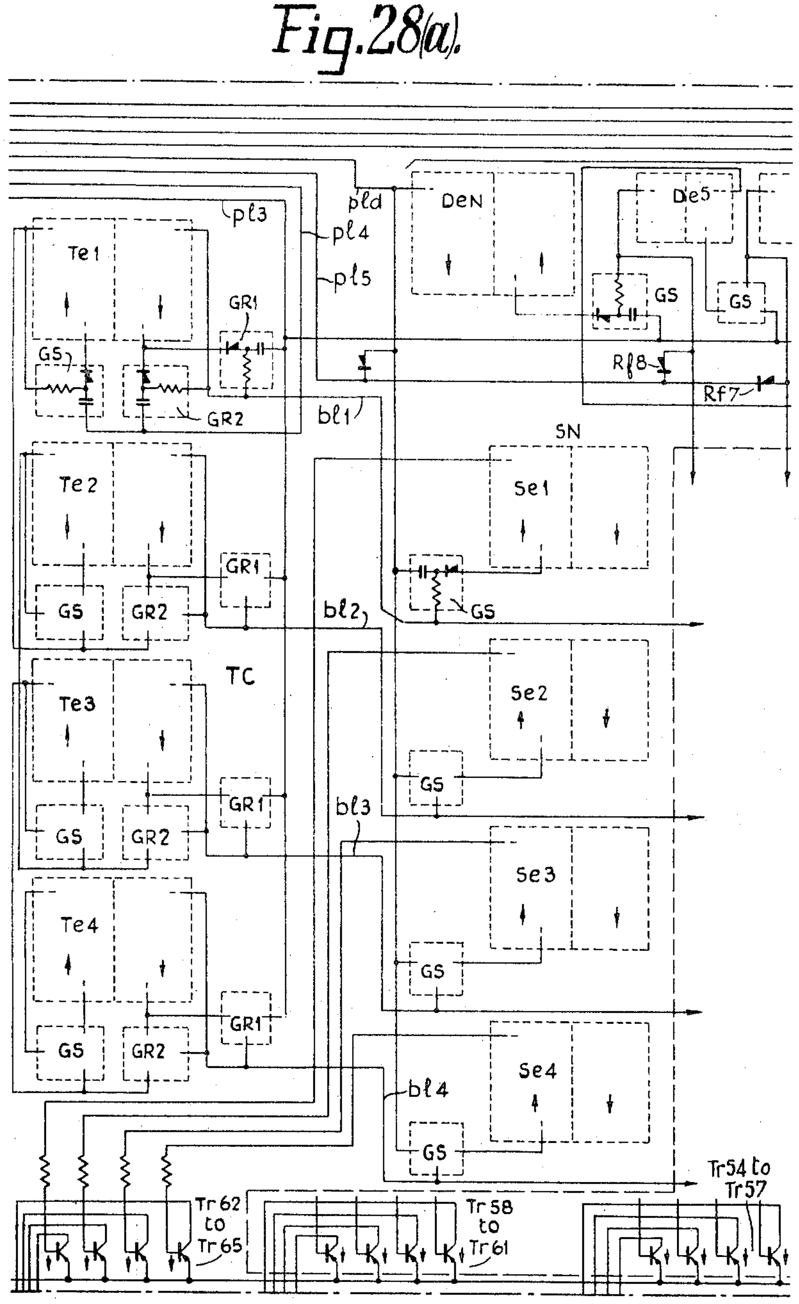
Figure 28B:
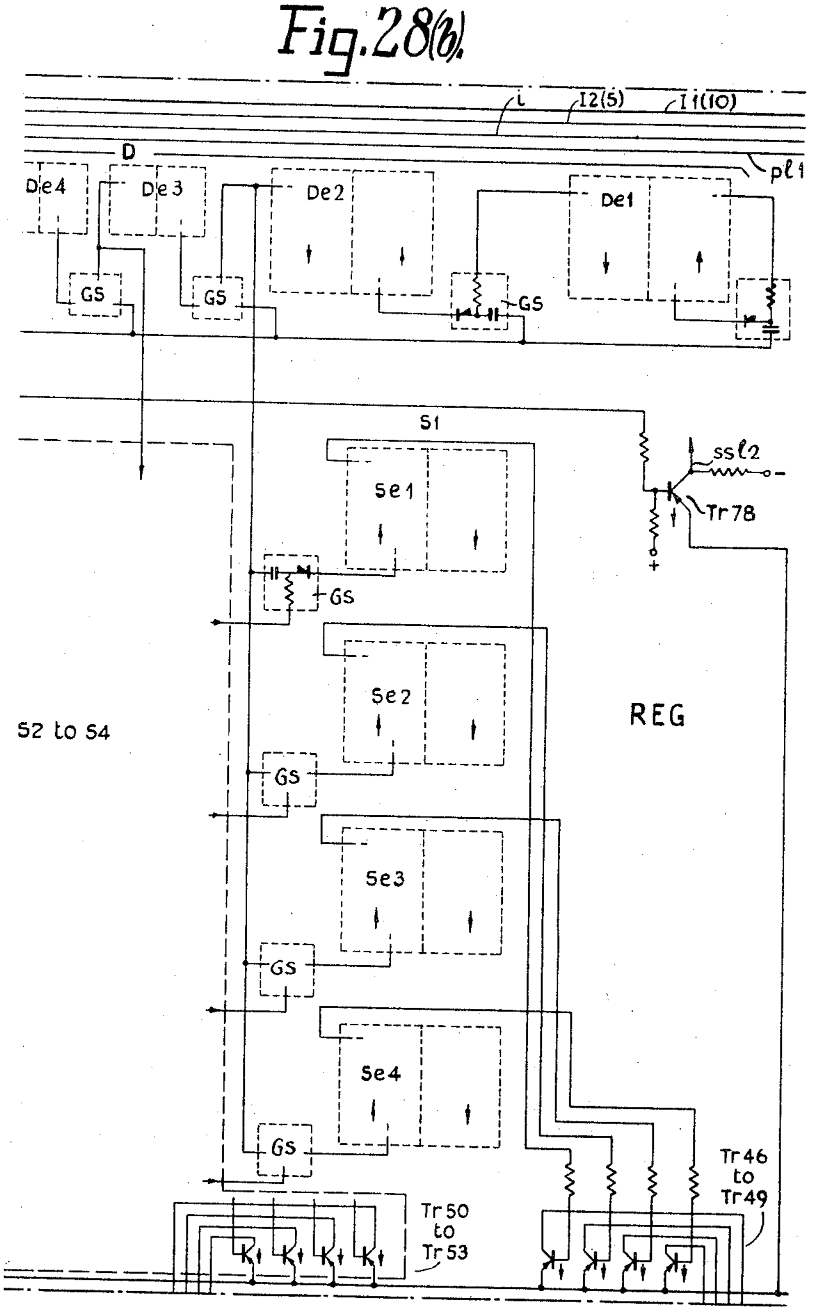
Figure 29A:
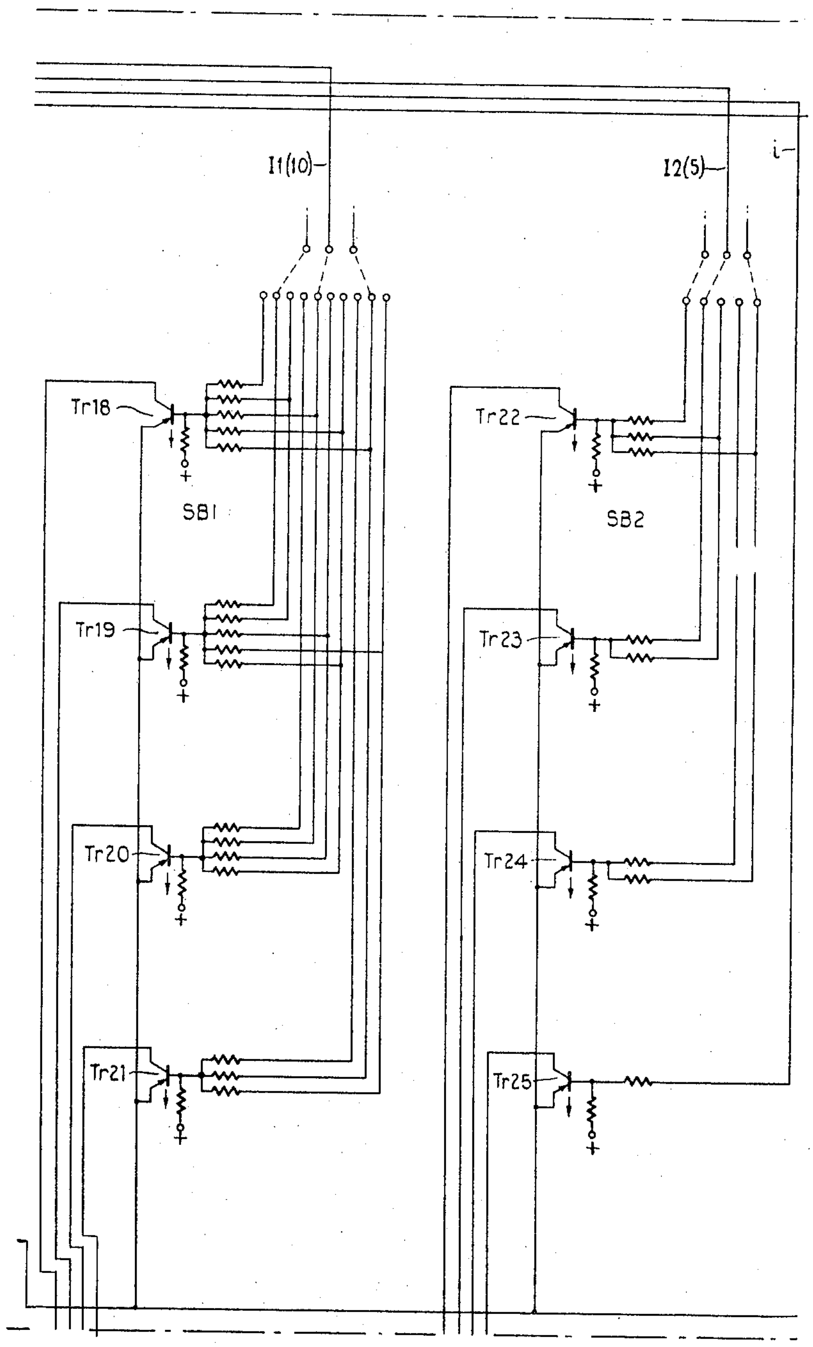
Figure 29B:
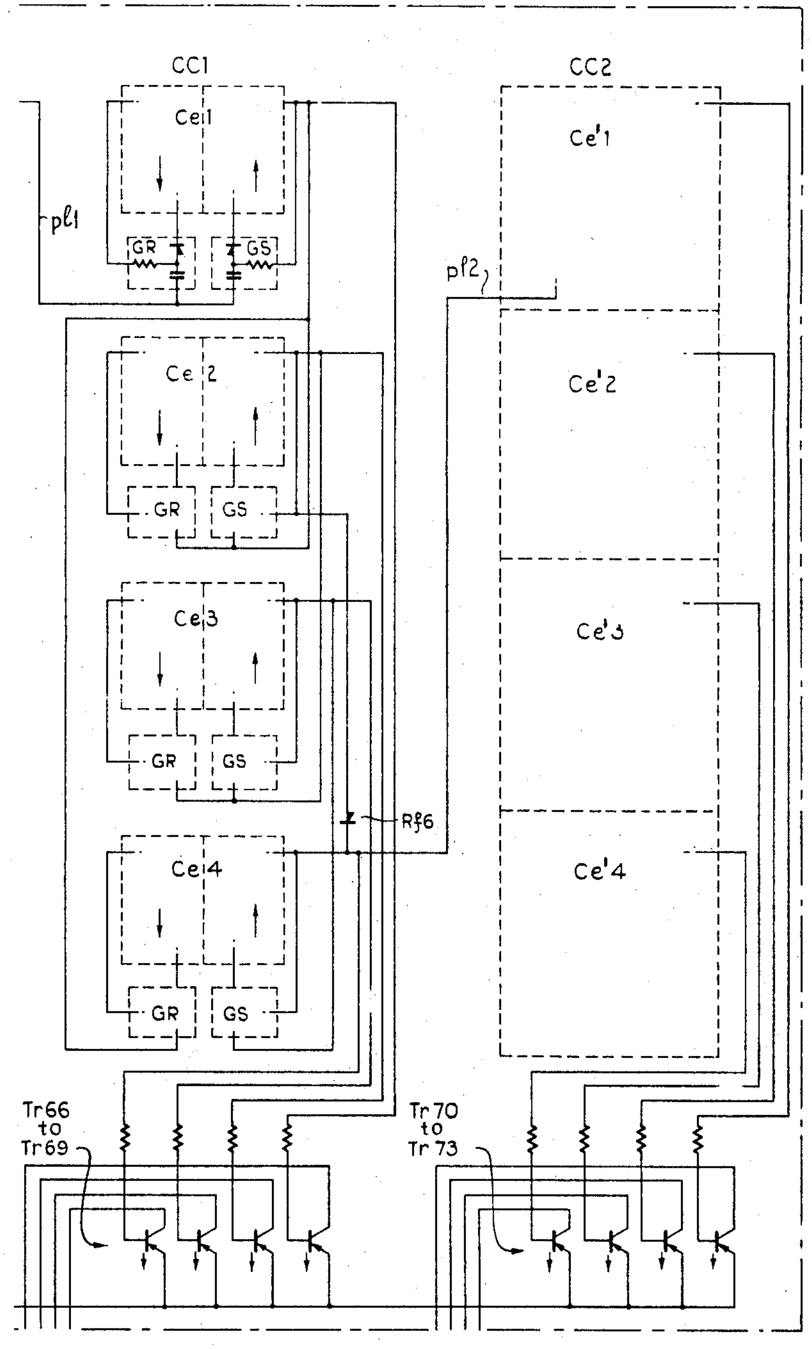
Figure 30A:
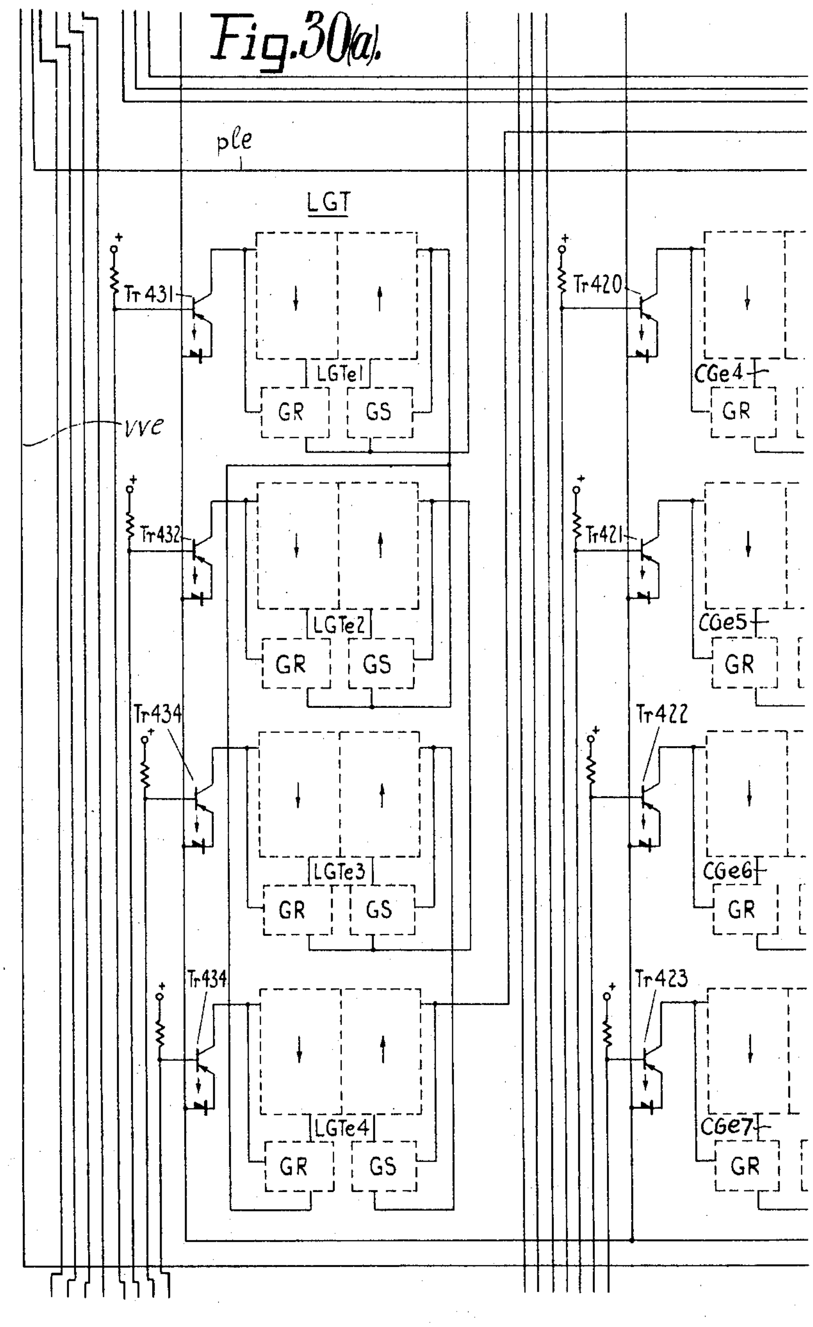
Figure 30B:
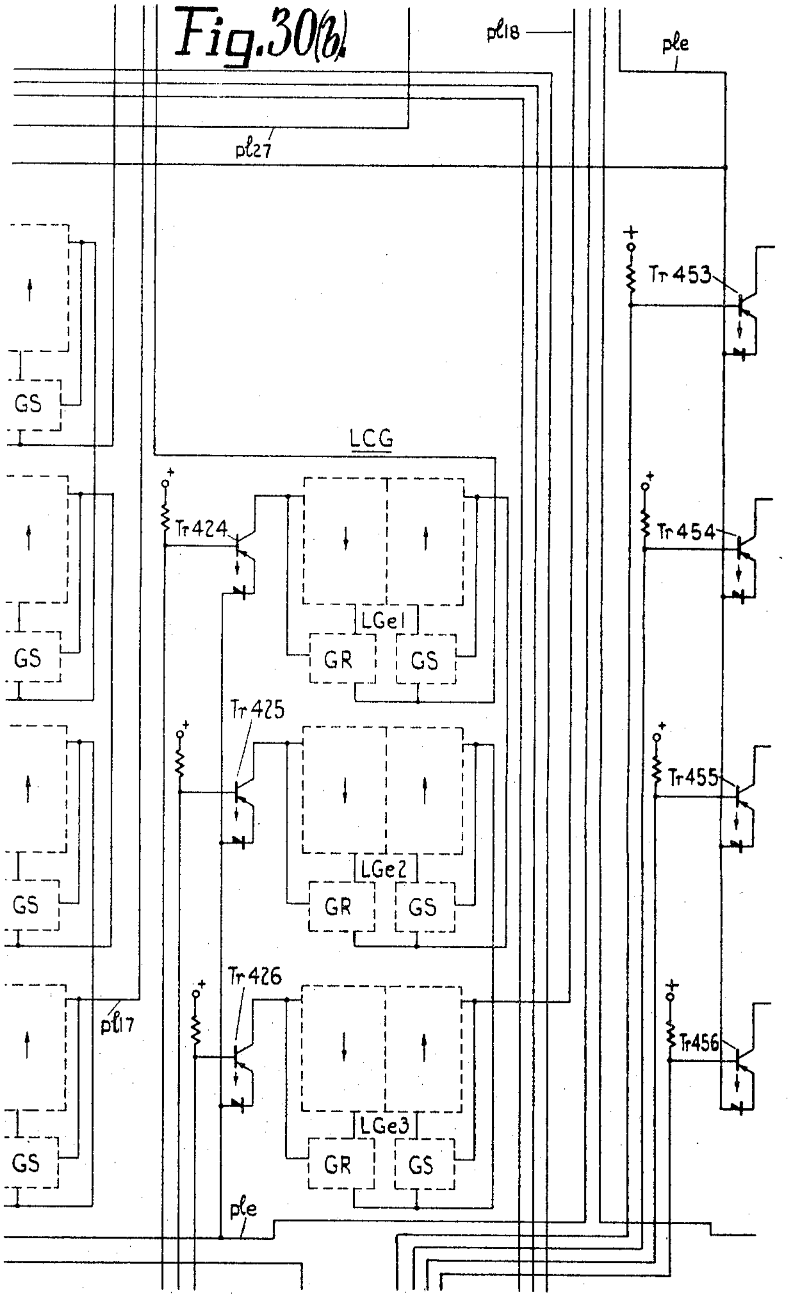
Figure 31A:
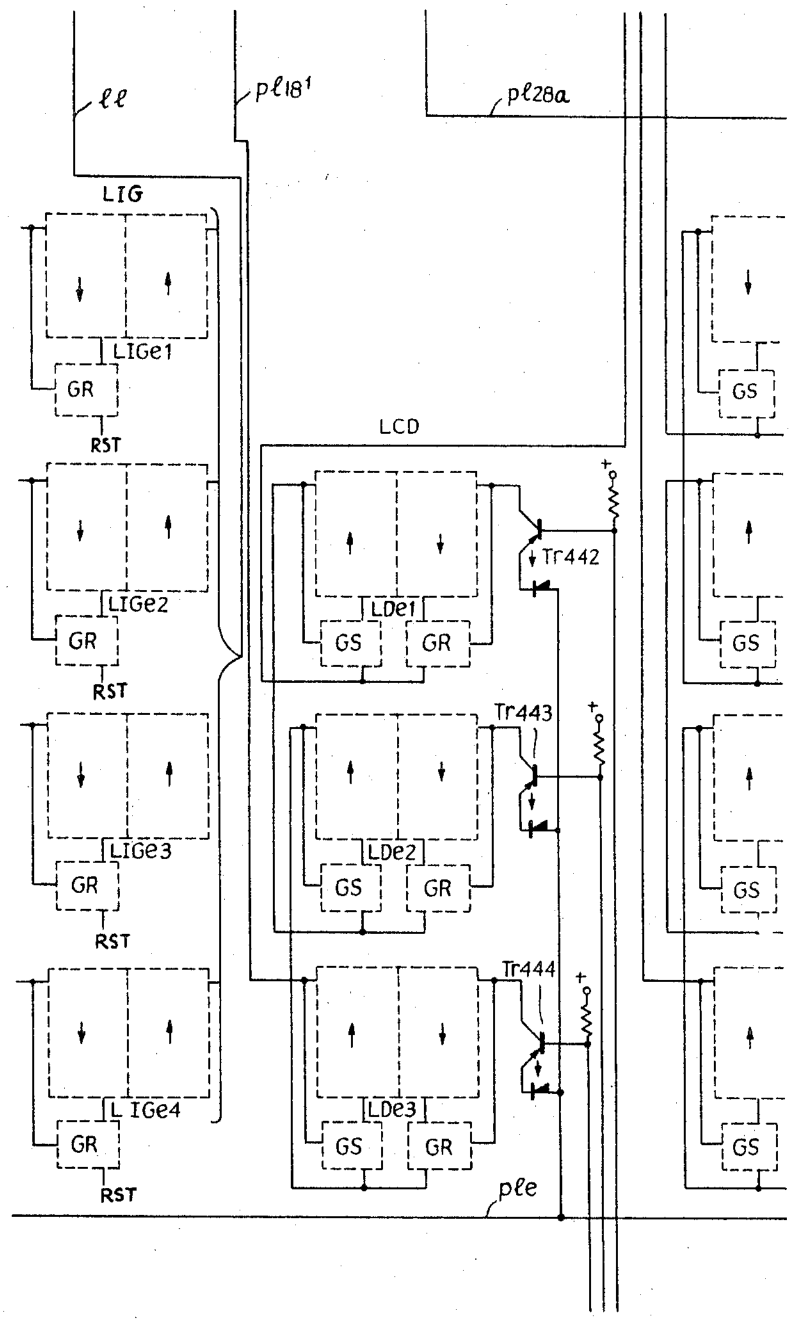
Figure 31B:
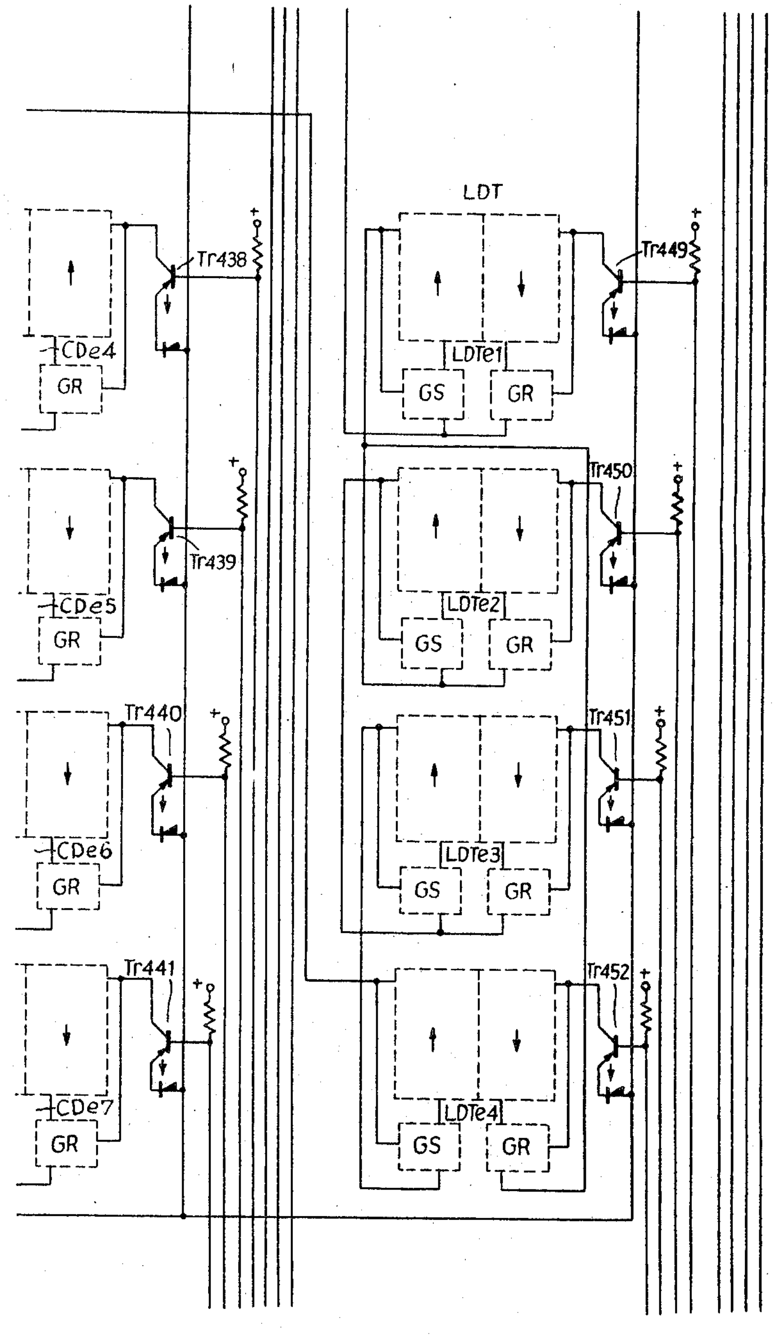

Turning now to the register circuit REG, shown in FIGS. 27 to 29, when this register has been set by the register hunter RH, that is, has responded to the negative battery "register free" condition extended from the register REG through contact arc *rh*6, the earth potential extended from the circuit DPC via the circuit DP is applied through the register hunter arc *rh*6 to a lead *pr* to the register REG to bring about the operation of a resetting relay KR. This earthing of the lead *pr* marks the register REG busy. Relay KR operating, closes contacts (not shown) to condition (that is set or reset as the case may be) numerous bistable circuits in the register REG. During the ensuing search by the line hunter LH for the calling line LIG the impulses reverted to the register REG over register hunter arcs *rh*4 and *rh*5 appear in the register on leads *pg* and *ws* whence they pass through a transformer T1 to be applied as negative pulses to the base of a transistor T*r*17 which in response thereto feeds setting pulses to the normally-open setting gate GS for a monostable circuit M*e*. This circuit M*e* is similar to the bistable transistor circuit of FIG. 9 but is minus resistors such as $R_{ss}$ and $R_{bs}$ so that in the absence of a setting pulse the left-hand transistor is the one which is normally conducting while only during the persistence of such pulse this transistor is cut-off and the right-hand transistor is conducting. In consequence for each reverted impulse the left-hand transistor of the circuit Me is cut-off so causing the right-hand transistor to conduct and apply a positive pulse to a lead *pl*1 the circuit Me restoring to its stable condition for the periods between successive impulses. The collector of the right-hand transistor in the circuit Me is connected over the lead *pl*1 to the pulse inputs of the setting gate GS and the resetting gate GR for from the register counters CC1 and CC2 and therefore these counters have to be adapted to record the appropriate binary markings in response to receipt of the reverted impulses relating to the fourth (units) and third (tens) digits of a calling line. This is achieved by initially setting the counters CC1 and CC2 to the binary pattern corresponding respectively to the digit value 7 (that is 1110) and 5 (that is 1010). The counting cycles of the counters CC1 and CC2 commencing with these settings are given in Table II below in which a "1" represents the set state of the circuits Ce1–Ce4 and Ce'1–Ce'4 and a "0" represents their reset state.

*Table II*

| Counter CC1 (units) | | | | | Counter CC2 (tens) | | | | |
|---|---|---|---|---|---|---|---|---|---|
| No. of Impulses (Units) | Ce1 | Ce2 | Ce3 | Ce4 | No. of Impulses (Tens) | Ce'1 | Ce'2 | Ce'3 | Ce'4 |
| 0 | 1 | 1 | 1 | 0 | 0 | 1 | 0 | 1 | 0 |
| 1 | 0 | 0 | 0 | 1 | → | 0 | 1 | 1 | 0 |
| 2 | 1 | 0 | 0 | 1 | 10 | 1 | 1 | 1 | 0 |
| 3 | 0 | 0 | 0 | 0— | 20 | 0 | 0 | 0 | 1 |
| 4 | 1 | 0 | 0 | 0 | 30 | 1 | 0 | 0 | 1 |
| 5 | 0 | 1 | 0 | 0 | 40 | 0 | 1 | 0 | 1 |
| 6 | 1 | 1 | 0 | 0 | 50 | 1 | 1 | 0 | 1 |
| 7 | 0 | 0 | 1 | 0 | 60 | 0 | 0 | 1 | 1 |
| 8 | 1 | 0 | 1 | 0 | 70 | 1 | 0 | 1 | 1 |
| 9 | 0 | 1 | 1 | 0 | 80 | 0 | 1 | 1 | 1 |
| 10 | 1 | 1 | 1 | 0 | 90 | 1 | 1 | 1 | 1 |
| | | | | | 100 | 0 | 0 | 0 | 0 |

the first bistable circuit Ce1 of a four-stage binary counter CC1 comprising circuits Ce1–Ce4. These four circuits Ce1–Ce4 are cascade-connected in conventional manner but the pulse input of the resetting gate GR for the circuit Ce4 is fed from the circuit Ce1 and the bias input of the setting gate GS for the circuit Ce2 is biased from the right-hand transistor of the circuit Ce4 via a rectifier Rf6 whereby to give the counter CC1 a cyclic count of only 10 as distinct from the cyclic count of 16 normally afforded my a four-stage binary counter. A second binary counter CC2 (shown in outline only) also comprises four cascade-connected bistable transistor circuits Ce'1–Ce'4 corresponding to elements Ce1–Ce4 of the counter CC1 but is unmodified and thus has a natural count of 16. The pulse inputs of setting and resetting gates of the first circuit (Ce'1) of the conuter CC2, that is the circuit corresponding to the circuit Ce1, are connected in common over a lead *pl*2 to the collector of the right-hand transistor in the circuit Ce4 of the counter CC1 and therefore, in general, the counter CC2 is stepped one step for each 10 steps (cycle) of the counter CC1. The counters CC1 and CC2 thus gives a combined count of 160 and can accordingly cater for the storage in binary form of digit numbers in excess of 100. This is necessary because it is assumed that there are 104 outlets in the line connector arcs (and in the line hunter arcs) so that up to this number of impulses representing the complement of the calling line outlet may be reverted from the line hunter LH for recording in the register counters CC1 and CC2.

As will hereinafter be described when the local controller LOC is being dealt with the outlet position of a calling line circuit on the line connector arcs is identified in tens and unit stores of the local controller LOC by binary markings having a composite value representing a number one less than the outlet number. Such markings are required to be transmitted to the local controller LOC It will be seen from Table II that as regards counter CC1 the modification in the counting cycle occurs upon receipt of the tenth impulse. With an unmodified counter the tenth pulse would cause the counter setting to become 0101 but in the present instance circuit Ce2 is prevented from becoming set because of the negative signal applied to its setting gate GS via rectifier Rf6 from the collector of the right-hand transistor in the circuit Ce4 while this latter circuit is itself reset by the circuit Ce1: the counter CC1 accordingly reverts instead to a setting 0000 for stepping the tens counter CC2 one step. As regards the counter CC2 only that portion of its cycle which is utilised is shown, that is from its initial setting 1010 to a setting 0000. As already mentioned a stepping pulse is applied over lead *pl*2 from the counter CC1 to the counter CC2 each time the counter CC1 is set to a pattern 0000, this being indicated in Table II by the arrowed line extending from that pattern to the pattern 0110 in the counter CC2. Therefore the counter CC2 is initially stepped to change its pattern after three reverted impulses have been received in the register REG and thereafter for each subsequent ten reverted impulses received. As an example of the setting of the counters CC1 and CC2 in response to reverted impulses if, say, 88 such impulses are transmitted to the register REG from the dial path DP, then the counter CC1 will be set to a pattern 1010 and the counter CC2 to a pattern 0111. It is to be appreciated of course that if 100-outlet line connectors were employed, so that the maximum number of reverted impulses is 100, the counter CC2 may then be modified in the same manner as the counter CC1 to give a cyclic count of 10 thereby providing a composite count of 100 for the two counters.

The second (hundreds) digit and first (thousands) digit of calling lines are identified to the register from the particular dial path which has taken it into use: this is achieved as follows. Since each of the dial paths is arranged to serve two line groups a group of five such dial paths will be required to serve five pairs of line groups (that is a thousand lines) irrespective of the subgrouping of the dial paths to provide the requisite availability. Consequently, taking into use one dial path in respect of a calling line automatically serves to give an indication in which thousand lines this line is located and from this the thousands digit value of the calling line can be derived by a particular one-out-of-ten marking extended to the register from the dial path. Nothwithstanding which one of the five dial paths of a group is taken into use an identical marking appertaining to the thousand lines served by the group will be transmitted to the register so as to provide an indication of the thousands digit value of the calling line. In the circuits being described, the one-out-of-ten decimal markings identifying the thousands digit value are extended as negative signals to the register REG from the dial paths by way of register hunter arcs such as *rh*8. Within the register REG, contacts of this arc (*rh*8) are selectively strapped to a set of ten identification leads I1(10) which extend the markings to a binary store SB1 comprising four normally non-conducting transistors T*r*18–T*r*21. In consequence for each possible one-out-of-ten marking the store SB1 is primed by marking one or more of these transistors T*r*18–T*r*21 in binary code in accordance with the relevant first (thousands) digit value of a calling line. In addition to the thousands digit marking, each of the five dial paths in a group is arranged, when taken into use, to extend to the register an individual marking which serves to identify the two line groups served by the dial path. These one-out-of-five markings, as they will be termed, are extended as negative signals to the register REG by way of register hunter arcs such as *rh*7, contacts of which are selectively strapped to a set of five identification leads I2(5) which extend the marking to a second binary store SB2. Having identified the two line groups, the identification of the particular line group in which a calling line is actually located is identified to the register REG from the dial path by a marking or the absence of a marking on a further lead *i*. This lead *i* is connected to all the contacts in the register hunter arcs such as *rh*5 via leads *ws* and receives a marking in the form of a negative signal only if the wiper switching relay WS in the dial path is operated. The set of five identification leads I2(5) and the lead *i* are selectively connected to four normally non-conducting transistors T*r*22–T*r*25 in the store SB2 such that for each possible one-out-of-five marking in conjunction or not with a marking on lead *i* according to the operated or non-operated condition of the relay WS in the dial path, the store SB2 is primed by marking one or more of these latter transistors. The priming of the store SB2 gives in coded form the value of the hundreds digit of a line group containing a calling line and thus the hundreds digit value of that line. This coding, although not straightforward binary coding, nevertheless can provide unique code combinations for each of the ten possible values of the hundreds digit and as will be dealt with presently, gives corresponding combinations of binary markings for transmission to the line location identifier LI wherein the actual hundreds digit value of a calling line is derived from these markings by the relevant binary-to-decimal decoder.

Once the line hunter LH in the dial path DP has set to the calling line LIG, the line loop of the latter is extended through register hunter arcs *rh*1 and *rh*2 to the +*ve* and −*ve* line wires in the register REG and through windings of a transformer T2 to complete a charging circuit for a capacitor C*s*2 in an element ABC which serves to provide the A (stepping), B (release) and C (switching) pulses, the employment of which is well-known in the telecommunications art. The A-section of element ABC comprises transistors T*r*26–T*r*29, the C-section transistors T*r*30–T*r*33 and the B-section transistors T*r*34–T*r*37. When the capacitor C*s*2 has become sufficiently negatively charged through the line loop and a resistor R*s*11 from a negative supply (−), transistor T*r*26 is rendered conducting, so causing transistor T*r*27 to cut-off, which in turn causes transistor T*r*28 to conduct, and that in turn causes transistor T*r*29 to cut-off. The resulting negative output signal from the collector of the transistor T*r*29 renders conducting a transistor T*r*38 which produces at its collector a positive signal which is applied to the pulse input lead of the setting gate GS for a bistable circuit H*e* (HOLD). This causes the left-hand transistor of the circuit H*e* to cut-off, so bringing a transistor T*r*39 into conduction to operate a holding relay HR. Contact *hr*1 closes to apply an earth to the lead *pr* via changeover contacts *kr*1 (operated) to hold relay KR and the dial path DP under control of the calling line circuit LIG. The circuit H*e* upon setting also extends a positive signal from the collector of its right-hand transistor to the pulse input lead of the setting gate GS for another bistable circuit DT*e* (DIAL TONE). This causes the left-hand transistor of this circuit DT*e* to cut-off, so bringing a transistor T*r*40 into conduction to start a blocking oscillator constituted by a transistor T*r*41 having its base and collector inductively coupled through windings of the transformer T2. This blocking oscillator produces a dial tone frequency which is induced through windings of the transformer T2 into the +*ve* and −*ve* line wires and is so reverted over register hunter arcs *rh*1, *rh*2, and through the dial path DP to the calling line circuit LIG.

Within the element ABC the transistor T*r*28 conducting cut-off transistor T*r*30, so causing transistor T*r*31 to conduct once a capacitor C*s*3 connected to its base has charged sufficiently negatively. This in turn cuts-off transistor T*r*32 so causing a pulse to be applied through a capacitor C*s*4 to the base of transistor T*r*33 to render this latter transistor conducting momentarily. The resulting positive (C) pulse produced at the collector of transistor T*r*33 is applied over lead *pl*3 to the pulse inputs of setting gates GS for several bistable circuits D*e*1 . . . D*e*N constituting a distributor circuit D. The setting gate GS for the circuit D*e*1 is biased open from its own circuit and therefore the pulse passes through this gate and sets the circuit D*e*1 so causing the setting gate GS for the circuit D*e*2 to become biased open from circuit D*e*1. The (C) pulse is also applied to the pulse inputs of resetting gates GR1 for four further bistable circuits T*e*1–T*e*4, comprising a temporary binary counter TC, to reset these circuits to a condition in which their left-hand transistors are conducting.

As dialling thereafter takes place at the calling line circuit LIG, a positive pulse is applied to the element ABC each time the calling loop opens. These pulses, received in groups as impulse trains, cause the A-section of the element ABC to produce corresponding positive A pulses from the collector of transistor T*r*29 which are applied over lead *pl*4 to the pulse inputs of the setting and resetting gates GS and GR2 of the circuit T*e*1 to step the temporary counter TC. At the end of the first impulse train the temporary counter TC is thus set to a binary configuration representing the value of the first dialled digit, those of the circuits T*e*1–T*e*4 which are set applying (positive) earth potential to individual bias leads *bl*1–*bl*4 connected respectively to the bias inputs of four pulse-plus-bias setting gates GS for four bistable circuits S*e*1–S*e*4, comprising a first-digit store S1, and also to corresponding sets of four setting gates GS for similar groups of four bistable circuits comprising further digit stores S2, S3 . . . SN. The C-pulse produced at the end of the first impulse train is applied over lead *pl*3 to set the circuit D*e*2 of the distributor D, so producing at the collector of the left-hand transistor of this circuit a positive signal which is applied to the pulse inputs of the setting gates GS for the circuits S*e*1–S*e*4 of the store S1. In consequence, the store S1 is set to the same configuration as that reached by the temporary counter TC to record the first digit value. The C-pulse also resets the circuits T*e*1–T*e*4 of the temporary counter TC via their resetting gates GR1 to prepare the counter for receiving the next dialled impulse train. In the distributor D, the setting gate of the circuit D*e*3 is now biased open by the circuit D*e*2 so that on the occurrence of the next C-pulse, that is, at the end of the second impulse train, the second digit value is recorded in the second-digit store S2. The values of further dialled digits are likewise successively recorded in the stores S3 . . . SN respectively.

When, during the above digit-recording action, sufficient digits have been received, say three digits, the register REG requests to be coupled to the location identifier LI in the following manner. In addition to the distributor circuit D*e*4 having the collector of its left-hand transistor connected to the pulse inputs of the setting gates GS for the circuits of the store S3, this collector is also connected through a rectifier R*f*7 to a pulse lead *pl*5 so that a positive signal appears on this lead when the distributor circuit D*e*4 is set. This lead *pl*5 is connected to the pulse input of a permanently biased setting gate GS for a bistable circuit A*e* (ASK TO COUPLE) which is therefore set consequent on the application of the positive signal to the lead *pl*5 and in becoming set renders a transistor T*r*42 conductive. The resulting positive (earth) potential at the collector of this transistor T*r*42 is extended over a request lead *rl* to a register scanner RSC (shown separately in FIG. 44 and to be described later) as a request signal indicating that the register REG wants to be coupled to the line location identifier LI when next given the opportunity to do so.

With this earth signal extending into the register scanner circuit RSC the next time the scanner couples to the register REG its scanning action is stopped and a negative signal is reverted to the register REG over a proceed lead *prl* to render a transistor T*r*43 conducting. Transistor T*r*43 conducting, cuts-off a transistor T*r*44 which in turn causes a transistor T*r*45 to conduct. The resulting earth potential at the collector of the transistor T*r*45 is applied to the emitters of sets of four transistors T*r*46–T*r*49, T*r*50–T*r*53, T*r*54–T*r*57, T*r*58–T*r*61 and T*r*62–T*r*65 which pertain respectively to the called number stores S1 . . . SN, and in consequence, the transistors in these sets which are marked at their bases by negative signals extended from the set circuits of their appertaining stores are rendered conductive to extend from their collectors positive signals into the line location identifier LI: these positive signals constitute binary markings identifying the called digit number. The earth potential at the collector of the transistor T*r*45 is also applied to the emitters of the transistors T*r*18–T*r*21 and T*r*22–T*r*25 of the stores SB1 and SB2 respectively, and to the emitters of two further sets of fours transistors T*r*66–T*r*69 and T*r*70–T*r*73 which pertain respectively to the calling number's counters CC1 and CC2. In consequence, the transistors in the sets T*r*66–T*r*69 and T*r*70–T*r*73 which are marked at their bases by negative signals extended from the set circuits of the counters CC1 and CC2 respectively are likewise rendered conductive to extend to the line location identifier LI positive binary markings identifying the tens and units digit values of calling numbers. As regards the transistors T*r*18–T*r*21 and T*r*22–T*r*25 in the stores SB1 and SB2, certain of these will be rendered conductive in accordance with the priming markings at their bases from the sets of leads I1(10), and the set I2(5) in conjunction with the lead *i* respectively, thereby to extend binary markings identifying the thousands and hundreds digit values of the calling line number to the line location identifier LI. The positive (earth) signal from the collector of the transistor T*r*45 is also applied to the emitter of a further transistor T*r*74 which at this time has its base held at a negative potential from the collector of the right-hand transistor of a bistable circuit RC*e* (REGISTER COUPLE) and is therfore rendered conductive to extend from its collector over a sequence start lead *ssl*1 a positive (earth) start signal to a sequence control circuit SCC (FIG. 43).

Figure 43A:
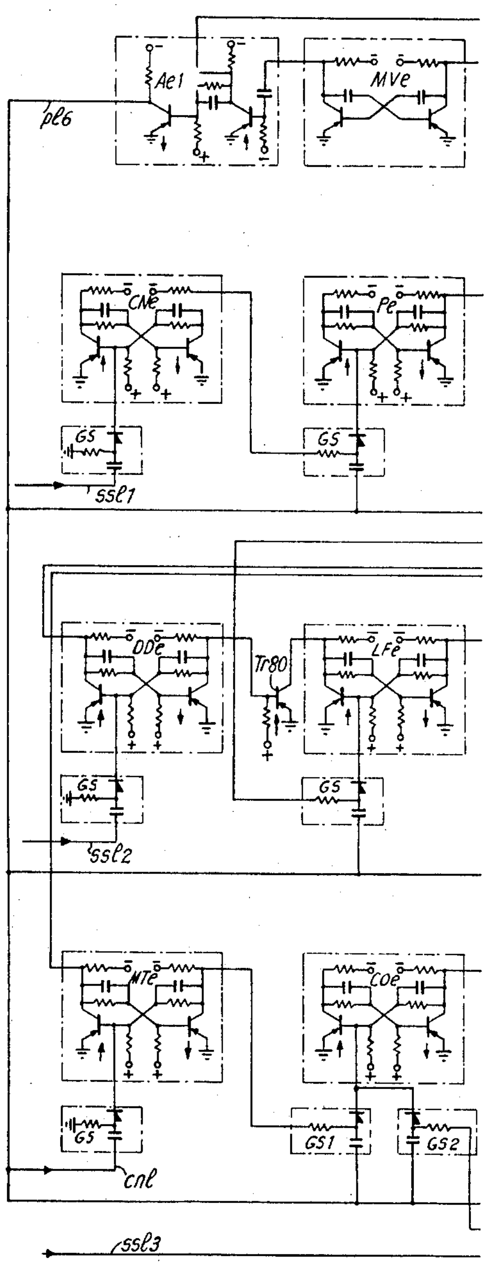
Figure 43B:
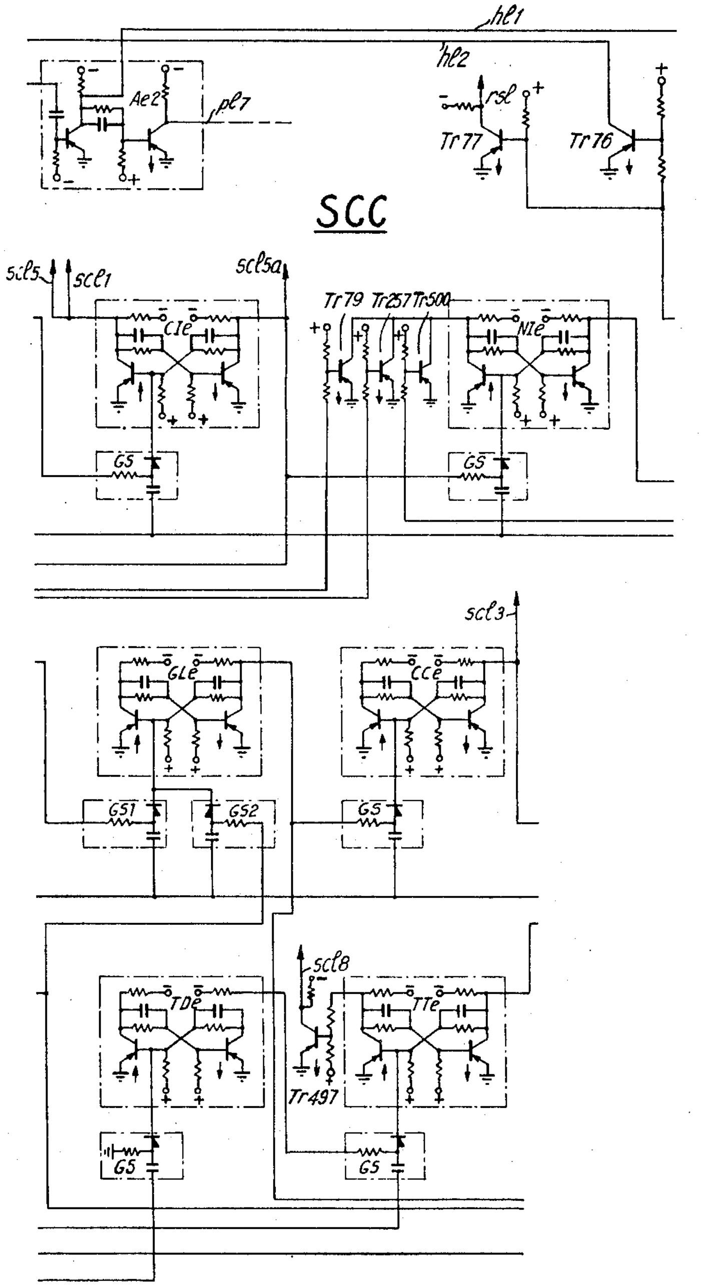
Figure 43C:
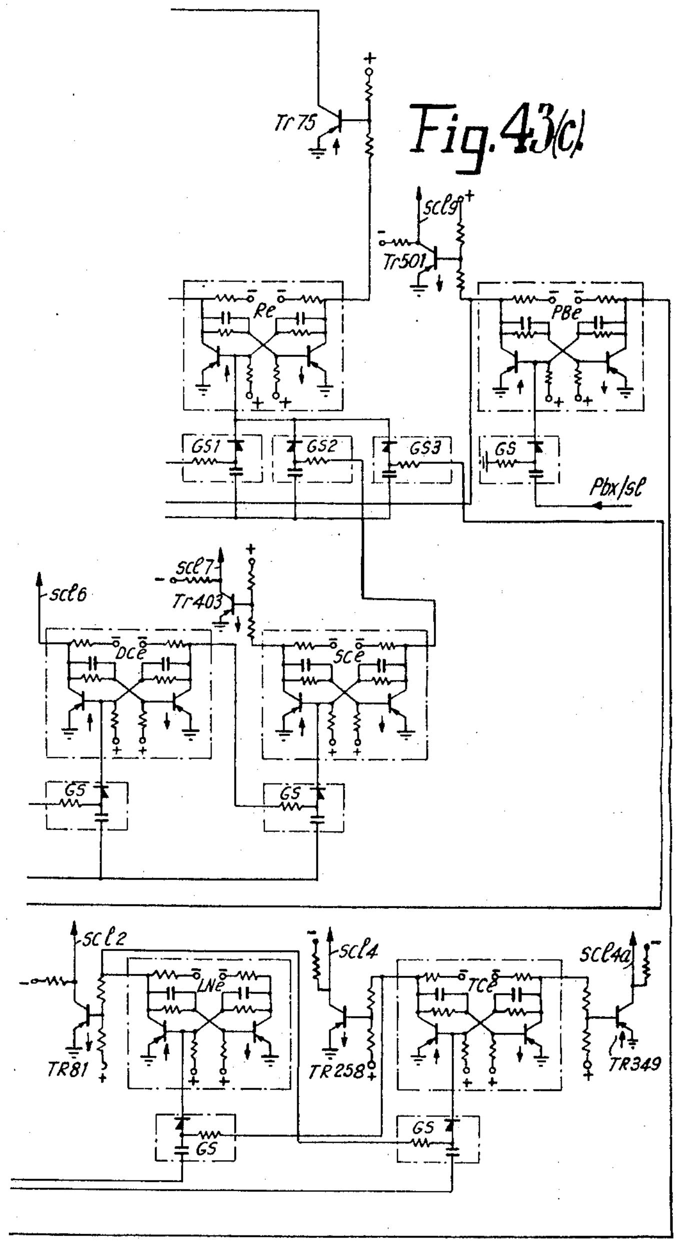

The sequence control circuit SCC shown in FIG. 43 includes numerous interconnected bistable circuits for effecting the operating sequence of the exchange according to the type of call (i.e. local, trunk, changed number, or PBX) which is being dealt with. These bistable circuits are driven by pulses produced by a continuously operating multivibrator circuit MV*e* and appearing, after amplification by an amplifying circuit A*e*1 or A*e*2, on two leads *pl*6 and *pl*7. The pulses on the lead *pl*6 are employed as setting pulses for certain of the bistable circuits (to be considered individually hereinafter) the lead *pl*6 being to this end connected to the pulse inputs of the setting gates GS for these circuits, while the pulses on the lead *pl*7 are employed as resetting pulses for all the bistable circuits. For this latter purpose it is to be appreciated that the lead *pl*7 would be connected to the pulse inputs of normally-open resetting gates for the bistable circuits: however, these latter gates have been omitted in order not to overburden the circuit with detail. The two amplying circuits A*e*1 and A*e*2 are controlled by a bistable circuit R*e* (RELEASE) which when it is reset, holds a transistor T*r*75 conducting to produce on an inhibiting lead *hl*1 a positive (earth) signal preventing the circuit A*e*2 from passing resetting pulses, and which when it is set, holds a transistor T*r*76 conducting to produce on an inhibiting lead *hl*2 a corresponding signal preventing the circuit A*e*1 from passing setting pulses.

The positive (earth) signal extended from the register REG over the lead *ssl*1 sets a bistable circuit CN*e* (COUPLE NORMAL) via it normally-open setting gate GS. With the circuit CN*e* set, the setting gate GS for a bistable circuit P*e* (PAUSE) is open so that this circuit, which serves merely to provide a pause of one setting pulse period to allow stabilisation of the various circuit potentials before the sequence of operations which follow, is set by the next setting pulse appearing on the lead *pl*6 from the continuously operating multivibrator circuit MV*e*. In turn, with the circuit P*e* set, the setting gate GS for a bistable circuit CI*e* (CAUSE IDENTIFICATION) is open so that this circuit is set by the next again setting pulse appearing on the lead *pl*6. The resulting negative signal on a sequence control lead *scl*1 is extended to the translator TX, causing the latter to examine (in a manner to be described presently) the three dialled digits which have been passed to it from the register REG. If the translator TX does not recognise these three digits it will take no action (the translator TX assuming as already mentioned that these digits therefore pertain to a local line connected to the exchange), and the next setting pulse appearing on the lead *pl*6 will set a bistable circuit NI*e* (NOT IDENTIFY) via its setting gate GS which has been opened by the setting of the circuit CI*e*. The circuit NI*e* has now opened the setting gate GS1 for the circuit R*e*, which is therefore set by the next pulse appearing on the lead *pl*6 so that on the one hand the amplifying circuit A*e*1 is inhibited by the transistor T*r*76 and on the other hand the inhibit signal applied to the amplifying circuit A*e*2 by the transistor T*r*75 is removed. In consequence, no further setting pulses appear on the lead *pl*6, while the first resetting pulse appearing on the lead *pl*7 resets the circuits CN*e*, P*e*, CI*e*, NI*e* and R*e* via their resetting gates (not shown). In addition to initiating this resetting action for the sequence control circuit SCC, the circuit R*e* in its set condition also renders another transistor T*r*77 conducting, with the result that a positive (earth) signal is extended from the collector of this transistor over a resetting lead *rsl* to the register REG to reset therein the bistable circuit A*e* via its normally-open resetting gate GR. With the circuit A*e* reset, the register REG releases the register scanning circuit RSC by removing the holding positive (earth) signal extended thereto over lead *rl*.

When the register REG has received the fourth dialled digit it again passes the stored digital information into the line location identifier LI and renders the sequence control circuit SCC operative, this time as a result of the distributor circuit D*e*5 applying a positive signal through a rectifier R*f*8 to the lead *pl*5. In the circuit SCC the circuits CN*e*, P*e* and CI*e* are set in turn as before. However, with the value of the fourth dialled digit stored in the register REG the distributor circuit D*e*5 has primed negatively the base of a transistor T*r*78 (which has its emitter connected to the collector of transistor T*r*45), so that in this instance a positive (earth) signal is applied from the register REG to the sequence control circuit SCC over a second sequence start lead *ssl*2 to set, via its normally-open setting gate GS a bistable circuit DD*e* (INDICATES DIGIT 4 DIALLED). With the circuit DD*e* set, a transistor T*r*79 is rendered conducting to prevent the circuit NI*e* from being set by the next setting pulse on the lead *pl*6 which is used instead to set a bistable circuit LF*e* (LOCAL WITH 4th DIGIT) which has its setting gate GS open in the set condition of the circuit CI*e*. When it is set the circuit LF*e*, which in the previous operation of the sequence control circuit SCC was prevented from becoming set by a transistor T*r*80 held normally conductive when the circuit DD*e* is reset, now opens the setting gate GS1 for a bistable circuit GL*e* (GATE INTO ROUTE SELECTOR) which is thus set by the next setting pulse on the lead *pl*6. When the circuit GL*e* sets it applies a positive (earth) signal to the setting gate GS for a bistable circuit LN*e* (LOCAL—NO CHANGE). This latter setting gate is normally biased open by a bistable circuit TC*e* (TRUNK, CHANGED NUMBER OR PBX) in its reset condition and therefore the circuit LN*e* is set and renders a transistor T*r*81 conductive. From the collector of this transistor a positive (earth) signal is applied over a sequence control lead *scl*2.

Leaving the sequence control circuit SCC for the moment and turning now to the line location identifier LI (FIGS. 32 to 34 and 37 to 39). With the register REG in receipt of the fourth digit of a dialled number and again coupled to the line location identifier LI, the digital information pertaining to the calling and called lines passes from the register REG to the line location identifier LI over lead groups *a* and *b*.

The digital information appertaining to the called line (on lead groups *a*) is fed into binary-to-decimal decoders D*b*1–D*b*5 each of which corresponds to the decoder already described in detail with reference to FIG. 10. From the decoders D*b*1–D*b*5 1-out-of-10 decimal markings pertaining to the called digits are passed over the relevant lead in each group *c*(10)1–*c*(10)5 respectively to the translator TX. If the call is a completely normal local call, then translator TX takes no action at this time and therefore the sequence control circuit SCC applies a positive signal over lead *scl*2 to the emitters of transistor groups T*r*82–T*r*91, T*r*92–T*r*101, T*r*102–T*r*111 and T*r*112–T*r*121 (these transistor groups corresponding to gates G*d* in FIG. 7). According to the value of the relevant called digit, one transistor in each of these groups will remain non-conducting due to the positive potential applied to its base from the associated decoder and the negative potential at the collector of this transistor in each group causes a negative marking signal representative of the decoded digit value to be extended over one lead in each of four groups of ten leads *e*(10)1–*e*(10)4 towards the route selector RS and to the other route selectors corresponding thereto in the other exchange sections. From the lead groups *e*(10)1 and *e*(10)2, the first (thousands) and second (hundreds) digits of the called line are extended to the route selector RS (FIGS. 35, 36, 40 and 41) as one-out-of-ten decimal markings over respective groups of ten leads 1D′ and 2D′, while from the lead groups *e*(10)3 and *e*(10)4 the third (tens) and fourth (units) digits are extended as binary markings over respective groups of four leads 3D′ and 4D′, the one-out-of-ten decimal markings from the decoders D*b*3 and D*b*4 being to this end re-encoded by respective encoders E1 and E2. These encoders each correspond to the encoder already described with reference to FIG. 11 and function in similar fashion, but in view of the organization of the translator circuit their transistors are arranged to be normally conducting and they include polarity reversing transistors (unreferenced) so that a negative decimal marking signal is converted into the appropriate combination of negative binary marking signals.

The first (thousands) and second (hundreds) calling line digit markings from the register REG are decoded into one-out-of-ten decimal markings by respective decoders D*a*1 and D*a*2, these markings being then fed as negative signals by way of respective transistor groups T*r*122–T*r*131 and T*r*132–T*r*141 and over respective groups of ten leads 1G′ and 2G′ to the route selector RS. The third (tens) and fourth (units) calling line digit markings from the register REG are extended, unchanged, over respective sets of four leads 3G′ and 4G′ to the route selector RS. Reverting again to the sequence control circuit SCC, the setting pulse on the lead *pl*6 following that which set the circuit GL*e* sets a bistable circuit CC*e* (CONSIDER CHOICE OF EXCHANGE SECTION) which has its setting gate GS opened by the circuit GL*e*. With the circuit CC*e* set a positive (earth) signal is extended over a sequence control lead *scl*3 to calling and called line P/Q discrimination circuits represented by the dotted-line blocks PQG and PQD in the line location identifier LI. These circuits PQG and PQD each correspond to the circuit shown in FIG. 49 which will be described later.

In the line location identifier LI, the third and fourth binary digit markings of the calling line are extended into the circuit PQG and the third and fourth digit markings of the called line are extended into the circuit PQD. In response to these markings, and consequent on receipt of the positive (earth) signal over the sequence control lead *scl*3, these circuits operate to pass to the route selector RS, markings indicating whether the calling and called lines are P- or Q-lines, these markings being passed to the route selector RS over leads PG (calling P-line) or QD (calling Q-line) and PD (called P-line) or QD (called Q-line), as the case may be.

Before considering the route selector RS, the translator TX also included in the line location identifier LI will first be dealt with. This translator TX essentially comprises a group of four translation (changed-number) elements T*ce*1–T*ce*4 one element in respect of each PBX and/or changed-number digits of called numbers and a plurality of translation (trunk) elements T*xe*1 . . . T*xen* one in respect of each trunk routing digit which may be required. As shown fully for the element T*xen* each of these elements comprises ten transistors T*r*142–T*r*151 one for each of the ten possible decimal values of the appertaining digit: each of these transistors has an individual translation strapping terminal *ts* connected to its base. For the present only the operation of the translator TX as confined to changed-number requirements will be dealt with. The lead groups *c*(10)1–*c*(10)5 from the decoders D*b*1–D*b*5 are connected respectively to the bases of normally conductive transistors T*r*152–T*r*161, T*r*162–T*r*171, T*r*172–T*r*181, T*r*182–T*r*191 and T*r*192–T*r*201, which are cascade-connected to further groups of transistors T*r*202–T*r*211, T*r*212–T*r*221, T*r*222–T*r*231, T*r*232–T*r*241 and T*r*242–T*r*251. These latter transistors have their collectors connected to individual translation input terminals *ti*. The translator TX also includes a number of changed-number elements such as C*xe*, one for each four-digit number required to be changed. This element C*xe* comprises a normally-conducting transistor T*r*252 which on the one hand has its base connected to a group of four rectifiers R*fn* which can be selectively connected (as by strappings) to the input terminals *ti* and on the other hand has its collector connected to a further group of four rectifiers R*fn*′ which can be selectively connected as by strappings to the strapping terminals *ts* of the elements T*ce*1–T*ce*4. For example if a called digit number 2615 is to be changed to 3159 then the element C*xe*

(assuming it relates to line 2615) would be strapped as shown. For this number positive signals from the decoders Db1–Db5 would be applied to the relevant lead in each of the lead groups c(10)1–c(10)4 to cut-off transistors Tr153, Tr167, Tr172 and Tr186. This in turn will render conducting transistors Tr203, Tr217, Tr222 and Tr236 each of which has its collector connected via the relevant input terminals ti to a different one of the rectifiers in the group Rfn. In consequence transistor Tr252 in the element Cxe will be cut-off so that its collector potential falls negatively to apply a negative priming signal through each of the rectifiers in the group Rfn' to the bases of the transistors such as Tr144, Tr142, Tr147 and Tr150 in the elements Tce1–Tce4.

Each of the elements Txe1 . . . Txen and Tce1–Tce4 has an individual normally non-conducting gating transistor such as transistor Tr253 for element Txen to the collector of which the ten transistors such as Tr142–Tr151 of the element are connected in common. These gating transistors are controlled from the sequence control circuit SCC to which reference will again be made.

From the sequence control circuit SCC the negative signal produced on lead scl1 when the element CIe (CAUSE IDENTIFICATION) became set is applied in the translator TX to the base of a transistor Tr254 which has its collector connected in common to the emitter of two transistors Tr255 and Tr256. The transistor Tr255, which pertains to changed number and trunk digit identification, has its base connected over a strapping connection t/cn to one of the rectifiers Rfn' in the changed number element Cxe to receive from this element a negative priming signal. (It is also similarly strapped to other changed number elements.) In consequence the transistor Tr255, when primed, is rendered conducting consequent on the transistor Tr254 becoming conducting as a result of the negative signal on lead scl1, to apply a positive signal to a changed-number lead cnl which extends into the sequence control circuit SCC wherein it is applied to the normally-open setting gate GS for a bistable circuit MTe (MAIN TRANSLATOR OUTPUT—TRUNK OR CHANGED-NUMBER). This causes the aforementioned action of the circuit SCC to be modified as follows. With the circuit MTe set a transistor Tr257 is rendered conducting to prevent the circuit NIe from being set by the next setting pulse appearing on the lead pl6 and the setting gate GS1 for a bistable circuit COe (CHANGED NUMBER FOR TRUNK OR LOCAL) is opened. The next setting pulse on lead pl6 therefore sets the circuit COe causing it to apply a setting pulse to the setting gate GS for the circuit TCe which in turn is set and renders a transistor Tr258 conducting so causing positive (earth) signal to be extended over a sequence control lead scl4. This signal which in lieu of the previously mentioned signal on lead scl2 is applied to the emitters of groups of ten translator output transistors Tr259–Tr268, Tr269–Tr278, Tr279–Tr288, Tr289–Tr298, Tr299–Tr308, Tr309–Tr318, Tr319–Tr328, Tr329–Tr338 and Tr339–Tr348 pertaining to the respective translation elements Tce1–Tce4 and Txe1 . . . Txen, and having their bases connected individually to the collectors of transistors such as Tr142–Tr151 in the appertaining translation element.

With the circuit TCe set, a transistor Tr349 in the circuit SCC is rendered non-conducting to apply over a sequence control lead scl4a a negative signal which is effective to render conducting the gating transistors such as transistor Tr253 in the translator TX. With these gating transistors conducting, earth potential is applied to the transistors such as Tr142–Tr151 in the translation elements Tce1–Tce4 and Txe1 . . . Txen so that the particular ones of these transistors which are primed at their bases by the negative signal from the changed number element Cxe are rendered conducting. In consequence, a positive signal is extended from the collectors of these conducting transistors to the bases of the appertaining output transistors and therefore when the positive signal is applied to the lead scl4 only these appertaining output transistors will remain non-conducting to maintain at their collectors negative signals which constitute negative (changed-number) decimal output marking signals and which are applied over one lead in each of four groups of ten leads e(10)1'–e(10)4' to the encoders E1 and E2 and thence to the route selectors such as RS of each exchange section in place of the original called digit markings.

In the circuit SCC the setting pulse causing the signals to be produced on leads scl4 and scl4a also sets the circuit LFe which, however, is ineffectual at this time. The next setting pulse sets the circuit GLe via its setting gate GS2 which has been opened by the setting of circuit COe but in this instance the circuit GLe does not set the circuit LNe and thus there is no signal on lead scl2 because the setting gate GS of the latter is now closed as a consequence of the circuit TCe being set. The four groups of gating transistors Tr259–Tr268, Tr269–Tr278, Tr279–Tr288 and Tr289–Tr298 correspond respectively to the gates Gf in FIG. 7.

Turning now to the route selectors of the several exchange sections, the circuit for one is shown at RS (FIGS. 35, 36, 40 and 41) and the others are similar. The markings representing the four digits identifying the calling line are received by the route selector RS from the line location identifier LI on the sets of leads 1G'–4G', together with a marking on lead PG or QG identifying the P or Q nature of the calling line. The markings on the sets of leads 3G' and 4G' are passed towards the local controllers, such as LOC (FIGS. 15, 16, 20, 21, 23 to 26, 30 and 31) over two sets of leads m1 and m2 which include respective sets of four normally-conductive transistors Tr350–Tr353 and Tr354–Tr357 that are selectively cut-off, in accordance with the positive markings on the sets of leads 3G' and 4G' to extend these markings as negative signals towards the local controllers. From the markings on the PG and PQ lead and on the leads 1G' and 2G', the line connector group to which the calling line is connected in the exchange section to which the route selector RS belongs has to be determined: this is achieved as follows.

It will be remembered that the first (thousands) and second (hundreds) digit markings on the groups of leads 1G' and 2G' together identify the particular one of the 100 line groups in which the calling line is located. As regards the several exchange sections, the P-lines in this line group are connected in common to the same line connector group. However, in the case of three of the exchange sections, the Q-lines in this line group are connected to another line connector group, different for each exchange section, according to the staggered or slipped multiple for the Q-lines. The Q-lines in the remaining exchange section are connected to the same line connector group to which the P-lines are connected. To identify the line connector group to which the particular calling line is connected in respect of each exchange section, it therefore becomes necessary not only to identify the line group but also whether the calling line is a P-line or a Q-line. To this end each route selector such as route selector RS includes a line connector group identifying element LCG which comprises a hundred double-gating circuits Gs1–Gs100, of which only gates Gs21 and Gs61 (assuming the route selector RS pertains to the third exchange section) have been shown. The gates Gs21 and Gs61 comprise respective transistors Tr358 and Tr359 pertaining to P-lines and respective normally-conductive transistors Tr360 and Tr361 pertaining to Q-lines. The emitters of the P-transistors Tr358 and Tr359 in common with corresponding transistors for all the other Gs gating circuits are connected to the lead PG while the emitters of the Q-transistors Tr360 and Tr361 in common with corresponding transistors for all the other Gs gating circuits are connected to the lead QG.

The gates Gs1–Gs100 have their collectors connected to respective output leads in the group sg1–sg100.

Considering by way of example the identification of the relevant line connector group(s) in the case of a calling line in line group 21. If the calling line is a P-line then it will be connected to line connector group 21 and this is signified by strappings between lead 2 in the set 1G' and lead 1 in the set 2G' via respective rectifiers R*f*10 and R*f*11 to the base of transistor T*r*358 in gate G*s*21. Thus when these two leads are marked with a negative signal the rectifiers R*f*10 and R*f*11 are backed off so that the transistor T*r*358 has its base primed by a negative potential through resistors R*s*12 and R*s*13. With this condition obtaining a positive signal on lead PG from the P/Q discriminator circuit PQG will render transistor T*r*358 conducting so producing a positive signal on lead *sg*21. If on the other hand the calling line is a Q-line, then in view of the slipping of the Q-multiple as mentioned previously the calling line will be connected to line connector group G61 instead of G21. To signify this the leads 2 and 1 in the lead groups 1G' and 2G' respectively are also strapped to gate G*s*61, in consequence of which a positive signal on lead QG in this instance will render transistor T*r*361 conducting to produce a positive signal on lead *sg*61. It will be appreciated that in the first exchange section, leads 2 and 1 will be connected to the Q-transistor such as T*r*360 in gate G*s*21 since both P- and Q-lines of a line group are served by the same line connector group in this exchange section, while in the second section these leads will be connected to the Q-transistor such as T*r*361 in gate G*s*41 and in the first section to the Q-transistor such as T*r*361 in gate G*s*81.

The leads *sg*1–*sg*100 pertaining respectively to the 100 line connector groups extend via respective rectifiers such as rectifiers R*f*12 and R*f*13 into a unit identifying element UG including a plurality of transistors T*r*362–T*r*367 from the collectors of which extend a group of leads *tg*, including one lead for each switching unit of the exchange section. In the element UG each *sg* lead is strapped to the base of the transistor which is connected to the *tg* lead relating to the unit containing the line connector group to which the *sg* lead pertains. Thus a positive marking on one of the *sg* leads will cut-off the relevant one of the transistors T*r*362–T*r*367 so that a negative signal will be extended over the *tg* lead connected to the collector of that transistor to identify the unit to which the calling line is connected.

The markings representing the four digits identifying a called line are received from the line location identifier LI on the sets of leads 1D'–4D' together with a marking on lead PD or QD identifying the called line as a P-line or Q-line. The markings on the sets of leads 3D' and 4D' are fed over lead groups *n*1, *n*2 towards the local controller LOC. In a line connector group identifying element LCD functioning similarly to the element LCG, the markings on the sets of leads 1D' and 2D' and on one or other of leads PD and QD are combined to mark, in a group of leads *sd*1–*sd*100, a particular lead corresponding to the line connector group to which the called line is connected in the section concerned. The leads *sd* are cross-connected in a unit identifying element UD, functioning similarly to the element UG, to a group of leads *td* so that a marking on an *sd* lead will be extended to a *td* lead as a negative signal to identify the unit to which the calling line is connected, there being one *td* lead for each unit.

The two switching units involved in the call are now known from the markings on the *tg* and *td* leads, and these markings are now fed into a link group identifying element LGI to identify, inter alia, the particular link group which can link these units. In this element LGI there is provided in respect of each unit a transistor double-gating element GU1 . . . GU*n* comprising, as for GU1, two transistors T*r*368 and T*r*369 feeding in common a further transistor T*r*370. The leads *tg* and *td* are cross-connected to the bases of the transistors such as T*r*368 and T*r*369 correspondingly with the particular link interconnecting these respective line connector groups, the cross-connection to the transistor such as T*r*368 being in respect of one direction of transmission required through the link and the cross-connection to the transistor such as T*r*369 being in respect of the opposite direction of transmission. The collectors of the transistors such as T*r*368 are connected to respective leads *u*1 . . . *un* which are cross-connected via transistor pairs such as T*r*371 and T*r*372 to particular leads in a group of leads *v* which extends towards the local and trunk controllers to identify according to the markings extended to them from the marked leads *u*1 . . . *un* the location on the pertinent trunk or local coupler (for example the bridge coupler CSL in FIG. 18) of the link group to which the marked lead relates. Each of the leads *u*1 . . . *un* is also cross-connected to a group of gating transistors T*r*373–T*r*375 (corresponding to the G*l* gates in FIG. 8), the collectors of which are connected over particular leads in a group of leads *y* towards the local controllers.

Each *u* lead also goes as a priming lead to the base of a transistor, such as transistor T*r*376 for lead *u*1 which has its collector connected to the emitters of a plurality (e.g. 5) of gating transistors T*r*377–T*r*381 (corresponding to the gates G*w* in FIG. 8). The bases of these gating transistors are fed over a group of leads *w*1 . . . *wn* with markings indicating the busy or free condition of all links in the group to which the particular *u* lead relates. Each lead in these groups of leads *w*1 . . . *wn* represents the busy/free lead such as lead *w* in the transmission bridge circuit of FIG. 13, and is normally held at a positive potential when the appertaining bridge is free, and is held at a negative potential when the bridge is busy. Thus when a negative marking signal appears on lead *u*1 consequent on transistor T*r*370 being cut-off, transistor T*r*376 is rendered conducting, causing those of the transistors such as T*r*377–T*r*381 pertaining to busy transmission bridges to be rendered conducting while those pertaining to free transmission bridges remain cut-off to extend via rectifiers such as R*f*14–R*f*18 and over leads *b*/*f*1–*b*/*f*N a combinatinon of positive and negative signals to the traffic comparator and summator TS shown in FIGS. 45 and 46. This combination of positive and negative signals is representative of the traffic in the link group and from these signals and from combinations of positive and negative signals representative of the traffic in the relevant link group in each of the other exchange sections the traffic comparator and summator functions, in a manner to be described later, to decide which exchange section is allocated to handle the call.

Reverting to the groups of leads *sg*1–*sg*100 and *sd*1–*sd*100, the leads of the former group extend into an encoder EG wherein they are connected via respective rectifiers such as R*f*19 and R*f*20 to the bases of transistors such as T*r*382 and T*r*383 having their collectors cross-connected through respective rectifier groups R*fg*1–R*fg*100 to the bases of binary encoding transistors T*r*384–T*r*390 cascade-connected with respective polarity reversing transistors T*r*391–T*r*397 which have their collectors connected over a group of leads *sg'* towards the local controllers.

Decimal one-out-of-a-hundred positive markings on the *sg* leads are therefore converted to 7-digit negative binary markings on the *sg'* leads to give the identity of the line connector group serving the calling line. Correspondingly, the group of leads *sd*1–*sd*100 are cross-connected by an encoder ED to a group of leads *sd'* to give a 7-digit negative binary marking in respect of the location of the line connector group serving the called line.

Each lead in the group *sg*1–*sg*100 is also connected in common to the pulse input of a group of five pulse-plus-bias gates GL*g*1–GL*g*100 (corresponding to the gates GL*g* in FIG. 8) and each lead in the group *sd*1–*sd*100 is likewise connected to the pulse input of a group of five pulse-plus-bias gates GL*d*1–GL*d*100 (corresponding to the GL*d* gates in FIG. 8).

Figure 45A:
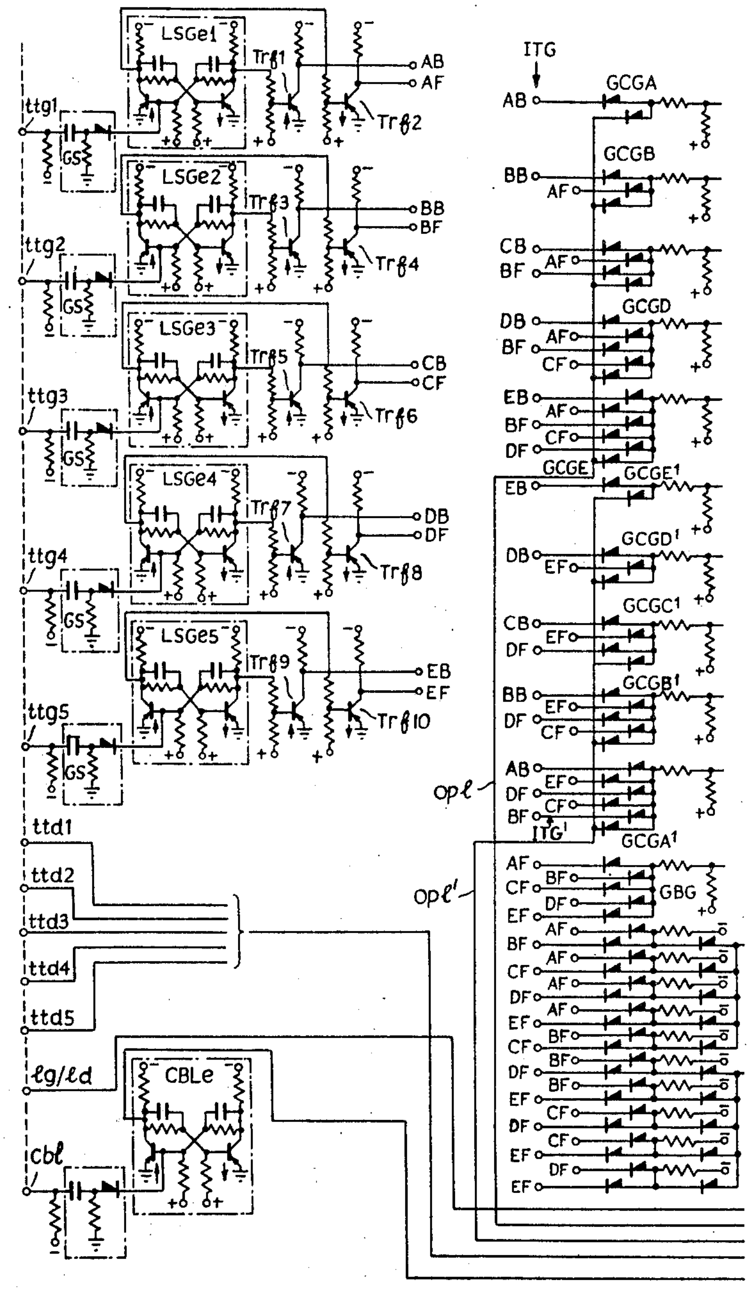
Figure 45B:
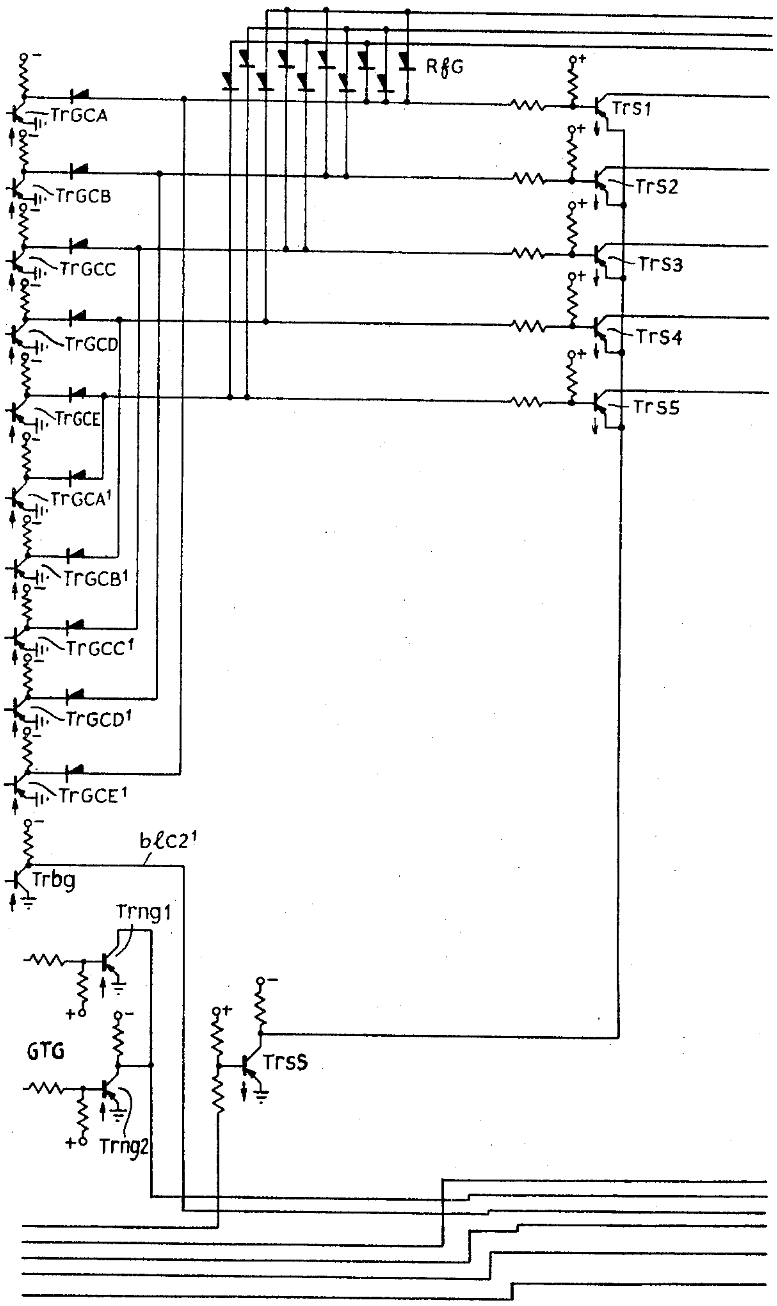
Figure 46A:
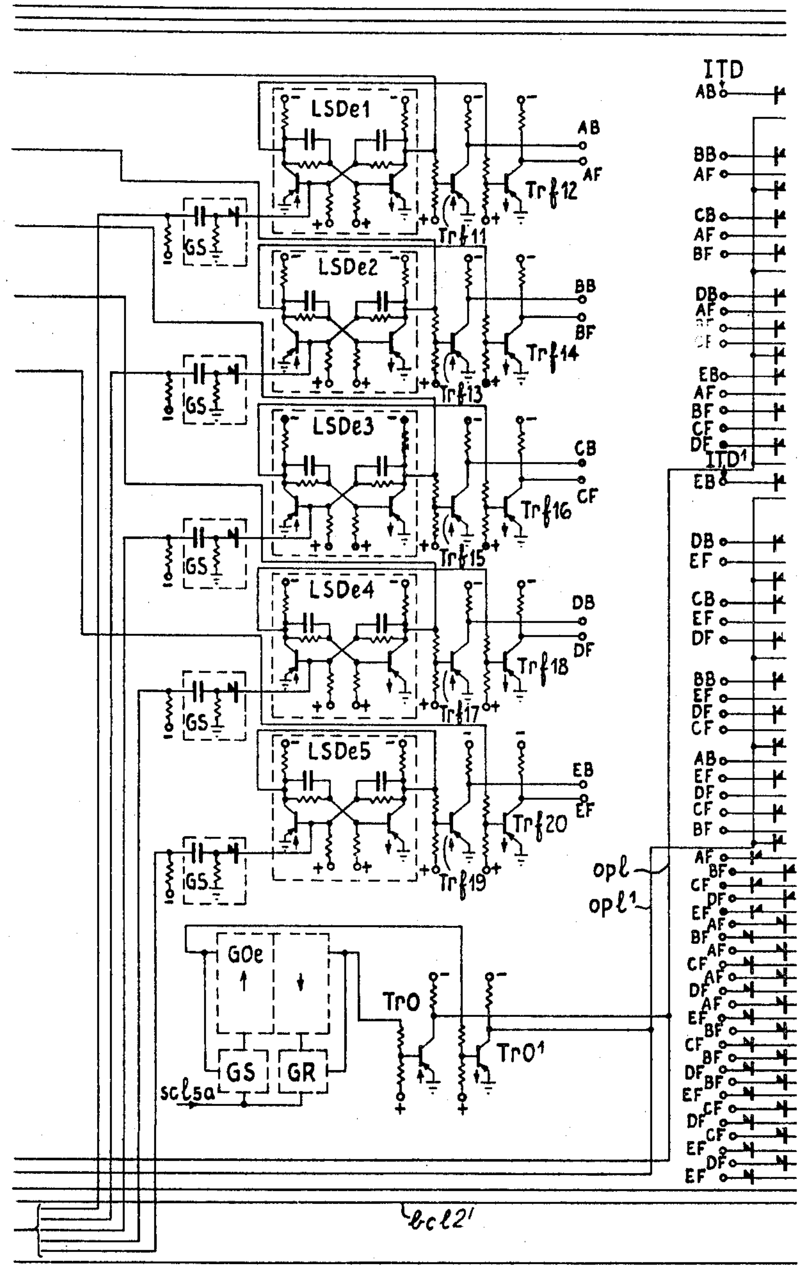
Figure 46B:
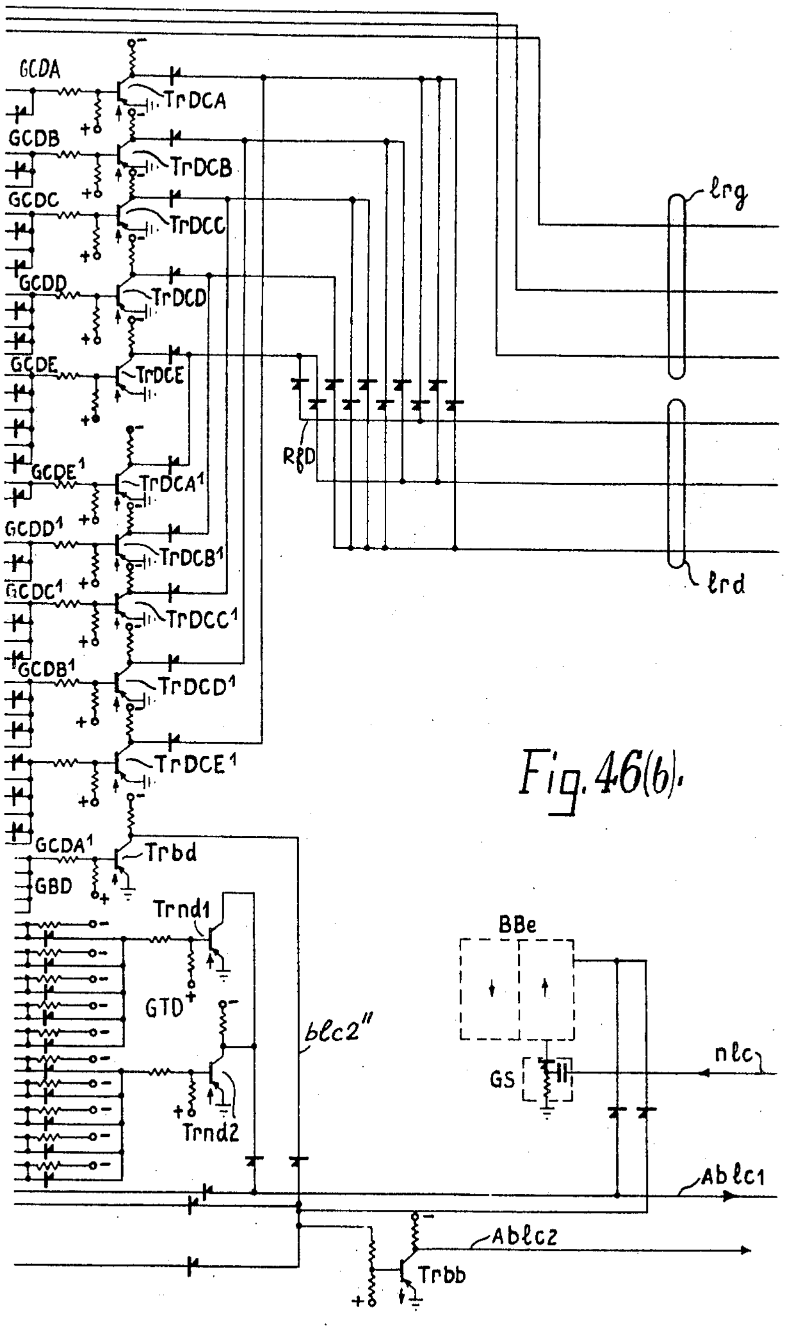

In each of these groups of gates there is one gate for each line connector or outgoing junction in the group to which the particular *sg* or *sd* lead relates and these gates are controlled over respective leads in the lead groups *l*1–*l*100 according to busy or free condition of the relevant line connector or outgoing junction, an *l* lead, as shown in the line connector circuit of FIG. 17, being unmarked if the line connector is free and being marked with a positive signal when the line connector is busy. When an *sg* or *sd* lead is marked by a positive signal the marking is passed through the gates pertaining to busy line connectors to a line connector choice element LCE which records these markings in order that when it operates to choose a free line connector in the group, these busy line connectors are excluded from the choice. A circuit for the element LCE is shown in FIGS. 45 and 46 which will be described later. From the element LCE binary markings identifying the chosen line connectors in respect of the calling and called lines are extended over lead groups *rd* and *rg* towards the local controllers, these markings being in the form of negative signals appearing at the collectors of normally-conducting transistors in the groups T*r*391–T*r*393 and T*r*394–T*r*396 which are cascade-connected with groups of transistors T*r*397–T*r*399 and T*r*400–T*r*402 connected to receive negative output signals from the element LCE.

Returning once more to the sequence control circuit SCC, it perhaps ought to be mentioned at this time that when the circuit CI*e* became set, in addition to extending a negative signal over lead *scl*1, another negative signal was also extended over lead *scl*5 to the section selector circuit SS (FIGS. 47 and 48) to reset certain bistable circuits therein, while a positive signal was extended over lead *scl*5*a* to the line connector choice element (FIGS. 45 and 46) to reset certain bistable elements therein. The effect of these signals in the respective circuits will be dealt with later when these circuits are being described. In the present state of the circuit SCC it will be remembered that the circuit CC*e* has been set to apply over lead *scl*3 a signal to the discriminator circuits PQG and PQD. The setting of the circuit CC*e* has also opened the setting gate GS for a bistable circuit DC*e* (DECIDE CHOICE OF EXCHANGE SECTION) and the next setting pulse on the lead *pl*6 therefore sets this circuit, producing on a sequence control lead *scl*6 a negative signal which is applied to the section selector SS (FIGS. 47 and 48) to allow, in the manner to be described later, the selection to be made of the exchange section which is to deal with the call. The next setting pulse on the lead *pl*6 sets a bistable circuit SC*e* (SELECT CONTROLLER) via its setting gate GS which has been opened by the circuit DC*e*, and this circuit SC*e* renders a transistor T*r*403 conducting to produce on a sequence control lead *scl*7 connected to its collector a positive (earth) signal which is applied to the section selector SS (FIGS. 47 and 48) to gate the choice of exchange section signal from the section selector SS into the relevant route selector (RS). In the route selector RS, this choice of exchange section signal, of negative polarity, is applied to the base of a transistor T*r*404 over a lead *crl* causing this transistor to conduct and so rendering conducting those of the transistors T*r*373–T*r*375 which are primed by a negative signal at their bases to extend over the relevant lead in group *y* a positive signal which is effective in conjunction with a controller selector CS (FIGS. 14 and 19) to select a free ring-and-tone element and thus a free controller. The action of the sequence control circuit SCC in respect of a local or changed-number call is now complete, and with the circuit SC*e* set the setting gate GS2 for the circuit R*e* (RELEASE) is open so that the next pulse on lead *pl*6 sets the circuit R*e* to bring about the release operation of the circuit SCC as already described.

Before considering the operation of the local controller LOC, it may here be reiterated that in respect of the calling line the markings applied to the lead group *sg'* identify the line connector group; those markings applied to the lead group *rg* identify the line connector of this group; and the markings applied to the lead groups *m*1 and *m*2 identify the line connector outlet to which the calling line circuit (LIG) is connected. As regards the called line, identification markings as just described in respect of the calling line are applied to corresponding lead groups *sd'*, *rd*, *n*1 and *n*2. In addition, a marking identifying the link group through which a connection is to be established between the calling and called lines is applied over the lead group *v*. These markings are extended in common to a number of controllers in the appropriate exchange section so that a selection of one of these controllers, which is achieved by the controller selector CS in a manner hereinafter to be described by the selection of a free ring-and-tone circuit associated with it, must be made in readiness for setting up the connection between the calling and called lines. In addition, the marking applied to the lead group *y* is similarly extended in common to these controllers wherein the leads of the lead group *y* are connected respectively to the pulse inputs of setting gates associated with bistable controller start circuits. In the controller LOC these setting gates which are indicated at C*x*1, C*x*2 and C*xn* and have their bias inputs connected to the controller selector CS over respective leads *ra*, *rb* and *rn* are associated with the bistable circuits CBA*e*, CBB*e* and CBN*e*.

Figure 18A:
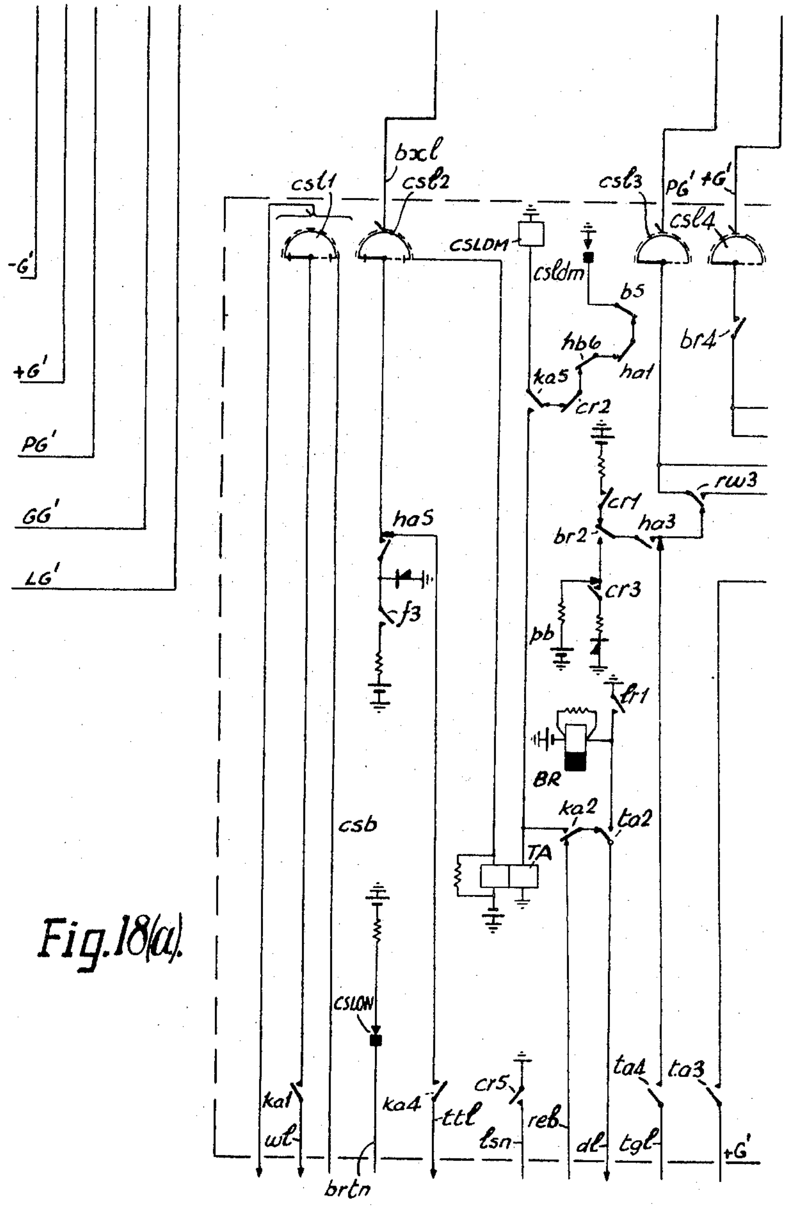
Figure 18B:
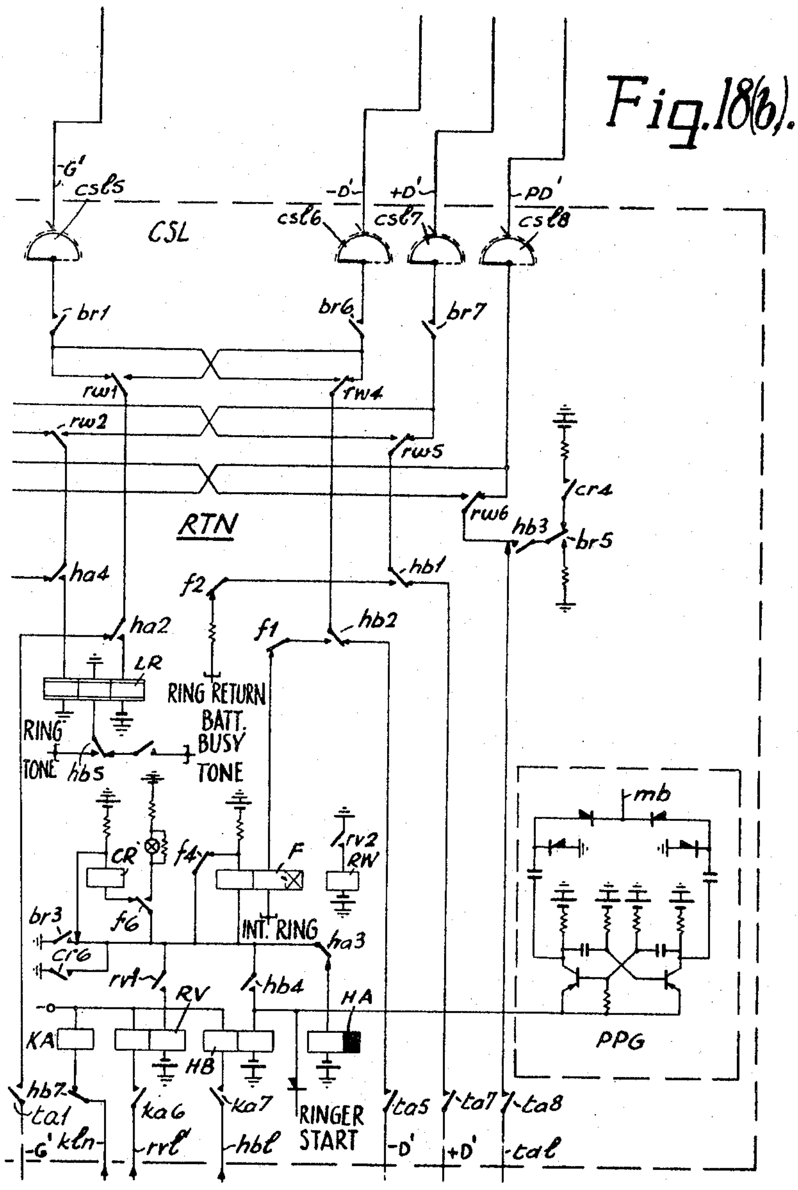

The busy or free condition of the ring-and-tone circuits (one of which is shown in FIG. 18) associated with each of the controllers is extended to the controller selector CS over respective leads *bla*, *blb* and *bln* from the collectors of the left-hand transistors in respective busy circuits RTA*e*, RTB*e* and RTN*e*.

The controller selector CS makes a one-only selection from free ring-and-tone circuits by the application of a positive signal over the relevant one of the leads *ra* . . . *rn* to the bias input of the seting gate G*x* of the relevant one of the circuits CBA*e* . . . CBN*e*. Assuming that the circuit CBN*e* is set by the positive signal on one of the leads *y* the potential at the collector of its right-hand transistor is applied through a rectifier R*f*2 to cut-off a transistor T*r*405. This in turn renders a transistor T*r*406 conducting and the positive potential at its collector cuts-off a transistor T*r*407. In so doing an earth clamp applied through a rectifier R*f*22 to a multivibrator circuit RTM is accordingly removed so that the latter becomes free-running. The first positive pulse from the circuit RTM on a pulse lead *plm* is applied in common to the setting and resetting gates GS and GR respectively of circuits RTA*e*, RTB*e* and RTN*e* which set at this time (these gates having been opened by the positive signal applied to their bias inputs over rectiffier R*f*21 in the case of element RTN*e* and rectifiers R*f*23 and R*f*24 respectively in the case of elements RTA*e* and RTB*e*) so as to extend negative busying signals to the controller selector CS over the leads *bla*, *blb* . . . *bln*.

The positive potential on the collector of the right-hand transistor of circuit CBN*e* is applied to the base of a normally-conductive transistor T*r*408 which constitutes in conjunction with a further transistor T*r*409 a transistor gating element. The transistor T*r*408 is cut-off and with the transistor T*r*409 normally cut-off a negative signal is applied to the base of a transistor T*r*410 which conducts to operate a relay KA in the selected ring-and-tone circuit over a lead *kln* to cause the relevant ring-and-tone coupler CSL to search for a link group which will be identified to the controller in a manner to be described later.

The collectors of the right-hand transistors of the circuits CBA*e*, CBB*e* and CBN*e* are connected respectively to the pulse inputs of permanently open gates G*a*, G*b* and G*n*. Since it has been assumed that the circuit CBN*e* is set the positive potential on its collector is extended through the gate G*n* to the base of a normally-conductive transistor T*r*411. This transistor cuts-off so as to render transistor T*r*412 conducting which in turn cuts-off normally-conducting transistor T*r*413. The collector of this latter transistor is connected in common to the bases of three transistors T*r*414–T*r*416 which conduct so as to apply positive pulses to a group of pulse leads *ple* in response to the corresponding pulse derived from the gate G*n*.

Considering this group of pulse leads *ple* one of the leads is connected in common and through individual rectifiers (unreferenced) to the emitters of a group of transistors T*r*417–T*r*423 pertaining to respective circuits CG*e*1–CG*e*7 of a seven-element binary store LCGI for recording in accordance with binary markings on the lead group *sg'* the identification of the line connector group serving the calling line: to the emitters of a group of transistors T*r*424–T*r*426 pertaining to respective circuits LG*e*1–LG*e*3 of a three-element binary store LCG for recording in accordance with binary markings on lead group *rg* the identity of the line connector in the group identified in the store LCGI: to the emitters of a group of transistors T*r*427–T*r*430 pertaining to respective circuits LGU*e*1–LGU*e*4 of a four-element binary store LGU for recording in accordance with markings on the lead group *m*2 the units digit value of the calling line: and to the emitters of a group of transistors T*r*431–T*r*434 pertaining to respective circuits LGT*e*1–LGT*e*4 of a four-element binary store LGT for recording in accordance with markings on the lead group *m*1 the tens digit value of the calling line. A further lead of the pulse lead group *ple* is correspondingly connected in common and again through individual rectifiers (unreferenced): to the emitters of a group of transistors T*r*435–T*r*441 pertaining to the respective circuits CD*e*1–CD*e*7 of a seven-element binary store LCDI: to the emitters of a group of transistors T*r*442–T*r*444 pertaining to the respective circuits LD*e*1–LD*e*3 of a three-element binary store LCD: to the emitters of a group of transistors T*r*445–T*r*448 pertaining to the respective circuits LDU*e*1–LDU*e*4 of a four-element binary store LDU: and to the emitters of a group of transistors T*r*449–T*r*452 pertaining to respective circuits LDT*e*1–LDT*e*4 of a four element binary store LDT. These stores LCDI, LCD, LDU and LDT correspond in respect of the called line to the stores LCGI, LCG, LGU and LGT, respectively.

The remaining pulse lead of the pulse lead group *ple* is connected in common and through individual rectifiers (unreferenced) to the emitters of a group of transistors T*r*453–T*r*456 pertaining to respective circuits LIG*e*1–LIG*e*4 of a link group identifying store LIG serving to record the link group identifying signal on a particular one of the leads of lead group *v*.

As already mentioned, negative signal markings are extended to the controller LOC over the lead groups *sg'*, *rg*, *m*1 and *m*2 in respect of a calling line, and over the lead groups *sd'*, *rd*, *n*1 and *n*2 in respect of called lines, and over lead group *v* in respect of link group identification. These markings serve to prime one or more transistors in the aforesaid groups pertaining to the respective stores. Hence, the positive pulses on the pulse leads *ple* will render the primed transistors conducting so as to permit the information received from the route selector RS to be stored by the setting of the relevant circuits in the stores LCGI, LCG, LGU and LGT (calling line) and stores LCDI, LCD, LCU and LDT (called line) and store LIG (link group identification).

The positive pulse from the element CBN*e* is also applied through a rectifier R*f*25 to the base of a normally-conducting transistor T*r*457. Consequently this transistor is cut-off so removing the clamping earth normally applied through a rectifier R*f*26 to the base of the left-hand transistor of a sequence pulse multivibrator SPM which therefore becomes free running. The pulses from this sequence pulse multivibrator SPM are applied over a pulse lead *pl*10 to the pulse inputs of setting and resetting gates GS and GR, respectively, of a sequence switching start bistable circuit SS*e* and also to the pulse inputs of setting gates GS1, GS2 and GSN, and resetting gates GR1, GR2 and GRN associated with a start bistable circuit SST*e*. The pulses applied to the pulse inputs of these gates over pulse lead *pl*10 are ineffectual in setting the circuits SS*e* and SST*e* until such time as a free transmission bridge in the requisite group has been seized and an earth start signal applied over the relavant lead in a lead group *ls*1 . . . *lsn* to one of the setting gates GS1–GSN appropriate to the ring-and-tone circuit taken into use.

It will be remembered that when the circuit CBN*e* was set the positive signal applied to the lead *kln* brought about the operation of relay KA in the relevant ring-and-tone circuit (assumed to be the ring-and-tone circuit shown in FIG. 18). The setting of one of the circuits LIG*e*1–LIG*e*4 in the link group identifying store LIG applies a negative marking over a link group marking lead, such as *ll*, to mark the outlets corresponding to the requisite link group in arc *csl*1 of the coupler CSL in the selected ring-and-tone circuit.

Considering now the ring-and-tone circuit in conjunction with the local controller LOC, relay KA in operating closes contacts *ka*1 to connect the wiper of arc *csl*1 over lead *wl* to the base of a normally non-conducting transistor T*r*458 which is cascade-connected to two further transistors T*r*459 and T*r*460 of which the latter has a double winding testing relay TT connected in its collector circuit, the two windings of this relay TT being normally connected in series in a circuit extendng into the ring-and-tone circuit over lead *ttl*. With relay KA operated the lead *ttl* is extended over operated contact *ka*4 to the wiper of a transmission bridge testing arc *csl*2 of the coupler CSL. Also with relay KA operated a driving circuit for the coupler motor CSLDM is completed through contacts *ka*5 and *ka*2 and over lead *dl* to an earthed contact *tt*1 of relay TT in the controller. Coupler CSL then drives in search of the first free transmission bridge in the marked group as signified by coincidence markings (negative) on the leads *wl* and *ttl* applied through arcs *csl*1 and *csl*2, respectively, the marking on lead *wl* being the link group marking from lead *ll* in the controller and the marking on lead *ttl* being the marking from the free transmission bridge (assumed to be FIG. 13) appearing on a busy/free lead *bxl*. These negative signals on the leads *wl* and *ttl* extend into the controller LOC wherein the marking on lead *wl* renders transistor T*r*458 conducting so cutting off transistor T*r*459. The resultant negative potential on the base of transistor T*r*460 renders this transitor conducting due to the negative signal on the lead *ttl*. In consequence testing relay TT operates and contact *tt*1 interrupts the driving circuit of the coupler CSL. With relay TT operated a relay TA (right-hand winding) is operated in series with the drive magnet CSLDM. Relay TT is held operated over its left-hand winding by the earth applied from operated contact *tt*1. A relay KXB in the seized transmission bridge circuit operates in series with the left-hand winding of testing relay TT in the local controller LOC and by the operation of contacts *kxb*5 brings about the release of testing relay TT but relay KXB remains operated. Contact *kxb*6 in opening substitutes negative for a positive signal on the transmission bridge busy lead *w*.

Upon the release of relay TT in the local controller, an operating circuit is completed from contact *tt*1 over the lead *dl* and contact *ta*2 for a relay BR. Contacts *br*1 and *br*4 extend negative (−G) and positive (+G) wires in respect of the calling line from arcs *csl*5 and *csl*4 of the coupler CSL to the local controller LOC. Similarly, contacts *br*6 and *br*7 extend the negative (−D) and positive (+D) wires in respect of the called line from arcs *csl*6 and *csl*7 to the local controller LOC. An operating circuit for a relay CR is completed by the earth applied over contacts *br*3, and relay CR in operating applies via contact *cr*5 an earth signal to the lead *lsn*.

At this point it is convenient to return to the local controller wherein the earth signal applied to the lead *lsn* opens the setting gate GSN for the circuit SST*e* (FIG. 16). Thus the latter circuit will be set by the next positive pulse on lead *pl*10 from the free-running multivibrator SPM. Circuit SST*e* in setting opens the setting gate GS for the circuit SS*e*. Thus the next pulse on the lead *pl*10 sets the circuit SS*e*. In consequence, circuit SS*e* opens the setting gate GS of calling and called control circuits GC*e* and DC*e*, respectively. On setting to the next pulse on lead *pl*10 the circuits GC*e* and DC*e* apply positive signals to pulse leads *pl*11 and *pl*12, respectively, the signal on the lead *pl*11 being applied to the pulse input of setting gate GS of a search control circuit (calling GSCE*e* (FIG. 23) and also to the bias input of a gate GGS1. The positive signal applied to the pulse lead *pl*12 is correspondingly applied to the pulse input of a gate GS of a search control circuit (called) DSCE*e* (FIG. 24) and also to the bias input of a gate DGS1.

The circuit GSCE*e* upon setting cuts-off a transistor T*r*461 which in turn renders a transistor T*r*462 conducting to bring about the operation of a relay TG in the collector circuit of the latter transistor. Similarly. the circuit DSCE*e* in setting renders transistor T*r*463 non-conducting which in turn causes transistor T*r*464 to conduct for bringing about the operation of a relay TD in its collector circuit. These relays TG and TD in operating extend earth to the ring-and-tone circuit (FIG. 18) at contacts *tg*1 and *td*1 and over leads *tgl* and *tdl*. These earths are extended via the arcs *csl*3 and *csl*8 to the transmission bridge circuit (FIG. 13) and thence into the calling (G/C–G) and called (G/C–D) group connector circuits (FIGS. 12 and 17) associated with the bridge over lead PG′ and PD′, respectively. In consequence, drive circuits for the driving motors GCDM of the calling and called group connectors are completed over normally-closed off-normal contacts *ong*1. The latch magnets pertaining to motors GCDM are energized so as to complete over contacts *glm*1 an alternative driving circuit for the respective group connectors preparatory to the opening of off-normal contacts *ong*′ when the group connectors are driven from their normal positions. Also with the latch magnets energized contacts *glm*2 and *glm*3 in respect of the calling group connector G/C–G serve to connect a pair of coils *gcl* to the leads —G′ and +G′ which are connected through the transmission bridge to the transmission bridge outlets in arcs *csl*4 and *csl*5. The latch magnet contacts *glm*2 and *glm*3 in respect of the called group connector G/C–D connect a pair of coils *gcl* to the leads —D′ and +D′ which are connected through the transmission bridge to the bridge outlets in arcs *csl*6 and *csl*7 of coupler CSL. The coil pairs *gcl* are inductively coupled to the motor windings of the respective group connector drive motors GCDM (i.e. calling and called) whereby pulses will be derived from the coil pairs in response to the alternate energization of the motor windings of each group connector by the appertaining interrupter contacts, these individual pulses being fed to the local controller on the leads +G′ and —G′ in respect of the calling line and +D′ and —D′ in respect of the called line. Pulses on the leads +G′ and —G′ are applied through the input windings of a transformer element TXG. This transformer element produces negative output pulses on the lead *pl*13 in response to pulses fed to the input of the transformer element. These negative output pulses are applied to the base of a transistor T*r*465 which conducts upon receipt of each pulse. Output pulses from the transformer are also fed through a capacitor *cs*5 to the base of a transistor T*r*466.

As regards the pulses on the leads +D′ and —D′, these are likewise fed through the input windings of a transformer element TXD. The negative output pulses from this element are applied to the base of a transistor T*r*467 over pulse lead *pl*14 and also to the base of a transistor T*r*468 through a capacitor *cs*6.

Figure 25A:
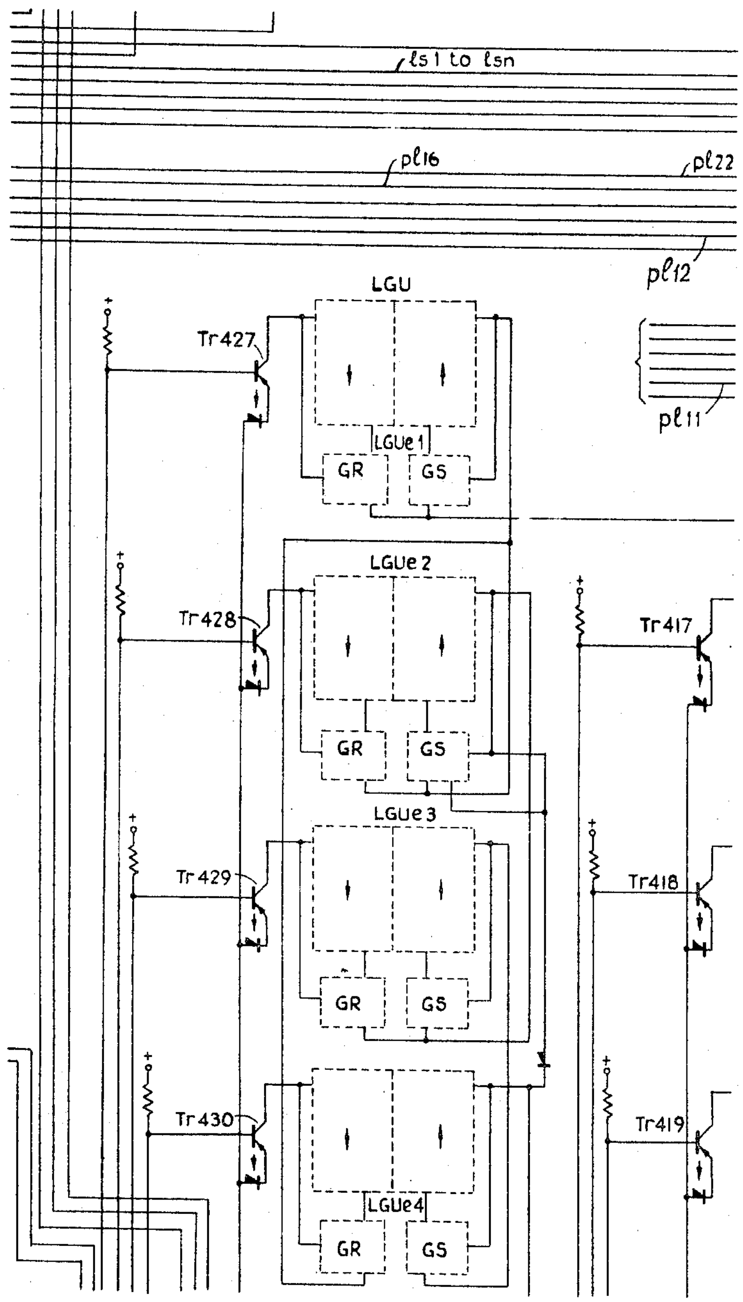
Figure 25B:
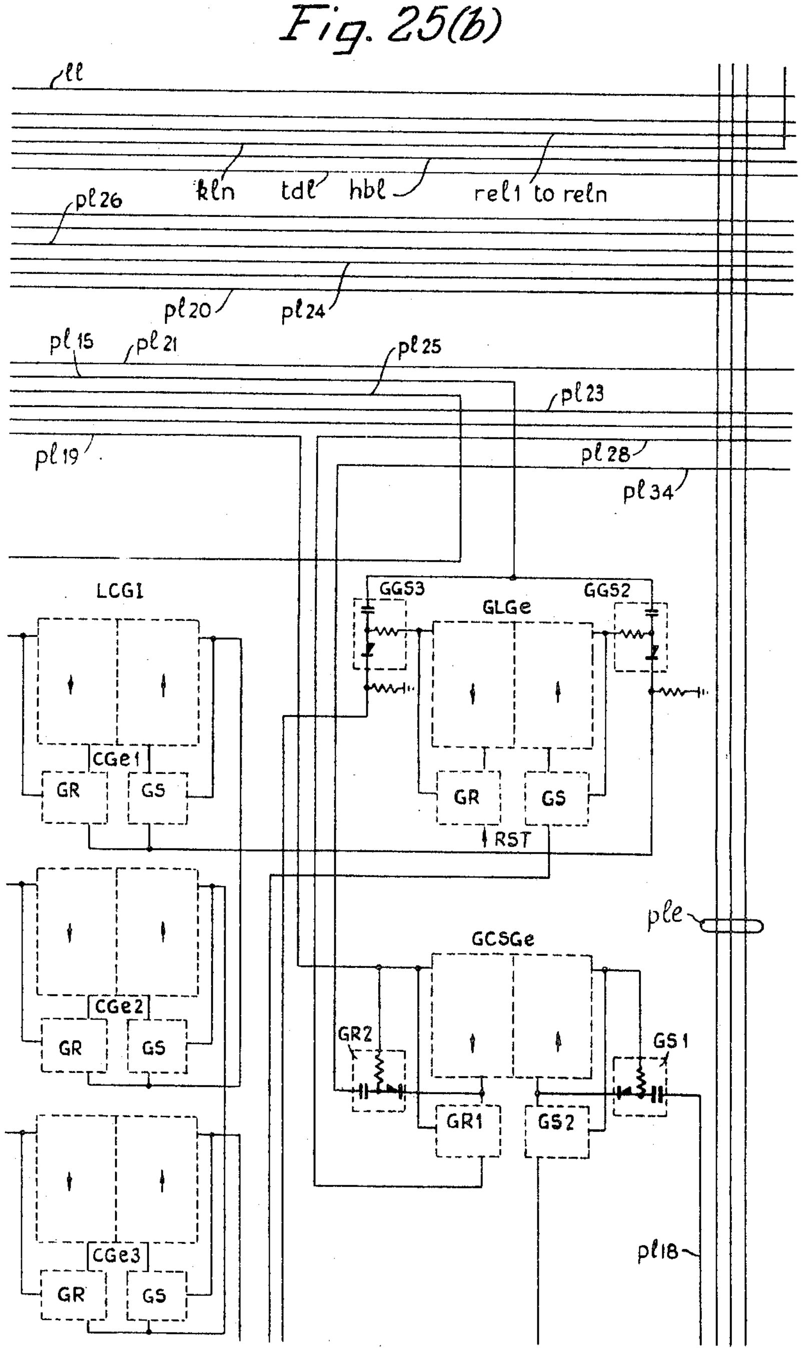

Consequently, each time a pulse is applied to the pulse lead *pl*13 the transistor T*r*465 conducts and applies a positive pulse to the pulse input of a normally open setting gate GS for a monostable circuit GM*e*. This circuit sets to each received pulse and applies a positive pulse to gate GGS1 which being opened by the positive signal on lead *pl*11 allows the pulse to pass on to a pulse lead *pl*15 to gates GGS2 and GGS3 (FIG. 25). In the reset state of a bistable circuit GLG*e*, the gate GGS2 is open while the gate GGS3 is closed and therefore the former gate passes the pulse on lead *pl*15 to the pulse inputs of setting and resetting gates GS and GR of the first bistable circuit CG*e*1 in the line connector group store LCGI.

Figure 26A:
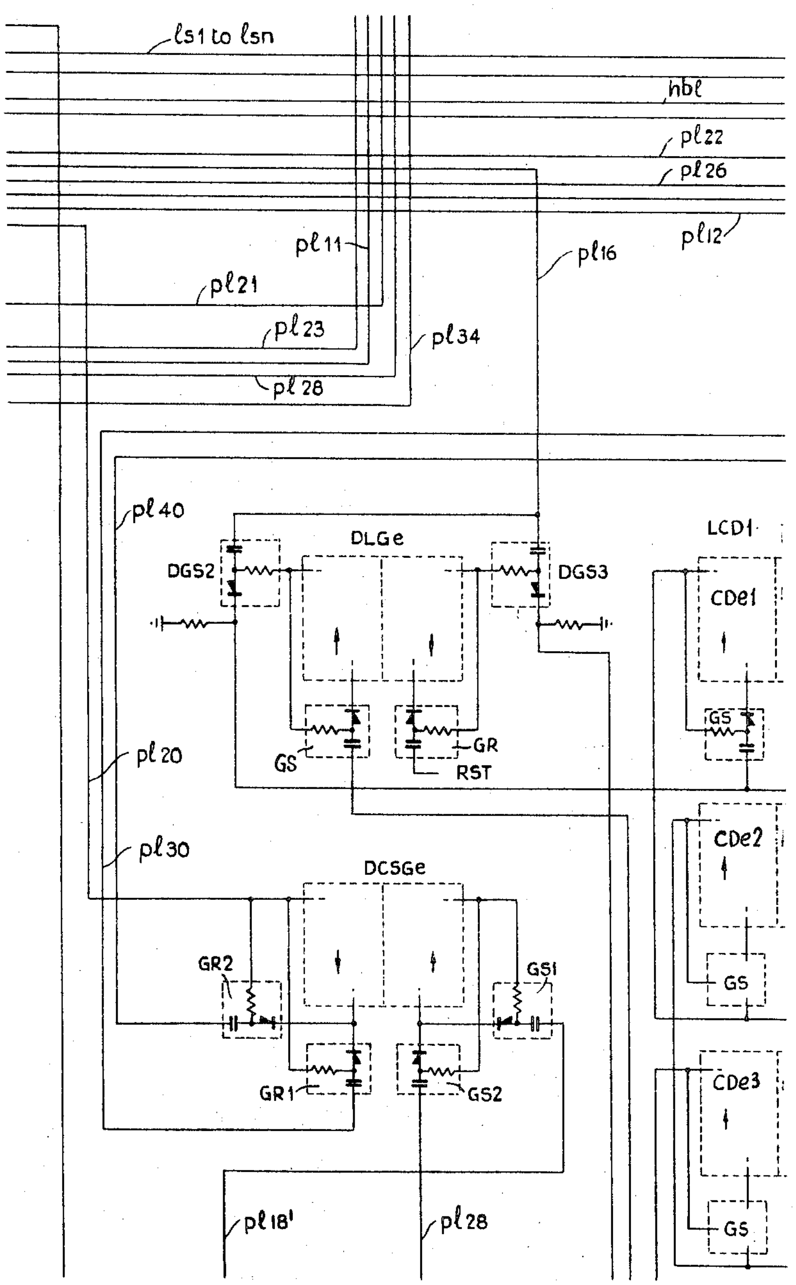
Figure 26B:
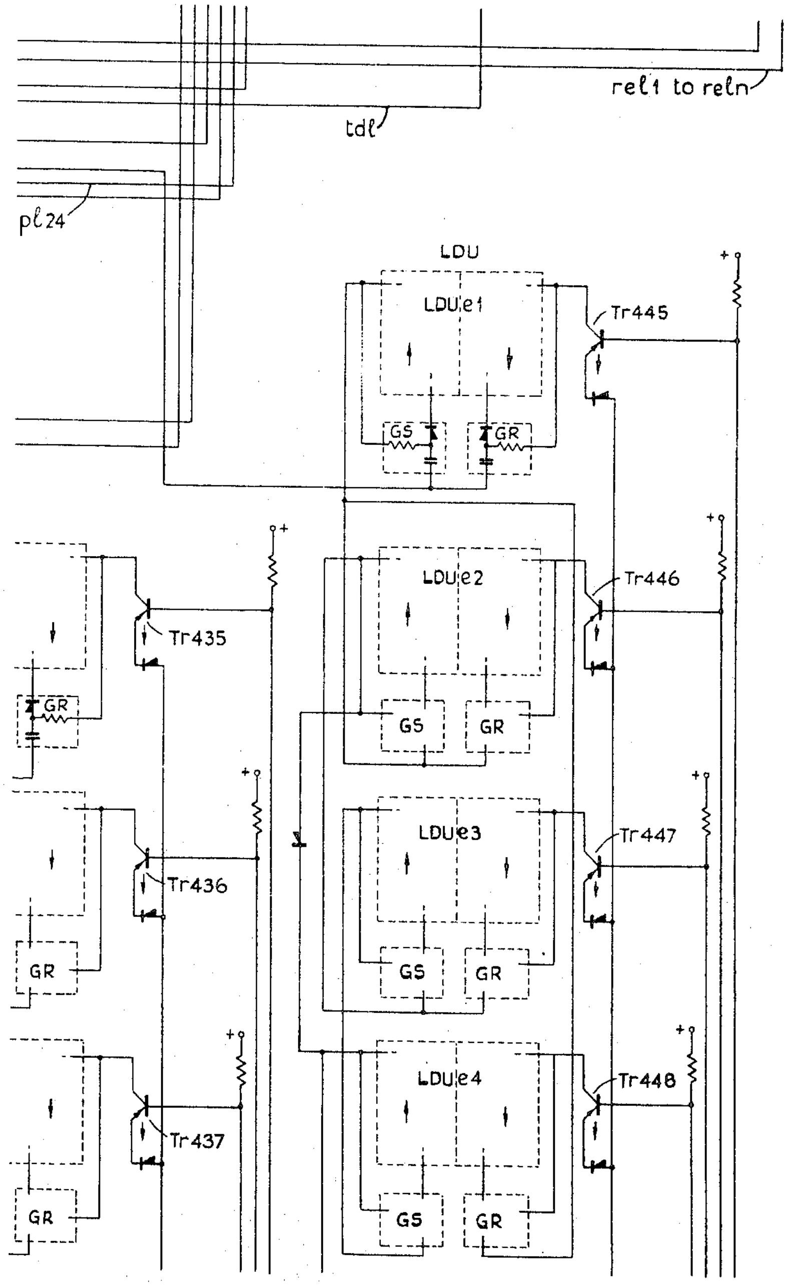

Similarly, each time a pulse is applied to the pulse lead *pl*14 the transistor T*r*467 conducts and applies a positive pulse to the pulse input of a normally-open setting gate GS of a monostable circuit DN*e*. This circuit sets to each received pulse and so applies a positive pulse to gate DGS1 which being opened by the positive signal on lead *pl*12 allows the pulse to pass on to a pulse lead *pl*16 and thence to gates DGS2 and DGS3 (FIG. 26). In the reset state of a circuit DLG*e* the gate DGS2 is open whereas the gate DGS3 is closed and consequently the former gate passes the pulse on pulse lead *pl*16 to the pulse inputs of setting and resetting gates GS and GR of the first circuit CD*e*1 in the line connector group store LCDI.

As previously described, the bistable circuits in the stores LCGI and LCDI are set to patterns in accordance with the line connector groups serving the calling and called lines, respectively. These stores will be counted out in response to pulses received over pulse leads *pl*15 and *pl*16. Upon the store LCGI being counted out and thus signifying that the group connector has reached the first outlet of the required line connector group a positive pulse produced on a pulse lead *pl*17 as a consequence of the resetting of circuit CG*e*7 is applied to the setting gate GS of the circuit GLG*e* which sets to close the gate GGS2 thereby preventing further pulses on lead *pl*15 from being passed to the store LCGI and opens the gate GGS3.

With the gate GGS3 open subsequent pulses on the lead *pl*15 are applied to the setting and resetting gates GS and GR of the circuit LG*e*1 of the line connector store LCG. The circuits of this store are set to a pattern signifying the particular line connector required in the line connector group which has now been reached by the group connector (calling) G/C–G. When the group connector reaches the outlet connected to the required line connector consequent upon the counting out of the store LCG responsive to the revertive impulses, the circuit LG*e*3 is reset to apply a positive signal over lead *pl*18 to a setting gate GS1 of a group connector stop calling circuit GCSG*e*. When this circuit sets it applies a positive signal over lead *pl*19 to the bias input of resetting gate GR of circuit GSCE*e* (FIG. 23) so that the next pulse reverted from the searching group connector and rendering transistor T*r*466 conducting results in circuit GSCE*e* being reset in which condition the relay TG is released to interrupt at contacts *tg*1 the drive circuit for the group connector to arrest the latter on the requisite line connector L/C–G (FIG. 7) serving the calling line LIG.

The group connector serving the called line is contemporaneously set to the required line connector L/C–D (FIG. 12) in response to the counting out of the store LCDI by pulses on lead *pl*16 applied to it through gate DGS2 followed by the counting out of store LCD by subsequent pulses on the lead *pl*16 extended to the latter store through gate DGS3. The circuit DLG*e* is set when store LCDI is counted out to effect the opening and closing, respectively, of gates DGS3 and DGS2, and a circuit DCSG*e* is set upon store LCD being counted out by a pulse applied from the left-hand transistor of circuit LDe3 over pulse lead pl18 to a setting gate GS1 for the circuit DCSGe. A positive signal is then applied over lead pl20 to the resetting gate GR of the circuit DSCEe (FIG. 24) which resets to bring about the release of relay TD. In releasing, relay TD causes the group connector G/C–D to stop on the outlet connected to the required line connector L/C–D appertaining to the called line LID (FIG. 12).

When circuit GSCEe resets a positive signal is applied over a lead pl21 to the pulse input of resetting gate GR of circuit GCe (FIG. 16) which is accordingly reset. The positive pulse is also applied to the pulse input of setting gate GS (opened from the circuit GCE) of a stop bistable circuit CGSe which sets.

Similarly, as a consequence of the resetting of circuit DSCEe a positive signal is applied over a lead pl22 to the pulse input of resetting gate GR of circuit DCe which is accordingly reset. In addition, this positive pulse is applied to the pulse input of setting gate GS (opened from the circuit DCe) of a stop bistable circuit CDSe to cause the latter to set.

By the setting of circuit CGSe the setting gate GS of a pause circuit CGPe is opened and this circuit will be set by the next pulse on lead pl10 from the multivibrator SPM. Likewise, by the setting of element CDSe the setting gate GS of a pause circuit CDPe will be opened and the circuit will thus be set by the same pulse as that setting pause circuit CGPe. With the pause circuits CGPe and CDPe set, positive signals are applied from these circuits to respective setting gates GS of line connector control circuits GLCe (calling) and DLCe (called). The next positive pulse on the lead pl10 sets the circuits GLCe and DLCe. In consequence, a positive signal is applied over a lead pl23 from circuit GLCe to the bias input of a gate GCS1 (FIG. 23) and a positive signal is also applied over lead pl24 from circuit DLCe to the bias input of a gate DCS1 (FIG. 24). The positive signal on lead pl23 is also applied to the pulse input of a setting gate GS1 for the circuit GSCEe which in setting brings about the re-operation of relay TG. Relay TG in operating closes its contact tg1 to complete over lead tgl, arc csl3 of the coupler CSL (FIG. 18), lead PG′ in the selected transmission bridge XBL, arc gcg3 and lead PG in the set group selector G/C–G, an energizing circuit for the drive motor LCDM of the line connector L/C–G.

In the same manner the positive signal applied to gate DCS1 is also applied to the pulse input of a setting gate GS1 for the circuit DSCEe which in setting re-operates relay TD. Relay TD in operating closes its contacts td1 to complete over lead tdl, arc csl8 of the coupler CSL (FIG. 18), lead PD′ in the selected transmission bridge XBL, arc gcd3 and lead PD in the set group selector G/C–D, an energizing circuit for the drive motor LCDM of the line connector L/C–D.

As regards the calling line connector L/C–G the energization of its latch magnet brings about the changeover of latch magnet contacts llm2 and llm3 so as to connect a pair of coils lcl corresponding to coils gcl of the group connector to the leads −G and +G and thence through the transmission bridge XBL and ring-and-tone circuit RT to the transformer element TXG (FIG. 23) in the local controller.

As the calling and called line connectors are driven revertive impulses are fed via the transformer elements TXG and TXD to the circuits GMe and DNe, respectively.

The circuit GMe produces output pulses corresponding to those pulses reverted through the transformer element TXG. These output pulses pass through the open gate GCS1 and are applied over pulse lead pl25 to the pulse input of setting and resetting gates GS and GR of the circuit LGUe1 (FIG. 25) in the calling units digit store LGU.

The element DNe produces output pulses corresponding to those pulses reverted through the transformer element TXD and these output pulses pass through the open gate DCS1 and are applied over pulse lead pl26 to the pulse input of setting and resetting gates GS and GR of the circuit LDUe1 (FIG. 26) of the called units digit store LDU.

The store LGU, as previously mentioned, comprises four bistable circuits and, as in the case of the store CC1 (FIG. 29) in the register REG, is modified to give a cyclic count of ten. The calling tens digit store LGT comprises four bistable circuits unmodified to give a cyclic count of sixteen and the stores LGU and LGT are interconnected in the same way as the stores CC1 and CC2 in the register to give a total possible count of 160.

The called stores LDU and LDT are correspondingly arranged to provide a combined count of 160.

It has already been described in some detail that the binary markings applied to the calling stores LGU and LGT, as well as those applied to the called stores LDU and LDT, correspond to the complement of the required outlets of the calling and called line connectors plus one. In consequence, with these stores set in accordance with these markings the store LGT in respect of the calling line and the store LDT in respect of the called line, will become counted out when the line connector has reached the outlets immediately preceding the calling and called line outlets.

Figure 23A:
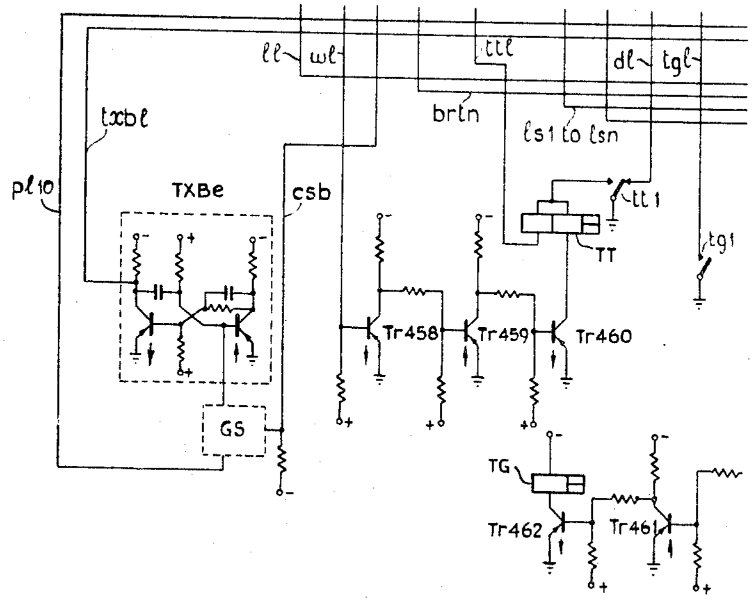
Figure 23B:
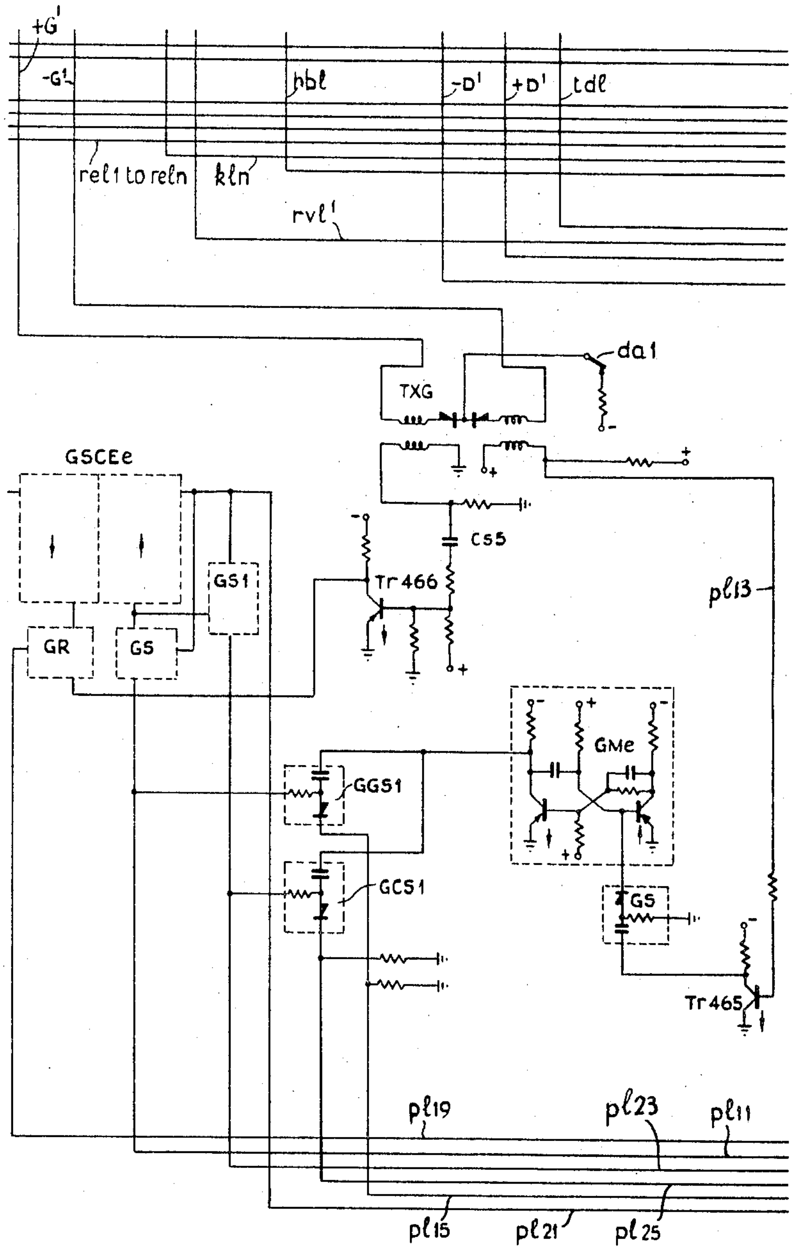
Figure 24A:
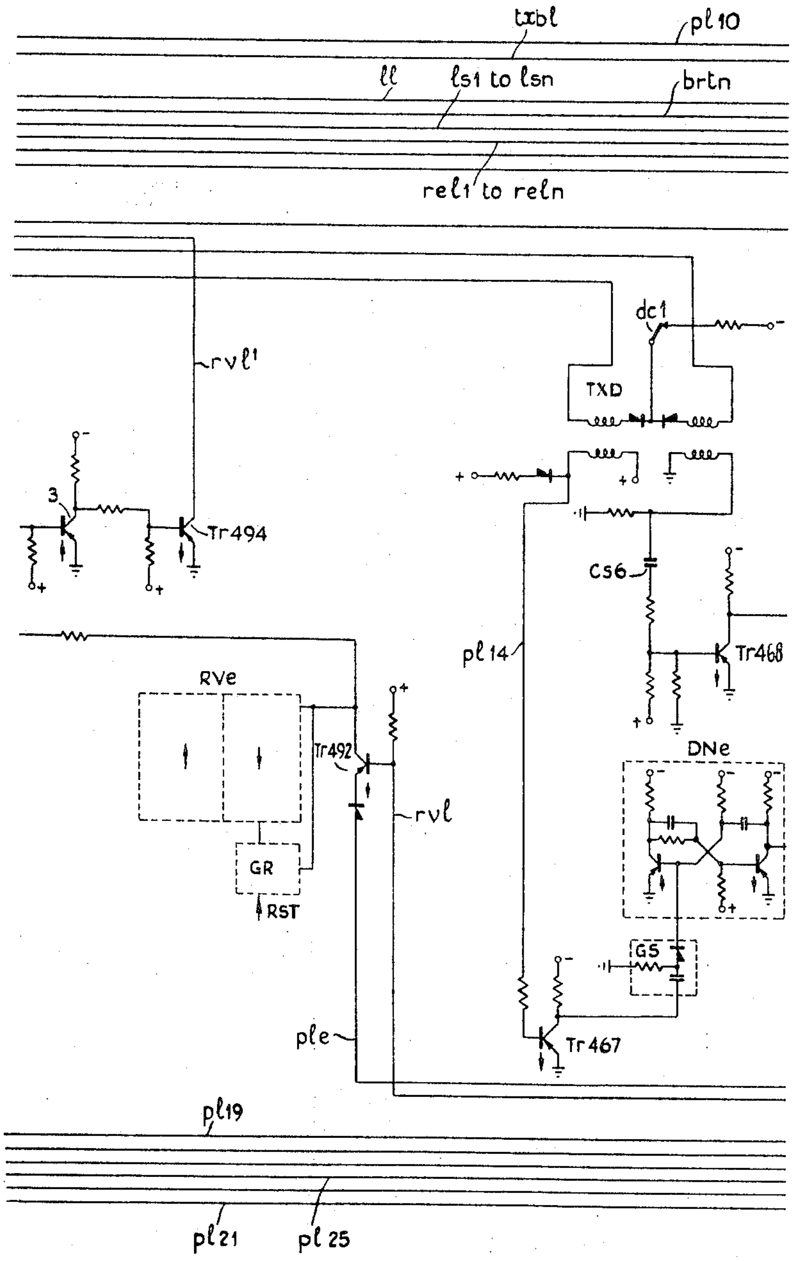
Figure 24B:
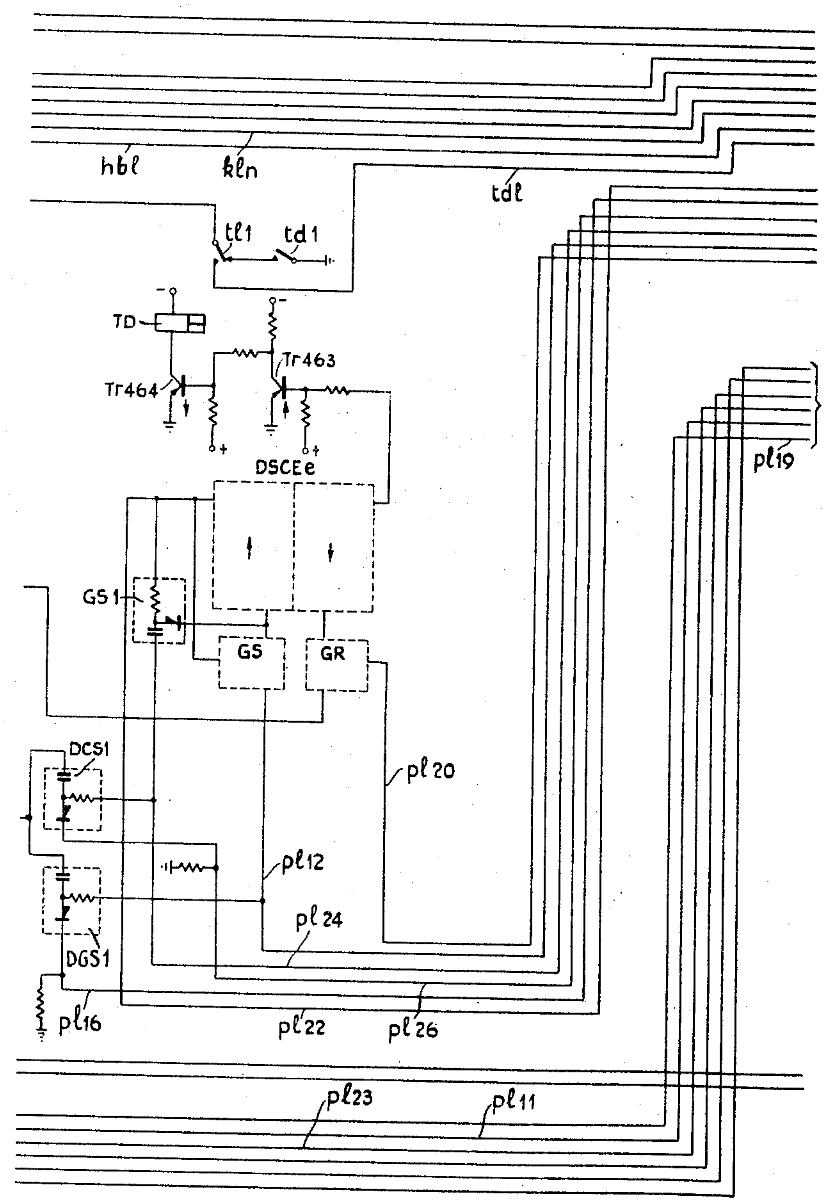

When store LGT is counted out the resetting of its circuit LGTe4 applies a positive signal over a pulse lead pl27 to a setting gate GS2 for the circuit GCSGe (FIG. 25) and this element which was reset by a positive signal applied to its resetting gate GR1 over a lead pl28 from the pause circuit CGPe (FIG. 16) is thus set once again to apply over pulse lead pl19 a positive signal which opens the resetting gate GR for the circuit GSCEe (FIG. 23).

Upon receipt of the next output pulse from the transformer element TXG the transistor Tr466 is rendered conducting and thus a positive signal is applied to the pulse input of resetting gate GR of circuit GSCEe which resets and thereby brings about therelease of relay TG to arrest the line connector L/C–G on the calling line LIG.

Likewise, when the store LDT is counted out the resetting of its circuit LDTe4 applies a positive signal over a pulse lead pl28a to a setting gate GS2 for the circuit DCSGe (FIG. 26) and this circuit, which was reset by a positive signal applied to its resetting gate GR1 over a pulse lead pl30 from the pause circuit CDPe, is thus set once again to apply over pulse lead pl20 a positive signal which opens the resetting gate GR for the circuit DSCEe (FIG. 24). The next pulse derived from transformer element TXD causes the transistor Tr468 to conduct and the positive output signal from the transistor is applied to the pulse input of resetting gate GR of circuit DSCEe which accordingly resets to bring about the release of relay TD. Relay TD, in releasing, interrupts the drive circuit for the called line line connector L/C–D at contacts td1 to bring this line connector to rest on the called line LID.

Reverting to the stage in the operating sequence in which the circuit SSe (FIG. 16) was reset consequent upon the setting of circuit DCe, with the circuit SSe reset the resetting gates GR for the circuits GCe and DCe were opened so that pulses applied to leads pl21 and pl22 from circuits GSCEe (FIG. 23) and DSCEe (FIG. 24) were effective to reset these circuits GCe and DCe, respectively which in turn bias open resetting gates GR of circuits CGSe and CDSe. Therefore, these latter circuits have already been reset by the pulse on the lead pl10 next occurring after the pulses that set them on the leads pl21 and pl22 so that they bias open resetting gates GR of the pause circuits CGPe and CDPe. Consequently these latter circuits have also been reset by the succeeding pulse on the lead *pl10* and are now biasing open resetting gates GR of the circuits GLC*e* and DLC*e*.

The pulses applied to the leads *pl21* and *pl22* at the end of the searching operation by the line connectors are effective to reset circuits GLC*e* and DLC*e* and at the same time they set stop circuits STG*e* and STD*e* through their opened gates GS, these latter gates having been biased open in the set state of the circuits GLC*e* and DLC*e*. In setting, circuits STG*e* and STD*e* apply positive signals over leads *pl31* and *pl32*, respectively, to the pulse inputs of normally-open setting gates GS of circuits DAG*e* and DAD*e* (FIG. 16). With circuit DAG*e* set a positive signal is applied to the base of a transistor T*r*469 which is accordingly cut-off and in turn renders a transistor T*r*470 conducting to bring about the operation of a relay DA. This relay, in operating, renders the transformer element TXG (FIG. 23) inoperative at contacts *da1*. With circuit DAD*e* set a positive signal is applied to the base of a transistor T*r*471 which is accordingly cut-off to render a transistor T*r*472 conducting for the operation of a relay DC, which in operating renders the transformer element TXD (FIG. 24) inoperative at contacts *dc1*.

The positive signal from the circuit STG*e* is also applied over a lead *pl33* to the bias input of setting gate GS of a circuit CPR*e* (PAUSE BEFORE RELEASE) (FIG. 21) which is thus set by the next pulse over lead *pl10*, this pulse also resetting circuit STG*e* which has its resetting gate GR opened from the now reset circuit GLC*e*. When the circuit CPR*e* sets it applies a positive signal over a lead *pl34* to the pulse input of a resetting gate GR2 of the circuit GCSG*e* (FIG. 25) to reset this circuit.

Figure 21A:
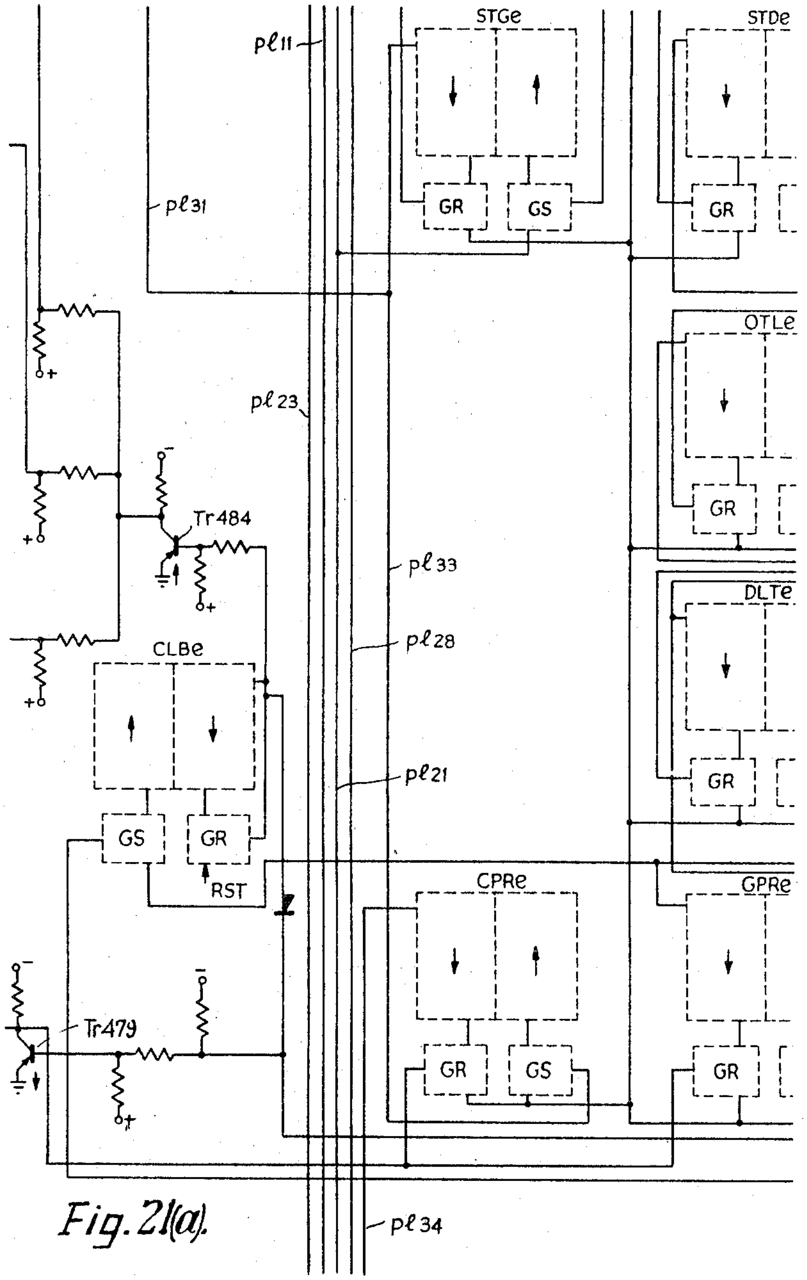
Figure 21B:
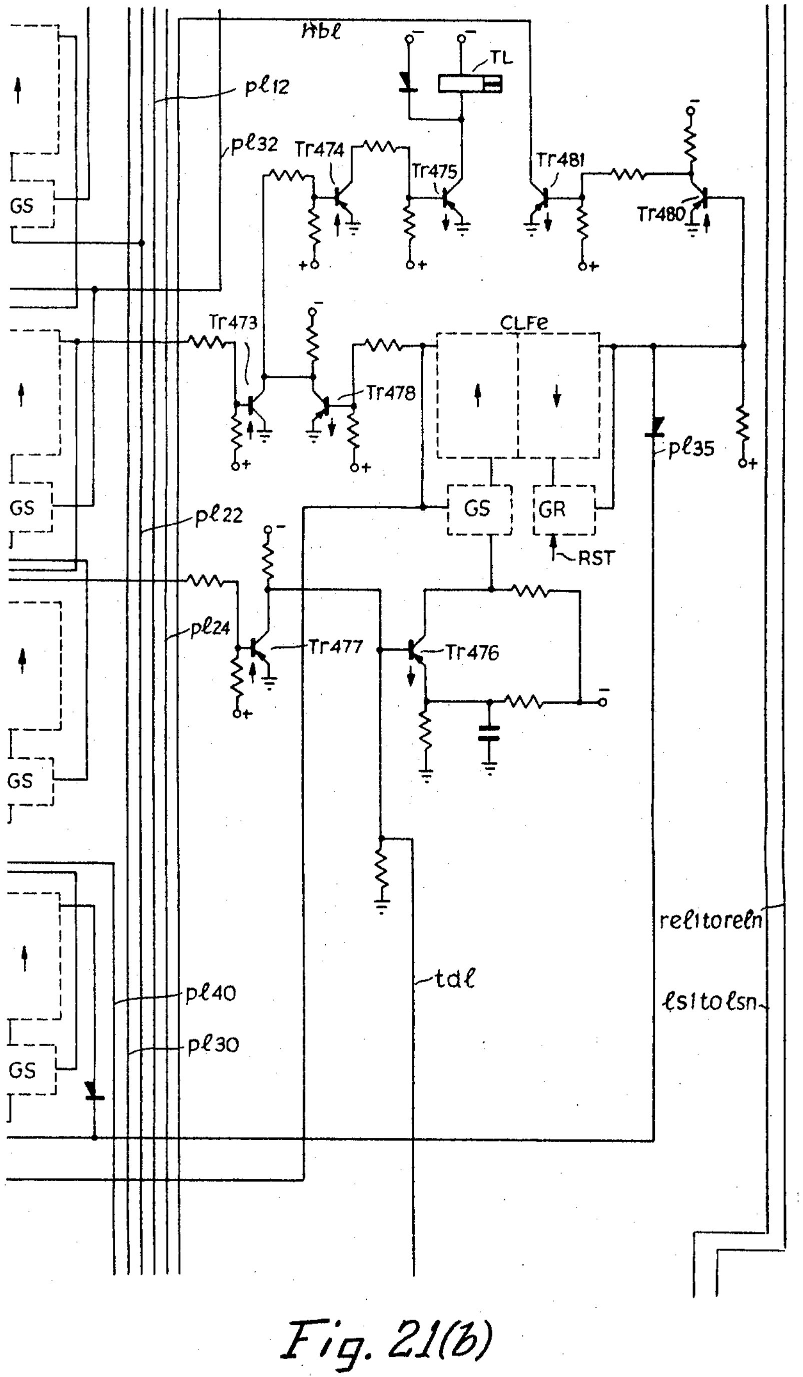
Figure 22A:
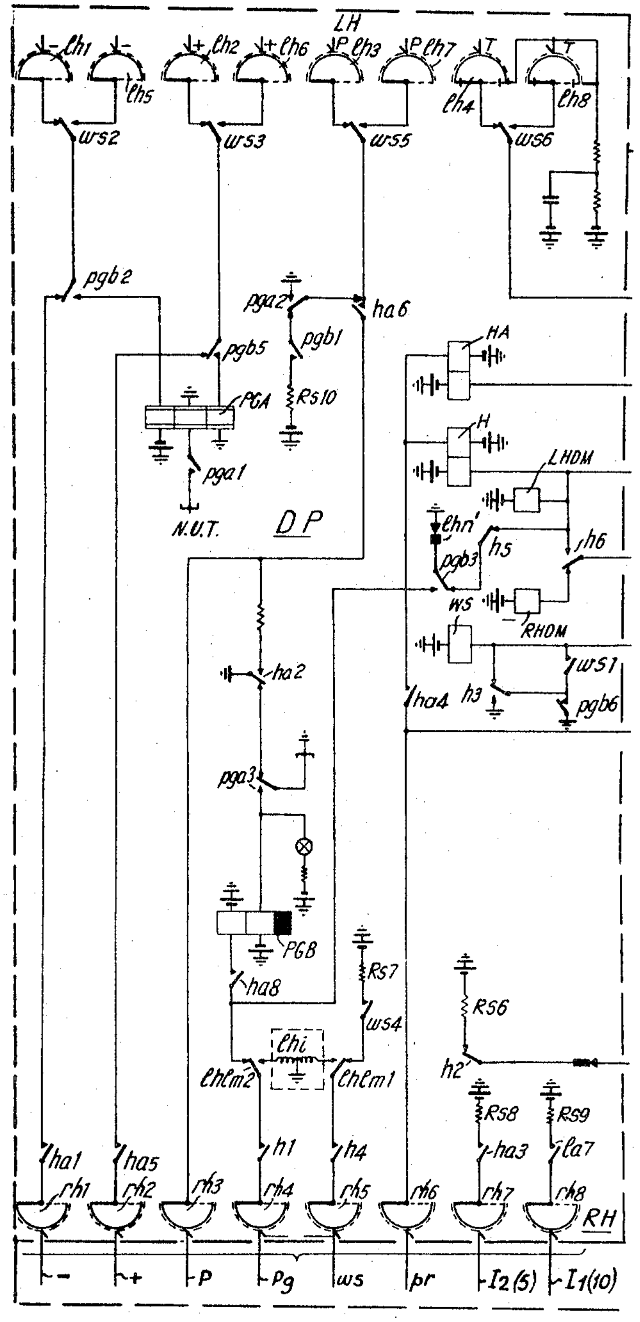
Figure 22B:
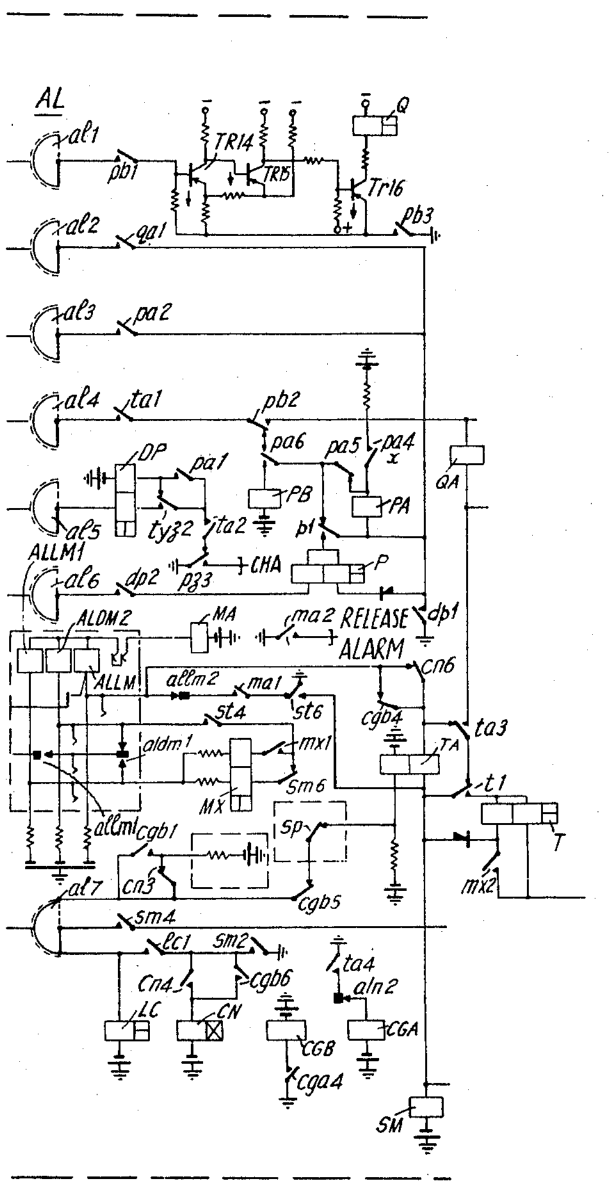
Figure 22C:
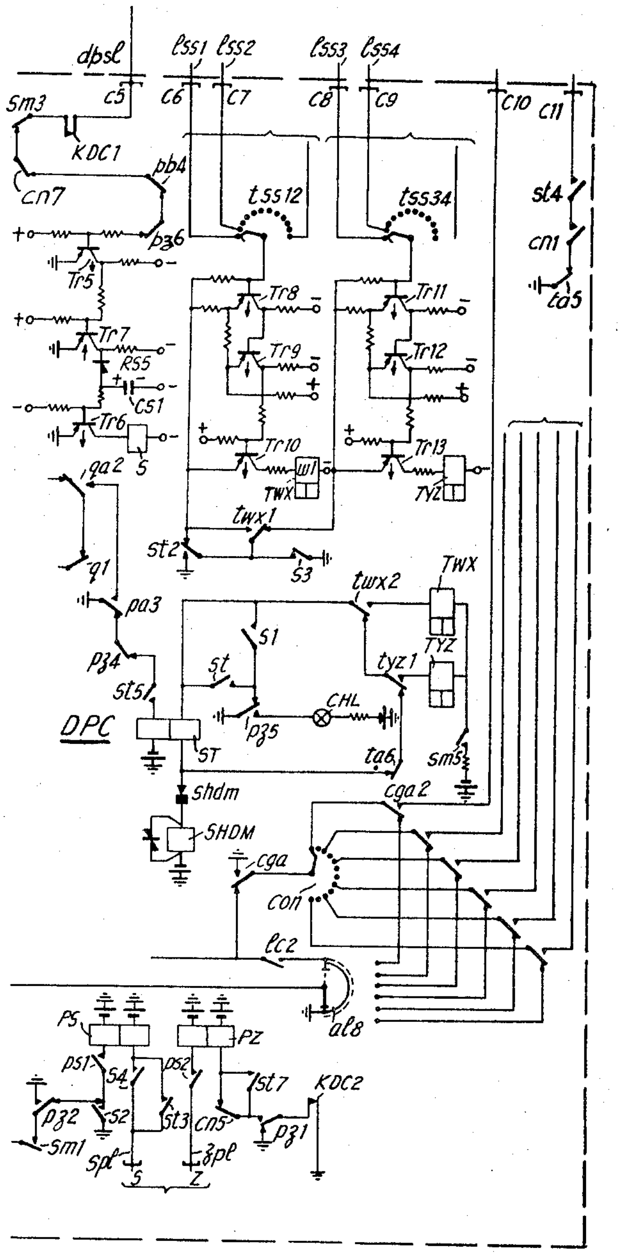

The positive signal from the circuit STD*e* is also applied to the bias input of the setting gate GS of a bistable circuit OTL*e* (operate relay TL) which in consequence is set by the next pulse appearing on the pulse lead *pl10*, this pulse also resetting circuit STD*e* which has its resetting gate GR opened from the now reset circuit DLC*e*. When the circuit OTL*e* sets it renders conducting a transistor T*r*473 to cut-off a transistor T*r*474 which in turn renders a transistor T*r*475 conducting to bring about the operation of a relay TL. When relay TL operates it extends at contacts *tl1* (FIG. 24) a lead *tdl* to the base of a called line testing transistor T*r*476 (FIG. 21). With the circuit OTL*e* set the setting gate GS for a bistable circuit DLT*e* is open so that the next pulse on the lead *pl10* sets this circuit and at the same time resets circuit OTL*e*. When circuit DLT*e* sets it cuts-off a transistor T*r*477 to apply a negative signal to the base of transistor T*r*476. If the called line is free a negative signal will also be extended to the base of this transistor T*r*476 over lead *tdl* and this transistor will therefore conduct and apply a positive signal to the setting gate GS for bistable circuit CLF*e* (called line free) which is therefore set and renders a transistor T*r*478 conducting. This latter transistor takes over from the transistor T*r*473 to maintain relay TL operated. The next pulse on lead *pl10* resets circuit DLT*e* and sets circuit GPR*e* (pause before release) which had its setting gate opened from DLT*e*. With the circuit CLF*e* set, a positive signal is extended over a lead *pl35* to the base of a transistor T*r*479 to hold this transistor non-conducting and thereby to keep closed the resetting gates GR of the circuits CPR*e* and GPR*e* and so prevent resetting of these circuits by the next pulse on lead *pl10*.

When circuit CLF*e* sets a positive potential is applied to the base of a transistor T*r*480 to cut it off and this in turn renders a transistor T*r*481 conducting to apply a positive signal over lead *hbl* to the ring-and-tone circuit RT to operate relay HB in the latter circuit. When relay HB operates ringing current is applied to the called line over operated contacts *hb1* and *hb2*, leads +D′ and −D′ in the transmission bridge XBL, and through the set group connector G/C–D and line connector L/C–D and the called line circuit LID. Contacts *hb5* prepare a circuit for applying ringing tone to the calling line over leads −G′ and +G′ in the transmission bridge XBL and through the set group connector G/C–G and line connector L/C–G and the calling line circuit LIG, when relay HA operates to operate relay LR. Contacts *hb3* apply busying earth to the called line over lead PD′ into the transmission bridge and over lead PD′ to the called line circuit LID. Contacts *hb4* complete a holding circuit for relay HB over contacts *br3* and *cr6*. The homing circuit for the coupler CSL is interrupted by contacts *hb6*, and contacts *hb7* disconnect the operating circuit of relay KA. When relay KA releases an operating circuit is established for relay HA over contacts *ka3*. Contacts *ha2* and *ha4* operate relay LR to extend ringing tone to the calling line. Contacts *ka7* disconnect the energizing circuit for the left-hand winding of relay HB which remains held over contacts *hb4*. Contacts *ka5* prepare a homing circuit for the coupler CSL and disconnect the operating circuit for relay TA which releases.

When relay TA releases the earth on the lead *dl* (FIG. 18) is applied to a lead *rel* of a group of leads *rel1* . . . *reln*. This earth signal opens the resetting gates GR1 . . . GRN for the circuit SST*e* (FIG. 16) so that the next pulse on the lead *pl10* applied through gate GRN will reset the latter circuit. When circuit SST*e* resets a transistor T*r*482 is cut-off and a transistor T*r*483 is rendered conducting to apply a positive signal over a reset lead RST to bias open resetting gate GR of the circuit CLF*e* (FIG. 21) which accordingly resets. When the circuit CLF*e* resets transistor T*r*478 is cut-off so that negative potential is applied to the base of transistor T*r*474 to render it conducting and so cut-off transistor T*r*475 to bring about the release of relay TL. Relay TL in releasing removes the busying earth from the lead *tdl* at contacts *td1* (FIG. 24). The positive signal on lead RST is also applied to the resetting gates of the circuits DAD*e* and DAG*e* (FIG. 16) which reset. In resetting, these circuits bring about the release of relays DA and DC. Still further, the positive signal on the lead RST is applied to the resetting gates GR of the circuits LIG*e*1–LIG*e*4 (FIG. 31) of the link group identifying store to reset that circuit which was set to identify the particular link group containing the transmission bridge XBL. Circuits GLG*e* (FIG. 25) and DLG*e* (FIG. 26) are also reset by the application of the positive signal on lead RST to their resetting gates GR.

Figure 20A:
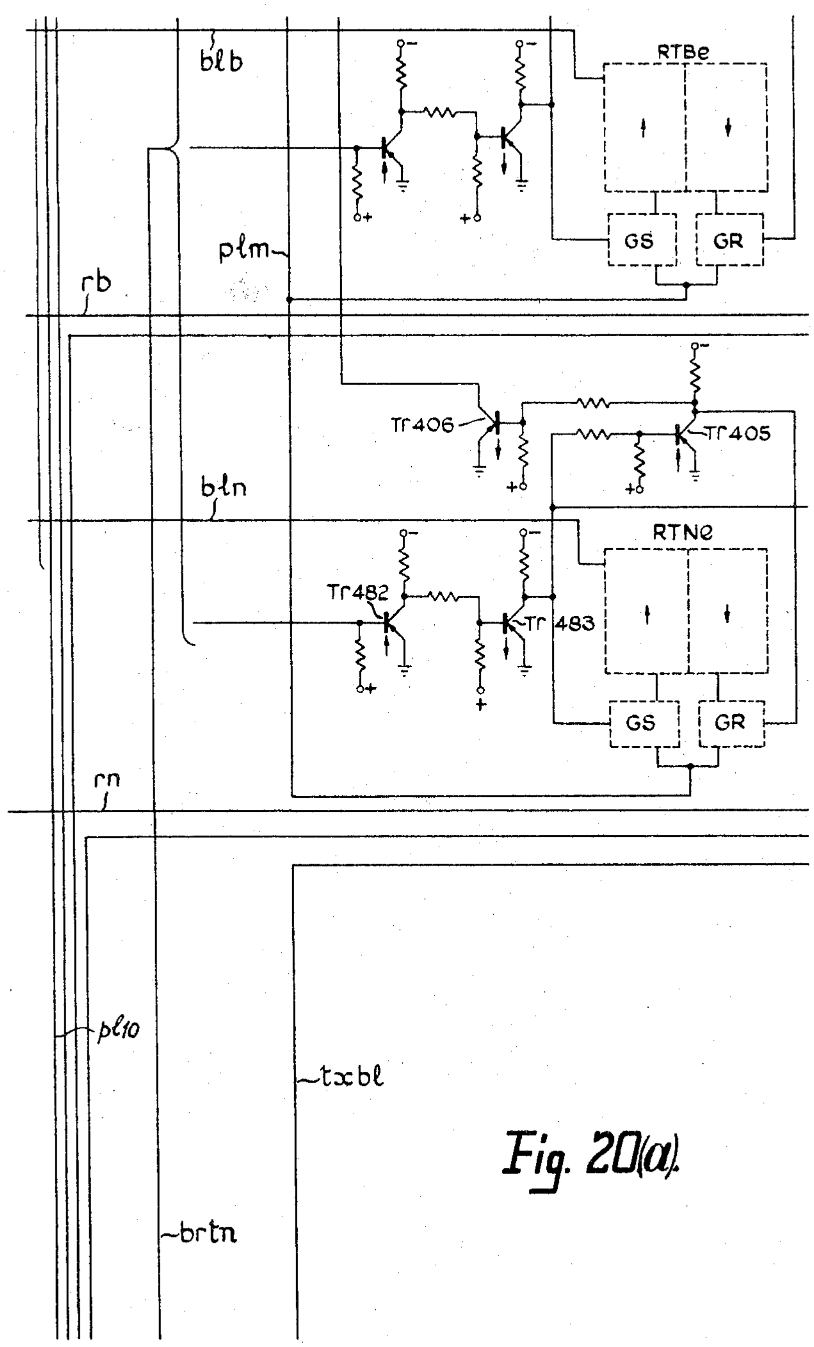
Figure 20B:
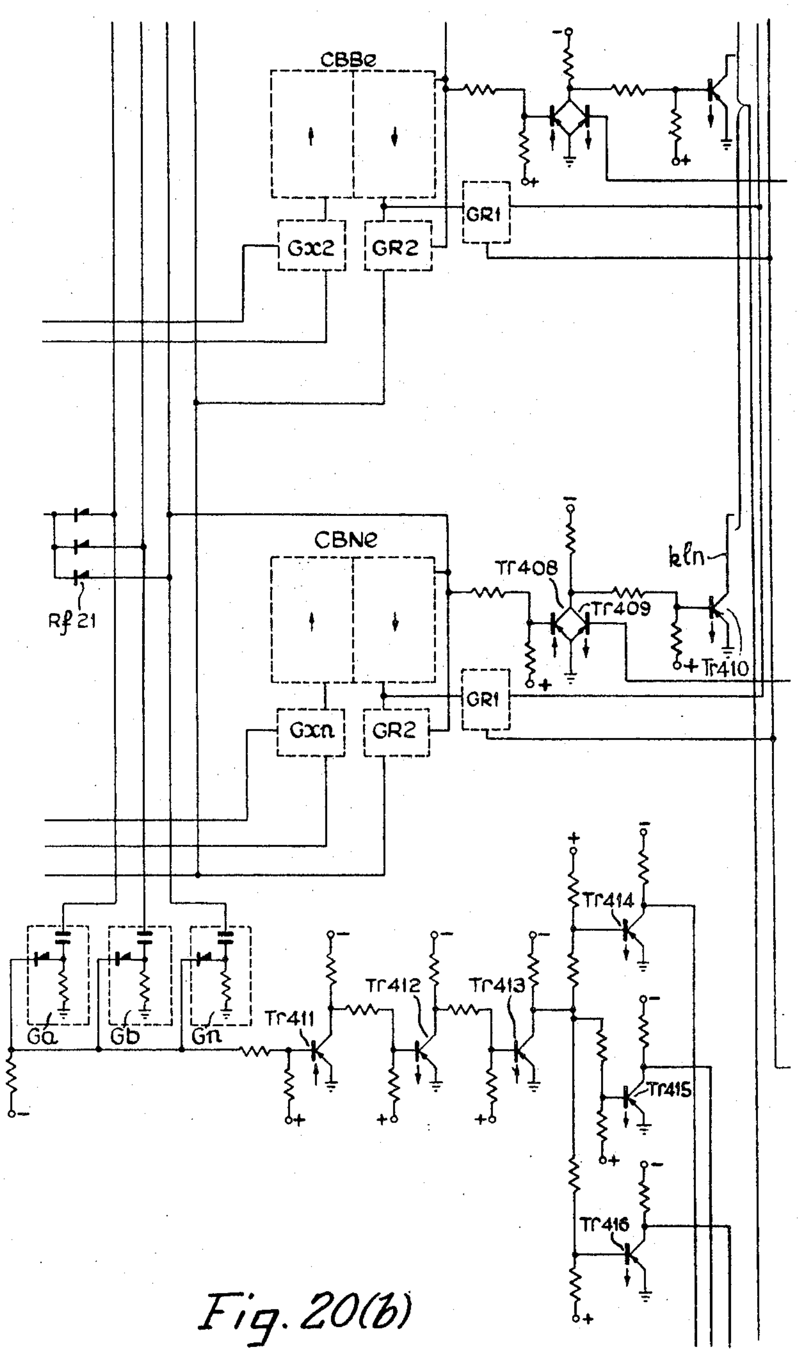

When circuit CLF*e* (FIG. 21) is reset the positive signal applied to the lead *pl35* from the right-hand transistor of the circuit is replaced by a negative signal. Since the circuit GPR*e* is in the set condition the transistor T*r*479 conducts. In conducting, this transistor applies earth potential to the bias inputs of resetting gates GR of the circuits CPR*e* and GPR*e* so that these circuits will be reset to the next pulse on the lead *pl10*. In addition, the earth potential at the collector of transistor T*r*479 is also extended to the bias input of resetting gate GR1 of the set circuit CBN*e* (FIG. 20). This circuit CBN*e* is accordingly reset by the pulse on lead *pl10* which resets the circuits CPR*e* and GPR*e* (FIG. 21). It may here be mentioned that since it has been assumed that ring-and-tone circuit RTN is taken into use, negative battery will have been disconnected from a lead *brtn* by off-normal contacts CSLON (FIG. 18) of the coupler CSL as soon as the coupler CSL searches for the transmission bridge XBL in the requisite link group. The removal of this negative battery from lead *brtn* will have caused a normally-conducting transistor T*r*482 (FIG. 20) to be cut-off, which in turn renders a transistor T*r*483 conducting. The corresponding transistors associated with the ring-and-tone circuits RTA and RTB however will have remained in their normal conditions. At the stage at present being considered the resetting of the circuit CBN*e* will cause the transistors associated with circuits RTA*e* and RTB*e* and corresponding to transistor T*r*405 associated with circuit RTN*e* to conduct and in conducting these transistors apply positive potentials from their collectors to the bias inputs of the resetting gates GR of the circuits RTA*e* and RTB*e* so that these circuits will be reset by the reset pulse from the ring-and-tone pulse multivibrator RTM over lead *plm*. In the case of circuit RTN*e*, however, the transistor T*r*405 will remain non-conducting since the base is held at positive potential from the collector of the conducting transistor T*r*483 (FIG. 20). Consequently the resetting gate GR of the circuit RTN*e* remains closed and it will continue to remain in this condition until the state of transistor T*r*483 is reversed (is non-conducting) by the re-application of the negative battery to the lead *brtn* when the ring-and-tone circuit is restored to normal when the call has been set up. The resetting of the circuit CBN*e* also has the effect of rendering the transistor T*r*457 conducting by the substitution of negative potential for positive potential on its base. Transistor T*r*457 in conducting re-applies the earth clamp via rectifier R*f*26 to the base of the left-hand transistor of the sequence pulse multivibrator SPM to stop the latter.

At this point the local controller LOC is free to be taken into use for another call but selection of the ring-and-tone circuit RTN*e* until the latter releases is prevented by the busying earth applied to the controller selector CS over the lead *bln* (FIG. 20).

It will be remembered that ringing current was extended to the called line when relay HB (FIG. 18) was operated. When the called subscriber answers a ringing relay F in the ring-and-tone circuit operates over the called subscriber's line loop. Contacts *f*1 and *f*2 interrupt the ringing circuit and contacts *f*4 remove the short circuit from the left-hand winding of relay F so that the latter is held operated to the earth applied over contacts *br*3. Contacts *f*6 interrupt the operating circuit for relay CR which releases while contacts *f*5 further interrupt the homing circuit for the coupler CSL. When relay CR (FIG. 18) releases a positive battery metering pulse is applied to the calling subscriber's meter M in the calling subscriber's line circuit LIG over contacts *cr*3, *br*2, *ha*3, arc *csl*3 (FIG. 18) and lead PG' in the transmission bridge XBL (FIG. 13) and lead PG in the set group and line connectors G/C–G and L/C–G, respectively. Contacts *f*3 of operated relay F in FIG. 18 extend a positive battery signal over contacts *ha*5 and arc *csl*2 of coupler CSL and lead *bxl* to operate a relay KK in the transmission bridge XBL over its left-hand winding. Relay KK in operating completes an operating circuit for a switching relay BA at contacts *kk*2 and over previously operated contacts *kxb*2 and contacts *kk*4 complete an operating circuit for a switching relay BB. When switching relays BA and BB operate they lock up over contacts *ba*6 and *bb*6. Contacts *bb*4 and *bb*5 reverse the polarity of the potentials on the wires from the left-hand side of the transmission bridge while contacts *ba*1 and *ba*2 extend the calling subscriber's line wires +G' and —G' to the bridge so bringing about the release of relay LR (FIG. 18) and the removal of ringing tone from the calling line. Contacts *ba*4 and *ba*5 reverse the polarity of the potentials on the wires from the right-hand side of the transmission bridge while contacts *bb*1 and *bb*2 extend the called subscriber's line wires +D' and —D' to the transmission bridge. Sleeved relays indicated at LA and LB accordingly operate over the calling and called line loops and earths are applied to the leads PG' and PD' over contacts *ba*3 and *bb*3 respectively to busy the calling and called line circuits LIG and LID.

When relays LA and LB operate, the operating circuits for relays CA and CB are interrupted at contacts *la*2 and *lb*2 and the latter relays release. The release of relay LR (FIG. 18) brought about by the operation of relay BA causes the operating circuit of relay BR to be disconnected at contact *lr*1. In releasing, relay BR removes the positive battery metering pulse from the lead PG' at contacts *br*2. Relays HA and HB (FIG. 18) and relay F are released by the removal of the earth at contacts *br*3.

When contacts *f*5, *ha*1 and *hb*6 restore a homing drive circuit is completed for the drive motor CSLDM of the coupler CSL, and contacts *ha*5 and *f*3 in restoring remove the positive battery from the lead *bxl* so that relay KK (FIG. 13) releases.

When the coupler CSL reaches its normal position the off-normal contacts CSLON close and apply negative potential to the lead *brtn*. This negative potential is applied to the base of transistor T*r*482 (FIG. 20) to cause it to conduct and cut-off transistor T*r*483. The resulting negative potential on the collector of transistor T*r*483 is applied to the base of transistor T*r*405 which accordingly conducts so that the positive potential on the collector of this transistor is applied to the bias input of the resetting gate GR of the circuit RTN*e*. The positive potential on the collector of transistor T*r*405 cuts-off transistor T*r*406 and the resulting negative potential on the collector of the latter transistor renders transistor T*r*407 (FIG. 15) conducting. In conducting, transistor T*r*407 re-applies the clamping earth to the base of the left-hand transistor of the ring-and-tone multivibrator RTM through the rectifier R*f*22 to stop the multivibrator and this earth is also applied through a further rectifier (unreferenced) to the pulse input of the opened resetting gate GR of the circuit RTN*e*. The circuit RTN*e* resets and an earth potential is accordingly applied to the lead *bln* to indicate to the controller selector CS that the ring-and-tone circuit RTN is now free and available for a further call.

Reverting now to the point where the called line was tested it will be recalled that the circuits CPR*e* and DLT*e* were set while circuit OTL*e* was reset by a pulse on lead *pl*10. If the called line is busy then the circuit CLF*e* remains in its reset state by reason of the earth potential applied to the base of transistor T*r*476 (FIG. 21) over leads *tdl* and wires PD and PD' from the called line circuit LID. Consequently when circuit OTL*e* is reset the positive potential on the collector of the right-hand transistor of the circuit is applied to the base of transistor T*r*473 (FIG. 21) to cut-off this transistor. The resulting negative potential on the collector of this transistor renders the transistor T*r*474 conducting which in turn cuts-off transistor T*r*475 to bring about the release of relay TL. When circuit DLT*e* is set the positive signal from the left-hand transistor of the circuit is applied to the bias input of the setting gate GS of the circuit GPR*e* so that the latter circuit is set by the next pulse applied over lead *pl*10 to the pulse input of its setting gate GS. This pulse on lead *pl*10 also resets the circuit DLT*e* since the resetting gate GR for the latter circuit was opened in response to the resetting of the circuit OTL*e*.

Since the circuit CLF*e* is not set in the case of the called line being busy earth potential is applied from the collector of its left-hand transistor to bias open the setting gate GS of a circuit CLB*e* (called line busy) and this latter circuit is set by a positive potential applied to the pulse input of its setting gate from the left-hand transistor of the circuit GPR*e* when the latter sets. This positive potential is also applied over lead *pl*40 to the pulse input of resetting gate GR2 of the circuit DCSG*e* (FIG. 26). The circuit DCSG*e* is accordingly reset since the gate GR2 is opened by the positive potential applied to its bias input from the left-hand transistor of the circuit.

In setting the circuit CLB*e* (FIG. 21) the earth potential applied from its right-hand transistor to the base of transistor T*r*479 prevents this transistor from conducting to bring about the resetting of the circuit CBN*e* to the next pulse on the lead *pl*10. The non-conduction of transistor T*r*479 also prevents the circuits CPR*e* and GPR*e* from being reset to the same pulse on the lead *pl*10.

When the circuit CLB*e* is set the earth potential on the collector of the right-hand transistor is applied to the base of a normally-conducting transistor T*r*484 to cut it off. Negative potential is accordingly applied to the base of the transistor Tr409 (FIG. 20) to render it conducting. This transistor in turn cuts-off transistor Tr410 and the consequent removal of the earth potential from the lead *kln* brings about the release of relay KA in the ring-and-tone circuit (RTN). When relay KA releases an operating circuit is completed for relay HA at contacts *ka*3. Relay HA operates and contacts *ha*2 and *ha*4 complete an operating circuit for relay LR over the calling subscriber's line loop. Relay LR operates and by the closure of contacts *lr*2 busy tone is extended to the calling subscriber's line. Contacts *ka*5 interrupt the operating circuit for relay TA which releases, as well as preparing a homing circuit for the drive motor CSLDM of the coupler CSL. Upon the release of relay TA the earth applied to the lead *dl* from contacts *tt*1 (FIG. 23) is extended over contacts *ta*2 and *ka*2 to the lead *reln*. This earth is applied to the bias input of resetting gate GRN of the circuit SST*e* (FIG. 16) so that the latter circuit is reset by the next pulse on the lead *pl*10. In resetting, the circuit SST*e* applies an earth to the base of the transistor Tr482 which is consequently cut-off to render transistor Tr483 conducting and so produce a positive signal on the reset lead RST. This positive signal is applied to the pulse input of open resetting gate GR of the circuit CLB*e* which is accordingly reset. By resetting of the circuit CLB*e* positive potential is removed from the base of the transistor Tr479 to render this transistor conducting with the result that the earth potential on the collector of the transisor Tr479 is applied to the bias inputs of the resetting gates GR of the circuits CPR*e* and GPR*e* which are accordingly reset by the next pulse on the lead *pl*10. The earth potential on the collector of transistor Tr479 is also applied to the bias input of resetting gate GR1 of the circuit CBN*e* and this circuit is reset by the same pulse on lead *pl*10 as that which reset circuits CPR*e* and GPR*e*.

Figure 14A:
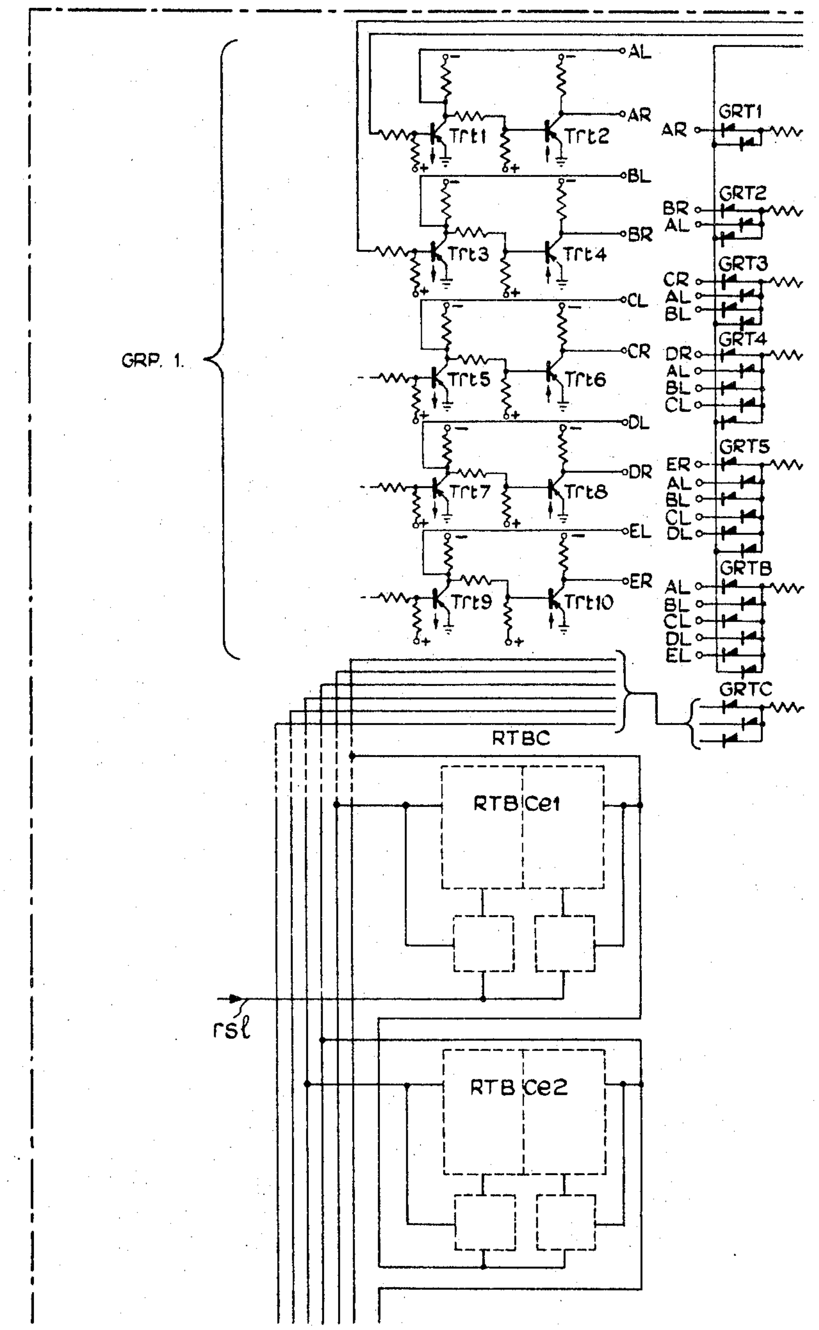
Figure 14B:
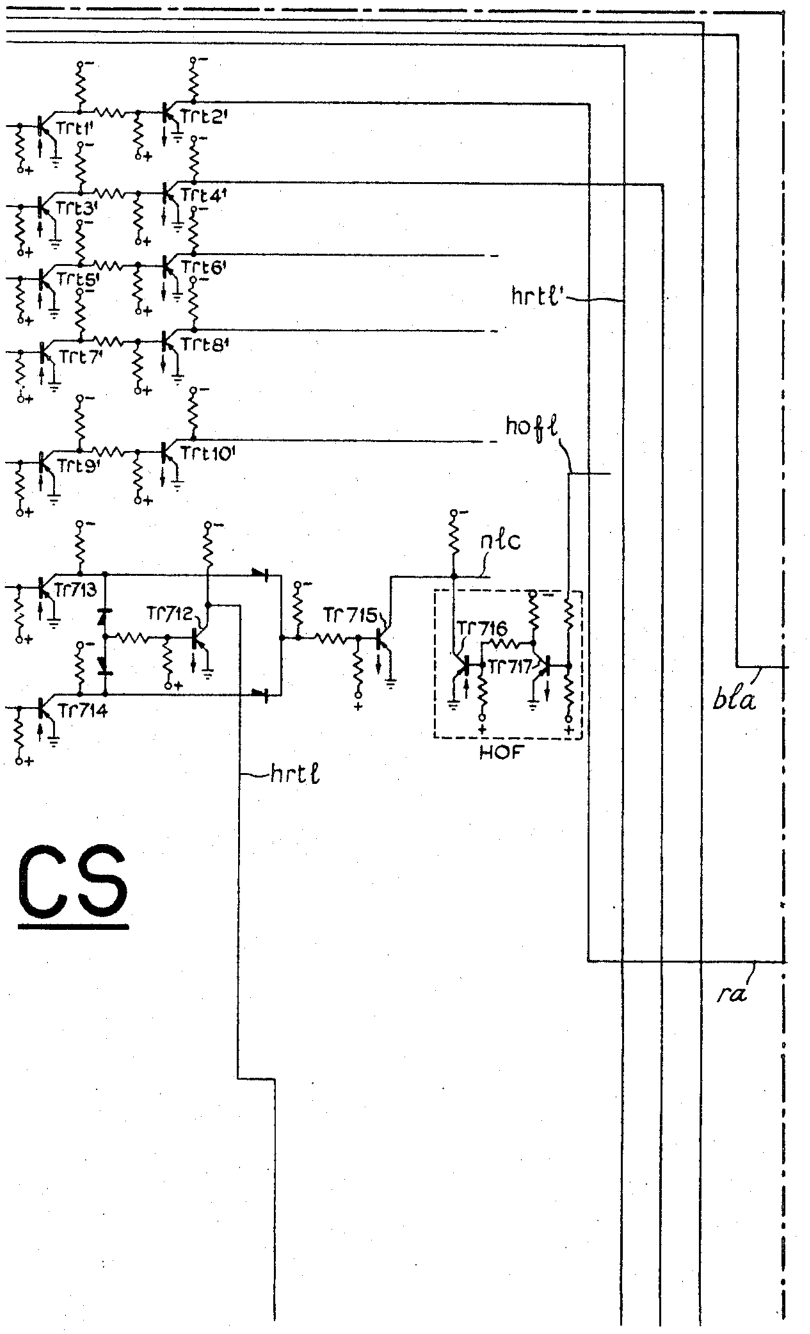
Figure 15A:
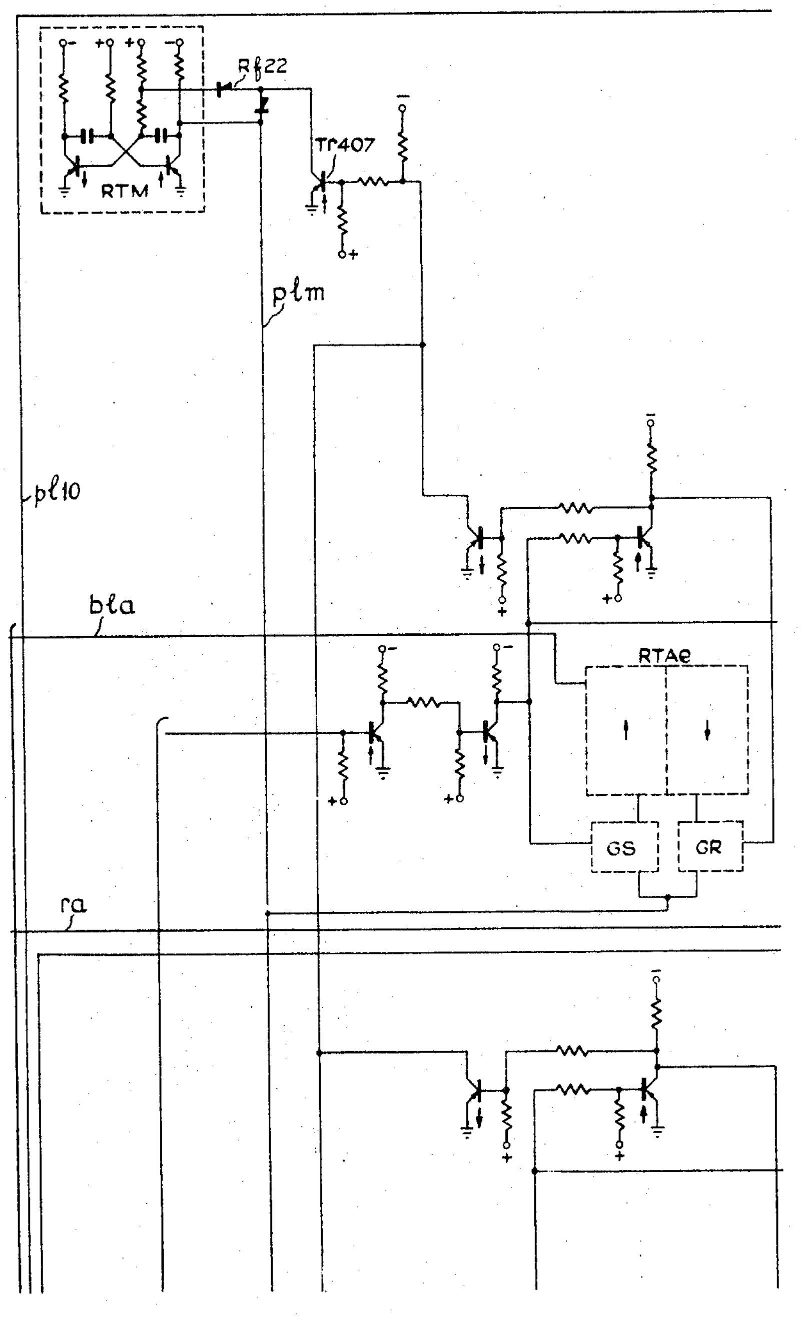
Figure 15B:
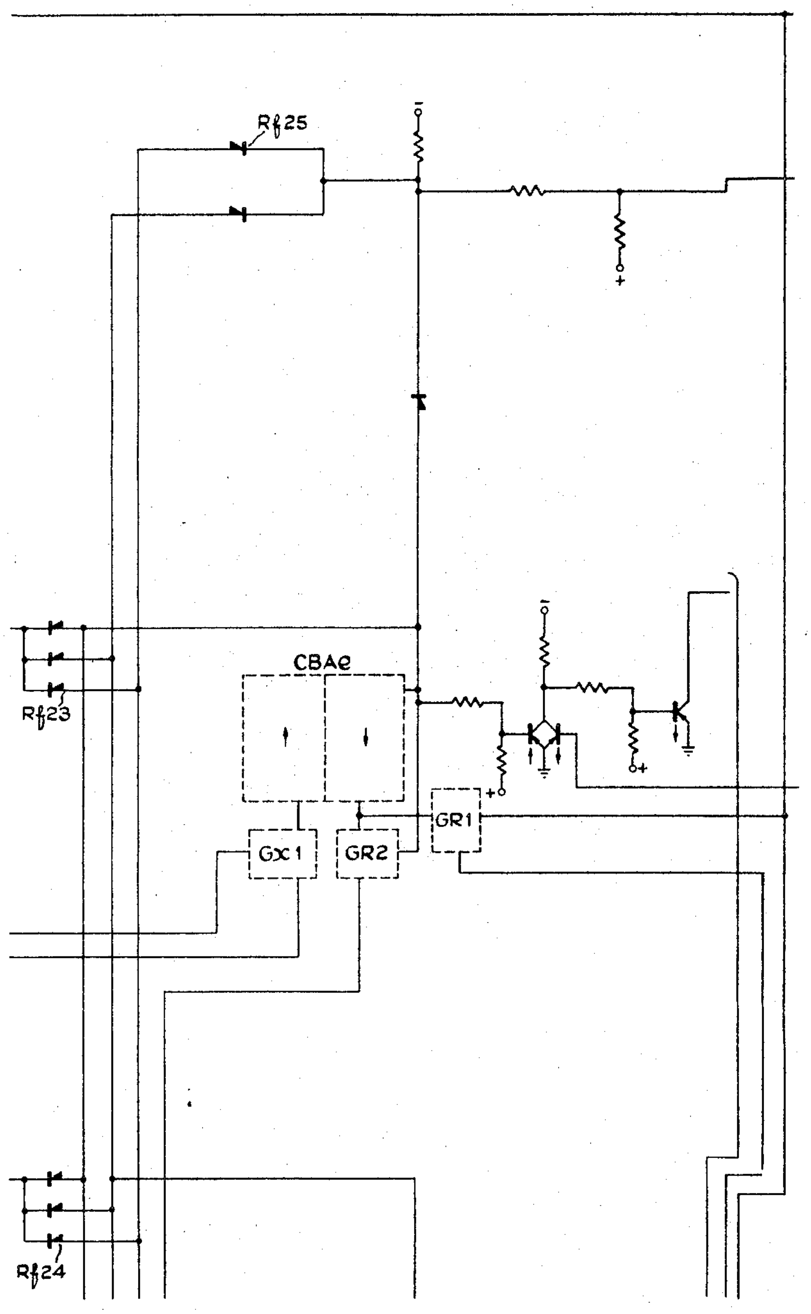
Figure 19A:
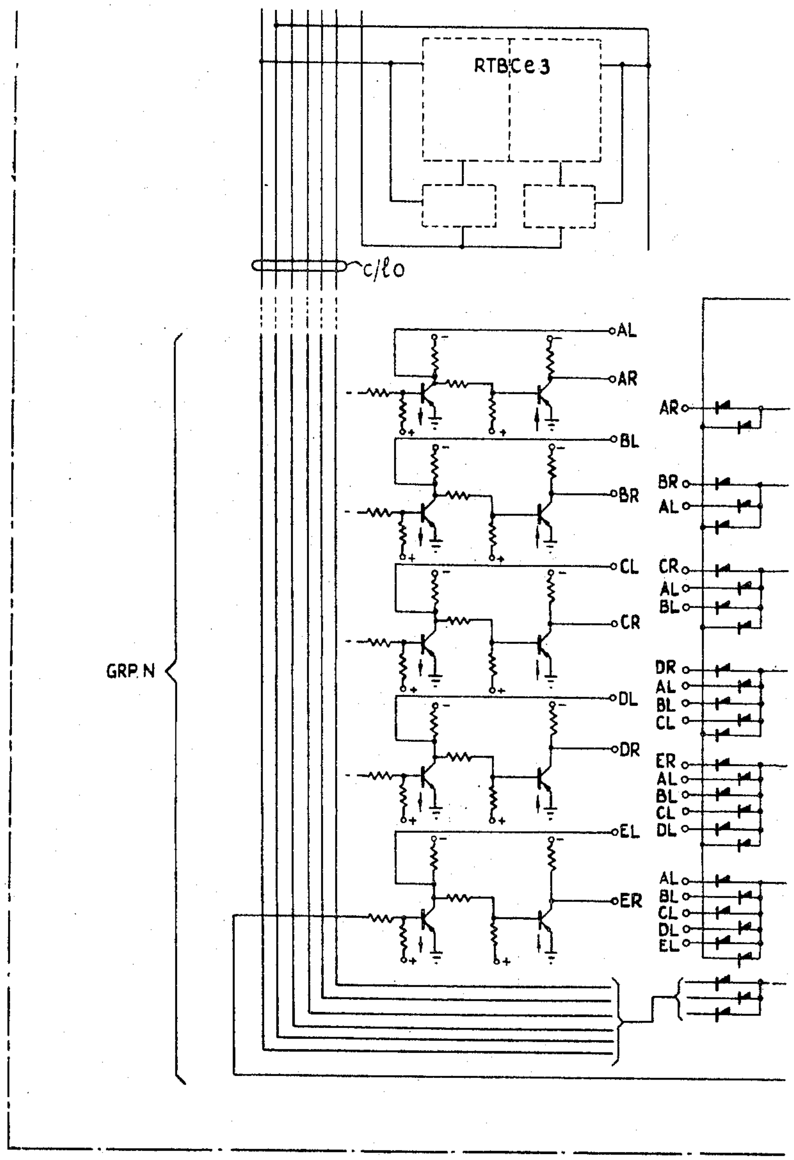
Figure 19B:
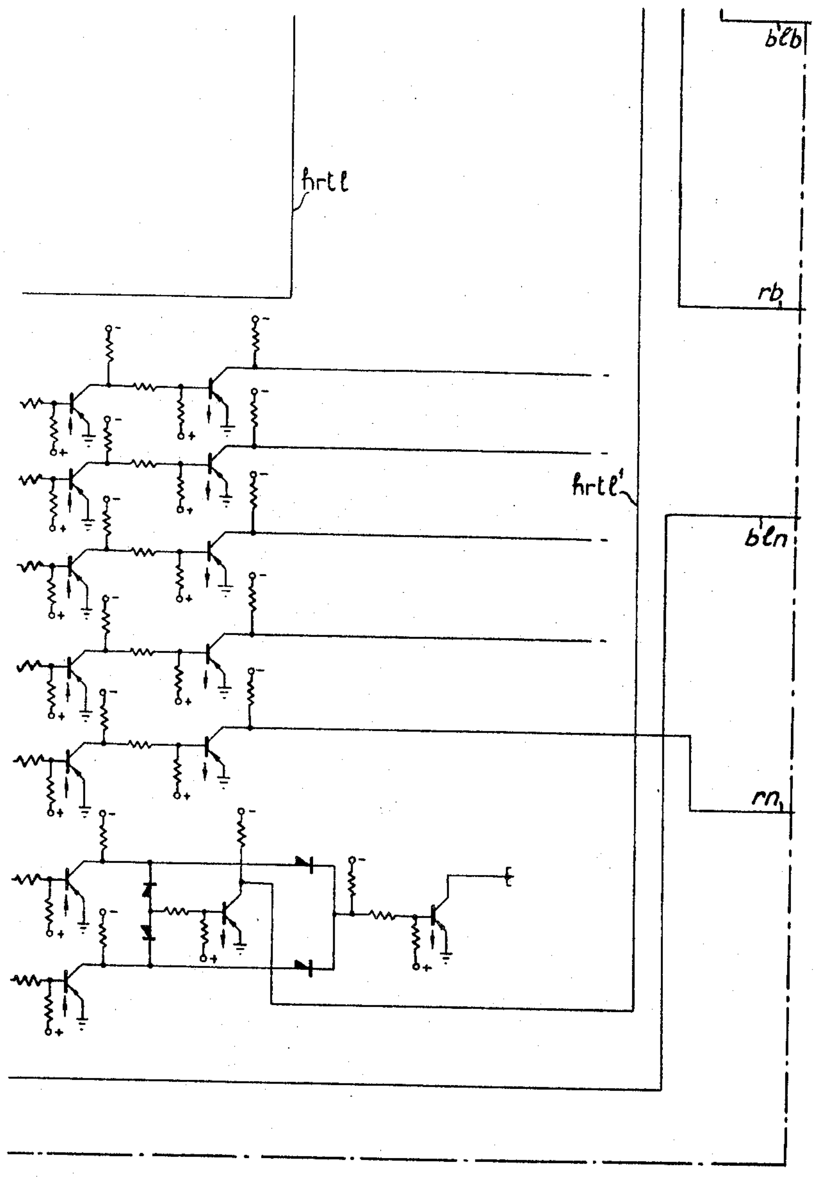

The circuit CBN*e* in resetting removes the earth potential from the base of the transistor Tr457 (FIG. 16) the effect of which is to stop the sequence pulse multivibrator SPM by the application to the latter of an earth clamp. As has already been described in the case where the called line was free the circuits RTA*e* and RTB*e* are reset consequent upon the resetting of circuit CBN*e* whereas the circuit RTN*e* remains set until the ring-and-tone circuit RTN is restored to normal. The controller is now free to be taken into use for another call but the ring-and-tone circuit RTN is still busied by the negative potential applied to the lead *bln* (FIG. 20) which extends to the controller selector CS (FIGS. 14 and 19).

When the calling subscriber clears down relay LR (FIG. 18) releases and the operating circuit for relay BR is disconnected at contacts *lr*1. Contacts *br*3 interrupt the operating circuit for relay CR while contacts *br*2 apply a negative battery to the lead PG during the release period of relay CR to release relay K in the calling line circuit LIG. When relay CR releases this negative battery is disconnected from the lead PG at contacts *cr*1 while contacts *cr*6 disconnects the operating circuit for relay HA. Contacts *cr*2 further prepares a homing circuit for the coupler CSL and when relay HA releases this homing circuit is completed over contacts *ha*1.

When the coupler CSL reaches its normal position a negative potential is applied to the lead *brtn* to bring about the resetting of the circuit RTN*e* (FIG. 20) and the stopping of the ring-and-tone pulse multivibrator RTM in a manner already described for the case where the called line is free. The ring-and-tone circuit RTN is then available for setting up a further call.

Assuming that the called line is free and the call is set up between the calling and called subscribers then relay LA (FIG. 13) will release when the calling subscriber clears down. When relay LA releases an operating circuit is completed for relay CA at contacts *la*2. Contacts *ca*1 and *la*1 apply a short circuit across relay BA which consequently releases and contacts *ca*3 and *ba*3 apply a negative battery to the lead PG to release relay K in the calling line circuit LIG. Contacts *ba*6 complete an operating circuit for relay RG (FIG. 13) over operated contacts *kxb*3. Relay RG in operating completes an energizing circuit for slow-to-operate relay TH at contacts *rg*5 and over contacts *ca*2. When relay BA releases relay CA releases by the removal of the operating earth at contacts *ba*6, and at contacts *ca*3 the negative battery for releasing relay K in the circuit LIG is disconnected from the lead PG.

Consequent upon the called subscriber clearing down the relay LB is released. Contacts *lb*2 complete an operating circuit for relay CB over contacts *kk*4 and *bb*6. Relay CB operates and the relay BB is consequently short circuited by contacts *cb*1 and *lb*1 to release it. When relay BB releases a negative battery is applied to the lead PD over contacts *bb*3 and *cb*3 to release the line relay (K) in the called line circuit LID. Relay BB in releasing removes the operating earth from relay CB which accordingly releases and at contacts *cb*3 the negative battery applied to the lead PD is removed. The release of relay CB interrupts the energizing circuit for slow-to-operate relay TH (formerly energized over contacts *bb*6 before the release of relay BB). The operating circuit for relay KXB is also interrupted at contacts *cb*2. Relay KXB releases and at contacts *kxb*3 the operating circuit for relay RG is disconnected but contacts *kxb*1 and *kxb*4 complete an operating circuit for relay RL in series with the drive motors LCDM (FIGS. 17 and 12) of the calling and called line connectors L/C–G and L/C–D before relay RC releases so that relay RG remains operated over an alternative operating circuit containing contacts *rl*1 and *rg*1. Relay KK re-operates over contacts *kxb*3 and *rg*4 (and parallel contacts *rl*2).

When relay RL operates in series with the drive motors LCDM of the calling and called line connectors these drive motors are at the same time effectively energized over their off-normal contacts *onc*2 and the line connectors L/C–G and L/C–D drive to their home positions whereat the drive circuits for the line connectors are interrupted by the above-mentioned off-normal contacts and the busying earth signal applied to the leads *l* extending to the route selector RS (FIG. 35) are removed when off-normal contacts *onc*1 open. The operating circuit for relay RL is also interrupted and relay RL releases. Contacts *rl*1 disconnect the operating circuit for relay RG which releases. When relay RG releases the operating circuit for relay KK is disconnected at contacts *rg*4 but before relay KK releases a re-operating circuit for relay RL is completed over back contacts *rg*2 and *rg*3 and off-normal contacts *ong*1 (FIGS. 17 and 12) of the group connectors G/C–G and G/C–D. Relay RL operates in series with the drive motors GCDM of the calling and called group connectors and at contacts *rl*2 a circuit is completed for holding relay KK (FIG. 13) operated. At the same time as the relay RL is operated the drive motors GCDM of the group connectors are effectively energized over their off-normal contacts *ong*1 so that the group connectors drive to their home positions. When both of the group connectors G/C–G and G/C–D home their drive circuits are interrupted by the off-normal contacts *ong*1 and these contacts also disconnect the operating circuit for the relay RL. Relay RL (FIG. 13) releases and in so doing the operating circuit for relay KK is disconnected at contacts *rl*2. Relay KK accordingly releases and contacts *kk*1 in restoring apply negative potential to the lead *bxl* while contacts *kk*3 apply earth potential to the lead *w* to signify to searching couplers such as CSL (FIG. 18) and to the route selector RS that the transmission bridge is once more free to be taken into use for another call.

In the foregoing description it has been assumed that the coupler CSL in the ring-and-tone circuit is successful in finding a free transmission bridge circuit XBL in the requisite link group identified in the link group store LIG (FIG. 31) of the controller LOC. By referring now to FIGS. 18 and 23 it will be observed that if the coupler CSL fails to find a free transmission bridge in the requisite link group the wiper of the coupler arc *csl*1 will apply the earth potential on the lead *wl* and extend it to the wiper over contacts *ka*1 to a lead *csb* when the coupler reaches its last outlet. This earth potential on the lead *csb* is applied to the bias input of a setting gate GS of a monostable transistor circuit TXB*e* (FIG. 23) and the latter circuit will be set by the next pulse on the lead *pl*10 applied to the pulse input of its setting gate GS. When the circuit TXB*e* sets the positive potential on the collector of its left-hand transistor is applied over a lead *txbl* to the pulse input of a resetting gate GR2 of the circuit CBN*e* which as will be recalled was set when the controller LOC was initially taken into use. This resetting gate GR2 being opened by the earth potential applied to its bias input from the right-hand transistor of the circuit CBN*e* allows the positive pulse on the lead *txbl* to reset the circuit CBN*e*.

When the circuit CBN*e* resets the negative potential on the collector of the right-hand transistor of the circuit CBN*e* is applied to the base of the transistor T*r*408 to render this transistor conducting. The resulting positive potential on the collector of transistor T*r*408 cuts-off transistor T*r*410 so that the operating circuit for relay KA (FIG. 18) over lead *kln* is disconnected.

As already described the resetting of circuit CBN*e* brings about the resetting of the circuits RTA*e* and RTB*e* as well as stopping the sequence pulse multivibrator SPM. The positive pulse on the lead *txbl* from the monostable circuit TXB*e* (FIG. 23) is also applied to additional resetting gates (not shown) of the set circuit SS*e* (FIG. 16) and of the circuits of the controller stores LIG, LGT, LCGI, LCG and LDT, LCDI, LCD so that the circuit SS*e* and the set circuits in these controller stores are reset.

The controller LOC is then free to be taken into use for a further call. As previously mentioned the circuit RTN*e* is reset to stop the ring-and-tone pulse generator RTM (FIG. 15) when negative potential is applied to the lead *brtn* over off-normal contacts CSLON (FIG. 18) consequent upon the coupler CSL being driven to its normal position.

In the foregoing description of the setting up of a call between the calling and called subscribers it has been assumed that reversal of the transmission bridge is not required. If, however, reversal of the bridge is necessary to establish a call then a negative signal will be applied to the base of a transistor T*r*490 (FIG. 36) in the route selector RS to render this transistor conducting and to cut-off a normally-conducting transistor T*r*491. The resulting negative potential on the collector of the transistor T*r*491 is applied over a lead *rvl* to the base of a transistor T*r*492 (FIG. 24) having its emitter earthed by the earth pulse on one of the leads *ple* when CBN*e* sets. The transistor T*r*492 conducts and applies earth potential to the base of a transistor T*r*493 to cut it off and the latter transistor when it cuts-off renders a further transistor T*r*494 conducting which accordingly applies earth potential to the lead *rvl'* to effect the operation of relay RV in the ring-and-tone circuit RTN (FIG. 18) over operated contacts *ka*6 of relay KA (FIG. 18). When transistor T*r*494 conducts an earth pulse is applied to the base of the left-hand transistor of a bistable circuit RV*e*. The left-hand transistor accordingly cuts off and causes the right-hand transistor to conduct to maintain the earth potential on the base of transistor T*r*493. Transistor T*r*493 and transistor T*r*494 accordingly remain non-conducting and conducting respectively when the earth pulse is removed from the lead *ple*.

When relay RV (FIG. 18) operates, contacts *rv*1 prepare a holding circuit for relay RV while contacts *rv*2 complete an operating circuit for a relay RW. Relay RW operates so that contacts *rw*1, *rw*2, *rw*3 and *rw*4, *rw*5, *rw*6 reverse the connections between the transmission bridge circuit XBL and the ring-and-tone circuit RTN consequent upon the operation of relay BR in the ring-and-tone circuit. In this event the calling line circuit LIG becomes the called line circuit whereas the called line circuit LID becomes the calling line circuit.

The setting up of a call takes place in the manner already described but with the ringing current being extended through the circuit LIG and the ringing tone being extended through the circuit LID.

The circuit RV*e* remains set until the circuit SST*e* (FIG. 16) is reset after the completion of a normal call as previously described, whereupon a positive pulse is applied over lead RST to the open resetting gate GR of the circuit RV*e* to reset the latter circuit and so render transistors T*r*493 and T*r*494 conducting and non-conducting, respectively. If, however, the coupler CSL (FIG. 18) fails to find a free transmission bridge in the requisite link group the circuit TXB*e* (FIG. 23) will be set in the manner previously described to apply a positive pulse to the lead *txbl*. This pulse will be applied to a further resetting gate (not shown) of the circuit RV*e* to reset the latter.

Referring to the ring-and-tone circuit RTN (FIG. 18) there is shown a transistor multivibrator circuit PPG for generating a positive signal on the lead *mb* for positive battery metering. For convenience, this circuit PPG is represented by the positive metering battery *pb* in the metering circuit. It will be remembered that relay HB (FIG. 18) was operated when the called line was tested free. When relay HB operates it locks up over its own contacts *hb*4. Earth potential is consequently applied to the ringer start lead over a rectifier (unreferenced) and also to the emitters of the left-hand and right-hand transistors of the circuit PPG. This causes the multivibrator PPG to be free-running (i.e. the transistors being alternately conducting and non-conducting) so as to produce a positive signal on the lead *mb*.

The register REG receives notification that the call is successfully completed when the line connector L/C–G arrives on the calling line LIG. When this happens a full earth signal is applied to the lead PG, this earth being extended from the local controller LOC at contact *tg*1 by way of ring-and-tone circuit RTN, transmission bridge XBL, the group connector G/C–G and the line connector L/C–G. In the register REG this earth signal cuts off a transistor T*r*497 causing a transistor T*r*498 to conduct and apply a positive signal to a resetting gate GR2 for the circuit H*e*, this resetting gate GR2 being biased open from the distributor D over lead *pld*. Circuit H*e* is therefore reset releasing relay HR and thereby clearing down both the register REG and the dial path DP.

Should the calling line circuit LIG be released by the replacing of the subscriber's handset before or during dialling the B element in the circuit ABC is rendered effectual and a positive B pulse is applied to turn over a monostable circuit BT*e*. After an interval determined by its circuit parameters the circuit BT*e* restores and applies a positive signal to the normally open resetting gate GRI for the circuit H*e*. Circuit H*e* therefore resets in this instance also causing relay HR to release and thus clearing down both the register REG and the dial path DP.

If the call is initiated by the line circuit LIG and the register REG is seized by a seized dial path DP but dialling does not take place for a period from 8–16 seconds then the usual S and Z pulses are effective for restoring the circuits. In this respect the occurrence of the S pulse sets a timing circuit S*e* (S pulse) via its normally open setting gate GS and in setting the circuit S*e* biases open the setting gate GS for a second timing circuit Z*e* (Z pulse). The Z pulse following the S pulse sets the circuit Z*e* thus causing a transistor T*r*499 to conduct and apply a positive signal via contact arc *rl*4 to the dial path DP to bring about the operation of a relay PGB therein to initiate a permanent glow condition well known in the telephone art. Change-over of contacts *pgb*2 and *pgb*5 interrupts the calling loop into the register REG so rendering the element B in the circuit ABC effectual, this element producing the B pulse which is effective to bring about the release of relay HR as for the known non-dialling release condition just referred to.

Dealing briefly with the circuit operations which take place in the case of a trunk call, connection to the calling line is made in the same manner as for a local or changed-number call while connection to an outgoing junction is made in a similar manner as for a changed-number call, the only difference being that in the translator TX (FIG. 37) strappings to the translation elements T*ce*1 to T*ce*4 are made from a trunk digit translation element T*xe* (FIG. 38) (corresponding to changed number element C*xe*). However, in this instance routing digits may be required to be transmitted over the outgoing junction and these routing digits are provided by the translation elements T*xe*1 to T*xen* which are also strapped to the element T*xe*. The fifth dialled digit from the register REG applied through the decoder D*b*5 and over the lead group C(10)5 is intended to signify the one or more dialled digits in excess of four which are applied to the trunk digit translation element T*xe* and from which the appropriate number of digit combinations is supplied for the additional strapping connections acquired from the translation element T*xe* to the translation elements T*xe*1 to T*xen*. As mentioned at the beginning of this specification where the general layout of the exchange was considered, a trunk controller, instead of a local controller, is taken into use for a trunk call and this trunk controller in addition to receiving the markings identifying the calling line and the 1N and 2N markings of the called line identifying the outgoing junction on the appropriate group connector, also receives and records the translation markings provided by the elements T*xe*1 to T*xen*. These markings are fed to the trunk controller via the gating transistors in the groups T*r*299 to T*r*308, T*r*309 to T*r*318, T*r*319 to T*r*328, T*r*329 to T*r*338 and T*r*339 to T*r*348 and respective encoders E*x*1 to E*xn* when the sequence control circuit SCC (FIG. 43) applies the positive gating signal to the lead *scl*4. In order that the sequence control circuit shall provide such signal the transistor T*r*255 in the translator TX has its base strapped over a connection (not shown), such as *t/cn*, to one of the output rectifiers in the element T*xe* whereby to bring about the application over lead *cnl* of a positive signal which is effective to set the circuit MT*e* in the sequence control circuit SCC in similar fashion to the setting of this circuit as a result of a changed number code.

In addition to the digits identifying the outgoing junction and the routing digits received by the register REG and appropriately translated by the translator TX, further digits, for instance numericals, may be subsequently received in the dialling sequence for transmission without translation over the outgoing junction. To this end the register, such as REG, would be provided with additional stores (not shown) for recording these further digits which may then be sent directly to the trunk controller without the translator TX being further involved. A possible way of achieving this would be for the identity of the trunk controller to be recorded to all the registers by applying to the latter over lead groups *lk*1 and *lk*2 markings identifying the trunk controller. In the register dealing with the call, transistors T*rrk*1–T*rrk*4 and T*rrk*5–T*rrk*8 would have earth potential connected to their emitters from transistor T*r*45 so that these transistors, rendered conducting in combinations corresponding to the markings, apply setting pulses to the setting gates GS of two stores TRK*s*1 and TRK*s*2 each comprising four bistable circuits T*rke*1 to T*rke*4 and T*rke*5 to T*rke*8 which thereby record the trunk controller identity in these stores. Thus, when this register has received the additional dialled digits and applies to the scanner over the request lead *rl* for a subsequent coupling to the trunk controller, the scanner proceed signal on lead *prl* is effective to render the transistor T*r*45 conducting as for normal register operation so that gating transistors T*rrk*1′ to T*rrk*4′ and T*rrk*5′ to T*rrk*8′ associated respectively with circuits T*rke*1 to T*rke*8 are selectively rendered conducting according to the setting of these stores and apply over respective lead groups *lk*3 and *lk*4 markings which are effective to identify the particular trunk controller involved in the call. Since when the register REG functions in this manner it applies to and receives from the register scanner circuit (FIG. 44) signals which are the same as when the register functioned in the manner described earlier, these two functions of the register REG have to be distinguished from each other and this is achieved by the trunk controller applying to the register over a lead *tkl* a negative signal which renders conducting a transistor T*r*495 to bring about the setting of a bistable circuit RC*e*. With this circuit RC*e* set and when the application of the negative signal from the scanner on lead *prl* has resulted in transistor T*r*45 becoming conducting a transistor T*r*496 is rendered conducting instead of transistor T*r*74 so that instead of a positive signal being applied to the sequence control circuit over lead *ssl*1 a positive signal is applied thereto over lead *ssl*3. In the circuit SCC the positive signal on the lead *ssl*3 sets a bistable element TD*e* (trunk digit transfer couple) via its setting gate GS. With the circuit TD*e* set the setting gate GS for a bistable circuit TT*e* (trunk digit transmit) is open so that the next pulse on the lead *pl*6 from the continuously running multivibrator circuit MV*e* sets the circuit TT*e* so rendering a transistor T*r*497 conducting to apply over sequence control lead *scl*8 a positive signal which is effective to gate into the trunk controller in a manner not shown, the trunk controller identification markings on the lead groups *lk*3 and *lk*4 so enabling this trunk controller to be rendered effectual and to receive and record in suitable stores further digit markings representing numericals from the register REG.

The trunk controller thereafter counts out these stores to transmit corresponding digits over the outgoing junction. In the sequence control circuit SCC setting of the circuit TT*e* opens a setting gate GS3 for the release circuit R*e* and the next pulse on the lead *pl*6 is applied through the gate GS3 to set the circuit R*e* thereby rendering conducting transistors T*r*76 and T*r*77 rendering non-conducting transistor T*r*75 to halt the operation of the circuit SSC and to bring about the release of the register in a manner previously described.

Figure 32:
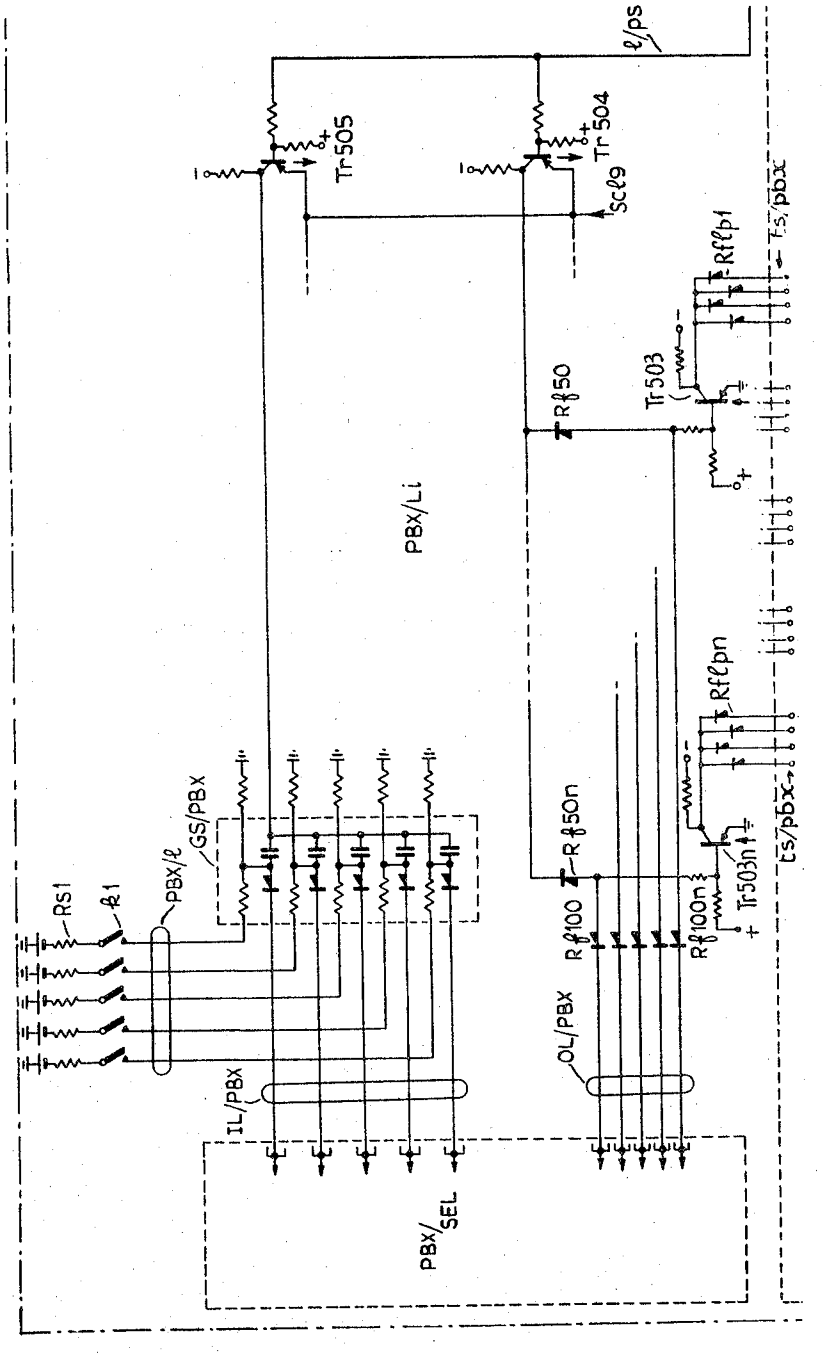
Figure 33A:
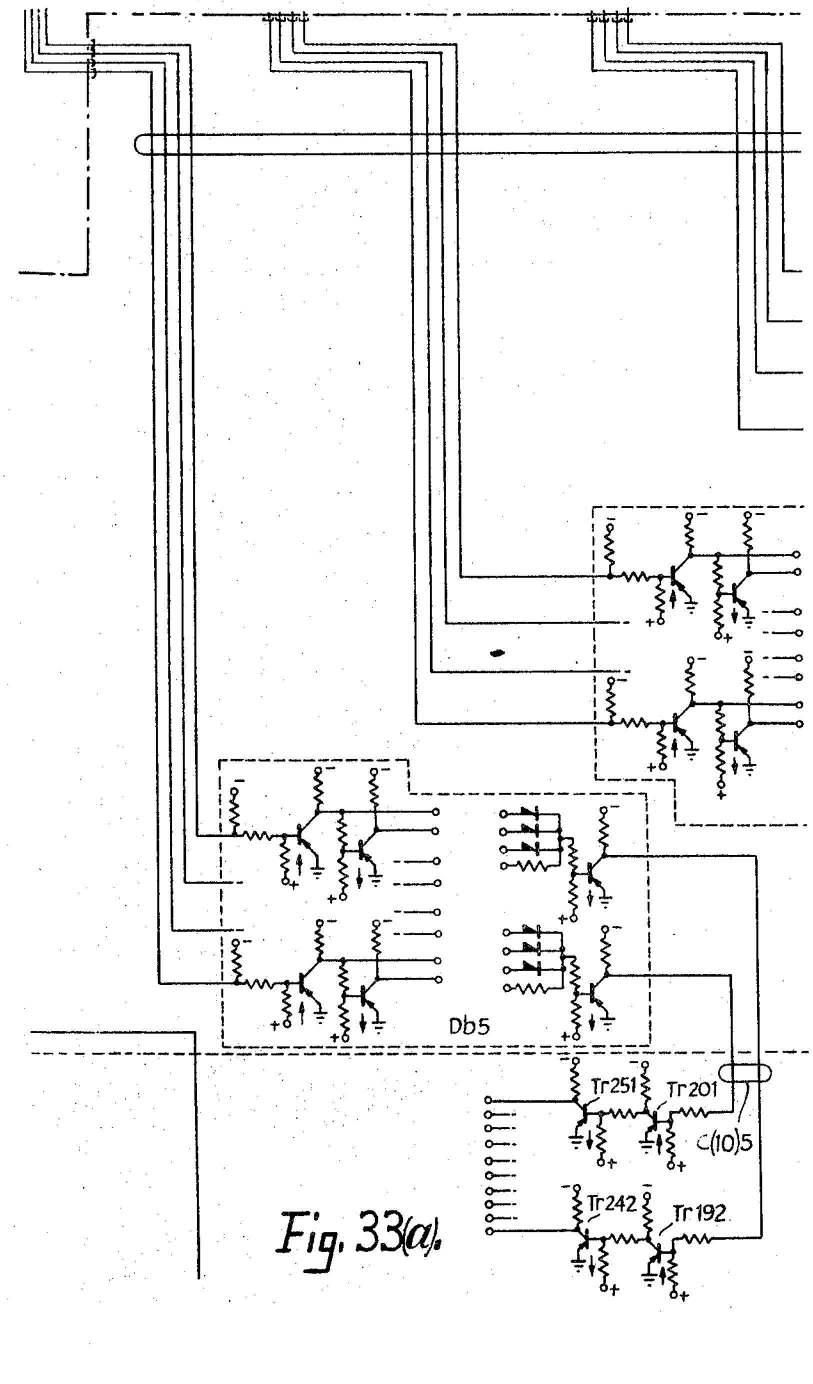
Figure 33B:
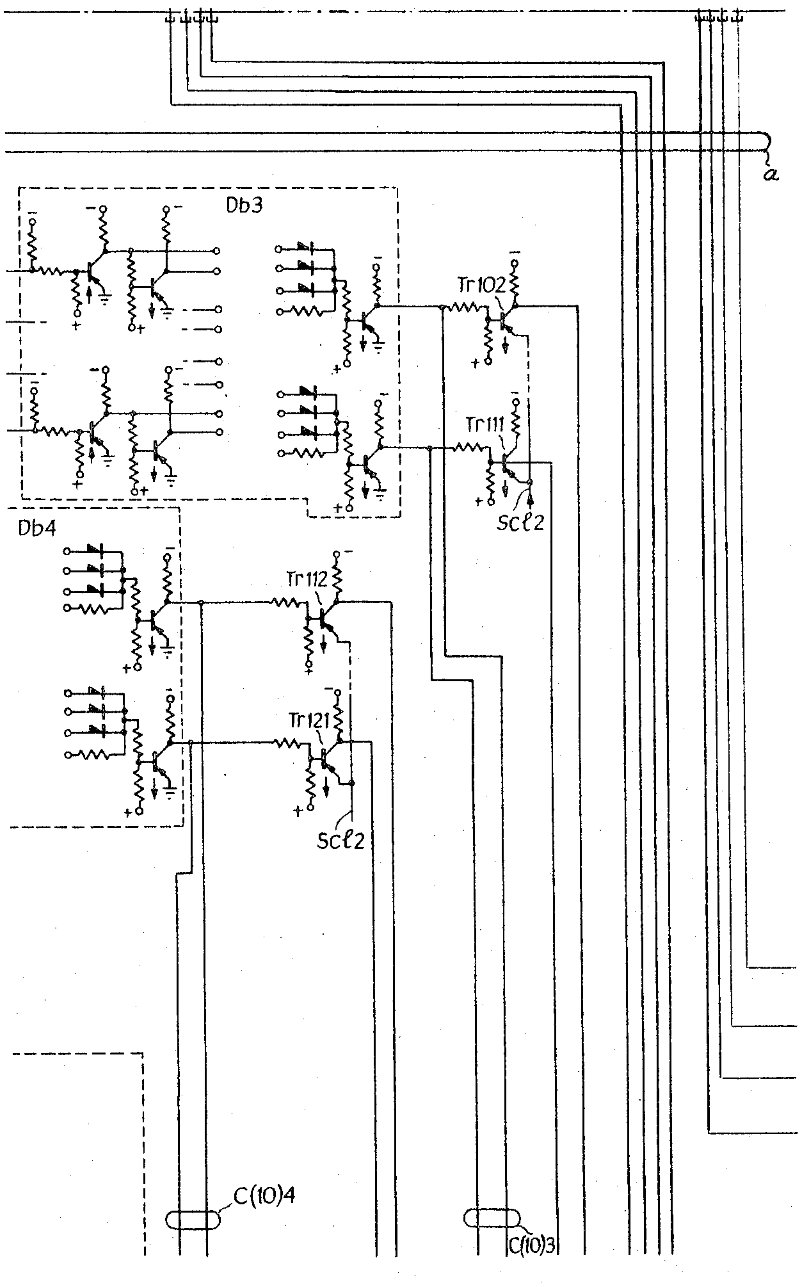
Figure 34A:
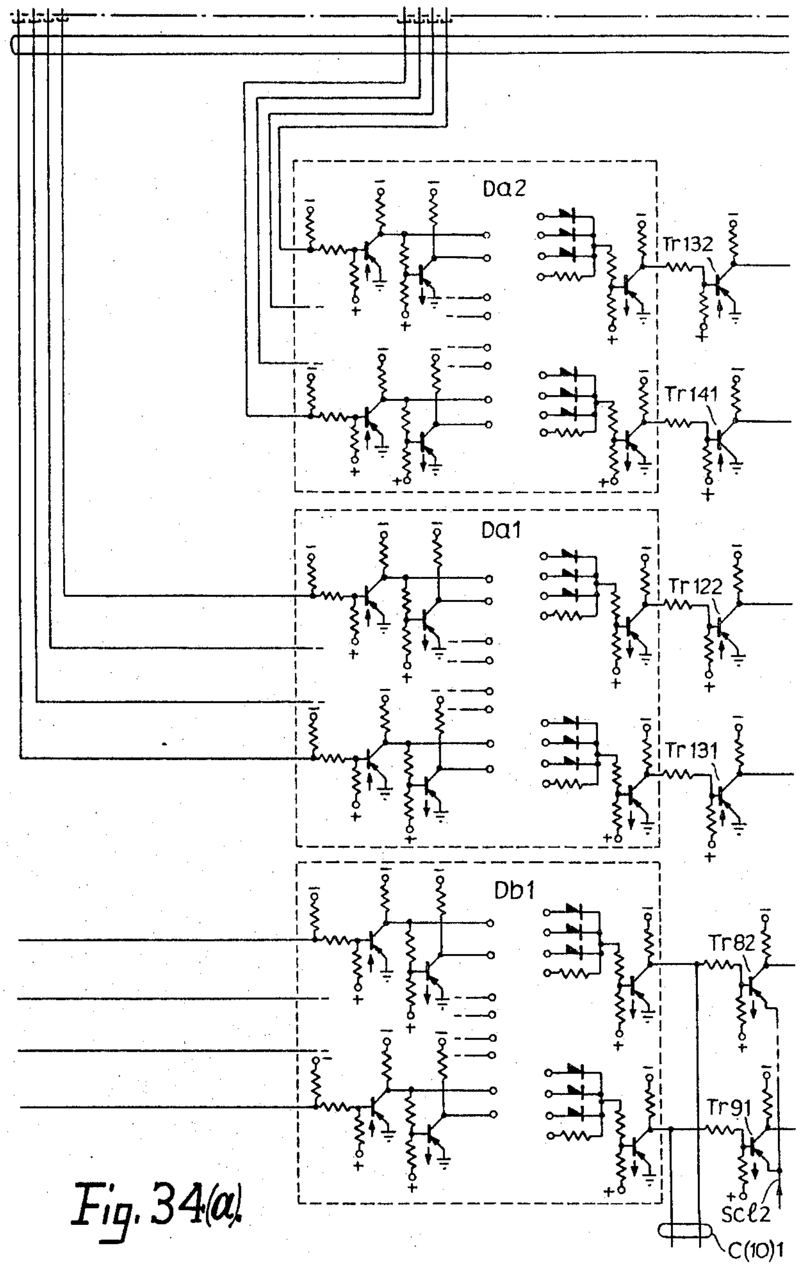
Figure 34B:
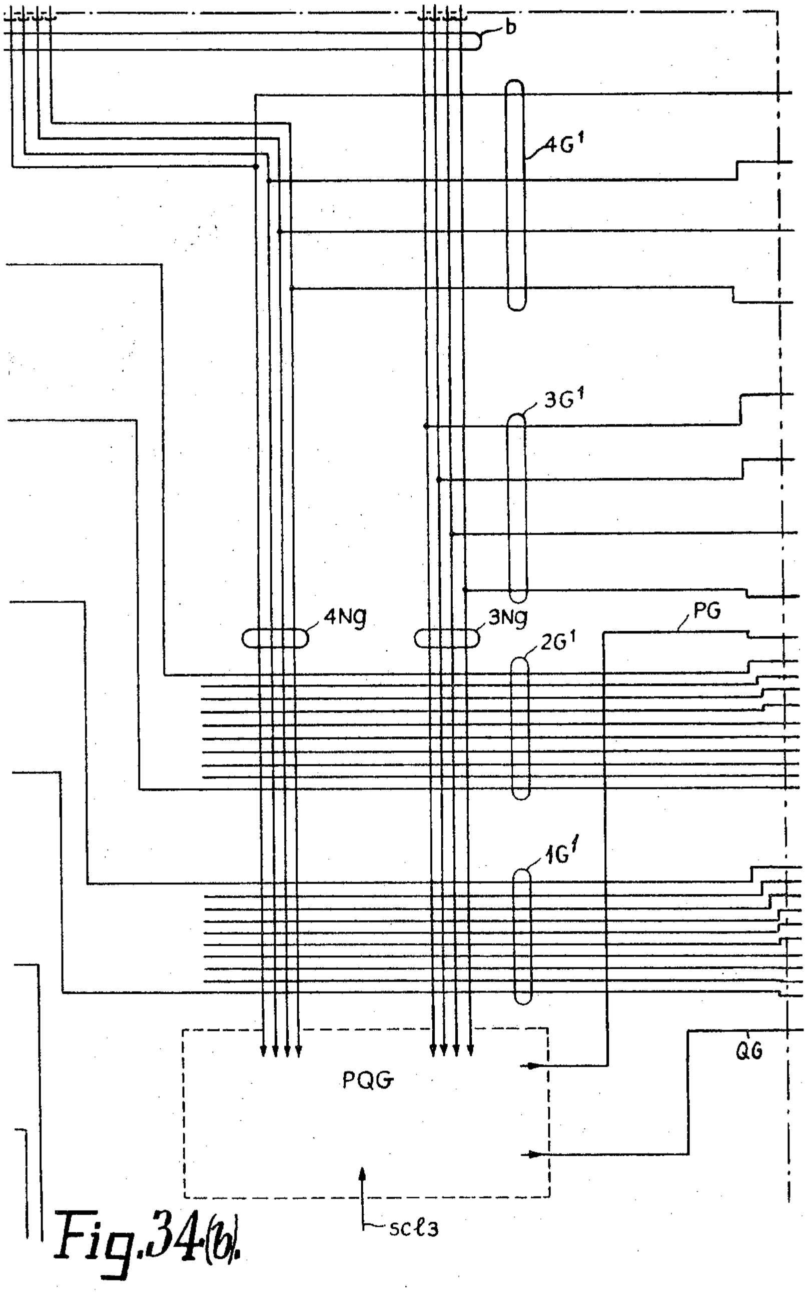

In the case of a PBX call the operation of the translator TX is achieved by strapping connections to a PBX identification circuit PBX*e* provided at least for the directory line of the group and comprising a normally-conducting transistor T*r*502 which has a single output rectifier R*f*PBX which is strapped over a strapping connection such as *t/cn* to the base of a transistor T*r*256. The collector of this transistor T*r*256 is connected over a lead *pbx/sl* to a normally-open setting gate GS for a bistable circuit PB*e* (PBX IDENTIFICATION) in the sequence control circuit SCC (FIG. 43) so that when the sequence control circuit applies its signal over lead *scl*1 to render conducting the transistor T*r*254 in the translator TX, transistor T*r*256 is rendered conducting to apply a positive signal over the lead *pbx/sl* to set the circuit PB*e*. The action of the sequence control circuit SCC in the case of a PBX call is similar to that as already described for a changed-number call in that when the circuit PB*e* is set it opens a setting gate GS2 for the circuit CO*e* so that this latter circuit is set to the next pulse on the lead *pl*6 and in setting, sets the circuit TC*e* via its normally-open setting gate GS to bring about the application of a positive signal to the sequence control lead *scl*4 and of a negative signal to the sequence control lead *scl*4*a*. For each group of PBX lines there is provided in addition to the PBX identification circuit, such as PBX*e*, a PBX line location circuit PBX/L*i* (FIG. 32). For the lines in the PBX group, this circuit PBX/L*i* includes individual transistors T*r*503 to T*r*503*n*, which have their collectors connected through respective groups of four rectifiers R*flp*1 to R*flpn* to groups of strapping terminals *ts/pbx*. The terminals in each of these groups are strapped to a particular one of the terminals *ts* in each of the translation elements T*ce*1 to T*ce*4 in accordance with the particular PBX line to which the associated one of their transistors T*r*503 to T*r*503*n* pertains. The transistors T*r*503 to T*r*503*n* are connected to be normally conducting on the one hand from a transistor T*r*504 by a negative signal extended through rectifiers R*f*50 to R*f*50*n* from the collector of transistor T*r*504 and, on the other hand, by a negative signal extended via rectifiers R*f*100 to R*f*100N from a group of output leads OL/PBX of a PBX one-only choice circuit PBX/SEL. The base of the transistor T*r*504, in common with the base of a transistor T*r*505, also provided individually to a PBX group of lines, is connected over a lead *l/ps* to the collector of the transistor T*r*502 in the PBX identification circuit PBX*e*. Thus, when this latter transistor is rendered non-conducting by the co-incidence at its base of positive signals on the relevant leads in the lead group C(10)1 to C(10)4 in addition to the transistor T*r*256 being rendered conducting, to extend the PBX start signal to the sequence control circuit SCC over lead *pbx/sl*, the bases of the transistors T*r*504 and T*r*505 are primed with negative signals. With the circuit PB*e* set in the sequence control circuit SCC a transistor T*r*501 is rendered conducting to apply a positive signal over a sequence control lead *scl*9. In the PBX line location circuit PBX/L*i* this positive signal is applied to the emitters of transistors T*r*504 and T*r*505 (and also to the PBX line location circuits such as PBX/L*i* of other PBX groups) to render these transistors T*r*504 and T*r*505 conducting. The resulting positive potential at the collector of transistor T*r*504 backs off rectifiers R*f*50 to R*f*50*n*, but transistors T*r*503 . . . T*r*503*n* are held conducting at this time by the other nagative signal applied to their bases from the circuit PBX/SEL via retifiers R*f*100 . . . R*f*100*n*. When transistor T*r*505 is rendered conducting it applies a positive signal from its collector to the pulse inputs of a group of gates GS/PBX there being one of these gates for each PBX line of the group. The bias inputs of these gates are controlled from their respective lines such that each gate is normally open when its line is free but is closed when the line is busy by the presence at the bias input of a negative signal extended thereto via lead PBX/*l* and contacts *k*1 and resistance *rs*1 in the line circuit LIG. Thus when these gates in the group GS/PBX receive the positive signal from transistor T*r*505 those pertaining to free lines in the PBX group will pass positive signals over the relevant one of the leads in the group of leads IL/PBX to the selector circuit PBX/SEL. This latter circuit functions in a manner to be described next with reference to FIG. 50 to select one of the PBX lines that are marked free, this selection being indicated to the PBX identification circuit PBX/L*i* by a positive signal on the relevant one of the leads OL/PBX. This positive signal backs off an associated one of the rectifiers R*f*100 . . . R*f*100*n* so that the particular one of the transistors T*r*503 . . . T*r*503*n* pertaining to the selected PBX line is cut off and extends a negative signal via the relevant group of rectifiers R*flp*1 . . . *Rflpn* to the translation elements T*ce*1–T*ce*4 in the translator TX in correspondence with the strapping connections between the terminals *ts* of these elements and the relevant group of four terminals *tspbx* of the PBX line location circuit PBX/L*i*. The translator TX thereafter functions as already described to extend markings identifying the PBX line to the line location identifier LI.

It is evident that the foregoing circuit arrangement for PBX line identification allows the lines of the PBX group to be located in random fashion in the line connector multiples, that is some of the lines of a PBX group may be served by one line connector group and others by further line connector groups, this being possible because the arrangement provides all four digit markings of PBX lines. As a possible modification in the case of large groups of PBX lines, and where the traffic carried by these lines justifies their physical grouping, a single PBX identification circuit such as circuit PBX*e*, relating to such a group, may have strapping connections which extend between the collector of its transistor such as transistor T*r*502 and the relevant *ts* terminals in order to identify the first and second numerical digits common to all PBX lines of the group, while the individual third and fourth numerical digits of each line of the group will be provided by strapping connections between the relevant terminals *ts* and pairs of terminals such as *ts/pbx* (one such pair for each PBX line) of a PBX line location circuit, such as PBX/L*i*, associated with the PBX group.

The PBX selector circuit PBX/SEL (FIG. 50) is provided in common to all the PBX groups of lines of the exchange and comprises a plurality of bistable circuits PSX*e*1 . . . PSX*e*N, one circuit being provided for each line in any PBX group. The input leads IL/PBX from the line location circuits such as PBX/L*i* are connected respectively to setting gates GS individual to circuits PSX*e*1 . . . PSX*e*N. The circuits PSX*e*1 . . . PSX*e*N are conveniently arranged in groups of five, such as PSX*e*1–PSX*e*5, with the collectors of the transistors of the circuits of each group being connected to respective pairs of busy/free marking terminals AL–AR, BL–BR, CL–CR, DL–DR and EL–ER, each terminal suffixed R of a pair being normally held at a negative potential and each terminal suffixed L being normally held at a positive potential. The terminals AL . . . ER connected to the group of circuits PSX*e*1–PSX*e*5 are cross-connected as indicated to an individual group of rectifier gates G/PBX1, G/PBX2, G/PBX3, G/PBX4 and G/PBX5, which feed respectively transistors T*r*700 T*r*701, T*r*702, T*r*703 and T*r*704 cascade-connected respectively with transistors T*r*705, T*r*706, T*r*707, T*r*708 and T*r*709, the collectors of these latter transistors being connected to individual leads in the lead group OL/PBX. The gates G/PBX1–G/PBX5 pertain respectively to the same five lines as the circuits PSX*e*1–PBX*e*5 and as a consequence of the cross-connections indicated are effective for choosing a free line in the group of five giving priority towards one end. When a PBX line selection is to be made positive signals pertaining to free PBX lines in the group concerned will appear on the relevant leads of the group IL/PBX to set appertaining circuits of the group PSX*e*1–PSX*e*5. Considering by way of example the case where all the PBX lines in the group (five) are free all the elements in the group PSX*e*1–PSX*e*5 will become set so that terminals AL, BL, CL, DL and EL will go negative and terminals AR, BR, CR, DR and ER positive. These signal conditions at the gates G/PBX1–G/PBX5 result in the closure of gate G/PBX1 since this is the only gate which does not have a negative signal applied to it. With gate G/PBX1 closed transistor T*r*700 is cut off so causing transistor T*r*705 to become conducting to apply over the lead in the group OL/PBX a positive signal pertaining to the first PBX line. This signal as already described, indicates in the line location circuit PBX/L*i* that this first PBX line has been selected for the call. If this first PBX line had already been engaged in a call, then the marking of the lead group IL/PBX would have been such as to prevent the circuit PSX*e*1 from being set. In this instance therefore gate G/PBX1 would have remained open by the continued presence of the negative signal at terminal AR while the coincidence at the gate G/PBX2 of positive signals from terminals BR and AL would have closed this gate instead whereby to cut-off transistor T*r*701 and render conducting transistor T*r*706, the positive signal at the collector of the latter signifying that the second PBX line in the group had been selected for the call. Gate G/PBX2 is closed if the first two lines of the PBX group are busy to cause a selection to be made through gate G/PBX3 and so on.

Where a PBX group of lines is sufficiently large to require two or more groups of five of the circuits PSX*e*1 . . . PSX*e*N a cascade-connected transistor pair, such as transistors T*r*710 and T*r*711, associated with one group of five lines extends a negative signal over a lead such as *il*/PBX to the five gates (unreferenced) associated with the succeeding group of five lines to maintain these gates open and thus prevent them from making a selection of a free line so long as a free line remains in the preceding group of five lines. When all five lines in the preceding group of five are busy, the five "L" terminals are all at positive potential so that a group-busy gate G/PBXH is closed to cause transistor T*r*710 to cut off. This renders transistor T*r*711 conducting to remove from the lead *il*/PBX the negative signal maintaining the succeeding group of five gates open and thereby enabling the selection of a free PBX line to be made by these latter gates.

Figure 44A:
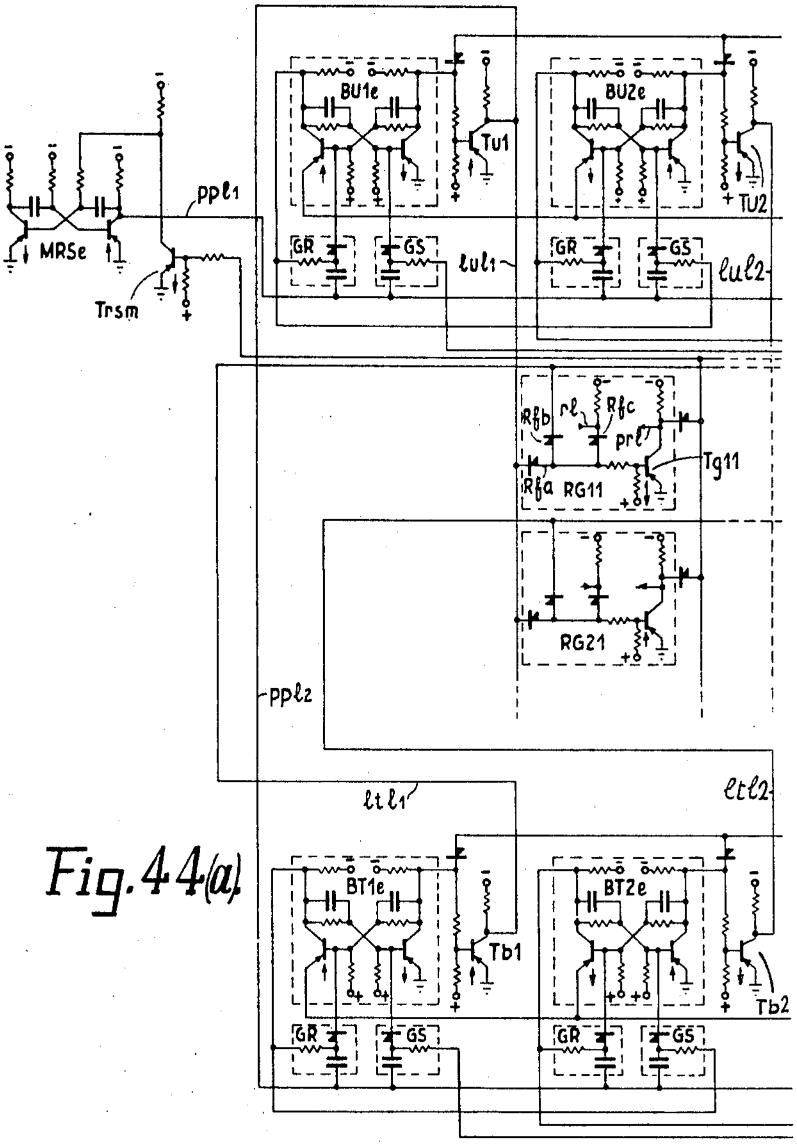
Figure 44B:
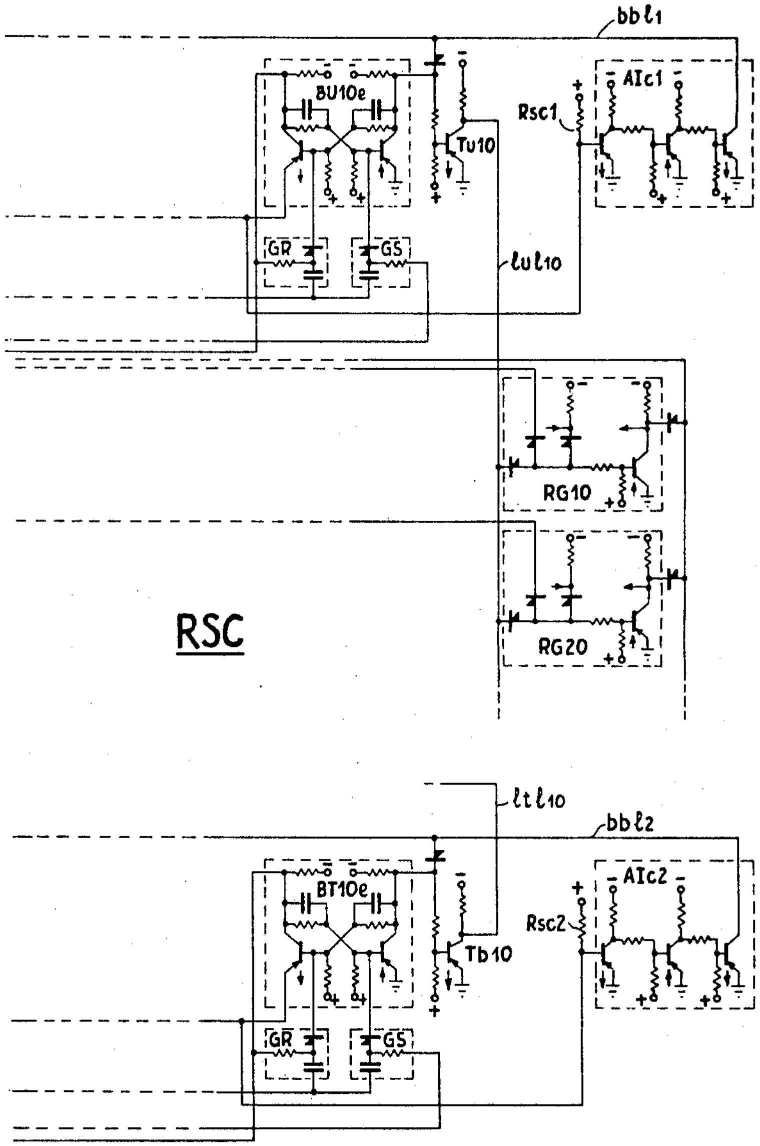

The function of the register scanner shown in FIG. 44 is to examine the registers such as REG sequentially to discover whether any of them requires to be coupled to the line location identifier LI. Upon finding a register requiring to be coupled, the scanner stops and the register concerned is connected to the line location identifier LI as already described, for a period sufficient to allow the necessary transfer of information.

The register scanner circuit comprises two sets of ten bistable circuits BU1*e*–BU10*e* and BT1*e*–BT10*e* controlled by a multivibrator circuit MRS*e*, and one hundred register gates GR00–GR99 pertaining respectively to the registers of the exchange. Of these bistable circuits and gates only the circuits BU1*e*, BU2*e*, BU10*e*, BT1*e*, BT2*e*, BT10*e* and the gates GR11, GR10, RG21 and RG20 have been shown in the drawing. The circuits BU1*e*–BU10*e* are interconnected to form a first one-out-of-ten cyclic counter which is driven by pulses applied to it over a lead *ppl*1 from the multivibrator circuit MRS*e* and the circuits BT1*e*–BT10*e* are interconnected to form a second one-out-of-ten cyclic counter which is driven by pulses applied to it over a lead *ppl*2 from the first counter upon each cycle of the latter. Each of these two counters is arranged so that only one of its circuits is set at any time, the other circuits being reset, and that when a pulse is applied to the counter the set circuit is reset and the circuit next to it is set. To this end in the case of the first counter the circuit BU1*e* when set is connected to bias open its own resetting gate GR and the setting gate GS for the circuit BU2*e*: the circuit BU2*e* when set is connected to bias open its own resetting gate GR and the resetting gate GS for the circuit BU3*e* and so on. Since the operation of the count is cyclic the circuit BU10*e* opens its own resetting gate GR and the setting gate GS for the circuit BU1*e*. Thus, in general, the application of a positive pulse to the lead *ppl*1 will reset the circuit that is set and set the circuit which has its setting gate opened by the set circuit. In order to make the "one-only" action of the counter as reliable as possible the left-hand transistors of the circuits BU1*e*–BU10*e* are commoned through a resistance R*sc*1 to a positive supply terminl (+). The value of the resistance R*sc*1 and the potential at this terminal are such that when one of the circuits BU1*e*–BU10*e* is set the potential of these commoned emitters is near earth. When the next circuit starts to set in response to a positive pulse on the lead *ppl*1, the potential of the commoned emitters goes negative causing an amplifying and inverting circuit AI*c*1, comprising three cascade-connected transistors, to bring about the application of a positive signal to a lead *bbl*1 which is connected through respective rectifiers (unreferenced) to the collectors of the right-hand transistors of the circuits BU1*e*–BU10*e*. This positive signal attempts to reset all the circuits BU1*e*–BU10*e* thus aiding the resetting of the previously set circuit. It does not affect the setting of the next circuit by the applied pulse on lead *ppl*1. The second counter comprising elements BT1*e*–BT10*e* is similarly organised, having associated therewith a common emitter resistance R*sc*2 and an amplifying and inverting circuit AI*c*2 and a lead *bbl*2.

Circuits BU1*e*–BU10*e* and BT1*e*–BT10*e* have respective output transistors T*u*1–T*u*10 and T*b*1–T*b*10 which when their appertaining circuit is set are rendered conducting to apply a positive signal to respective leads *lul*1–*lul*10 and *ltl*1–*ltl*10. These leads are cross-connected matrix-wise through the gates RG00–RG99 and the positive signals thereon constitute opening signals for these gates. Considering the gate RG11 for example and assuming that this gate pertains to the register REG, when in the cyclic operation of the two counters the circuits BU1*e* and BT1*e* are both set positive signals are applied over leads *lul*1 and *ltl*1 respectively to the gate RG11. The gates RG21, RG31 . . . etc. and RG11, RG12 . . . etc. are also receiving one positive signal from one or the other of these leads but only the gate RG11 is receiving the coincidence of these positive signals, thereby signifying that the register REG has been allocated the use of the line location identifier LI. If the register REG requires to be coupled to the line location identifier LI at this time then it will be extending a positive signal over its request lead *rl* (FIG. 27) as previously described and the coincidence of the three positive signals on the gate RG11 backs off respective rectifiers R*fa*, R*fb*, R*fc* . . . to cut-off a normally-conducting transistor T*g*11. With this transistor T*g*11 non-conducting the resultant negative signal on its collector is extended over the proceed lead *prl* to the register REG for utilisation therein as already described.

The negative signal at the collector of the transistor T*g*11 is also applied to the base of a transistor T*rsm* in the scanner circuit thereby rendering this transistor conducting to produce at its collector a positive signal which stops the action of the multivibrator circuit MRSE. This halts the scanner operation. The scanning action remains inhibited in this way until the release signal is applied from the sequence control circuit over lead *rsl* (FIG. 43) to reset the circuit A*e* in the register REG (FIG. 27) and so bring about the removal of the positive signal on the request lead *rl*. This re-closes the gate RG11, cutting off transistor T*rsm*, to allow the scanning action of the scanning circuit to re-commence.

The line connector choice circuit LCE in the route selector RS may take the form shown in FIGS. 45 and 46 which should be placed side-by-side with FIG. 45 to the left of FIG. 46 to make up the circuit. As mentioned previously, the function of the circuit LCE is to select two free line connectors in its associated exchange section, one for establishing a connection to the called line and the other for establishing a connection to the calling line. The circuit LCE comprises five bistable circuits LSG*e*1–LSG*e*5 for recording the busy/free conditions of the five possible line connectors which can be used for the calling line, and five bistable circuits LSD*e*1–LSD*e*5 for recording the busy/free conditions of the five possible line connectors which can be used for the called line. The outputs of the five calling line connector gates in each of the groups of gates GL*g*1–GL*g*100 (FIG. 35) are connected respectively to input terminals *ttg*1–*ttg*5 which are connected to the pulse inputs of setting gates GS for the circuits LSG*e*1–LSG*e*5, and the outputs of the five called line connector gates in each of the groups of gates GL*d*1–GL*d*100 (FIG. 40) are connected respectively to input terminals *ttd*1–*ttd*5 which are connected to the pulse inputs of setting gates GS for the circuits LSD*e*1–LSD*e*5.

When a particular one of the double-gating circuits in the group LCG (FIG. 35) is opened to produce a positive signal on the relevant *sg* lead in the group of leads *sg*1–*sg*100, this positive signal passes through the gates of the relevant group GL*g*1–GL*g*100 which pertain to busy line connectors in the sub-group of five having access to the calling line, and through the corresponding setting gates in the circuit LCE to set those of the circuits LSG*e*1–LSG*e*5 which these setting gates feed. Similarly, when a particular one of the double-gating circuits in the group LCD (FIG. 40) is opened to produce a positive signal on the relevant *sd* lead in the group of leads *sd*1–*sd*100, this positive signal passes through the gates of the relevant group GL*d*1–GL*d*100 which pertain to busy line connectors in the sub-group of five having access to the called line, and through the corresponding setting gates in the circuit LCE to set those of the circuits LSD*e*1–LSD*e*5 which these setting gates feed. The circuits LSG*e*1–LSG*e*5 and LSD*e*1–LSD*e*5 are thus operated to assume respective patterns of set and reset circuits indicative of the busy/free condition of the calling or called line connector sub-group, as the case may be.

Pairs of feeder transistors T*rf*1/T*rf*2, T*rf*3/T*rf*4, T*rf*5/T*rf*6, T*rf*7/T*rf*8 and T*rf*9/T*rf*10 feed the state of the bistable circuits LSG*e*1–LSG*e*5 on to output terminals AB/AF, BB/BF, CB/CF, DB/DF and EB/EF respectively, as positive or negative signals; each "B" output terminal normally receiving a positive signal and receiving a negative signal when its associated bistable circuit is set, indicating that the line connector to which it corresponds is busy, and each "F" output terminal normally receiving a negative signal when its associated bistable circuit is reset indicating that the line connector to which it corresponds is free. Pairs of feeder transistors T*rf*11/T*rf*12, T*rf*13/T*rf*14, T*rf*15/T*rf*16, T*rf*17/T*rf*18, and T*rf*19/T*rf*20 likewise feed the state of the bistable circuits LSD*e*1–LSD*e*5 as positive or negative signals on to similar output terminals AB . . . EF.

Selection of a free (calling) line connector is achieved by gates GCGA . . . GCGE with associated transistors T*r*GCA . . . T*r*GCE, and selection of a free (called) line connector is achieved by gates GCD*a* . . . GDCE with associated transistors T*r*DCA . . . T*r*DCE. Input terminals ITG and ITD of these gates are connected to the respective groups of output terminals AB . . . EF as indicated. The collectors of the transistors T*r*GCA . . . T*r*GCE and T*r*DCA . . . T*r*DCE, are connected through individual rectifiers (unreferenced) to respective rectifier groups R*f*G and R*f*D to binary marking leads *lrg* and *lrd* which are connected to the bases of the transistors T*r*397 to T*r*399 and T*r*400 to T*r*402 in FIGS. 35 and 40. The gates GCGA . . . GCGE select between them a free line connector (calling) in the sub-group of five available, giving priority towards one end. For example, if the line connector to which the circuit LSG*e*1 corresponds is free this circuit will be in its reset state so that the negative signal at terminal AF will hold conducting all of the transistors T*r*GCA . . . T*r*GCE except the first one, that is transistor T*r*GCA. The negative signal from the collector of transistor T*r*GCA is converted into the appropriate binary marking output signals, identifying the selected line connector (calling) by the cross-connections of the rectifier group R*f*G. In the same fashion, the gates GCDA . . . GCDE select between them a free line connector (called) in the sub-group of five available, giving priority towards one end and the negative potential at the collector of the non-conducting transistor in the group T*r*DCA . . . T*r*DCE is converted into the appropriate binary marking output signals, identifying the selected line connector (called), by the cross-connections of the rectifier group R*f*D.

The choosing towards one end of a free line connector (either calling or called) could give rise to excessive traffic being handled by the early choice line connectors. With a view to more evenly distributing the traffic over the line connectors there is provided a second group of gates GCGA′ . . . GCGE′ and associated transistors T*r*GCE′ . . . T*r*GCA′ in respect of calling line connectors and a second group of gates GCDA′ . . . GCDE′ and associated transistors T*r*DCE′ . . . T*r*DCA′ in respect of called line connectors. The connections between the respective groups of output terminals AB . . . EF and input terminals ITG′ and ITD′ for these latter gates are, as indicated, inverted with respect to their connection to the input terminals ITG and ITD, so that priority of choice of a free line connector is given towards the opposite end by these latter gates. The gates GCGA . . . GCGE and GCGA′ . . . GCGE′ respectively, on the one hand, and the gates GCDA . . . GCDE and GCDA′ . . . GCDE′ respectively on the other hand, are rendered effectual alternatively to reverse the end from which a free line connector is chosen by means of positive signals applied to them over respective leads *opl* and *opl′* from the collectors of two transistors T*ro* and T*ro′* which are controlled by a bistable circuit GO*e*. With this circuit GO*e* reset, the transistor T*ro* is conducting so that a positive signal is applied to lead *opl* to render ineffectual the gates GCGA . . . GCGE and GCDA . . . GCDE, and with the circuit GO*e* set, the transistor T*ro′* is conducting so that a positive signal is applied to lead *opl′* to render effectual the gates GCGA′ . . . GCGE′ and GCDA′ . . . GCDE′. The circuit GO*e* is changed in state each time the route selector RS is taken into use by a positive signal applied to its setting and resetting gates GS.GR from the sequence control circuit. SCC over lead *scl*5*a*. This positive signal on lead *scl*5*a* also serves to reset the circuits LSG*e*1–LSG*e*5 and LSD*e*1–LSD*e*5 via their resetting gates (not shown) immediately prior to the line connector choice action.

It would of course be possible to even out the traffic over the line connectors to a certain extent by making the called side choice from one end and the calling side choice from the other end, thereby avoiding the need for the additional gating assemblies and the bistable circuit GO*e*. However, this alternative would be suitable only if the incoming and outgoing traffic was reasonably equal.

If, as may be the case, the calling and called lines are served by the same line connector sub-group, the possibility of the same line connector being chosen both for the calling line and the called line is avoided as follows. If the route selector RS ascertains that the calling and called lines are served by the same line connector sub-group a negative signal is received from it over a lead *lg*/*ld* from a gating transistor such as T*rgd*1 and T*rgd*100 (FIG. 35 or FIG. 40) and this signal renders conducting a transistor T*rss* (FIG. 45). When the transistor T*rss* conducts the resulting positive (earth) potential at its collector is applied to the emitters of five transistors T*rs*1–T*rs*5 which have their bases connected respectively to the collectors of the transistors T*r*GCA . . . T*r*GCE. In consequence, when one of these latter transistors is rendered non-conducting to produce at its collector a negative signal indicating a choice of a free line connector (calling) the relevant one of the transistors T*rs*1–T*rs*5 is rendered conducting to produce at its collector a positive signal which is applied to the base of the relevant one of the feeder transistors T*rf*11, T*rf*13, T*rf*15, T*rf*17, and T*rf*19, to render these transistors non-conducting. This therefore effectively marks busy the line connector chosen for the calling line and so the same line connector cannot be chosen for the called line.

If there is no free line connector of a sub-group available for establishing connection to the calling line then a busy gate GBG is opened and a transistor T*rbg* associated therewith is cut-off to apply from its collector a negative signal over a lead *blc*2′ to the base of a transistor T*rbb* to render this transistor conducting. The resulting earth signal at the collector of this transistor is applied over a lead A*blc*2 to the summator circuit TS for the relevant exchange section for utilisation therein, as will be described. Similarly if there is no free line connector of a sub-group available for establishing connection to the called line, then a busy gate GBD is opened and a transistor T*rbd* associated therewith is cut-off to apply from its collector a negative signal over a lead *blc*2″ to the base of transistor T*rbb* to render this transistor conducting to produce the earth signal on lead A*blc*2. The transistor T*rbb* is also rendered conducting by a negative signal applied to its base from a bistable circuit BB*e* when this circuit is set by a positive signal applied to its setting gate GS over a lead *nlc* from the controller selector CS (FIG. 14) indicating that there is no controller such as LOC available for setting of the call.

If there are less than two free line connectors (calling) or less than two free line connectors (called) then a gate GTG or a gate GTD, as the case may be, will open to cut-off a transistor pair T*rng*1/T*rng*2 or a transistor pair T*rnd*1/T*rnd*2 to cause a negative signal to be extended to the summator circuit TS over a lead A*blc*1.

Figure 47A:
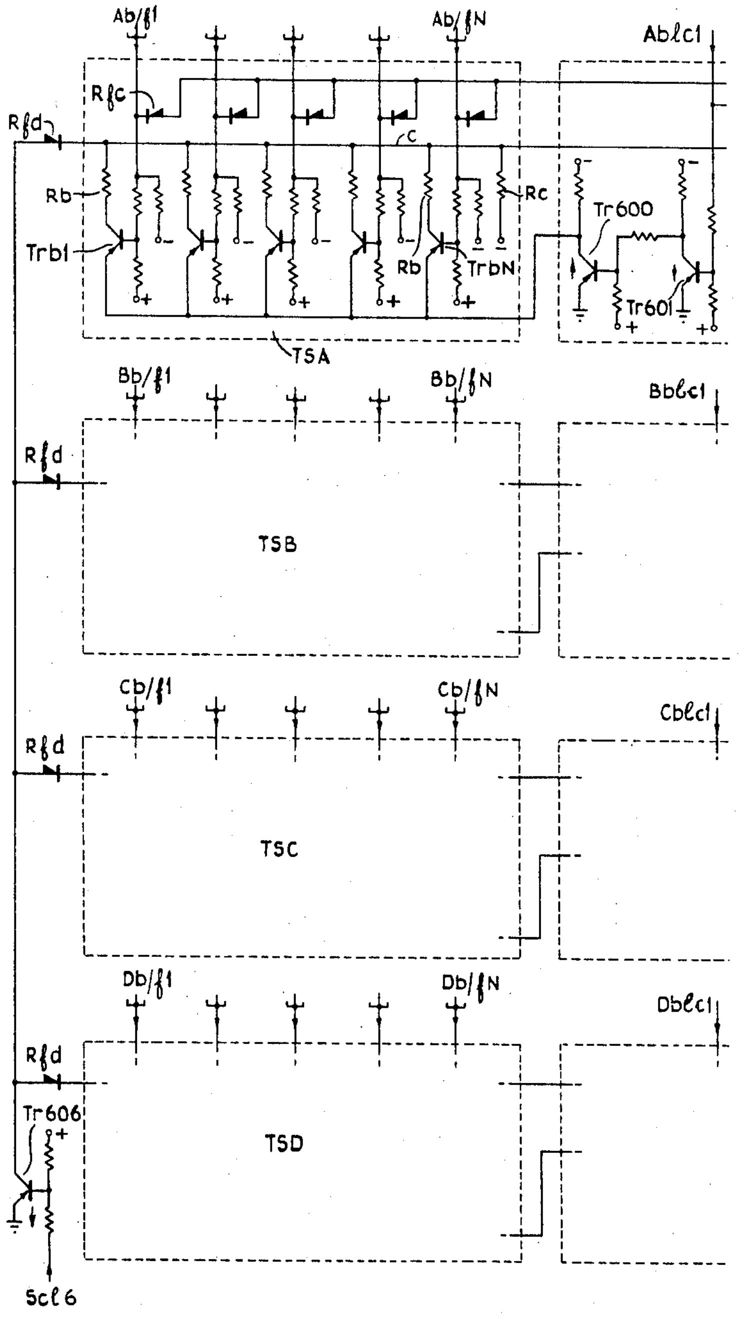
Figure 47B:
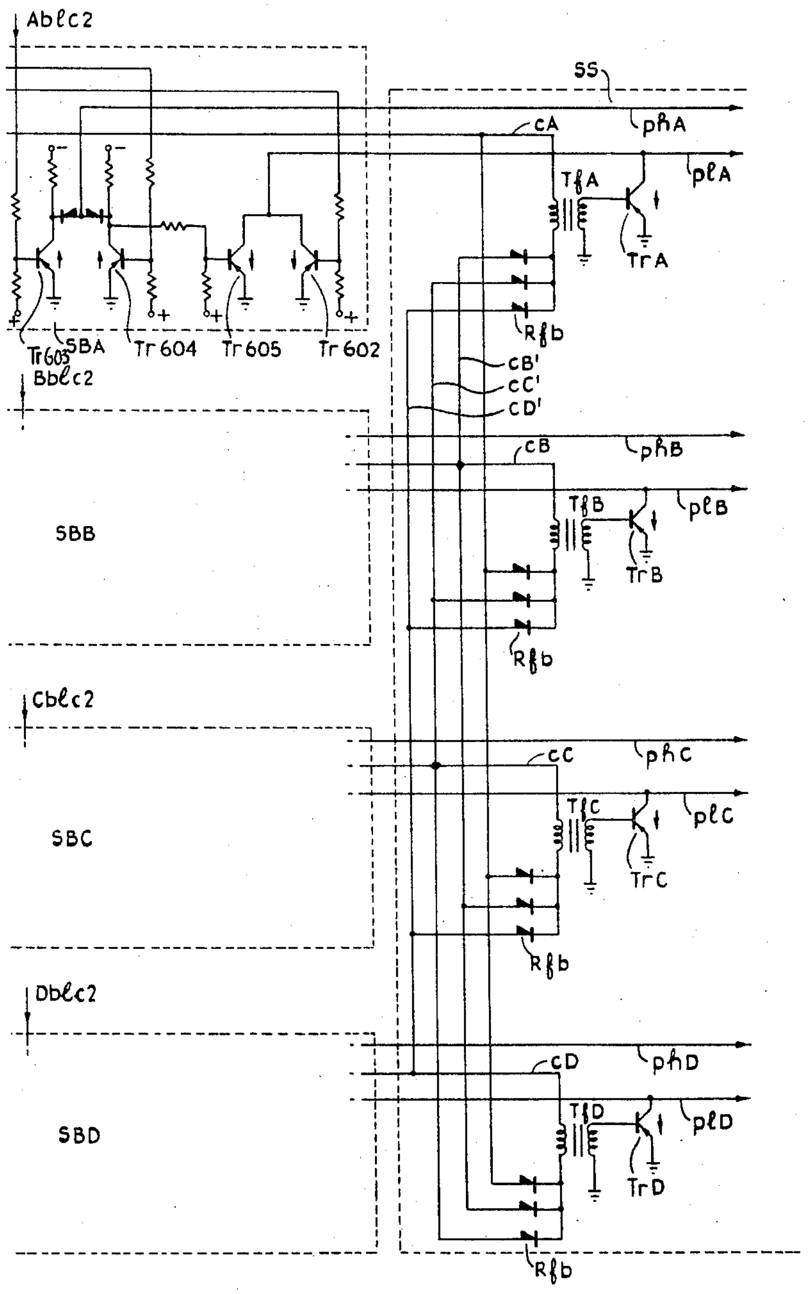
Figure 48A:
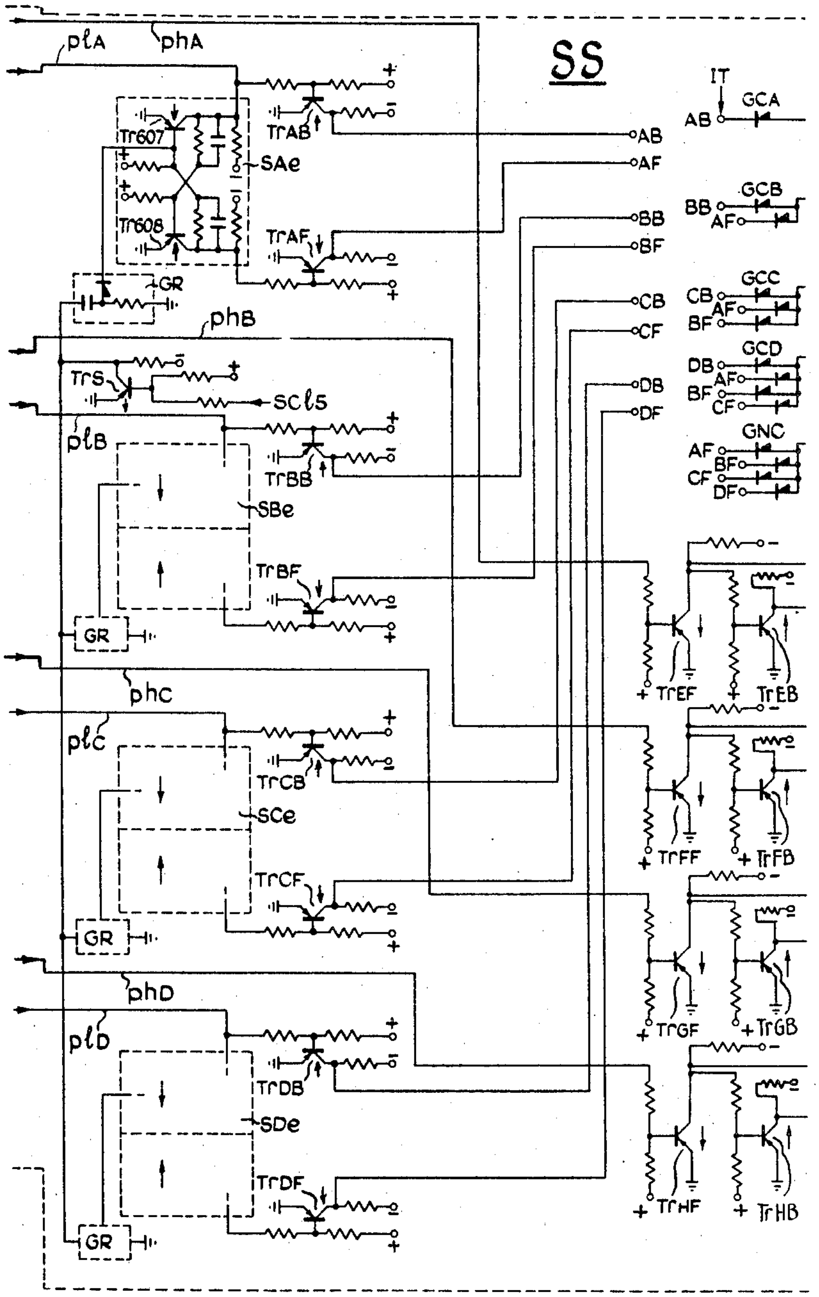
Figure 48B:
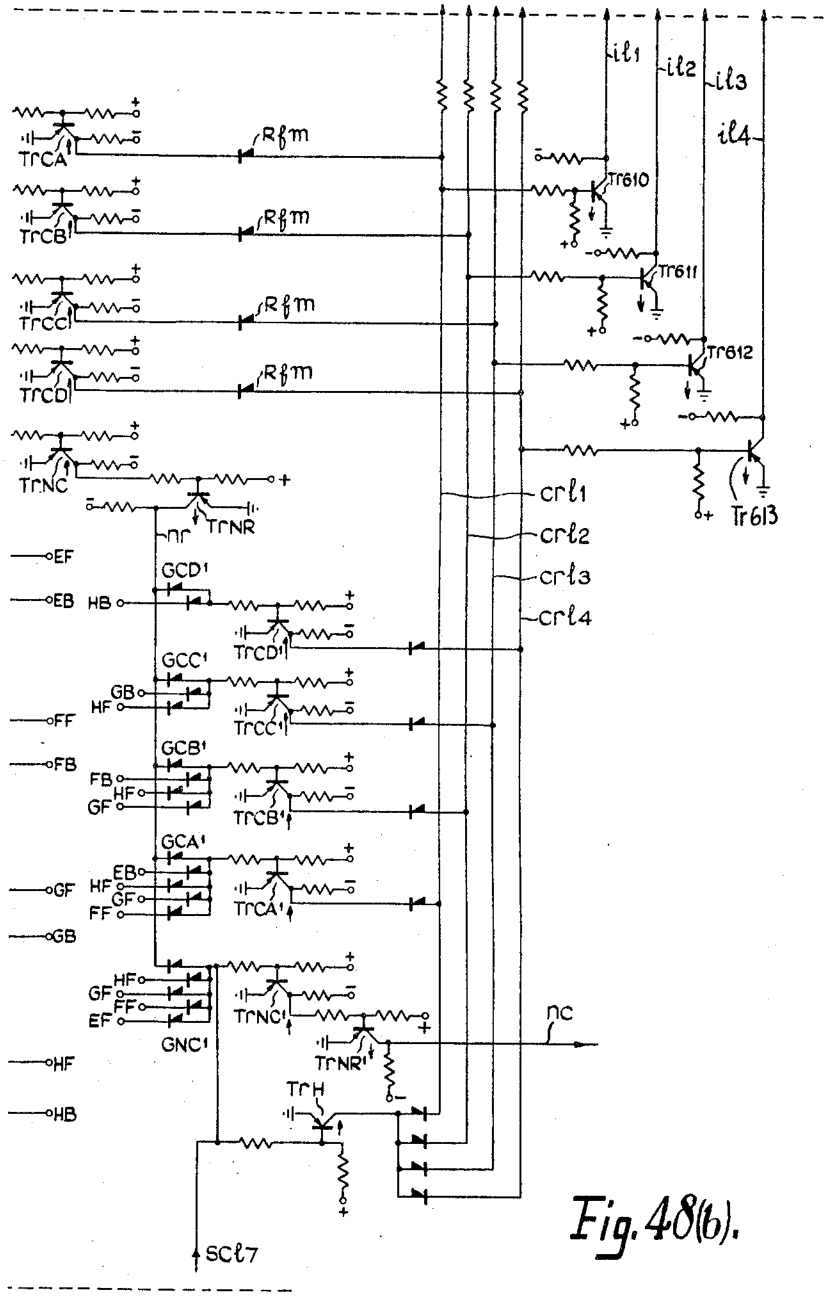

Circuits for the traffic summator TS in each section, the section selector SS, and the inhibiting busy element SB in the route selector RS of each section are shown in FIGS. 47 and 48. In FIG. 47 circuits are shown in blocks TSA and SBA for the traffic summator and busy element relating to one section. The other sections have similar circuits represented by blocks TSB, TSC and TSD and SBB, SBC, SBD.

In the route selector RS of each section, as previously described, leads *b/f*1 . . . *b/f*N (FIG. 36) are marked in a pattern of positive (earth) and negative potentials according to the busy or free conditions of the linking circuits in the particular group of such circuits which can link the calling and called lines in the section concerned. The markings on these leads *b/f*1 . . . *b/f*N, given a prefix A, B, C, or D in FIG. 47 according to the section concerned, control respective transistors T*rb*1 . . . T*rb*N in the traffic summator TS of their section. Of these transistors T*rb*1 . . . T*rb*N, those associated with leads which are carrying negative (free) markings are rendered conductive, assuming for the moment that a transistor T*r*600, which will be considered later, is conducting. The others of transistors T*rb*1 . . . T*rb*N remain non-conductive. The collectors of the transistors T*rb*1 . . . T*rb*N are connected through respective resistors R*b* to a common connection *c* which itself is connected through a resistance R*c* to a source of negative collector potential. The potential appearing on this lead *c* will depend on the number of the transistors T*rb*1 . . . T*rb*N that are conducting and drawing current through resistor R*c*, that is on the number of free linking circuits in the group concerned. This potential, which therefore represents the traffic level in the group, will be more positive according as the number of free linking circuits in the group is greater. From the traffic summators TSA–TSD of the several sections this potential is applied over leads *c*A, *c*B, *c*C, *c*D, respectively to one end of the primary windings of respective transformers T*f* which relate to the several sections according to their suffix letter A, B, C, or D. The other end of each of these transformer windings is connected to each other of the leads *c*A, *c*B, *c*C, *c*D through respective rectifiers R*fb*: thus for instance the primary winding of transformer T*f*A is connected at one side directly to lead *c*A and at the other side via rectifiers R*fb* to leads *c*B′, *c*C′ *c*D′ extending from leads *c*B, *c*C, *c*D respectively. The polarity of the rectifiers R*fb* is such that, as regards any one of transformers T*f*A . . . T*f*D, significant current will flow in its primary winding only if that one of the leads *c*A . . . *c*D to which this winding is directly connected is more negative than any of the others of these lead. Consequently no significant current will flow in the primary winding of that transformer, or those transformers, relating to the section or sections having the lowest traffic level. The secondary windings of transformers T*f*A . . . T*f*D are connected between earth and the bases of respective normally non-conductive transistors T*r*A . . . T*r*D.

The basis of section selection is that the section having the lowest traffic level in the linking group that could serve the call, or one of two or more sections having the same, lowest, traffic level, is selected unless the line connectors or controllers that are suitable for the call in that section are all busy, or less than two of such line connectors is free: in this latter case the section will be selected only if each of the other sections has less than two suitable line connectors free. In each section markings indicating the existence of the above conditions are provided on leads *bcl*1 and *bcl*2 (FIG. 46) and these markings are fed to the busy elements SBA . . . SBD of the several sections. The leads *bcl*1 and *bcl*2 have been prefixed in FIG. 47 according to the section to which they relate. It will be recalled that a positive marking is applied to the *bcl*2 lead if no suitable line connector or controller is free in the relevant section, while a negative marking is applied to the *bcl*1 lead if that section has less than two suitable line connectors free or no suitable controllers free. A negative marking on lead A*blcl* renders conductive a normally non-conductive transistor T*r*601. This results in the normally conductive transistor T*r*600 being cut-off so that a negative potential is applied from its collector to the emitters of transistors T*rb*1 . . . T*rb*N and thereby inhibits conduction of any of these transistors. As a result the potential then appearing on the common connection *c* is the same as if all the link circuits in the relevant group were busy. A negative marking on lead A*blc*1 also renders conductive a normally non-conductive transistor T*r*602 to hold the lead *pl*A at earth potential. A positive marking on lead A*blc*2 renders non-conductive a normally conductive transistor T*r*603 to apply a negative marking into the section selector SS on lead *ph*A. A transistor T*r*604, which is normally conductive so long as any one of the leads A*b/f*1 . . . A*b/f*N carries a negative potential (this potential being applied to the base of transistor T*r*604 over rectifiers R*fc*), becomes non-conductive if all the linking circuits of the relevant group are busy because the rectifiers R*fc* are then all backed off by the positive markings on leads A*b/f*1 . . . A*b/f*N. This again results in a negative marking being applied to the lead *ph*A, and also results in a normally conductive transistor T*r*605 being rendered conductive to hold lead *pl*A at earth potential. Similar actions take place in respect of the other sections.

After the current flow conditions in transformers T*f*A . . . T*f*D have had time to become established a signal on lead *scl*6 from the sequence control circuit renders conductive a transistor T*r*606 to apply earth potential to the connection *c* in the several traffic summators TS. This interrupts the current flow in the or each of the transformers T*f*A . . . T*f*D in which current was flowing, and as a result of this current interruption an E.M.F. is generated in the secondary windings of these transformers that were drawing current. The rectifiers R*fd* prevent the short circuit presented by transistor T*r*606 from damping the back E.M.F. in the transformer primary windings; any such damping would tend to reduce the output signal. The E.M.F. thus generated in any one of the transformers T*f*A . . . T*f*D appears as a negative pulse at the base of the associated transistor T*r*A . . . T*r*D, which therefore momentarily conducts to apply a positive (earth) pulse to the associated one of the leads *pl*A . . . *pl*D, unless that lead is already held at earth potential because of transistor T*r*602 or T*r*605 being conductive in the busy element.

Turning now to FIG. 48, there is included in the section selector SS in respect of each section an individual bistable element SA*e*, SB*e*, SC*e* and SD*e* comprising transistors such as T*r*607 and T*r*608 as shown for element SA*e*. If transistor T*r*602 in a busy element SB has been rendered conductive to indicate that no suitable controller or less than two suitable line connectors are free in the relevant section or if transistor T*r*605 has been rendered conductive to indicate that all the suitable link circuits are busy, then at the time when it was so rendered conductive the resultant impulsive application of earth potential to the associated one of leads *pl*A, *pl*B, *pl*C and *pl*D will have set the associated bistable element SA*e*, SB*e*, SC*e*, SD*e* to the condition in which its upper transistor (T*r*607) is conductive and its other transistor (T*r*608) is non-conductive. This is because the positive (earth) pulse is applied to the collector of transistor T*r*607 and is fed from there over the coupling capacitor to the base of transistor T*r*608, thereby tending to cut off this latter transistor and so initiating the setting of the element to the state mentioned, if it is not already in that state.

Shortly before the element DC*e* in the sequence control circuit SCC pulses the leads *scl*6, the element CI*e* applies a negative pulse to the lead *scl*5. This pulse, acting through a transistor T*rs* and resetting gates GR, attempts to reset all the elements SA*e*, SB*e*, SC*e*, SD*e* to the state in which the upper transistor is non-conductive and the lower transistor is conductive. If, however, any one of these elements is already in its opposite state with an earth potential on lead *pl*A, *pl*B, *pl*C, *pl*D from transistor T*r*602 or T*r*605 in the associated busy element, then the presence of this earth potential will prevent that bistable element from being reset. If the transistor T*r*A, T*r*B, T*r*C, T*r*D associated with any particular section thereafter applies a positive (earth) pulse to the lead *pl*A, *pl*B, *pl*C, *pl*D for any section for which transistors T*r*602 and T*r*605 are not conductive, the resulting pulse on that lead will change the corresponding bistable element SA*e*, SB*e*, SC*e*, SD*e* to its set state if it had been reset by the pulse on lead *scl*5. There is therefore left in the reset state only that element (or elements) relating to a section having the lowest traffic level and also having a suitable controller free, a suitable linking circuit free, and more than one suitable line connector free. This section or sections, if there is one, is therefore available for selection to the exclusion of the others.

The states of the bistable elements SA*e*, SB*e*, SC*e*, SD*e* are marked onto pairs of terminals AB/AF, BB/BF, CB/CF and DB/DF respectively via transistors T*r*AB/T*r*AF for elements SA*e*, T*r*BB/T*r*BF for element SB*e*, T*r*CB/T*r*CF for element SC*e* and T*r*DB/T*r*DF for element SD*e*. If the element SA*e* is in its reset state (transistor T*r*607 non-conducting and T*r*608 conducting), indicating that the corresponding section is available for selection, then transistor T*r*AB will be conductive and T*r*AF will be non-conductive resulting in a positive (earth) potential at terminal AB and a negative potential at terminal AF. On the other hand if the elements SA*e* is in its opposite state these potential conditions for terminals AB and AF will be reversed. Similar potential conditions obtain at the other pairs of terminals BB/BF, CB/CF, DB/DF according to whether or not the sections to which they relate are available for selection.

Selection of a section on the basis of having more than one suitable line connector free in addition to a suitable controller and linking circuit is achieved by gates GCA . . . GCD with associated transistors T*r*CA . . . T*r*CD. If two or more sections are available on this basis then these gates select between these sections, giving priority of A over B over C over D. Input terminals IT of these gates are connected to the terminals AB . . . DF according to the lettering applied to them in the figure. If the A-section is available for selection, the positive potential at terminal AB cuts off transistor T*r*CA to select that section, while the negative potential at terminal AF renders the transistors T*r*CB, T*r*CC, T*r*CD conductive through gates GCB, GCC, GCD, whether or not any of the other sections are also available for selection. If on the other hand the B-section is available for selection but not the A-section, then the negative potential at terminal AB renders transistor T*r*CA conductive, the positive potentials at terminals AF and BB cut-off transistor T*r*CB to select the B-section, and the negative potential at terminal BF renders the transistors T*r*CC and T*r*CD conductive. The action is similar for the selection of other sections.

Selection of a section as just described results in all but one of the transistors T*r*CA . . . T*r*CD being rendered conductive, the remaining one, which corresponds to the selected section, being cut-off. The cut-off transistor attempts to apply its negative collector potential via rectifier R*fm* as a marking on the relevant one of leads *crl*1–*crl*4 which lead back to the route selectors RS of the several sections. This marking is held off, however, by a normally-conductive transistor T*r*H which holds the leads *crl*1–*crl*4 at earth potential until it is rendered non-conductive by a positive signal applied from the sequence control circuit over lead *scl*7.

If no section is available for selection on the basis of having two or more suitable line connectors free, there will be negative potentials at terminals AB, BB, CB and DB and positive potentials at terminals AF, BF, CF, DF. Consequently none of the gates GCA . . . GCD will cut off transistors T*r*CA . . . T*r*CD, but a further gate GNC will cut-off a transistor T*r*NC associated with it, bringing into conduction a further transistor T*r*NR to apply a positive (earth) potential to a lead *nr*. This lead *nr* has a negative potential if transistor T*r*NR is non-conductive. If no section is available on the foregoing basis (indicated by a positive potential at lead *nr*) there may be one available with a single suitable line connector free, in addition to a suitable controller and link circuit. The existence of such a section will be denoted by the absence of a negative marking on the relevant lead *ph*A . . . *ph*D.

Leads *ph*A . . . *phD* lead towards the bases of respective normally non-conductive transistors T*r*EF, T*r*FF, T*r*GF, and T*r*HF each of which becomes conductive and applies a positive (earth) potential to an associated terminal EF . . . HF if there is a negative marking on the relevant *ph* lead, but otherwise remains non-conductive to apply a negative potential to that terminal. Each of these transistors is associated with an inverting transistor T*r*EB . . . T*r*HB which applies a positive (earth) potential to terminal EB . . . HB when terminal EF . . . HF is negative and vice versa. Consequently if a section is available for selection with only one line connector free, there will be a positive potential at the relevant terminal EB . . . HB and a negative potential at terminal EF . . . HF, these potentials being reversed if the section is not available for selection. It will be seen that the potential conditions at terminals EF . . . HB correspond to those at terminals AB . . . DF.

With a positive potential on lead *nr*, indicating that gates GCA . . . GCD have been unable to make a choice, gates GCA′ . . . GCD′ become capable of making a choice of a section, doing so according to the potentials on terminals EF . . . HB in the same manner as already described for gates GCA . . . GCD except that in this instance the priority of selection is D over C over B over A. This reversal of the order of priority helps to give a balance of choice. If a section is selected by one of the gates GCA′ . . . GCD′, the relevant one of transistors T*r*CA′ . . . T*r*CD′ will be cut-off and the others will be conductive, as was the case for transistors T*r*CA . . . T*r*CD. The cut-off transistor attempts to apply a negative marking to the relevant *crl* lead, doing so when the hold-off transistor T*r*H is cut-off by the pulse on lead *scl*7 from the sequence control circuit.

If no section is able to set up the call, a gate GNC′ causes cut-off of an associated transistor T*r*NC′ which through an inverting transistor T*r*NR′ applies a positive busy marking to a lead *nc* extending back to the register. In the register REG (FIGS. 27 to 29) dealing with the call, which at this time still has access to the line location identifier LI under control of the scanner, this positive marking, applied as a pulse through a setting gate GS, sets a bistable circuit NC*e* which thereupon brings about operation of a relay NC through a transistor. At contacts *nc*1 this relay applies busy tone to the calling line wires via the transformer T2. Instead of immediately applying busy tone to the calling line in the manner just described the register may if desired be arranged to make several more attempts to set the call before doing so.

Returning to FIG. 48, connections are taken from leads *crl*1–*crl*4 towards the bases of respective normally non-conductive transistors T*r*610–T*r*613, to the collectors of which are connected leads *il*1–*il*4 respectively. When one of the *crl* leads is marked negatively to denote the section that has been selected to establish the call, the associated one of the transistors T*r*610–T*r*613 is rendered conductive and applies a positive (earth) potential to its *il* lead. In the route selector (FIGS. 35 and 40) of the selected section, this positive potential initiates a busy condition which temporarily prevents re-selection of the same section for another call involving the same line connector group on either the calling or called side. This temporary busy condition is arranged to last long enough for the line connectors for the first call to have become set and to have indicated their busy condition into the route selector.

Figure 35A:
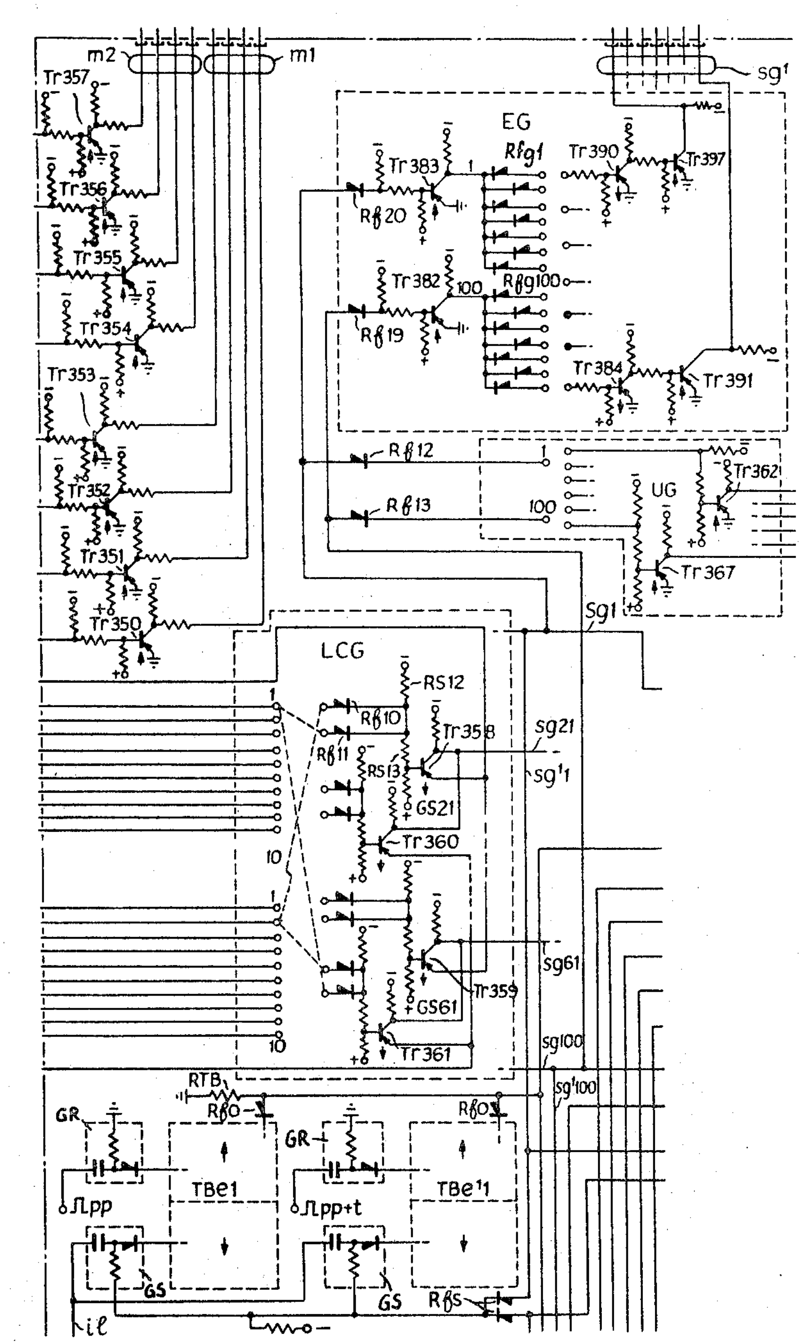
Figure 35B:
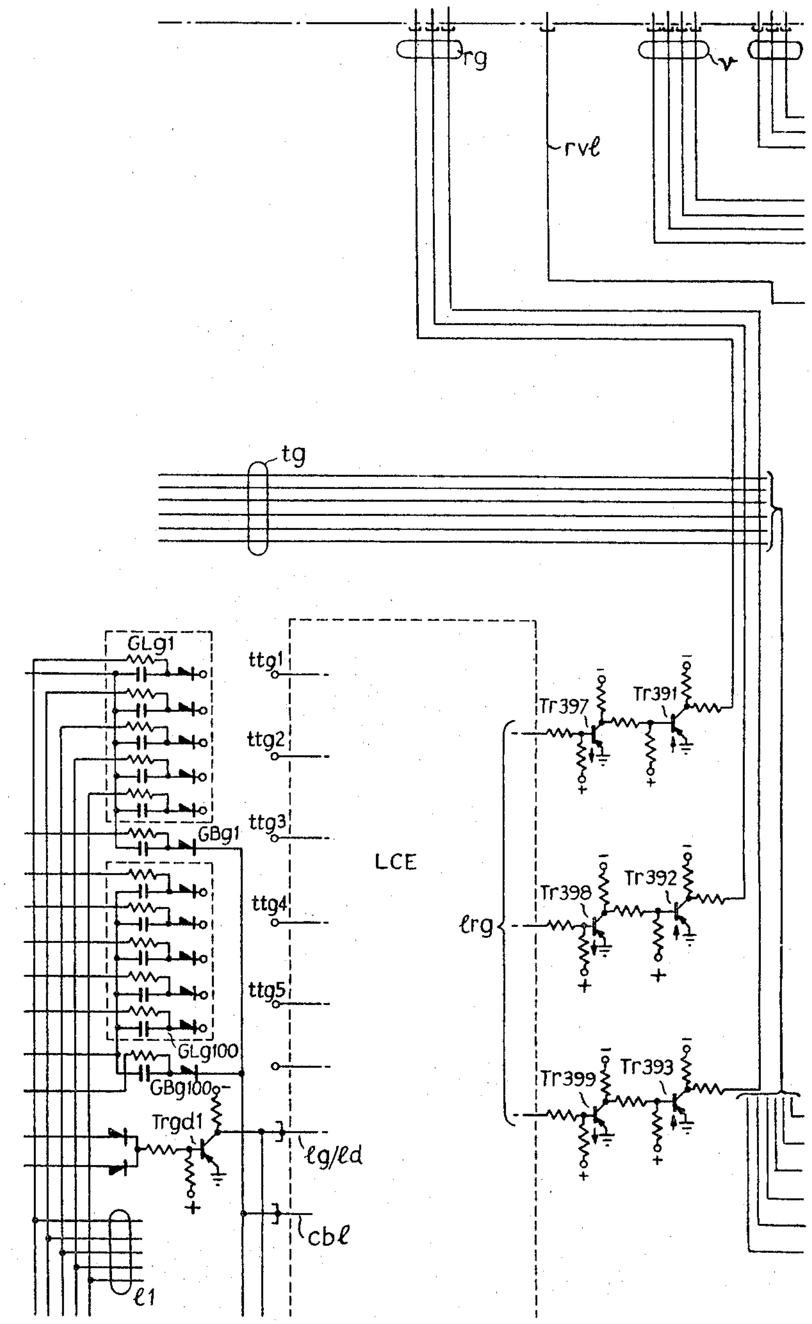
Figure 36A:
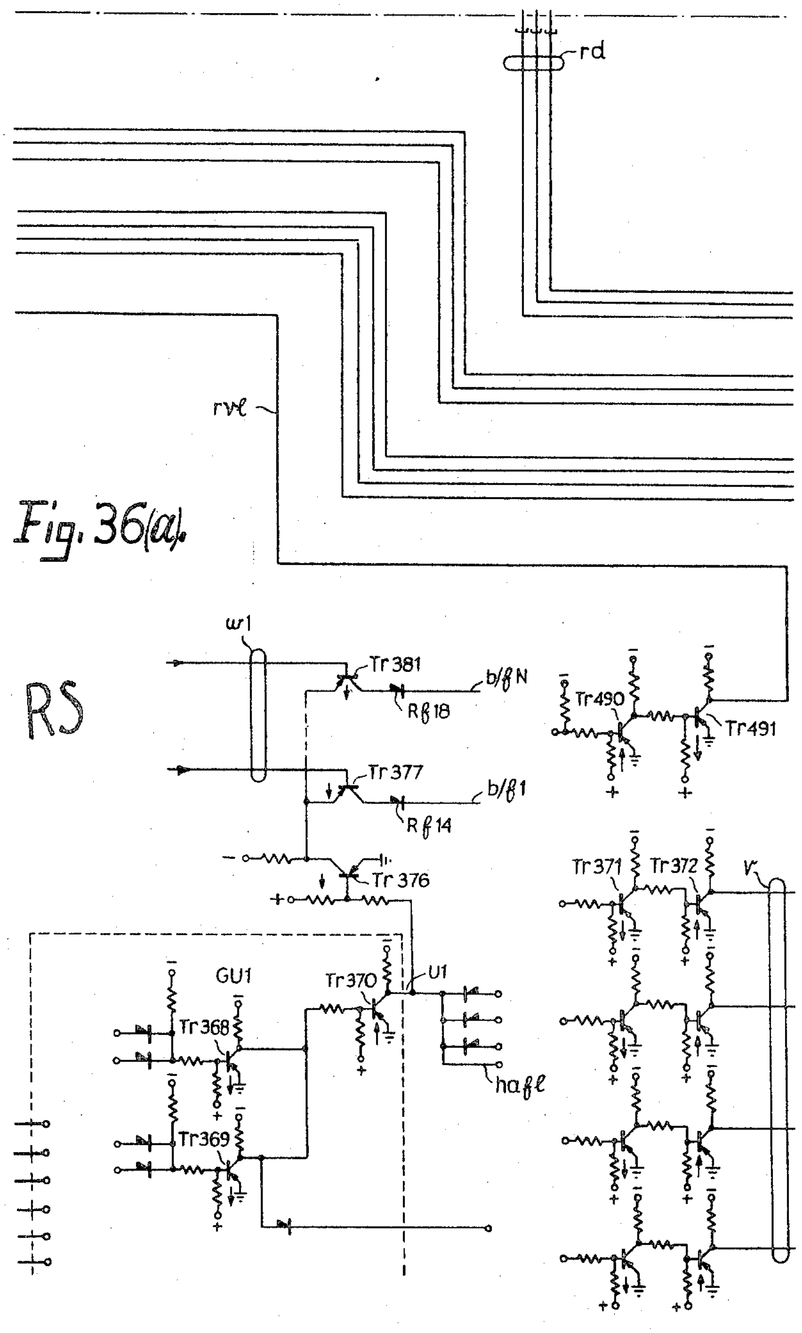
Figure 36B:
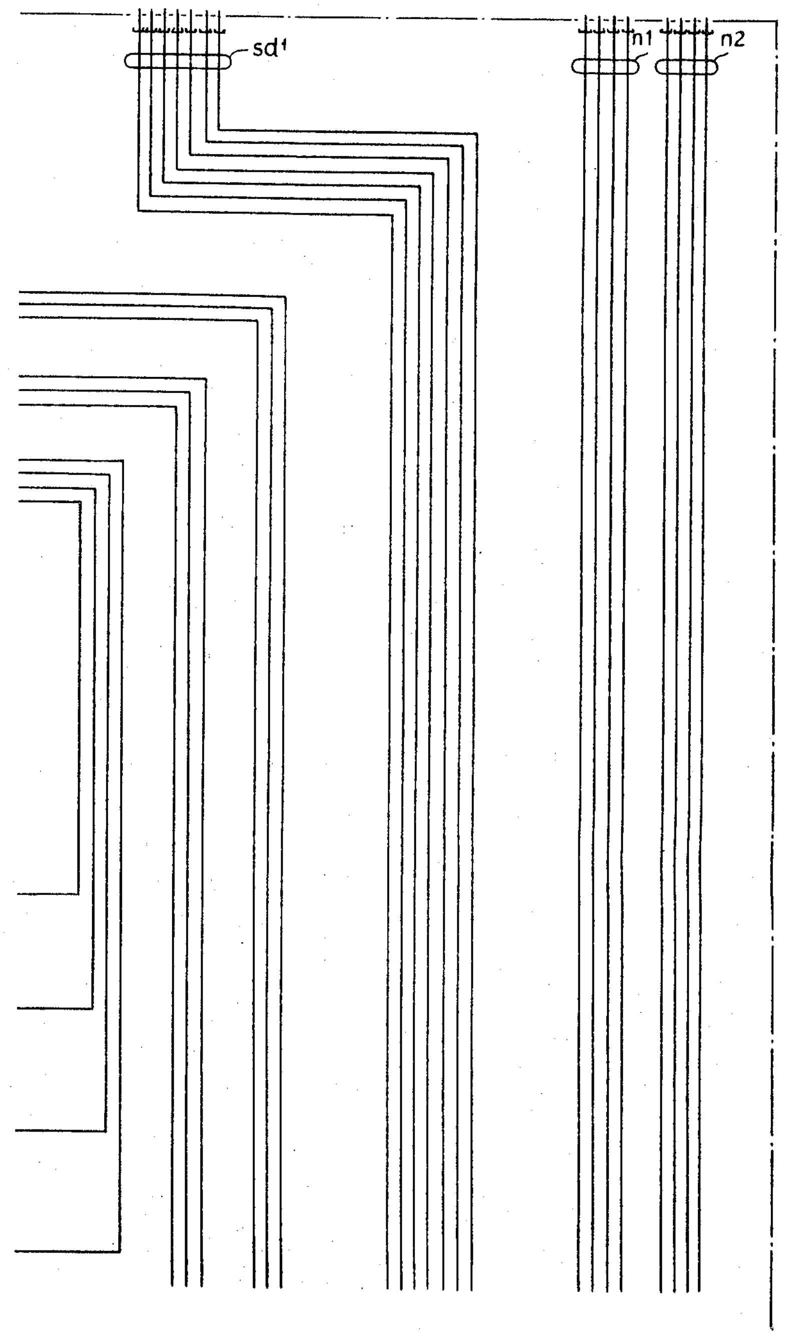
Figure 37A:
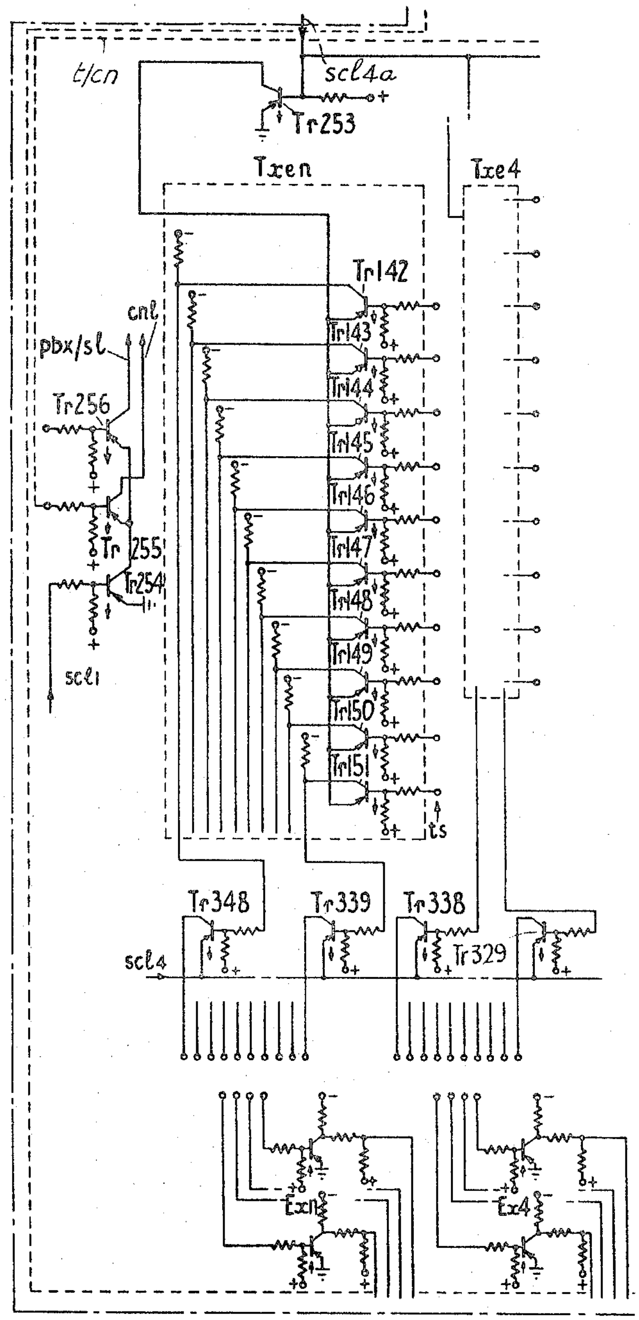
Figure 37B:
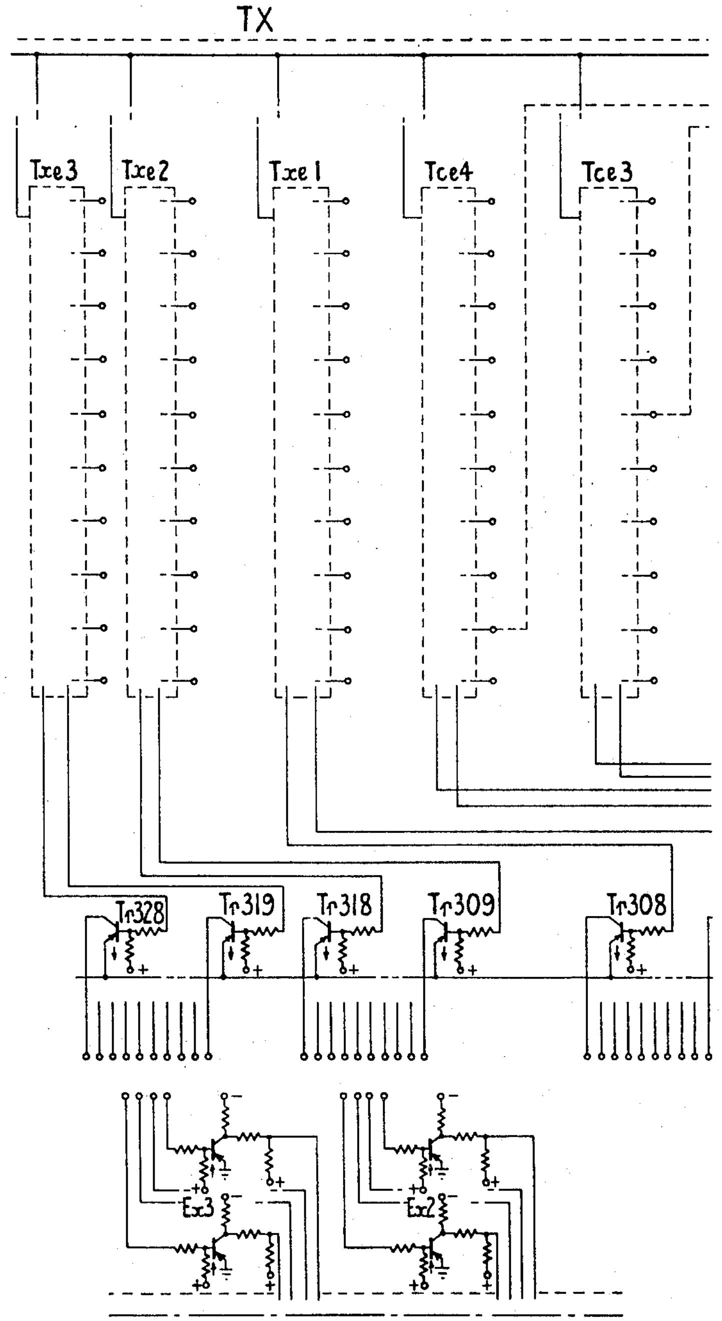
Figure 37C:
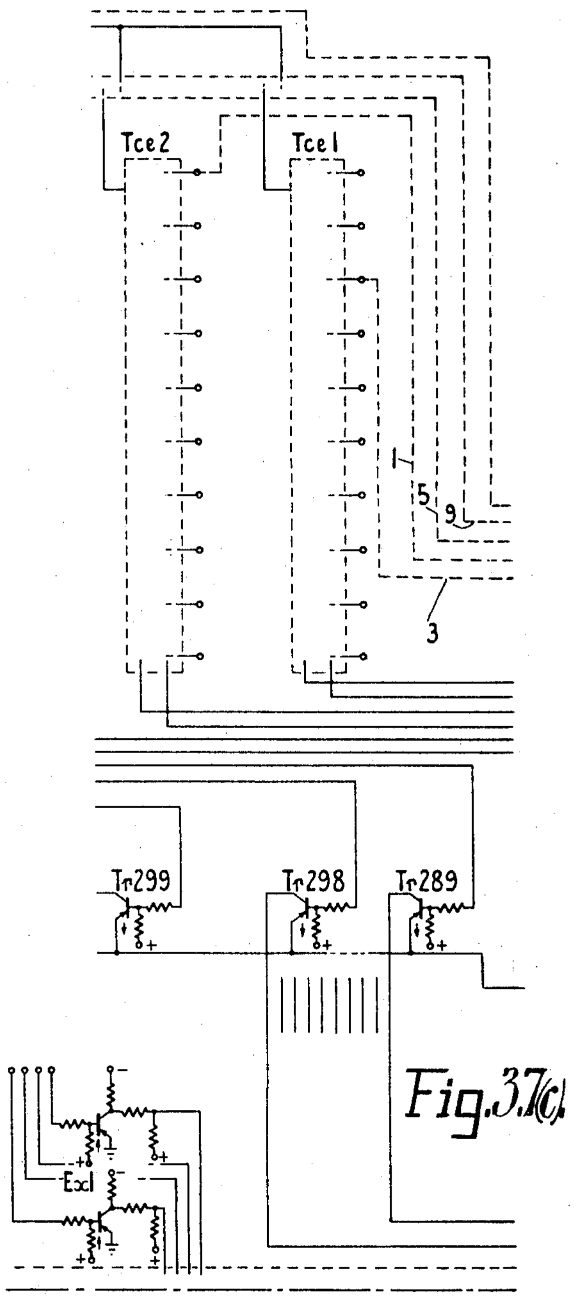
Figure 38A:
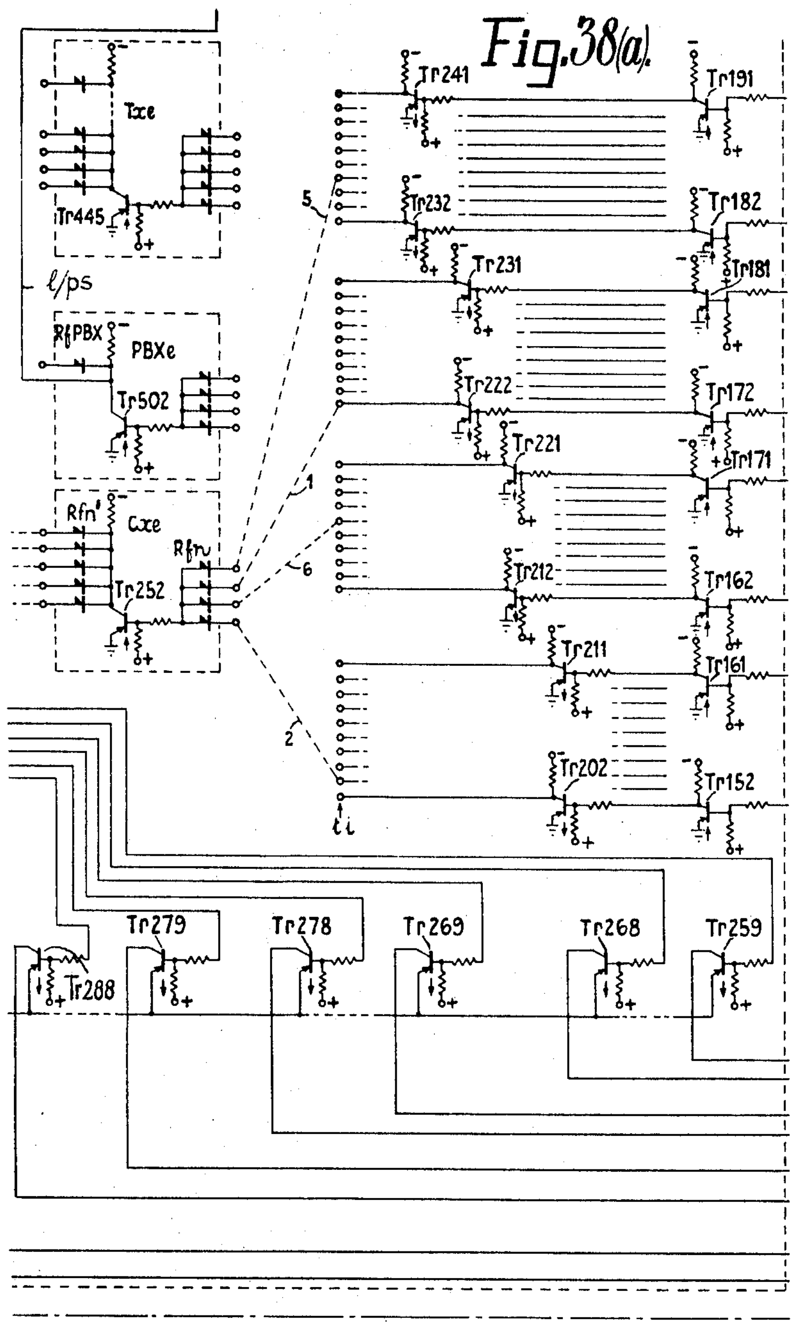
Figure 38B:
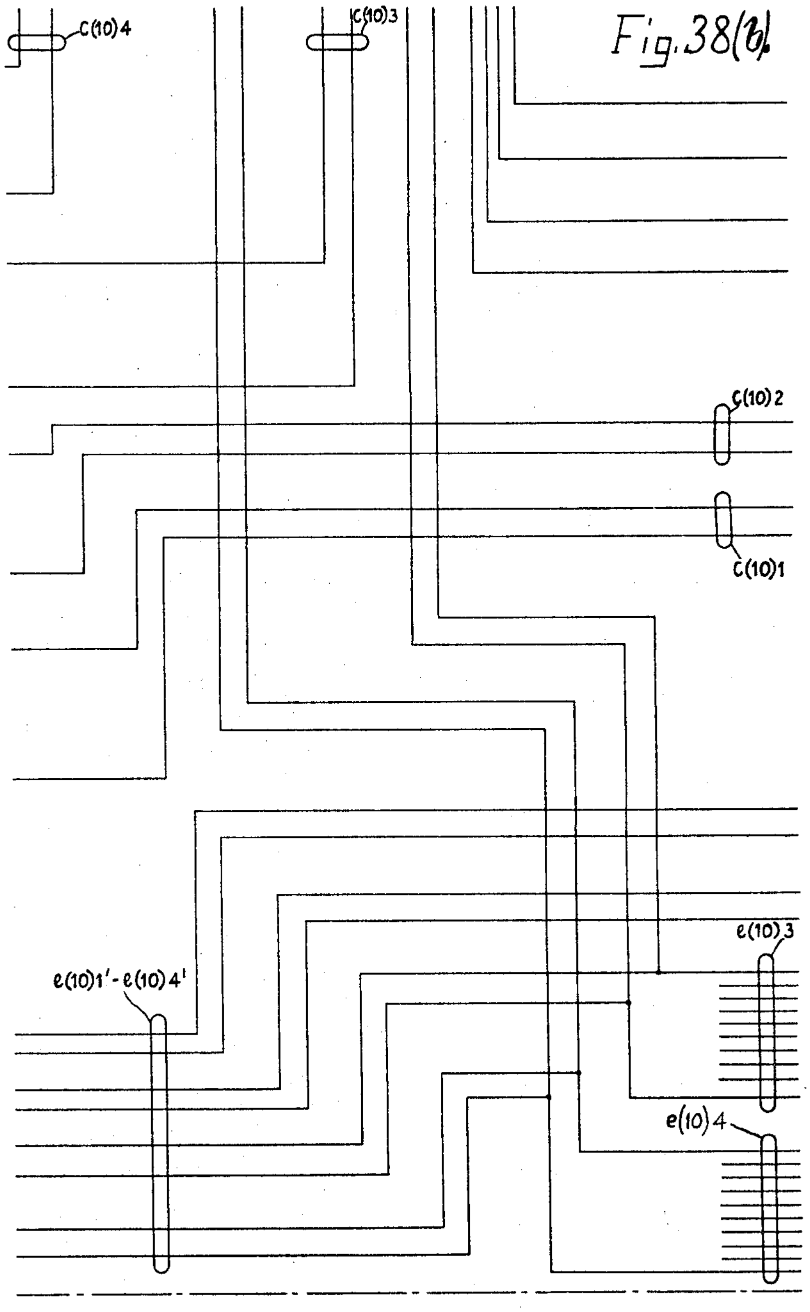
Figure 40A:
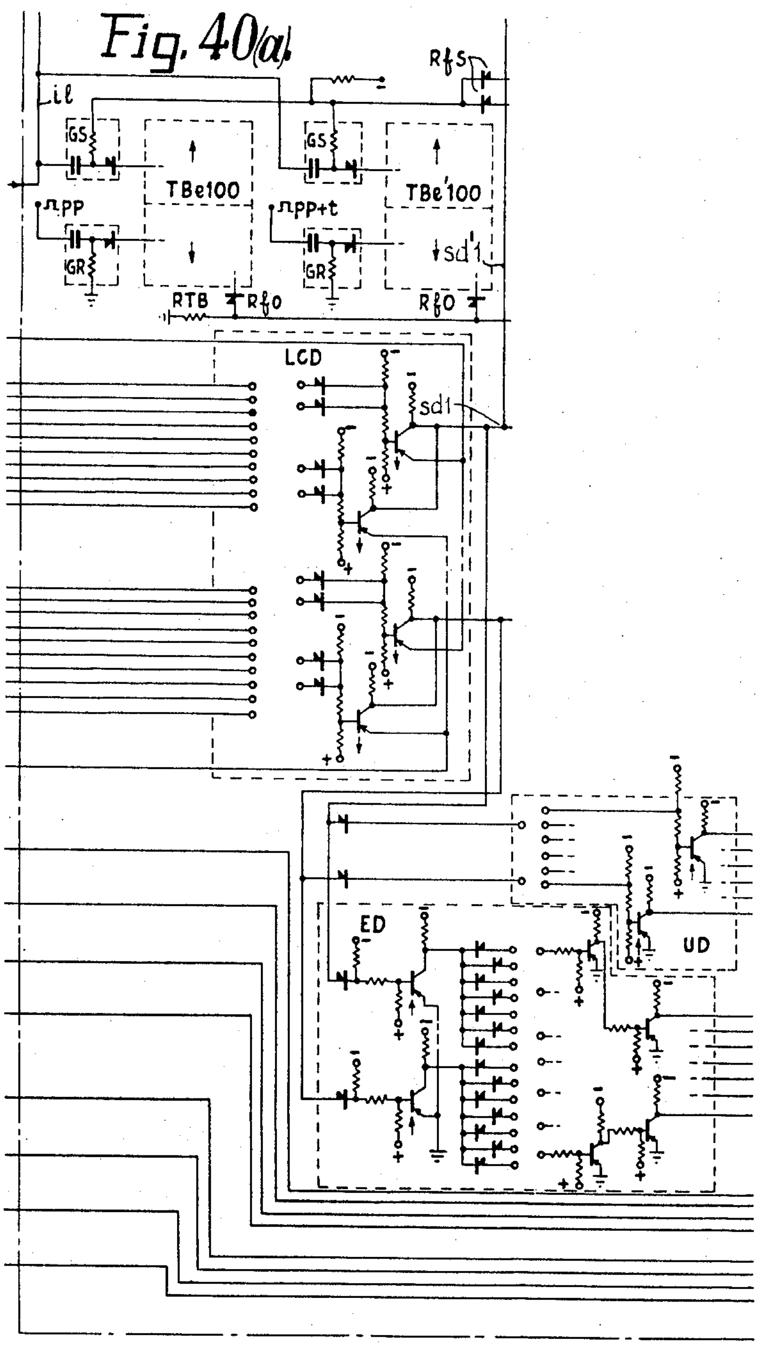
Figure 40B:
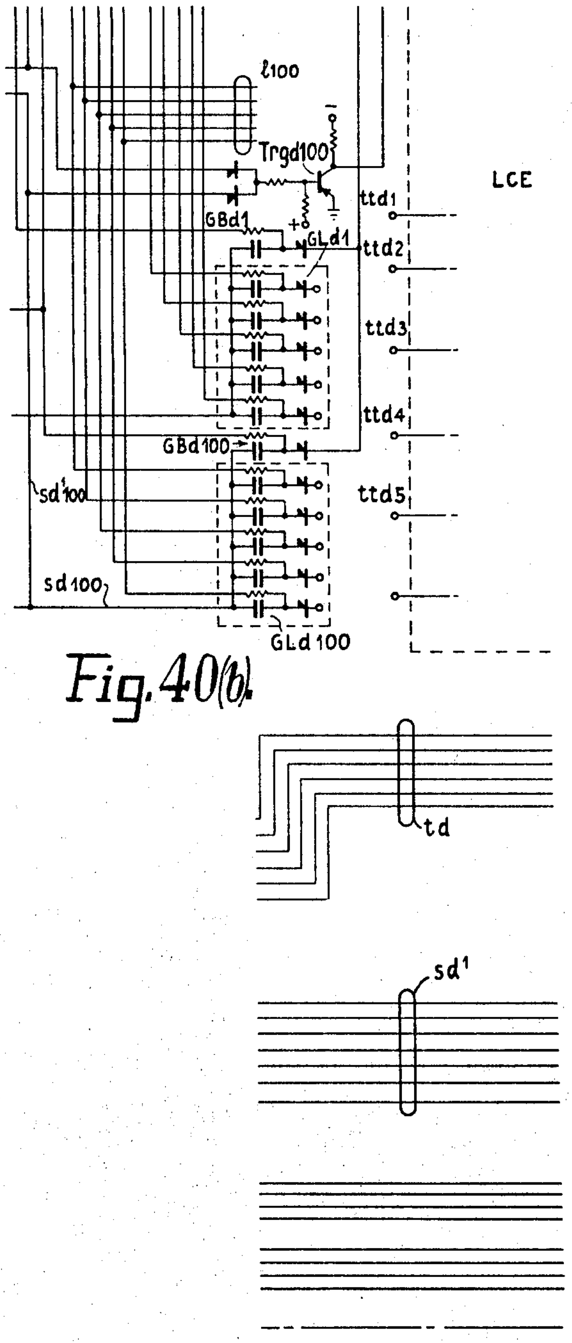
Figure 40C:
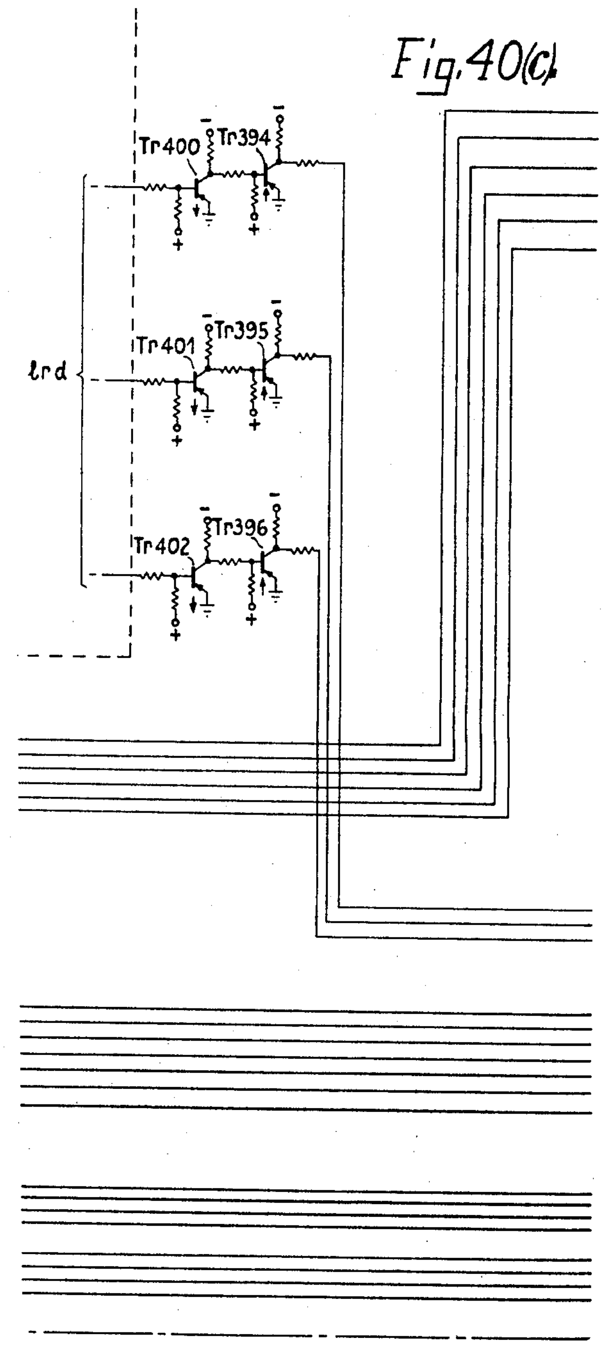
Figure 41A:
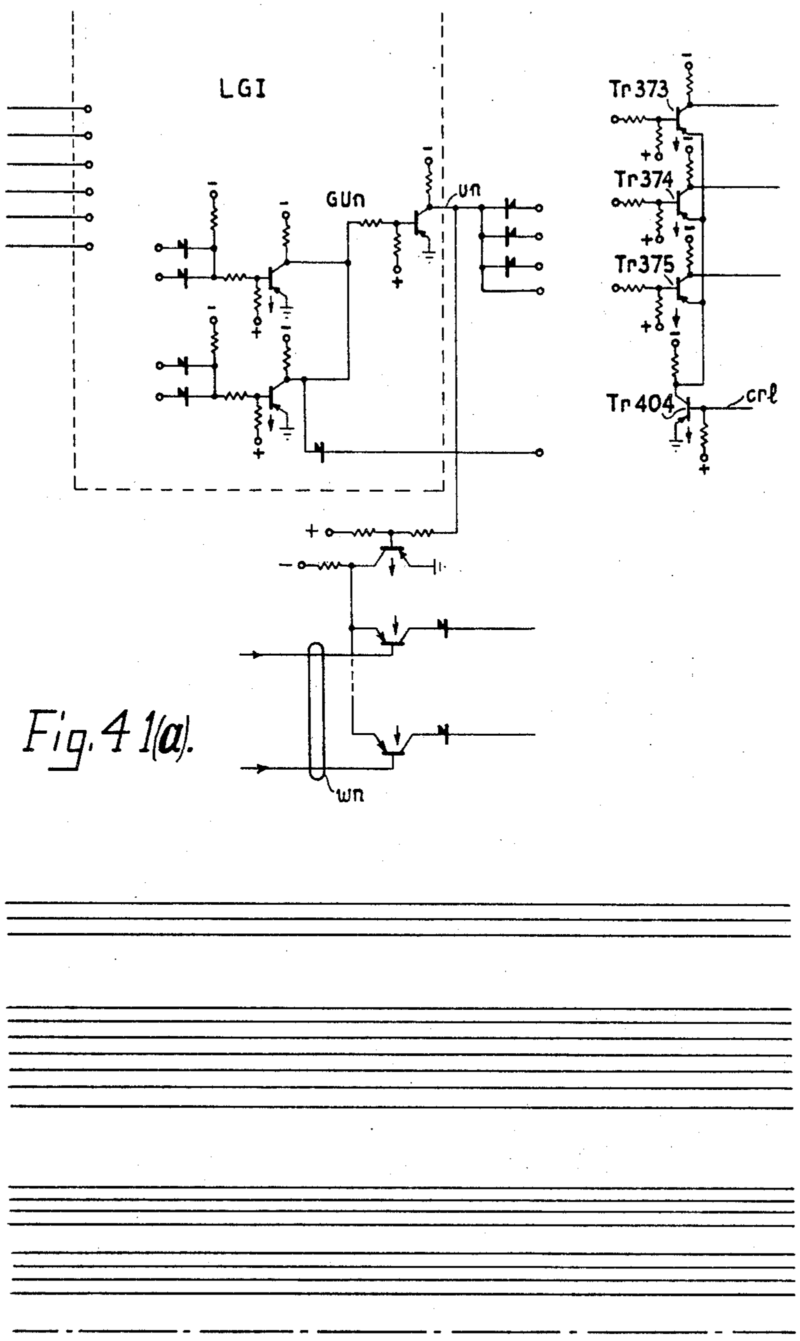
Figure 41B:
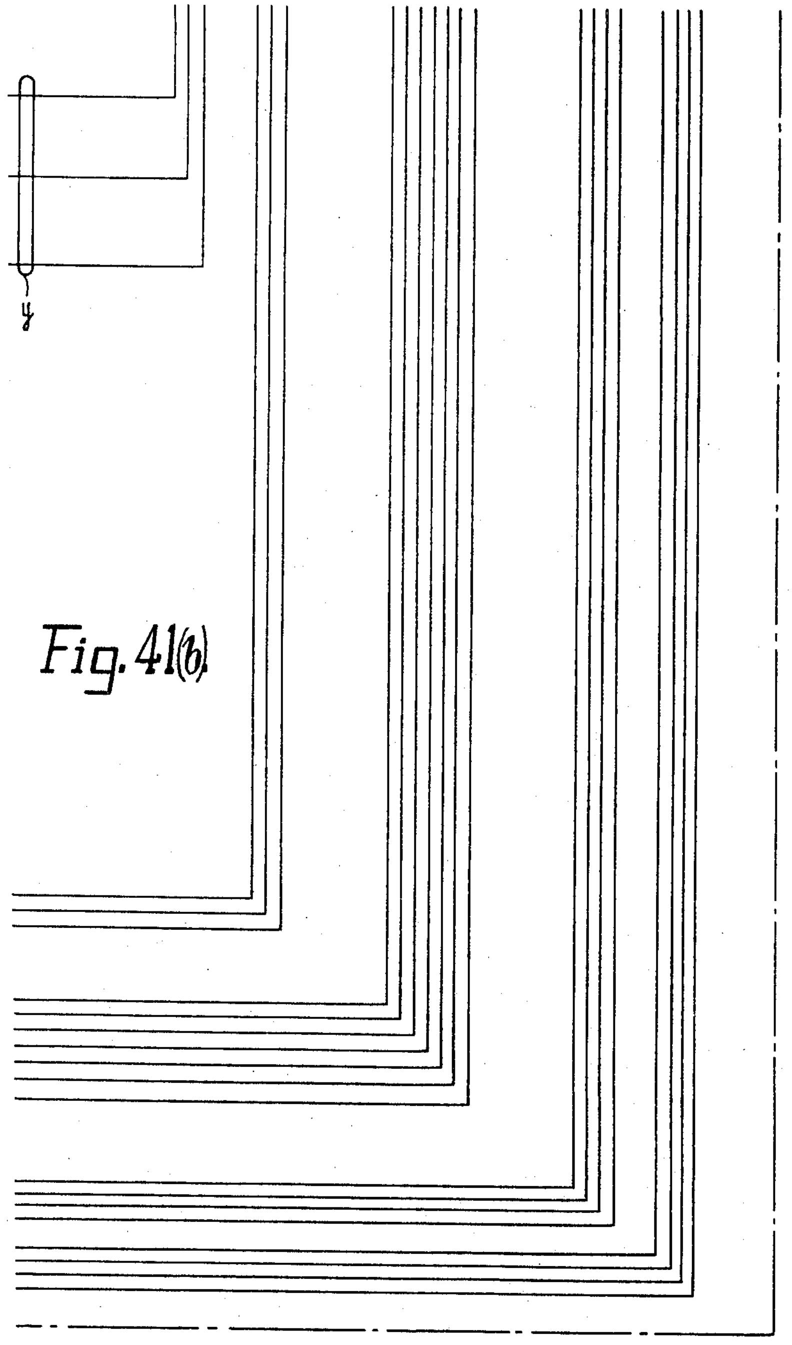
Figure 42:
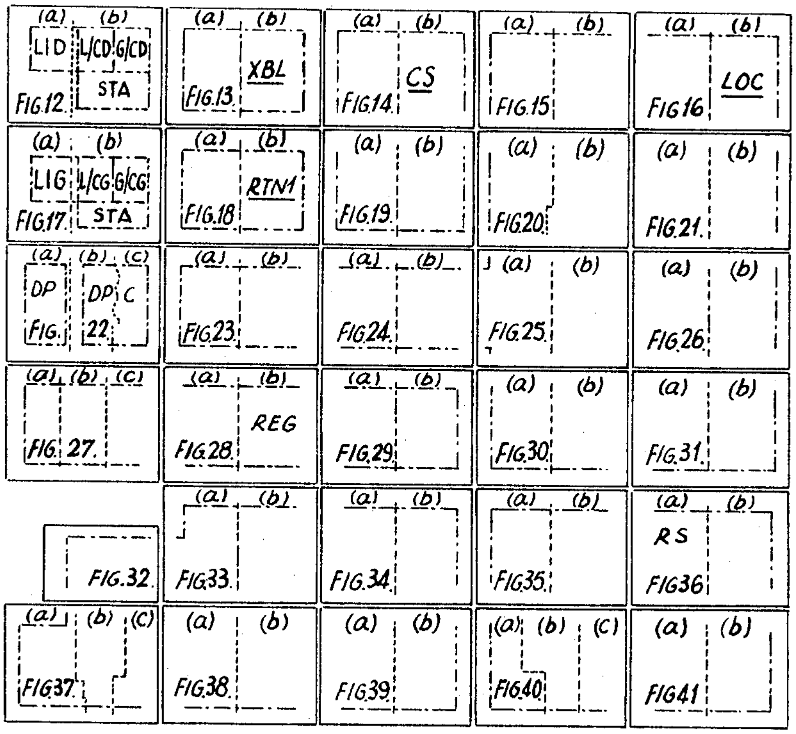

To provide this temporary busy condition there is provided in the route selector RS of each section, in respect of each line connector group, a pair of bistable elements such as TB*e*1, TB*e'*1 for group 1 and TB*e*100, TB*e'*100 for group 100 (see FIGS. 35 and 40). Markings appearing on leads *sg*1–*sg*100 (FIG. 35) to identify a calling line connector group, and markings appearing on leads *sd*1–*sd*100 (FIG. 40) to identify a called line connector group are extended on corresponding *sg'* and *sd'* leads to bias open the setting (GS) gates for the pair of TB*e*, TB*e'* bistable elements relating to the relevant line connector group. Thus a marking on lead *sg*1, and likewise a marking on lead *sd*1, is passed over lead *sg'*1 or *sd'*1 via rectifiers R*fs* to the setting gates of bistable elements TB*e*1 and TB*e'*1, whereas a marking on lead *sg*100 or *sd*100 is passed over lead *sg'*100 or *sd'*100 to the setting gates of bistable elements TB*e*100 and TB*e'*100. The lead *il* which is marked in the section selector SS to initiate the temporary busy condition, on selection of the section appears at the bottom left-hand corner of FIG. 35 and the top left-hand corner of FIG. 40. It is connected to the pulse input terminals of the setting gates for all the bistable elements such as TB*e*1, TB*e'*1, TB*e*100 and TB*e'*100 in the route selector of this section. The positive marking applied to this *il* lead passes as a pulse through the setting gates that are open and thereby sets the pairs of TB*e*, TB*e'* elements relating to the calling line connector group and the called line connector group respectively. Resetting pulses *pp* are repeatedly applied to the TB*e* elements through resetting gates (GR) and pulses *pp*+*t* occurring at a time *t* after the *pp* pulses are repeatedly applied to the TB*e'* elements through their resetting gates. Consequently if the TB*e*, TB*e'* elements of a pair have been set by a pulse on the *il* lead, the TB*e* element will be set by the next *pp* pulse and the TB*e'* element by the next *pp*+*t* pulse. The time elapsing between the setting of these elements and the return of both of them to their reset condition will be determined by the interval between the successive *pp* pulses and the interval *t*. Thus for instance if the *pp* pulses are spaced by two seconds and the *pp*+*t* pulses occur one second after them, then a period of between about one and two seconds will elapse between the setting of any pair of the bistable elements in question and the return of both of them to the reset state.

For the period that the TB*e* and TB*e'* elements of any pair are in their set state a positive (earth) potential is present behind output rectifiers R*fo*. Consequently earth potential is effective via a resistance RTB to bias open busying gates such as GB*g*1 and GB*d*1 for line connector group 1 and GB*g*100 and GB*d*100 for line connector group 100, these gates leading into the line connector choice circuit of FIGS. 45 and 46. The GB*g* and GB*d* gates thus opened are closed again when both of the TB*e*, TB*e'* elements which opened them have been reset by the *pp* and *pp*+*t* pulses so as to apply a negative potential via rectifiers R*fo* to the gates in question. If while the gates are open there is a further call involving the same line connector group on either the calling or called sides, the same pulses as are passed by the GL*g* and GL*d* gates are also passed by the GB*g* and GB*d* gates on to a common lead *cbl* extending into the line connector choice circuit. In the line connector choice circuit these pulses turn over a bistable elements CBL*e* (FIG. 45) which thereupon causes conduction of transistor *Trbb* (FIG. 46) to apply positive (earth) potential to lead *blc*2 and thereby mark the section concerned against selection.

Figure 49:
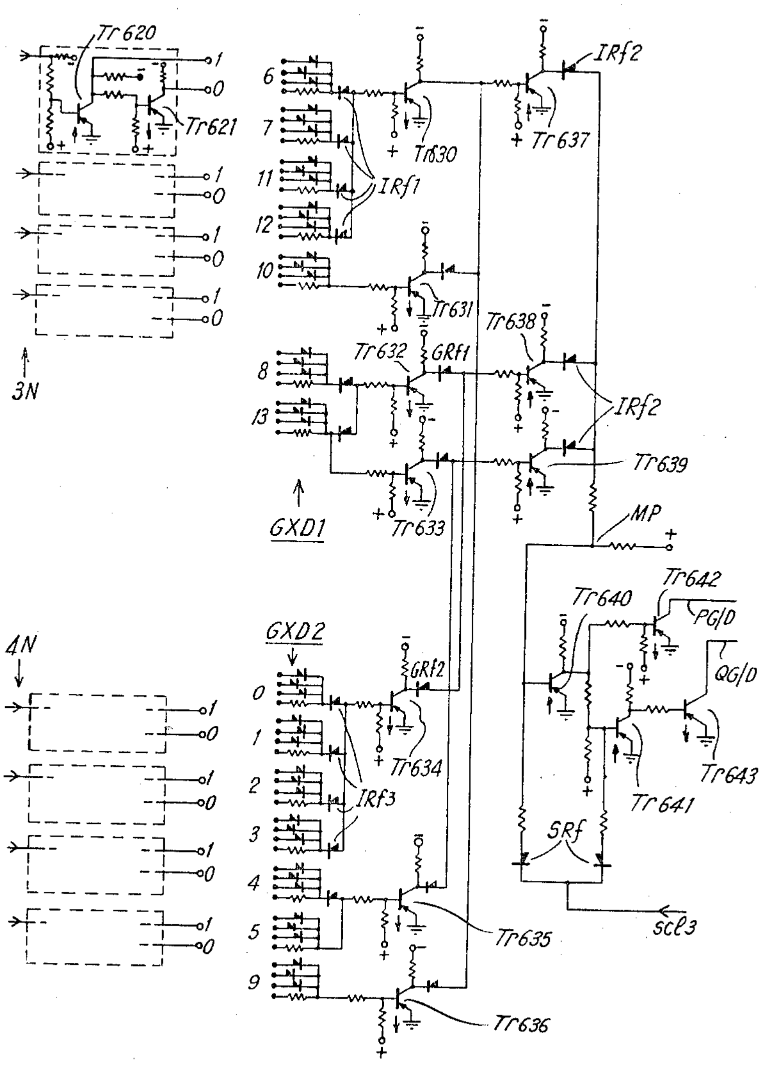
Figure 50A:
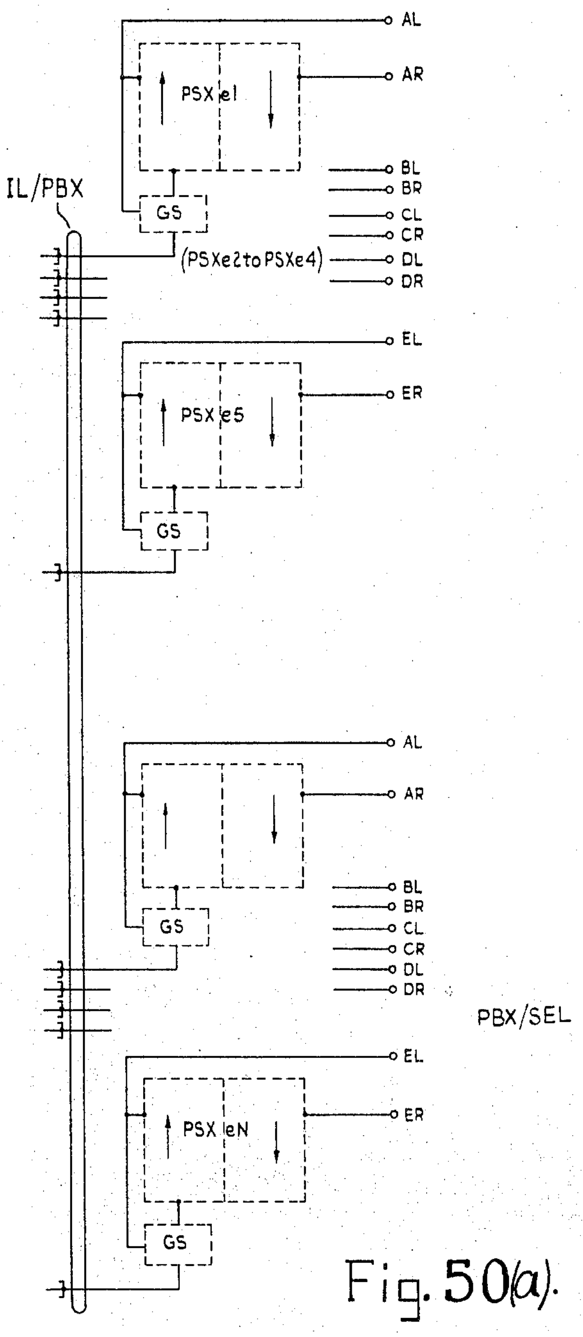
Figure 50B:
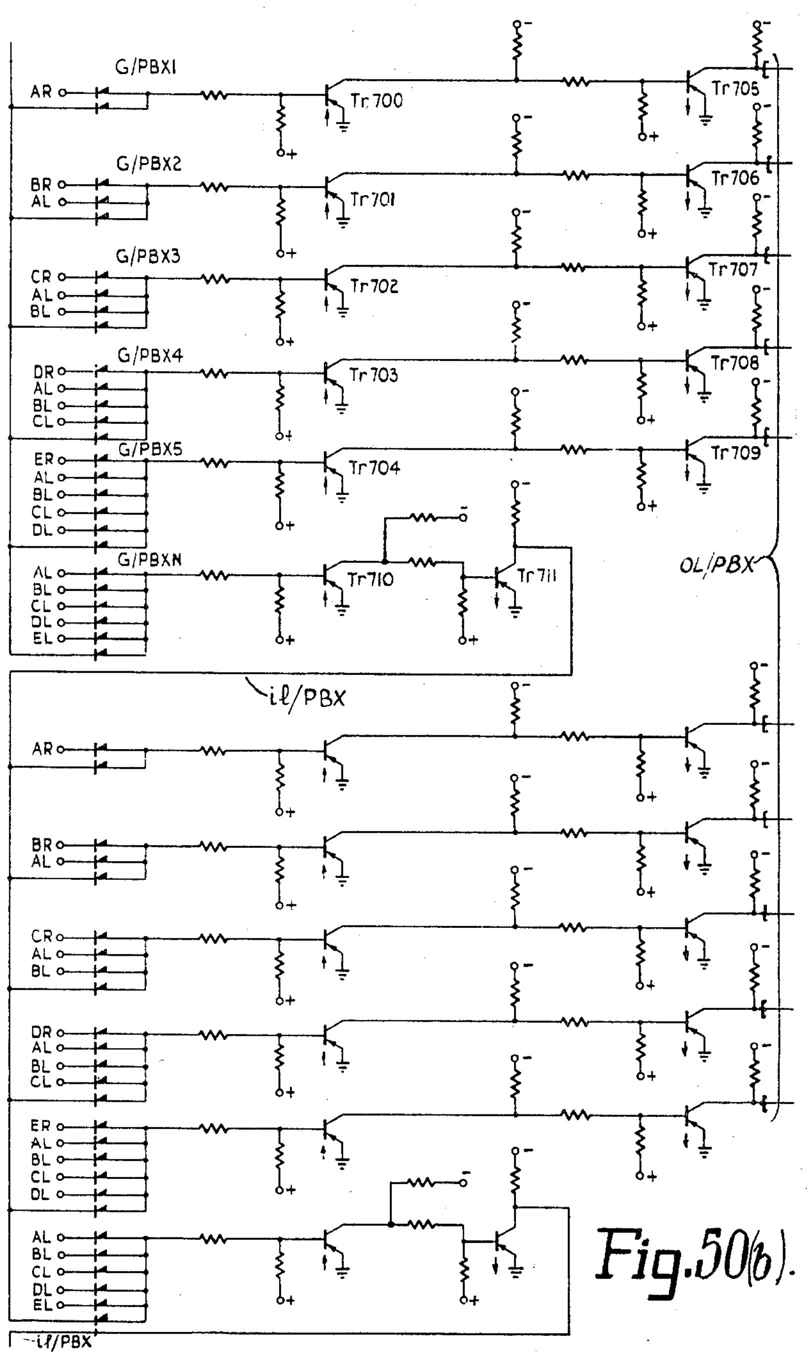

For the discriminators PQG (FIG. 34) and PQD (FIG. 39), circuits based on FIG. 49 may be used. The combinations of positive and negative markings fed into the discriminator on leads 3N and 4N represent in binary code two digits denoting the outlet to which a line is connected on the line connectors. A positive marking on any one of these leads is converted by a transistor such as T*r*620 to a negative marking at terminal "1" of an associated pair of terminals marked "1" and "0" in FIG. 49. A negative marking on any one of leads 3N and 4N appears via transistors such as T*r*620 and T*r*621 as a negative marking at terminal "0" of the associated 0/1 pair. Gates GXD1 for one digit and GXD2 for the other digit, each providing a negative output in response only to a coincidence of four negative inputs, have their input terminals selectively connected to one or other terminal of the respective 0/1 pairs of the relevant digit in such manner that each gate receives its four negative inputs in response only to a combination of markings representing a certain digit value to which the gate in question therefore relates. The outputs of the GXD1 and GXD2 gates are thus combined and gated towards a marking point MP, this gating and the selection of the digit values to which the several gates relate being organised in such manner that a negative potential appears at the marking point MP if the markings received on leads 3N and 4N denote a Q-line. For a P-line no such negative potential appears at point MP from the gating circuits. To take a specific example, consider the calling line discriminator (PQG in FIG. 34) and let it be assumed that of the hundred lines connected to each line connector (assumed to have 104 outlets as before) the lines connected to outlets 1–25 and 53–77 are P-lines and those connected to outlets 26–52 and 78–100 are Q-lines, outlets 101–104 not being required. It will be recalled that the identity of the outlet to which a calling line is connected is stored by the register, on two counters CC1 and CC2 having a capacity of 10 and 16 respectively, as the complement of the outlet number to 104+57=161 (see Table II). Consequently any one of the numbers 135–109 and 83–61 stored in the register and marked on two leads 3N and 4N, denotes a Q-line and requires the appearance of a negative potential at point MP. This can be achieved by relating the GXD1 and GXD2 gates to the digit values shown alongside their input terminals in FIG. 49 and by combining and gating their outputs in the manner shown in that figure. Thus gates GXD1 relating to digit values 6, 7, 11 and 12 are connected on their output sides through isolating rectifiers IR*f*1 towards the base of a transistor T*r*630 the collector potential of which is fed to the base of a further transistor T*r*637. For any one of these digit values the relevant gate will receive four negative inputs, resulting in conduction of transistor T*r*630 and in consequence non-conduction of transistor T*r*637, this producing through isolating rectifier IR*f*2 a negative marking at point MP. Therefore since the markings applied to gates GXD1, that is those derived from leads 3N, relate to a "tens" digit (the markings on leads 4N relating to a "units" digit) this negative marking at point MP will be obtained for register numbers 60–69, 70–79, 110–119 and 120–129 all corresponding to Q-lines. The GXD1 gate relating to digit value 8 is connected on its output side towards the base of transistor Tr632 the collector of which is connected through a gating rectifier GRf1 towards the base of transistor Tr638. Also the GXD2 gates relating to digit values 0, 1, 2, 3 are connected on their output sides through isolating rectifiers IRf3 towards the base of transistor Tr634 the collector of which is connected through gating rectifier GRf2 towards the base of transistor Tr638. Transistor Tr632 will conduct if digit value 8 is received on leads 3N and transistor Tr634 will conduct if digit value 0, 1, 2 or 3 is received on leads 4N. Because of the gating rectifiers GRf1 and GRf2 however, transistor Tr638 will remain conducting unless transistors Tr632 and Tr634 are both conductive together to back off these rectifiers from their collectors. Transistor Tr638 would then be cutoff by the positive bias on its base, resulting in the application of a negative marking from its collector to point MP. This marking is therefore obtained for register numbers 80–83 which again correspond to Q-lines. Examination of FIG. 49 in the light of the foregoing description will show that for all the Q numbers quoted above one or another of the transistors Tr637–Tr639 will be cut-off to apply a negative marking to point MP.

The lead *scl*3 from element CC*e* of the sequence control circuit of FIG. 43 normally has a negative potential which acts through rectifiers SR*f* to hold transistors Tr640 and Tr641 normally conductive and consequently transistors Tr641 and Tr643 normally non-conductive. When, at the appropriate time, the sequence control circuit applies a positive pulse to lead *scl*3, the states of transistors Tr640–Tr643 are no longer held by the potential on this lead but are now dependent on the potential at the point MP. For a Q-line this point has a negative potential as already explained so that transistor Tr640 conducts, transistors Tr641 and Tr642 are non-conductive and transistor Tr643 is permitted to conduct to extend positive (earth) potential on lead QG/D connected to its collector. For a P-line transistor Tr640 is non-conductive because of the positive bias then effective at its base, transistor Tr641 is conductive, transistor Tr643 is non-conductive and transistor Tr642 is permitted to conduct to extend positive (earth) potential over lead PG/D.

The discriminator for a called line (PQD, FIG. 39) can be designed on the same general principles as for that for the calling line taking into account the different mode of number presentation on the leads 3N*d*, 4N*d* (FIG. 39) as compared with that on leads 3N*g*, 4N*g* (FIG. 35) for a calling line. The leads PG/D and QG/D of the discriminator circuit of FIG. 49 extend as leads PG and QG to the circuit LCG in FIG. 35 or as leads PD and QD to the circuit LCD in FIG. 40 according as the discriminator is on the calling or called side.

The controller selector circuit CS shown in FIGS. 14 and 19 was referred to briefly in the foregoing description of the detailed exchange operations insofar as it provided a positive bias signal on one of the leads *ra* . . . *rn* for biasing open the gates G*x*1 . . . G*xn* (FIGS. 15 and 20) and received busying signals on leads *bla* . . . *bln* from circuits RTA*e* . . . RTN*e* when the ring-and-tone circuits to which these latter circuits pertain were busy. Considering now the circuit CS in somewhat more detail, the circuit comprises a plurality of groups of transistor pairs of which only the first group GRP1 and the last group GRPN have been shown. As for groups GRP1, each of these groups comprises five transistor pairs Tr*t*1/Tr*t*2, Tr*t*3/Tr*t*4, Tr*t*5/Tr*t*6, Tr*t*7/Tr*t*8, and Tr*t*9/Tr*t*10 having respective output terminals AL/AR, BL/BR, CL/CR, DL/DR and EL/ER which are cross-connected as indicated to a set of gates GRT1 . . . GRT5. These gates feed respective pairs of transistors Tr*t*1′/Tr*t*2′, Tr*t*3′/Tr*t*4′, Tr*t*5′/Tr*t*6′, Tr*t*7′/Tr*t*8′ and Tr*t*9′/Tr*t*10′, the second transistor of the pair in each case having its collector connected to one of the leads in the group of leads *ra*, *rb* . . . *rn*. The transistor pairs Tr*t*1/Tr*t*2 . . . etc. pertain respectively to the ring-and-tone circuits such as RTN (FIG. 18) of the exchange and the base of the first transistors (Tr*t*1 etc.) in the several pairs are connected respectively to the leads *bla* . . . *bln*.

When ring-and-tone circuits are free, the relevant leads in the group *bla* . . . *bln* are held at positive potential by the circuits such as RTA*e* . . . RTN*e* so that terminals AL, BL, CL, DL and EL are receiving negative signals and terminals AR, BR, CR, DR and ER are receiving positive signals, whereas when ring-and-tone circuits are busy the relevant *bl* leads receive negative signals, thereby reversing the polarity of the signals at terminals AL . . . ER. In the same manner as a PBX line was selected by the PBX choice circuit PBX/SEL in FIG. 50, the cross-connection of the terminals AL . . . ER to the gates GRT1–GRT5 is such that these gates select between them a free ring-and-tone circuit in the group GRP1, giving priority towards one end, the selection resulting in a positive signal on the relevant one of the leads *ra* . . . *rn*.

Also in a manner similar to the PBX choice circuit PBX/SEL each of the groups GRP1 . . . GRPN is arranged to extend a negative signal over a lead *hrtl* to maintain open the selecting gates in the succeeding group as long as its own group contains a free ring-and-tone circuit. This negative signal is obtained from the collector of a transistor such as transistor Tr712 which is held non-conducting by a transistor Tr713 as long as the latter transistor remains conducting due to a group-busy gate such as GRTB remaining open.

In order that the selection of ring-and-tone circuits by the circuit CS should be even, the selection thereof is made from a different starting point each time. This is achieved by including in the circuit CS a three-stage binary counter RTBC comprising three bistable circuits RTBC*e*1. RTBC*e*2, and RTBC*e*3 of which the first circuit RTBC*e*1 receives over lead *rsl* a positive signal from the sequence control circuit SCC (FIG. 43) each time the latter completes a sequence control operation. The counter RTBC has a group of six output leads *c*/*lo* which receive a combination of markings from the counter RTBC—the combination being changed once per sequence control operation—and which are connected in unique combinations to gates such as GRTC for each of the groups GRP1 . . . GRPN. Thus when a gate such as GRTC receives the coincidence of positive signals from the lead group *c*/*lo*, this gate is closed to cut-off a transistor Tr714 which it feeds, and this transistor, when cut-off, renders conducting transistor Tr712 so that the selection is made from the group (GRP1 . . . GRPN) immediately succeeding the group receiving coincidence markings from the counter RTBC. This group receiving said coincidence markings is therefore the last one in which a selection may be made and if there is no free ring-and-tone circuit thereon then transistor such as transistor Tr713 is cut-off. With both transistors Tr713 and Tr714 cut-off, a transistor Tr715 is rendered conducting to apply a positive "busy" pulse over lead *nlc* to the line connector choice circuit (FIG. 46) to signify that there is no free ring-and-tone circuit and thus no local controller which can handle the call.

For the purpose of preventing a "busy" pulse appearing on lead *nlc* other than in respect of a call in hand, a "hold-off" element HOF comprising two transistors Tr716 and Tr717 is provided in the circuit CS. This element HOF has transistor Tr716 normally conducting and transistor Tr717 normally cut-off, the collector potential of transistor Tr716 holding the lead *nlc* positive so that if transistor Tr715 conducts no positive pulse appears on lead *nlc*. This "hold-off" element HOF is rendered ineffectual when the controller selector CS is about to make a choice for a free ring-and-tone circuit by a negative signal applied to the base of transistor Tr717 over a lead *hofl* from the particular *u*-lead which is marked in the route selector RS (FIG. 36), so that the controller selector CS can bring about the application of a "busy" pulse to lead *nlc* if there is no free ring-and-tone circuit and there is no free local controller.

Trunk controllers are selected in a similar manner by a circuit corresponding to the controller selector, but in this case the selection of a trunk controller is made directly and set via a ring-and-tone circuit. To this end, the trunk controllers would have their own busy/free bistable circuits corresponding to circuits RTA*e* . . . RTN*e*, whereby to mark the busy/free condition of the trunk controllers on to transistor pairs in the trunk controller selectors.

In the foregoing embodiment of the invention as applied to a uniselector system, the selection of a particular section to establish a call is achieved in effect by rendering operative a controller (trunk or local) in that section. Thus there is no actual selective switching of the calling and called lines to a particular section, all the lines being permanently multipled over the sections on the line connectors. It is possible however, as an alternative, for additional switches to be provided between the lines and the line connectors and for the selection of a section to be accompanied by the selective operation of the additional switches to connect the calling and called lines to the selected section the line connectors and group connectors in that section being set to establish the call through it. This latter possibility is particularly applicable in crossbar or cross-point systems in which the additional switches could be small crossbar switches or cross-point assemblies located between the lines and the line connectors (primary switches) in the several sections, these additional switches each serving a plurality of lines connected to their input multiples and having a number of output multiples respectively leading to the several sections: the selection of a section would in this case include the operation of those contacts of the crossbar switches or cross-point assemblies (or analogous electronic switching means) which connect the required line to the output multiple leading to the selected section. In a T.D.M. system a somewhat analogous arrangement may be provided in which each line has access through respective gates to a number of pulse highways (constituting mutually separate interconnection paths as aforesaid) applied by respective sections of the exchange, a particular one of these gates being opened according to the section selected.

What I claim is:

1. A switching arrangement for an automatic telecommunications exchange comprising switching equipment permitting selective establishment of communication path between lines connected to the exchange, a plurality of switching sections constituted by respective sub-divisions of said switching equipment, connections affording access of each line to a plurality of said sections, the switching equipment in each section affording a plurality of selectable routes through it as portions of such communication paths, the routes through each section being separate from an independent of the other sections, a plurality of links connected to the switching sections and co-operating therewith in providing between any two of said lines a plurality of possible communication paths each comprising incoming and outgoing portions interconnected by one of said links with the incoming portions of the several paths extending over respective routes in different sections and likewise the outgoing portions of the several paths extending over respective routes in different sections and a section selecting arrangement comprising means operable in respect of a call between two lines for ascertaining pertinent conditions in the several sections, means for selecting from said path portions in accordance with the so ascertained conditions an incoming path portion and an outgoing path portion for a communication path between the call lines, and means for establishing this communication path over the selected path portions and the link which interconnects them.

2. A switching arrangement as claimed in claim 1 wherein each said link links a pair of routes through one and the same section whereby each section affords within itself both the incoming and the outgoing portions of a path between two lines through such link.

3. A switching arrangement as claimed in claim 1 wherein the sections cooperate in pairs in affording said plurality of possible paths between any two lines, the incoming and outgoing portions of each path being respectively afforded by the two sections of a pair and being linked by a link between these sections.

4. A switching arrangement as claimed in claim 1 wherein said links are both-way links so that either portion of an afforded communication path can be the incoming portion, the other portion being the outgoing portion.

5. A switching arrangement as claimed in claim 1 wherein the section selecting arrangement includes individual route selectors in respect of the several sections, a common section selector, means for supplying to each route selector information relative to the identities of the calling and called lines involved in a call, means in the route selectors for selecting on the basis of this information through the switching equipment in the respective sections available routes over which the call could be established, means for collating and passing to the section selector information as to the conditions in the sections pertinent to the communication paths which include the selected routes as portions thereof, the section selector including means for selecting one of these paths dependent on said information, each section also having an individual switching control arrangement including means controlled by the section selecting arrangement, in the event that that particular section is involved in the selected path, for bringing about the setting of switching equipment in the section to establish the call over the selected path.

6. A switching arrangement as claimed in claim 1 wherein the order of connection of the lines to one switching section is different from the order of connection to another section.

7. A switching arrangement as claimed in claim 1 wherein the switching equipment of each section includes line connectors to which the lines are connected in groups and wherein the lines of a group connected to a particular line connector in one section have their connections to another section distributed over at least two line connectors therein.

8. A switching arrangement as claimed in claim 1 wherein the switching equipment of each section includes line connectors to which the lines are connected in groups and group connectors which afford selective connection to the line connectors, and wherein of the line connectors connected to a particular group of lines in the several sections, all of them have connections to a particular group connector in one section, whereas in another section some of them have connections to a different group connector than the others.

9. A switching arrangement as claimed in claim 1 wherein each section is made up of a number of switching units together serving the totality of lines but each individually serving only a proportion of the lines, lines served by different units having access to each other through their units via links forming a link group interconnecting these units and the selection of a communication path for a call between two such lines including the selection of a relevant link for such path.

10. A switching arrangement as claimed in claim 9 wherein at least between units serving local lines, as distinct from junction lines, each link includes a supervisory transmission bridge circuit which is reversibly connectable to serve calls through it in either direction.

11. A switching arrangement as claimed in claim 9 wherein the lines connected to any one unit in one section have their connections to another section distributed over at least two units in another section.

12. A switching arrangement as claimed in claim 9 wherein the section selecting arrangement has means for supplying it with information as to traffic conditions in the links and includes means for effecting its selection on the basis of tending to balance traffic between link groups linking different pairs of units.

13. A switching arrangement as claimed in claim 12 wherein the section selecting arrangement includes a plurality of traffic summators means for respectively feeding them with information as to the link conditions, namely whether busy or free, in those link groups which as regards a call between any two lines include the links for the plurality of possible communication paths afforded by the sections between these lines, each traffic summator including means for producing an output signal representative of the number of free links in the relevant link group, comparing means for comparing these output signals from the several summators thereby to ascertain which of them represents a lowest traffic level, and selecting means for selecting a particular link group from a possible plurality of such groups thus ascertained as having the same lowest traffic level.

14. A switching arrangement as claimed in claim 13 wherein each traffic summator comprises a plurality of electronic devices connected to be rendered conductive in a number corresponding to the number of available links in the relevant link group and having a common load impedance which by the voltage drop across it will produce at a common point between said load impedance and the several devices a potential the magnitude of which will be dependent on the number of devices that are conducting and therefore on the number of available links in the group, an output lead of the summator being connected to said point so that said potential will appear thereon to constitute the said output signal.

15. A switching arrangement as claimed in claim 14 wherein the comparing means comprises a current responsive electric element connected between each summator output lead and the output lead of the other summators, and rectifiers similarly poled with respect to each other individually connected between said current responsive element and the output leads of the other summators respectively, whereby for unequal potential magnitudes on the output leads of the several summators, current will flow in the several current responsive devices with the exception of such of these devices for which the magnitude is greater, representing the greatest number of available links.

16. An arrangement as claimed in claim 15 wherein said current responsive devices are constituted by respective transformers having primary windings connected to the output leads, secondary windings and respective bistable circuits coupled to the secondary windings, together with means for abruptly interrupting current flow in the transformers whereby to produce a pulse in the secondary winding of each transformer in which current was flowing, such pulse being effective to reverse the state of the associated bistable circuit.

17. A circuit arrangement for comparing the magnitudes of a plurality of quantities, such as the number of items in respective groups of such items, comprising in respect of each quantity means for providing on an individual output lead an electric potential of magnitude representative of the magnitude of the quantity, a current responsive electric device connected between said output lead and the output lead correspondingly relating to the other quantities, and rectifiers similarly poled with respect to each other individually connected between said current responsive device and said other output leads respectively, whereby for unequal potential magnitudes on the output leads relating to the several quantities, current will flow in the several current responsive devices with the exception of such of those devices for which the magnitude of the pertinent quantity represents one extreme of the range of magnitudes of the several quantities.

18. A circuit arrangement as claimed in claim 17 wherein said current responsive devices are constituted by respective transformers having primary windings connected to the output leads, secondary windings and respective bistable elements coupled to the secondary windings, together with means for abruptly interrupting current flow in the transformers whereby to produce a pulse in the secondary winding of each transformer in which current was flowing, said pulse being effective to reverse the state of the associated bistable element.

19. A switching arrangement as claimed in claim 13 wherein said selecting means includes means operative to select a particular link group from a plurality thereof according to a certain order of priority.

20. A switching arrangement as claimed in claim 1 having at least one register associated therewith and including means for identifying and giving to such register the identity of a calling line, means for establishing connection between the calling line and the register, means in the register for registering the identity of the calling line and also the identity of a called line as received over said connection, a line location identifier having means for feeding it with the registered identities of the calling and called lines, route selectors for the several sections having means for feeding them in common from the line location identifier with markings identifying the locations of the calling and called lines on the switching equipment of the pertinent sections, each of which route selectors includes means for selecting a route available through its section for inclusion in one of the said plurality of possible communication paths afforded between the calling and called lines by the several sections, a section selector, means for indicating to the section selector the pertinent conditions in dependence on which the selection of one of said paths will be made, and at least one switching control circuit for each section operable on selection of a path involving its section and in dependence on line location information from the associated route selector to establish the selected path through the switching equipment.

21. A switching arrangement as claimed in claim 1 having at least one register associated therewith and including means for giving to such register the identity of a calling line, means for establishing connection between the calling line and the register, means in the register for registering the identity of the calling line and also the identity of a called line as received over said connection, a line location identifier having means for feeding it with the registered identities of the calling and called lines, route selectors for the several section having means for feeding them in common from the line location identifier with markings identifying the locations of the calling and called lines on the switching equipment of the pertinent sections, each of which route selectors including means for selecting a route available through its section for inclusion in one of the said plurality of possible communication paths afforded between the calling and called lines by the several sections, each such path including a link which is one of a plurality of such links forming a group and which at least for paths between local lines includes a supervisory transmission bridge a section selector circuit, means for indicating to the section selecting arrangement the traffic levels in the relevant link groups, said section selector including means for selecting the communication path whose link is in a link group having the lowest traffic level, and at least one switching control circuit for each section operable on selection of a path involving its section and in dependence on line location information from the associated route selector to establish the selected path through the switching equipment and the relevant link.

22. A switching arrangement as claimed in claim 20 wherein the line location identifier includes a translator having means for receiving the numerical identity of a called line from the register and translating it into an identification of the location of the called line in the several sections.

23. A switching arrangement as claimed in claim 22 serving lines including lines in PBX groups wherein the line location identifier includes means for receiving the identity of a called line from a register and ascertaining if this called line is in a PBX group, a PBX selector fed with the conditions busy or free of PBX lines connected to the exchange, and means in the PBX selector for receiving from the translator the identity of a called PBX line and for selecting from the relevant PBX group according to the conditions of the lines therein a free line which is thereupon identified by the line location identifier to the route selectors.

24. A switching arrangement as claimed in claim 23 wherein said line location identifier includes for at least the directory line of each PBX group a PBX identification circuit connected to produce a signal in response to the receipt of the identity of a PBX line, wherein said PBX selector includes a group of gates for each PBX group of lines, means for priming the gates of each group according to the conditions busy or free of the respective lines in the relevant PBX group and for actuating the gates in response to said signal from the identification circuit pertaining to this PBX group, and wherein there is further included a one-only choice circuit connected in common to said groups of gates on their output side, said choice circuit including means responsive to receipt of outputs from any group of gates to select a free line from the PBX group to which such gate group relates, said free line being indicated by a signal applied by the choice circuit to a group of output connections therefrom, and a circuit for each PBX line jointly responsive to the presence of this last signal on the relevant output connection and to the signal provided by the relevant PBX identification circuit for providing on selection of the PBX line to which it pertains markings identifying this line as being the one selected.

25. A switching arrangement as claimed in claim 24 wherein said one-only choice circuit comprises in respect of each gate of a group of PBX gates for selecting a free PBX line from the appertaining group thereof according to a certain order of priority and according to which lines of said group are available for selection a bistable circuit element settable to one or the other of its stable conditions according as the line is available for selection or not, a first marking lead marked by the bistable element in its one condition, a second marking lead marked by the bistable element in its other condition, and a gating circuit of which that pertaining to the line highest in order of priority in the group has an input lead connected to the first marking lead of the corresponding bistable element, and that pertaining to each other line in the group has an input lead connected to the first marking lead of the corresponding bistable element and a further input lead connected to the second marking lead of each bistable element pertaining to a line higher in the order of priority in the group, the several gates having respective output leads of which that of the gate pertaining to the available line of highest priority will be distinctively marked compared with the others of these output leads.

26. A switching arrangement constituted as claimed in claim 25 in respect of each of a plurality of such groups of gates from which a single available appertaining PBX line is to be selected wherein, in respect of at least each group except the first in a given order of the groups, each said gating circuit has an additional inhibiting input connection and wherein in respect of at least each group except the last there is an additional gating circuit having input connections to the second marking lead of each bistable element relating to the group, this additional gating circuit having an output connection coupled as an inhibition remover to said inhibiting input connectors of the gating circuit of the next group in said order whereby a PBX line can be selected in such next group if and only if no line is available for selection in the group preceding it.

27. A switching arrangement as claimed in claim 26 wherein the first group also has said gating circuit inhibiting input connections and the last group also has said additional gating circuit with its output connection coupled to said inhibiting leads for the first group, means being provided for at times removing the inhibition from the gating circuits of the several groups, one group at a time, independently of the additional gate in the preceding group.

28. In an automatic telecommunications exchange a PBX switching arrangement comprising means for receiving the identity of a called line and ascertaining if the called line is in a PBX group, said means including for at least the directory line of each PBX group a PBX identification circuit connected to produce a signal in response to the receipt of the identity of a PBX line, a PBX line location circuit including a group of gates for each PBX group of lines, means for priming the gates of each group according to the conditions busy or free of the respective lines in the relevant PBX group and for actuating the gates in response to said signal from the identification circuit pertaining to this PBX group, a one-only selector circuit connected in common to said groups of gates on their output side, said selector circuit including means responsive to receipt of outputs from any group of gates to select a free line from the PBX group to which such gate group relates, said free line being indicated by a signal applied by the selector circuit to a group of output connections therefrom, and a circuit for each PBX line jointly responsive to the presence of this last signal on the relevant output connection and to the signal provided by the relevant PBX identification circuit for providing on selection of the PBX line to which it pertains markings identifying this line as being the one selected.

29. A switching arrangement as claimed in claim 20 wherein for selection of a free switch from a group thereof according to a certain order of priority and according to which switches of said group are available for selection, each route selector comprises in respect of each switch of such group a bistable circuit element settable to one or the other of its stable conditions according as the switch is available for selection or not, a first marking lead marked by the bistable element in its one condition, a second marking lead marked by the bistable element in its other condition, and a gating circuit of which that pertaining to the switch highest in order of priority in the group has an input lead connected to the first marking lead of the corresponding bistable element, and that pertaining to each other switch in the group has an input lead connected to the first marking lead of the corresponding bistable element and a further input lead connected to the second marking lead of each bistable element pertaining to a switch higher in the order of priority in the group, the several gates having respective output leads of which that of the gate pertaining to the available switch of highest priority will be distinctively marked compared with the other of these output leads.

30. A switching arrangement as claimed in claim 29 wherein each route selector further includes for the several switches of said group respective additional gates of which that pertaining to the switch lowest in the said order of priority in the group has an input lead connected to the first marking lead of the corresponding bistable element, and that pertaining to each switch has an input lead connected to the first marking lead of the corresponding bistable element and a further input lead connected to the second marking lead of each bistable element pertaining to a switch lower in the said order of priority whereby as regards these additional gates the order of priority is reversed, together with means for alternately rendering effectual said additional gates on the one hand and the other said gates on the other hand.

31. An arrangement for selecting a particular item from a group thereof according to a certain order of priority and according to which items of said group are available for selection, comprising in respect of each item a bistable circuit settable to one or the other of its stable conditions according, respectively, as the item is available for selection or not, a first marking lead marked by the bistable circuit in its one condition, a second marking lead marked by the bistable circuit in its other condition, and a gating circuit of which that pertaining to the item highest in order of priority in the group has an input lead connected to the first marking lead of the corresponding bistable circuit, and that pertaining to each other item in the group has an input lead connected to the first marking lead of the corresponding bistable circuit and a further input lead connected to the second marking lead of each bistable circuit pertaining to an item higher in the order of priority in the group, the several gating circuits having respective output leads of which that of the gating circuit pertaining to the available item of highest priority will be distinctively marked compared with the others of these output leads, as a consequence of the application of a marking to each input lead of such gating circuit from the bistable circuit concerned.

32. An arrangement as claimed in claim 31 including for the several items respective additional gating circuits of which that pertaining to the item lowest in the said order of priority in the group has an input lead connected to the first marking lead of the corresponding bistable circuit, and that pertaining to each other item has an input lead connected to the first marking lead of the corresponding bistable circuit and a further input lead connected to the second marking lead of each bistable circuit pertaining to an item lower in the said order of priority whereby as regards these additional gating circuits the order of priority is reversed, together with means for alternately rendering effectual said additional gating circuits on the one hand and the other said gating circuits on the other hand.

33. Arrangements constituted as claimed in claim 31 in respect of each of a plurality of such groups of items from which a single available item is to be selected from the groups as a whole, wherein in the arrangement in respect of at least each group except the first in a given order of the groups, each said gating circuit has additionally an inhibiting input connection and wherein in the arrangement in respect of at least each group except the last there is a additional gating circuit having input leads connected to the second marking lead of each bistable element relating to the group, this additional gating circuit having an output connection coupled as an inhibition remover to said inhibiting input connections of the gating circuits of the arrangement for the next group in said order whereby an item can be selected in such next group if and only if no item is available for selection in the group preceding it.

34. Arrangements as claimed in claim 33 wherein each gating circuit of the arrangement for the first group also has said inhibiting input connection and the arrangement for the last group also has said additional gating circuit with its output connection coupled to said inhibiting input connections of the gating circuits of the arrangement for the first group, means also being provided for at times removing the inhibition from the gating circuits of the arrangements for the several groups, in one arrangement at a time, independently of the additional gating circuit of the arrangement for the preceding group.

References Cited by the Examiner

UNITED STATES PATENTS

| | | | |
|---|---|---|---|
| 2,882,344 | 4/1959 | Henquet et al. | 179—23 X |
| 2,913,534 | 11/1959 | Henquet et al. | 179—23 |
| 2,916,555 | 12/1959 | Gatzert | 179—27.021 X |
| 2,925,474 | 2/1960 | Kinsey | 179—23 |
| 2,933,564 | 4/1960 | Pearce et al. | 179—18 |
| 3,008,010 | 11/1961 | Le Queau | 179—27 |

FOREIGN PATENTS

| | | |
|---|---|---|
| 757,025 | 9/1956 | Great Britain. |
| 787,031 | 11/1957 | Great Britain. |

KATHLEEN H. CLAFFY, *Primary Examiner.*

W. L. LYNDE, ROBERT H. ROSE, *Examiners.*

S. H. BOYER, *Assistant Examiner.*